(12) United States Patent
Smith et al.

(10) Patent No.: US 12,228,925 B2
(45) Date of Patent: *Feb. 18, 2025

(54) SYSTEMS AND METHODS FOR AUTOMATED OPERATION AND HANDLING OF AUTONOMOUS TRUCKS AND TRAILERS HAULED THEREBY

(71) Applicant: Outrider Technologies, Inc., Brighton, CO (US)

(72) Inventors: Andrew F. Smith, Bend, OR (US); Lawrence S. Klein, Bend, OR (US); Stephen A. Langenderfer, Bend, OR (US); Martin E. Sotola, Boulder, CO (US); Vikas Bahl, Highlands Ranch, CO (US); Mark H. Rosenblum, Denver, CO (US); Peter James, Denver, CO (US); Dale Dee Rowley, Highlands Ranch, CO (US); Matthew S. Johannes, Arvada, CO (US); Gary Michael Seminara, Golden, CO (US); Jeremy M. Nett, Littleton, CO (US)

(73) Assignee: Outrider Technologies, Inc., Brighton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,119

(22) Filed: Oct. 9, 2023

(65) Prior Publication Data

US 2024/0152139 A1 May 9, 2024

Related U.S. Application Data

(63) Continuation of application No. 17/897,327, filed on Aug. 29, 2022, now Pat. No. 11,782,436, which is a
(Continued)

(51) Int. Cl.
*G05D 1/00* (2024.01)
*B25J 9/16* (2006.01)
(Continued)

(52) U.S. Cl.
CPC .......... *G05D 1/0061* (2013.01); *B25J 9/1679* (2013.01); *B60D 1/015* (2013.01);
(Continued)

(58) Field of Classification Search
CPC .. G05D 1/0061; G05D 1/0088; G05D 1/0276; B60L 58/12; B60L 53/36;
(Continued)

(56) References Cited

U.S. PATENT DOCUMENTS

| 3,881,748 A | 5/1975 | Donaldson |
| 4,366,965 A | 1/1983 | Rhodes |

(Continued)

FOREIGN PATENT DOCUMENTS

| CA | 2555212 A1 | 9/2005 |
| CN | 106741239 | 5/2017 |

(Continued)

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. (Year: 2008).

(Continued)

*Primary Examiner* — Gertrude Arthur Jeanglaude
(74) *Attorney, Agent, or Firm* — Loginov & Associates, PLLC; William A. Loginov

(57) ABSTRACT

A system and method for operation of an autonomous vehicle (AV) yard truck is provided. A processor facilitates autonomous movement of the AV yard truck, and connection
(Continued)

to and disconnection from trailers. A plurality of sensors are interconnected with the processor that sense terrain/objects and assist in automatically connecting/disconnecting trailers. A server, interconnected, wirelessly with the processor, that tracks movement of the truck around and determines locations for trailer connection and disconnection. A door station unlatches/opens rear doors of the trailer when adjacent thereto, securing them in an opened position via clamps, etc. The system computes a height of the trailer, and/or if landing gear of the trailer is on the ground and interoperates with the fifth wheel to change height, and whether docking is safe, allowing a user to take manual control, and optimum charge time(s). Reversing sensors/safety, automated chocking, and intermodal container organization are also provided.

22 Claims, 126 Drawing Sheets

Related U.S. Application Data continuation of application No. 16/282,258, filed on Feb. 21, 2019, now Pat. No. 11,429,099.

(60) Provisional application No. 62/715,757, filed on Aug. 7, 2018, provisional application No. 62/681,044, filed on Jun. 5, 2018, provisional application No. 62/633,185, filed on Feb. 21, 2018.

(51) Int. Cl.

| | |
|---|---|
| *B60D 1/01* | (2006.01) |
| *B60D 1/26* | (2006.01) |
| *B60D 1/62* | (2006.01) |
| *B60D 1/64* | (2006.01) |
| *B60L 53/36* | (2019.01) |
| *B60L 58/12* | (2019.01) |
| *B60R 1/00* | (2022.01) |
| *B60R 25/04* | (2013.01) |
| *B60R 25/102* | (2013.01) |
| *B60R 25/23* | (2013.01) |
| *B60R 25/25* | (2013.01) |
| *B62D 13/06* | (2006.01) |
| *B62D 15/02* | (2006.01) |
| *B62D 33/02* | (2006.01) |
| *B62D 53/08* | (2006.01) |
| *B62D 53/12* | (2006.01) |
| *B65G 69/00* | (2006.01) |
| *E05B 81/54* | (2014.01) |
| *E05C 17/02* | (2006.01) |
| *G05D 1/247* | (2024.01) |
| *G05D 1/249* | (2024.01) |
| *G05D 1/661* | (2024.01) |
| *G05D 1/81* | (2024.01) |
| *B62D 63/08* | (2006.01) |

(52) U.S. Cl.
CPC ............... *B60D 1/26* (2013.01); *B60D 1/62* (2013.01); *B60D 1/64* (2013.01); *B60L 53/36* (2019.02); *B60L 58/12* (2019.02); *B60R 1/003* (2013.01); *B60R 25/04* (2013.01); *B60R 25/102* (2013.01); *B60R 25/23* (2013.01); *B60R 25/25* (2013.01); *B62D 13/06* (2013.01); *B62D 15/0285* (2013.01); *B62D 33/0222* (2013.01); *B62D 53/0821* (2013.01); *B62D 53/12* (2013.01); *B65G 69/005* (2013.01); *E05B 81/54* (2013.01); *E05C 17/02* (2013.01); *G05D 1/0088* (2013.01); *G05D 1/0225* (2013.01); *G05D 1/0231* (2013.01); *G05D 1/0276* (2013.01); *G05D 1/247* (2024.01); *G05D 1/249* (2024.01); *G05D 1/661* (2024.01); *G05D 1/81* (2024.01); *B60L 2200/36* (2013.01); *B62D 63/08* (2013.01); *E05Y 2900/516* (2013.01); *E05Y 2900/531* (2013.01)

(58) Field of Classification Search
CPC ...... B60L 2200/36; B25J 9/1679; B60D 1/62; B60R 25/04; B60R 25/102; B60R 25/23; B60R 25/25; B62D 13/06; B62D 15/0285; B62D 53/0821; E05B 81/54; E05C 17/02; E05Y 2900/516; E05Y 2900/531
See application file for complete search history.

(56) References Cited

U.S. PATENT DOCUMENTS

| | | |
|---|---|---|
| 4,448,447 A | 5/1984 | Funk |
| 4,548,783 A | 10/1985 | Dalke |
| 5,305,427 A | 4/1994 | Nagata |
| 5,607,221 A | 3/1997 | Justus |
| 6,179,319 B1 | 1/2001 | Malisch |
| 6,863,538 B2 | 3/2005 | Mattern |
| 7,562,918 B2 | 7/2009 | Toma |
| 7,669,875 B2 | 3/2010 | Halverson |
| 7,748,549 B1 | 7/2010 | Browning |
| 8,187,020 B2 | 5/2012 | Algueera Gallego et al. |
| 8,301,318 B2 | 10/2012 | Lacaze |
| 8,532,862 B2 | 9/2013 | Neff |
| 8,727,084 B1 | 5/2014 | Kuker |
| 8,806,689 B2 | 8/2014 | Riviere |
| 8,888,121 B2 | 11/2014 | Trevino |
| 9,068,668 B2 | 6/2015 | Grover |
| 9,211,889 B1 | 12/2015 | Hoetzer |
| 9,302,678 B2 | 4/2016 | Murphy |
| 9,592,964 B2 * | 3/2017 | Göllü ................ G05B 15/02 |
| 10,081,504 B2 | 9/2018 | Walford |
| 11,099,560 B2 | 8/2021 | Smith |
| 11,429,099 B2 | 8/2022 | Smith |
| 11,560,188 B2 | 1/2023 | Moore |
| 2003/0233189 A1 | 12/2003 | Hsiao |
| 2004/0146384 A1 | 7/2004 | Whelan |
| 2005/0017506 A1 | 1/2005 | Caldwell |
| 2005/0103541 A1 | 5/2005 | Nelson |
| 2006/0071447 A1 | 4/2006 | Gehring |
| 2007/0030349 A1 | 2/2007 | Riley |
| 2008/0012695 A1 | 1/2008 | Herschell |
| 2008/0223630 A1 | 9/2008 | Couture |
| 2008/0262654 A1 | 10/2008 | Omori |
| 2010/0025964 A1 | 2/2010 | Fisk |
| 2011/0037241 A1 | 2/2011 | Temple |
| 2011/0254504 A1 | 10/2011 | Haddad |
| 2012/0248167 A1 | 10/2012 | Flanagan |
| 2014/0007386 A1 | 1/2014 | Liao |
| 2014/0251556 A1 | 9/2014 | Orton |
| 2014/0268095 A1 | 9/2014 | Petkov |
| 2015/0251366 A1 | 9/2015 | Voth |
| 2015/0258908 A1 | 9/2015 | Fukui |
| 2015/0263541 A1 | 9/2015 | Fukui |
| 2015/0328655 A1 | 11/2015 | Reichler |
| 2016/0039456 A1 | 2/2016 | Lavoie |
| 2016/0054143 A1 | 2/2016 | Abuelsaad |
| 2016/0075526 A1 | 3/2016 | Avalos |
| 2016/0260328 A1 | 9/2016 | Mishra |
| 2016/0304122 A1 | 10/2016 | Herzog |
| 2016/0318490 A1 | 11/2016 | Ben Shalom |
| 2017/0031356 A1 | 2/2017 | Bell |
| 2017/0050526 A1 * | 2/2017 | Sommarström ........ B60L 53/16 |
| 2017/0146168 A1 | 5/2017 | Caprio |
| 2017/0165839 A1 | 6/2017 | Tan |
| 2017/0174019 A1 | 6/2017 | Lurie |

(56) References Cited

U.S. PATENT DOCUMENTS

| | | | |
|---|---|---|---|
| 2017/0185082 A1* | 6/2017 | Matos | A61N 1/3956 |
| 2017/0186124 A1* | 6/2017 | Jones | G10L 25/51 |
| 2017/0305694 A1 | 10/2017 | McMurrough | |
| 2017/0361844 A1 | 12/2017 | Kahn | |
| 2017/0364070 A1 | 12/2017 | Oba | |
| 2017/0369260 A1 | 12/2017 | Hoofard | |
| 2018/0050573 A1 | 2/2018 | Strand | |
| 2018/0202822 A1 | 7/2018 | Delizio | |
| 2018/0250833 A1 | 9/2018 | Boria | |
| 2018/0264963 A1 | 9/2018 | Dudar | |
| 2018/0265076 A1 | 9/2018 | Hall | |
| 2018/0281178 A1 | 10/2018 | Jacobsen | |
| 2019/0002216 A1 | 1/2019 | Walford | |
| 2019/0064828 A1 | 2/2019 | Meredith | |
| 2019/0064835 A1 | 2/2019 | Hoofard | |
| 2019/0077600 A1 | 3/2019 | Watts | |
| 2019/0095861 A1 | 3/2019 | Baldwin | |
| 2019/0129429 A1 | 5/2019 | Juelsgaard | |
| 2019/0187716 A1 | 6/2019 | Cantrell | |
| 2019/0197786 A1 | 6/2019 | Molyneaux | |
| 2019/0235504 A1 | 8/2019 | Carter | |
| 2020/0338942 A1 | 10/2020 | Winograd | |
| 2020/0387166 A1 | 12/2020 | Lacaze | |
| 2020/0387168 A1 | 12/2020 | Lacaze | |
| 2021/0053407 A1 | 2/2021 | Smith | |
| 2021/0061304 A1 | 3/2021 | Braunstein | |
| 2021/0141384 A1 | 5/2021 | Lacaze | |
| 2021/0192784 A1 | 6/2021 | Taylor | |
| 2021/0316761 A1 | 10/2021 | Torrie | |
| 2021/0380182 A1 | 12/2021 | Delizo | |
| 2022/0080584 A1 | 3/2022 | Wicks | |
| 2022/0371199 A1 | 11/2022 | Schultz | |
| 2024/0043075 A1 | 2/2024 | Johannes | |

FOREIGN PATENT DOCUMENTS

| | | |
|---|---|---|
| CN | 107380002 | 11/2017 |
| DE | 102012102648 B4 | 9/2012 |
| DE | 102012023999 A1 | 1/2014 |
| EP | 2886497 B1 | 6/2015 |
| JP | S5885702 A | 5/1983 |
| JP | 3215916 B2 | 10/2001 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016] p. 109-p. 112.

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/? action =repository action common download&item id=20956 &item- - no=I&attribute- id=17&file- no=2 [retrieved on Nov. 27, 2018] Chapter 9.

* cited by examiner

SYSTEMS AND METHODS FOR AUTOMATED OPERATION AND HANDLING OF AUTONOMOUS TRUCKS AND TRAILERS HAULED THEREBY

RELATED APPLICATIONS

This application is a continuation of co-pending U.S. patent application Ser. No. 17/897,327, entitled SYSTEMS AND METHODS FOR AUTOMATED OPERATION AND HANDLING OF AUTONOMOUS TRUCKS AND TRAILERS HAULED THEREBY, filed Aug. 29, 2022, continuation of co-pending U.S. patent application Ser. No. 16/282,258, filed Feb. 21, 2019, entitled SYSTEMS AND METHODS FOR AUTOMATED OPERATION AND HANDLING OF AUTONOMOUS TRUCKS AND TRAILERS HAULED THEREBY, now U.S. Pat. No. 11,429,099, issued Aug. 30, 2022, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention relates to autonomous vehicles and more particularly to autonomous trucks and trailers therefor, for example, as used to haul cargo around a shipping facility, a production facility or yard, or to transport cargo to and from a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines, the raising and lowering of landing gear, the operation of rear swing doors associated with trailers, and vehicle inspections have been tasks that have typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel. Assuming the trailer is to be unloaded (e.g. after backing it into a loading dock), the driver also walks to the rear of the trailer to unlatch the trailer swing doors, rotate them back 270 degrees, and (typically) affix each door to the side of the trailer. With some trailer variations, rear doors are rolled up (rather than swung), and/or other action is taken to allow access to cargo. Other facilities, such as loading dock warning systems, chocks which prevent trailers from rolling unexpectedly and trailer-to-dock locking mechanisms rely upon human activation and monitoring to ensure proper function and safety. Similar safety concerns exist when trucks and trailers are backing up, as they exhibit a substantial blind spot due to their long length and large width and height.

Further challenges in trucking relate to intermodal operations, where yard trucks are used to ferry containers between various transportation modalities. More particularly, containers must be moved between railcars and trailers in a railyard in a particular order and orientation (front-to-rear facing, with doors at the rear). Likewise, order and orientation is a concern in dockyard operations where containers are removed from a ship.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

With the advent of autonomous vehicles, it is desirable to provide further automation of a variety of functions that have been provided manually out of tradition or reasonable convenience.

SUMMARY OF THE INVENTION

This invention overcomes disadvantages of the prior art by providing systems and methods for connecting and disconnecting trailers from truck cabs (tractors) that enhance the overall automation of the process and reduce the need for human intervention therewith. These systems and methods are particularly desirable for use in an autonomous trucking environment, such as a shipping yard, port, manufacturing center, fulfillment center and/or general warehouse complex, where the operational range and routes taken by hauling vehicles are limited and a high density of are moved into, out of and around the facility. Such trailers typically originate from, and are dispatched to, locations using over-the-road cabs or trucks (that can be powered by diesel, gasoline, compressed gas other internal-combustion-based fuels, and/or electricity in a plug-in-charged and/or fuel/electric hybrid arrangement). Cabs or trucks within the facility (termed "yard trucks") can be powered by electricity or another desirable (e.g. internal combustion) fuel source—which can be, but is not limited to, clean-burning fuel, in various implementations.

In order to facilitate substantially autonomous operation of yard trucks (herein referred to as "autonomous vehicle", or "AV" yard trucks), as well as other AV trucks and hauling vehicles, various systems are automated. The systems and methods herein address such automation. By way of non-limiting example, the operation of hitching, including the connection of brake/electrical service to a trailer by the truck is automated. Additionally, unlatching and opening of trailer (e.g. swing) doors is automated. Identification of trailers in a yard and navigation with respect to such trailers is automated, and safety mechanisms and operations when docking and undocking a trailer are automated. Access to the truck by a user can be controlled, and safety tests can be performed in an automated manner—including but not limited to a tug test that ensures a secure hitch. Likewise, the raising of the fifth wheel and verification that the trailer landing gear has disengaged the ground is automated.

In an embodiment, connection of at least the emergency brake pneumatic lines is facilitated by an interengaging connection structure that consists of a cab-mounted, conical or tapered guide structure located on the distal end of a manipulator or extension and a base connector located on the front face/wall of the trailer body having a corresponding receptacle shaped and arranged to center and register the cab guide structure so that, when fully engaged, the air connection between the cab and the trailer is complete and (at least) the emergency brakes can be actuated via pressure delivered from the cab. In a further embodiment, the cab-mounted guide structure can be adapted to include one or more electrical connectors that engage to close the power circuit between the cab and trailer. The connection arrangement can also be adapted to interconnect the service brake lines between the cab and the trailer. The connection on the trailer can be provided using a mounting plate that is removably (or permanently) attached to the front of the trailer when it enters the facility using (e.g.) clamps that engage slots on the trailer bottom. Alternatively, an interengaging fabric (e.g. hook-and-loop, 3M Dual-Lock™), fasteners, magnetic sheet or buttons, etc., can be employed to removably fasten the connection plate. The plate includes the base connector and a hose with a fitting (e.g. a glad hand) adapted to engage a standard hose fitting on the trailer.

In another embodiment, a pneumatically or hydraulically extendable (telescoping) arm is affixed behind the cab of the yard truck on a linear actuator that allows lateral movement. In addition, a second smaller pneumatic/hydraulic piston is affixed to the base and the bottom of the larger arm, allowing the arm to raise and lower. At the end of the arm is a vertical pivot or wrist (for vertical alignment) with an electrically actuated gripping device or hand, that can hold (and retrieve) a coupling device which is deployed onto the trailer to a corresponding shaped receiving receptacle. The coupling devise also has one (or more) side-mounted air-hose(s) that deliver the air pressure from the yard truck for connection to the trailer. An integrated power (and communications line) is paired with the air-hose, allowing for the actuation of a collar (lock) on a standard hose fitting to pair the coupling device to the receiving receptacle. In addition, the electrical power that is delivered via the coupling devise could also provide power to the trailer systems (as described above). In order to assist with the arm's autonomous ranging and alignment, a camera and laser-ranging device are also mounted on the gripping mechanism or hand. Once the hand delivers the coupling device (with associated air-hose and electrical connection) to the receiving receptacle and a positive air connection is detected, the grip release is actuated and the coupling remains with the receiving receptacle, as the arm is retracted back towards the cab for trailer clearance purposes. The receiving receptacle on the trailer can be mounted in a preferred available location on the front face of the trailer by the use of an interengaging fabric tape or sheet—such as industrial grade hook-and-loop material and/or Dual-Lock™ recloseable fasteners, or similar (e.g. magnetic sheets), as a removably attached device when onsite (or permanently affixed). The receiving receptacle is also marked with an identifying bordering pattern that the associated ranging/locating software can use to orient the arm and align the coupling device.

In another embodiment, in place of the extendable arm and secondary piston, two additional linear actuators are mounted, in a cross-formation onto the base linear actuator, which now runs in orientation along the length of the truck's frame. This results in the ability of the three linear actuators to move, in-concert, in the orthogonal X, Y, and Z-axis dimensions. The linear actuator that is cross-mounted on the vertical linear actuator still retains the electrically actuated gripping device or hand, as described above.

A system and method for operation of an autonomous vehicle (AV) yard truck in a yard environment is provided. A processor facilitates autonomous movement of the AV yard truck, substantially free of human user control inputs to onboard controls of the truck, and connection to and disconnection from trailers in the yard. A plurality of sensors are interconnected with the processor that sense terrain and objects in the yard and assist in automatically connecting to and disconnecting from the trailers. A server (and/or yard management system (YMS)) is interconnected, wirelessly with the processor, and tracks movement of the AV yard truck around the yard. It determines locations for connecting to and disconnecting from the trailers. Illustratively, a connection mechanism connects a service line between one of the trailers and the AV yard truck when the AV yard truck and trailer are hitched (connected) and disconnects the service line when the AV yard truck and trailer are unhitched (disconnected). The service line can comprise at least one of an electrical line, an emergency brake pneumatic line and a service brake pneumatic line. The connection mechanism can include a robotic manipulator that joins a connector on the AV yard truck to a receiving connector on the trailer. Also, the receiving connector can comprises a receptacle that is removably attached to the trailer with a clamping assembly or a receptacle that is removably attached to the trailer with an interengaging fabric-type fastener (or other types of fasting mechanisms).

Illustratively, the processor and the server communicate with a door station for unlatching and opening rear doors of the trailer when adjacent thereto. The door station can include a clamping mechanism that removably maintains the rear doors in an open position when exiting the door station.

In an embodiment, the processor and the server can communicate with a dock-mounted safety system that indicates when movement of the trailer away from the dock is enabled. The processor and server thereby instruct the truck to move when indicated by the safety system. The safety system can comprise a multi-color signal light operatively connected with the server and the processor, and/or the truck can include a sensor that reads a state of the multi-color signal light. The safety system can also (or alternatively) comprise a locking mechanism that selectively engages a portion of the trailer when movement away from the dock is not enabled. The processor and the server can communicate with a charge monitoring process that determines optimum intervals in which to charge batteries of the truck, based upon at least one of, for each truck in a monitored group, (a) the current charge state of the truck, (b) location of the truck, and (c) availability of the truck to be charged, the charge monitoring process being arranged to direct the server and the processor to return the truck to a charging station to be charged. The charging station can be adapted to allow manual or automatic charging of the truck, and the monitoring process is adapted to enable the return of the truck to be instructed manually by a user or automatically, based on current charge state. The charge monitoring process can communicate with a user via a graphical user interface. Illustratively, the processor can communicate with a tug-test process that, when the truck is hitched to the trailer, automatically determines whether the trailer is hitched, more particularly by applying motive power to the truck and determining load on the truck thereby.

In an embodiment, the processor communicates with a sensor assembly that is directed rearward and is adapted to sense a feature on a visible portion of the trailer when adjacent to, or hitched to, the truck. The sensor assembly is interconnected with a height determination process that computes at least one of (a) a height of the trailer, and (b) if a landing gear of the trailer is engaged or disengaged from the ground. The feature can comprise at least one of a fiducial on the trailer front face and an edge on a body of the trailer. Illustratively, the fiducial comprises an ID code with information encoded thereinto. More particularly, the ID code can comprise an ARTag. The height determination process can be operatively connected with a fifth wheel height controller that raises and lowers the fifth wheel in response to a computation of at least one of (a) and (b). Additionally, the computation can include a determination of a required trailer height to provide clearance for a predetermined location.

In an embodiment, an authentication process can communicate with the server and the processor, receiving input identification data from a user, and can verify, based upon stored information, an identity and authorization of the user to assume manual control of the truck from an autonomous driving mode. An interface can be provided on the truck, into which a user inputs at least one of passwords, user names, and biometric information. If the authentication process determines that the user is not authorized to assume manual control, it can perform at least one of (a) alerting the server, (b) stopping the truck and (c) returning the truck to a secure location.

In an embodiment, a wheel dolly arrangement is provided, which engages wheels of the trailer, and isolates the wheels from the ground, thereby allowing for hitching and movement of the trailer with respect to the truck. The wheel dolly arrangement can include automated wheel brakes that respond to braking signals from the truck.

In an embodiment, a system and method for automatically connecting at least one service line on a truck to a trailer is provided. A receiver on the trailer is permanently or temporarily affixed thereto. The receiver is interconnected with at least one of a pneumatic line and an electrical line. A coupling is manipulated by an end effector of a robotic manipulator to find and engage the receiver when the trailer is brought into proximity with, or hitched to, the truck. A processor, in response to a position of the receiver, moves the manipulator to align and engage the coupling with the receiver so as to complete a circuit between the truck and the trailer. The end effector can be mounted on at least one of (a) a framework moving along at least two orthogonal axes and having a rearwardly extending arm, (b) a multi-degree-of-freedom robot arm, and (c) a linear-actuator-driven arm with pivoting joints to allow for concurrent rearward extension and height adjustment. The linear-actuator-driven arm can be mounted on a laterally moving base on the truck chassis. A pivoting joint attached to the end effector can include a rotary actuator to maintain a predetermined angle in the coupling. The coupling can include an actuated, quick-disconnect-style fitting adapted to selectively and sealingly secure to a connector in the receptacle. The actuated, quick-disconnect-style fitting can comprise a magnetic solenoid assembly that selectively and slidably opens and allows closure of the quick-disconnect-style fitting in response, to application of electrical current thereto. A tensioned cable can be attached to the coupling and a pneumatic line can be attached to the truck brake system. The brake system can comprise at least one of a service brake and an emergency brake. An electrical connection can be provided on the coupling attached to the truck electrical system. Illustratively, the receptacle is removably attached to a front face of the trailer by at least one of an interengaging fabric material, fasteners, clamps and magnets.

In an embodiment, a retrofit kit for the trailer is provided, which includes a Y-connector assembly for at least one of a trailer pneumatic line and a trailer electrical line, the Y-connector assembly connects to both a conventional service connector and the receiver. The Y-connector assembly can be operatively connected to a venting mechanism that selectively allows one of the coupling and the conventional service connector to vent. The conventional service connector can comprises a glad hand.

In an embodiment, a system and method for robotically opening rear swing doors of a trailer is provided. A framework is adapted to receive, adjacent thereto, a trailer rear. A member on the framework can move in a plurality of degrees of freedom in relation to the framework and trailer, and the member can include structures that are arranged to manipulate a door securing assembly on the trailer. A door opening assembly engages and swings the doors subsequent to unlocking, and an interface guides the framework and the door opening assembly remotely. A door-fixing assembly can retain each door in an open orientation after the trailer moves remote from the framework. Illustratively, the door opening assembly comprises at least one of a robotic arm assembly and a post assembly that move approximately vertically into and out of engagement with each of the doors, and moves along a path from a closed position and the open orientation. The posts can be movably mounted with respect to a slotted floor that allows each of the posts to track along a respective slot, defining the path. In an embodiment, the door-fixing assembly can comprise an end effector, operatively connected with the framework, which selectively applies a clip or clamp-like device over the door and a side of the trailer via a rear edge thereof in the open orientation. The interface can comprise a sensor assembly that views the rear of the trailer and a processor that causes the framework to move in response to control commands. Illustratively the processor includes at least one of (a) a human-machine-interface (HMI) control that allows a user to move the framework based on feedback received from the sensor assembly, and (b) an autonomous movement process that automatically moves the framework based on a trained pattern in response to the sensor assembly. The sensor assembly can also comprise a camera assembly and the autonomous movement process includes a vision system.

In an embodiment, a system and method for operating a truck in a yard is provided. An autonomous truck and hitched trailer responsive to an onboard processor and a remote server is provided. A dock-mounted safety system indicates when movement of the trailer away from the dock is enabled. The processor and server instruct the truck to move when indicated by the safety system. The safety system comprises a multi-color signal light operatively connected with the server and the processor. The truck can include a sensor that reads a state of the multi-color signal light. The safety system can also comprise a locking mechanism that selectively engages a portion of the trailer when movement away from the dock is not enabled.

In an embodiment, a system and method for controlling charging of an electric truck in a facility, within a group of trucks, in which the truck(s) have an on-board processor is provided. A remote server can be provided, in which both of (or one of) the processor and the server communicate with a charge monitoring process that determines optimum intervals in which to charge batteries of the truck based upon, at least one of, for each truck in a monitored group, (a) the current charge state of the truck, (b) location of the truck, and (c) availability of the truck to be charged. The charge monitoring process is arranged to direct the server and the processor to return the truck to a charging station to be charged. The charging station is adapted to allow manual or automatic charging of the truck and the monitoring process is adapted to enable the return of the truck to be instructed manually by a user or automatically, based on the current charge state. Illustratively, the charge monitoring process communicates with a user via a graphical user interface.

In an embodiment, a system and method for operating an autonomous truck with respect to a trailer is provided. A vehicle-based processor communicates with a tug-test process that, when the truck is hitched to the trailer, automatically determines whether the trailer is hitched by applying motive power to the truck and determining load on the truck thereby.

In an embodiment, a system and method for handling a trailer with respect to a truck is provided. A processor communicates with a sensor assembly that is directed rearward on the truck, and is adapted to sense a feature on a visible portion of the trailer when adjacent to, or hitched to, the truck. The sensor assembly is interconnected with a height determination process that computes at least one of (a) a height of the trailer, and (b) if landing gear of the trailer is engaged or disengaged from the ground. The feature can comprise at least one of a fiducial on the trailer front face and an edge on a body of the trailer. More particularly, the fiducial can comprise an ID code with information encoded thereinto and/or an ARTag. Illustratively, the height determination process can be operatively connected with a fifth wheel height controller that raises and lowers the fifth wheel in response to a computation of at least one of items (a) and (b) above. The computation can include a determination of a required trailer height to provide clearance for a predetermined location.

In an embodiment, a system and method for controlling access by a user to an autonomous truck, in a facility having a server is provided. An authentication process communicates with the server and an on-board processor of the truck, receives input identification data from a user and verifies, based upon stored information, an identity and authorization of the user to assume manual control of the truck from an autonomous driving mode. An interface can be provided on the truck, into which a user inputs at least one of passwords, user names, and biometric information. Illustratively, the authentication process, if determining that the user is not authorized to assume manual control, can perform at least one of (a) alerting the server, (b) stopping the truck and (c) returning the truck to a secure location.

In an embodiment, a system and method for allowing movement of a trailer around a facility in a manner that is free of interconnection of service connections between a truck and the trailer is provided. A wheel dolly arrangement engages and isolates wheels of the trailer from the ground, and allows for hitching and movement of the trailer with respect to the truck. The wheel dolly arrangement can include automated wheel brakes that respond to braking signals from the truck. An air pressure supply or other switchable power source (controlled by RF or other signals from the truck) is used to operate brakes and/or lights on the wheel dolly.

In an embodiment, a system and method for retaining opened swing doors on a trailer includes a clip-like clamping device constructed and arranged to flex and frictionally pinch each opened swing door against a side of the trailer. The clamping device resides over a rear edge of the swing door and the side when in an attached orientation. The clamping device can define a pair of tines, with a gap therebetween, joined by a connecting base. The clamping device can be adapted to be slid robotically or manually over the rear edge, and/or the connecting base can include a structure that is selectively engaged by an end effector of a robot. Illustratively, the clamping device comprises a flexible material and defines a unitary construction between the tines and the connecting base. The geometry of the tines can vary (e.g. define a curve, polygonal or other shape) to facilitate flexure, clearance over structures on the door/trailer side, and/or enhance grip.

In an embodiment, a system and method for handling a trailer with a truck in a manner that is free of service connections between a pneumatic brake system of the truck and a brake system of the trailer is provided. A pressurized air canister is removably secured to the trailer, and connected to the brake system thereof. The arrangement includes a valve, in line with the canister, which is actuated based upon a signal from the truck to release the brake system. Illustratively, the truck is an autonomous truck, and the signal is transmitted wirelessly from a controller of the truck. More particularly the truck can be an AV yard truck, and the canister can be adapted to be attached to the trailer upon delivery of the trailer to a yard, by (e.g.) an OTR truck.

In an embodiment, a system and method for identifying and orienting with respect to container wells on railcars in a yard comprises a scanner that scans rail cars, based on relative motion between the railcars and the scanner, and compares the tags to stored information with respect to the railcars. The scanner can be a fixed scanner and the rail cars pass relative thereto. The tags can be RFID tags, located on at least one of a front or rear of each of the rail cars. Alternatively, or additionally, the scanner can be part of a moving perception system with sensors that scans the railcars. A processor can be arranged to receive information on the railcars from the perception system, and organize parking locations for container-carrying trailers adjacent to the railcars, based upon location and orientation of the wells. Illustratively the trailers are moved by autonomous vehicle (AV) yard trucks under control of at least one system server. In embodiments, a processor receives information on the railcars from the scanner and organizes parking locations for container-carrying trailers adjacent to the railcars based upon location and orientation of the wells. The trailers can be moved by AV yard trucks under control of at least one system server.

In an embodiment, a system and method for locating a glad hand connector on a front face of a trailer comprises a gross sensing system that acquires at least one of a 2D and a 3D image of the front face, and searches for glad hand-related image features. The gross sensing system locates features having a differing texture or color from the surrounding image features after identifying edges of the trailer front face in the image. The gross sensing system can include a sensor located on a cab or chassis of an AV yard truck. A fine sensing system, located on an end effector of a fine manipulator, can be moved in a gross motion operation to a location adjacent to a location on the front face containing candidate glad hand features. The fine sensing system can includes a plurality of 2D and/or 3D imaging sensors. The fine manipulator can comprise a multi-axis robotic arm mounted on a multi-axis gross motion mechanism. The gross motion mechanism can comprise a plurality of linear actuators mounted on the AV yard truck that move the fine manipulator from a neutral location to the location adjacent to the glad hand candidate features. Illustratively, the gross motion mechanism comprises a piston driven, hinged platform mounted on the AV yard truck that moves the fine manipulator from a neutral location to the location adjacent to the glad hand candidate features. The fine manipulator can be servoed based upon feedback received from the fine sensing system relative to the glad hand imaged thereby. Illustratively, the fine sensing system locates a trained feature on the glad hand to determine pose thereof. The feature can be at least one of the annular glad hand seal, an outline edge of a flange for securing the glad hand, and a tag attached to the glad hand. The tag can include a fiducial matrix that assists in determining the pose. The tag can be located on a clip attached to a raised element on the glad hand. The feature can include a plurality of identification regions on a gasket seal of the glad hand.

In an embodiment, a system and method for attaching a truck based pneumatic line connector to a glad hand on a trailer using a manipulator with an end effector that selectively engages and releases the connector includes a clamping assembly that selectively overlies an annular seal of the glad hand, and that sealingly clamps the connector to the annular seal. The clamping assembly can be at least one of an actuated clamp and a spring-loaded clamp. Illustratively, the spring-loaded claim is normally closed and is opened by a gripping action of the end effector. The actuated clamp includes one of (a) a pivoting pair of clamping members and (b) a sliding clamping member.

In an embodiment, a system and method for attaching a truck based pneumatic line connector to a glad hand on a trailer, using a manipulator with an end effector that selectively engages and releases the connector, includes a probe member containing a pressure port, which inserts into, and becomes lodged in, an annular seal of the glad hand based upon a placement motion of the end effector. The probe member can comprise one of (a) a frustoconical plug that is releasable press fit into the annual seal, and (b) an inflatable plug that selectively engages a cavity in the glad hand beneath the annular seal and is inflated to become secured therein. The frustoconical plug includes a circumferential barb to assist in retaining against the annular seal.

In an embodiment, a system and method for attaching a truck-based pneumatic line connector to a trailer glad hand on a trailer, using a manipulator with an end effector that selectively engages and releases the connector, comprises another glad hand that is secured to the trailer glad hand in a substantially conventional manner. The other glad hand include a quick-disconnect (universal) fitting that receives the selectively connector from the end effector. A corresponding, opposite-gender, fitting is carried by the end effector to selectively connect and disconnect the universal fitting.

In an embodiment, a system and method for assisting reverse operations on a trailer hitched to an autonomous truck comprises an unmanned vehicle that is deployed with respect to a rear of the trailer and that images a space behind the trailer prior to and/or during a reversing motion. The unmanned vehicle can comprise at least one of an unmanned aerial vehicle (UAV), and an unmanned ground vehicle (UGV) that can be a robotic vehicle having a plurality of sensor types thereon and that tracks a perimeter of the trailer to locate a rear thereof. Illustratively, the sensor types can include forward looking sensors and upward looking sensors. The UGV can also be adapted to travel along a top of the roof of the trailer. A deployment mechanism on the truck can lift the UGV from a location on the truck, and place the UGV on the roof. The UGV can be arranged to travel with respect to a centerline of the roof. The UGV includes at least one of tracks and wheels that frictionally engage the roof.

In an embodiment, a system and method for assisting reverse operations on a trailer, hitched to an autonomous truck comprises a moving sensor assembly mounted on a linear guideway. The guideway is mounted laterally on a structure adjacent to a parking area for trailers to be received. The sensor assembly provides/transmits sensor data related to a space behind the trailer, which is employed by at least one of a facility control server for the autonomous truck and an on-board controller of the autonomous truck. The sensor assembly can include at least one of a vision system camera, LIDAR and radar, among other known visual and spatial sensor types. Illustratively, the guideway is mounted with respect to a loading dock and/or can comprise at least one of a rail, wire and track. The sensor assembly can move to a location in the structure in which the autonomous truck is operating, and the sensor assembly is constructed and arranged to provide the sensor data to a plurality of autonomous trucks when reversing, respectively, at that location in the structure.

In an embodiment, a system and method for transporting an over-the-road (OTR) trailer with an AV yard truck comprises a split dolly trailer having a front, and a pair of separated rails extending rearwardly from the front. The front includes a fifth-wheel hitch for engaging the truck, and a plurality of rear wheels located on each of the rails adjacent to a rear the split dolly trailer. The split dolly trailer, and its associated wheels, are interconnected with electrical and pneumatic lines of the AV yard truck to provide braking to the dolly rear wheels and lighting to the dolly rear. A lifting mechanism is located with respect to the wheels so that, when the split dolly is backed onto and engages the OTR trailer, the rails are lifted to remove wheels of the OTR trailer from the ground. Hence, the OTR trailer can be fully supported and moved by the split dolly, which is semi-permanently hitched to the AV yard truck. Illustratively, the rails are arranged to change in length to accommodate a predetermined length of OTR trailer.

In another embodiment, a system and method for transporting an over-the-road (OTR) trailer with an AV yard truck comprises a pair of autonomous, moving dollies each adapted to engage wheel sets on each of opposing, respective sides of the OTR trailer. The dollies are each adapted to lift the OTR trailer wheel sets out of contact with the ground, and provide braking and lighting in response to signals provided by the AV yard truck.

In an embodiment, a system and method for automatically applying a jackstand to a trailer comprises a base mounted to a ground surface and a rotation mechanism that rotates a jackstand assembly from an orientation substantially flush with the ground surface to an upright orientation with jack pads confronting a bottom of the trailer. A pair of telescoping jackstand members move, in the upright orientation, from a retracted location beneath the bottom of the trailer to a deployed location that engages the bottom of the trailer, and thereby supplements and/or replaces the trailer's standard landing gear.

In an embodiment, a system and method for automated chocking of a trailer comprises a pair of pads having a predetermined length that is greater than a length of a wheel set of the trailer. The pads are secured to the ground and arranged/adapted for the trailer wheel sets to drive thereonto. An inflatable material selectively inflates to define a plurality of undulating surfaces that cradle the wheels of the wheel sets to resist rolling of the wheels. The inflatable material, conversely, enables free rolling of the wheels when deflated. Illustratively, the inflatable material can define a sawtooth cross section when inflated, with a series of substantially triangular teeth.

In an embodiment, a system and method for automated chocking of a trailer comprises a pair of manifold housings having a predetermined length that is greater than a length of a wheel set of the trailer. The housings are adapted for the wheel sets to drive therebetween with the manifold housings residing along each of opposing respective sides. A plurality of side-by-side inflatable tubes extend inwardly toward an adjacent one of the wheel sets. The fully extended tubes project across the wheels of the wheel sets to resist rolling thereof.

In an embodiment, a system and method for automated chocking of a trailer comprises a track that resides beneath the trailer; and a slider that moves along the track. A bar assembly selectively moves into and out of interference with a wheel set of the trailer when the slider moves the bar assembly along the track into proximity with the wheel set. The bar assembly can include a pair of oppositely extending bar extensions that selectively lengthen to bar assembly from a width less than an inner width between the wheel sets and a width that is greater that the inner width. Alternatively, at least one of the bar assembly and the slider includes a rotation mechanism that rotates the bar between an elongated orientation substantially parallel to the track and a transverse orientation that extends across a path of travel of the wheel sets.

In an embodiment, a system and method for transporting an over-the-road (OTR) trailer with an autonomous yard truck is provided. The system and method comprises a gantry system having a framework with wheels at a front and rear thereof and having a lifting mechanism that is adapted to be backed onto the trailer with the lifting mechanism confronting an underside of the trailer. The lifting mechanism is constructed and arranged to raise the underside so that the trailer is disengaged from contact with a ground surface. A drive control directs the wheels to move and steer into alignment and engagement with the trailer, and a braking and/or an illumination system operates based upon commands from a system controller. Illustratively, the system controller is part of at least one of an automated yard truck that hitches with respect to at least one of the framework and the trailer when lifted by the lifting mechanism. The lifting mechanism can span a full length of the trailer.

In another embodiment, a system and method for transporting an over-the-road (OTR) trailer with an autonomous truck comprises a moving dolly that is sized and arranged to be deployed, and travel beneath, an underside of the OTR trailer, and to reside between opposing wheel sets adjacent to a rear of the OTR trailer. Pinching elements on the dolly engage each of the opposing wheel sets and are adapted to lift the wheel sets out of contact with the ground, and to provide braking and lighting in response to signals provided remotely. Illustratively, the signals are provided by at least one of a system server and the autonomous truck. A tether can also be provided, which selectively extends from an attachment location on the autonomous truck to the dolly. The tether can carry at least one of pneumatic pressure and electrical power. Additionally, the autonomous truck can be arranged to secure the dolly with respect to a chassis thereof when the dolly is in an undeployed state.

In another embodiment, a system and method for transporting an over-the-road (OTR) trailer with an autonomous truck comprises a pair of autonomous, moving dollies, which are each adapted to engage wheel sets on each of opposing, respective sides of the OTR trailer. The dollies are also each adapted to lift the wheel sets out of contact with the ground, and provide braking and lighting in response to signals provided by the autonomous truck. Illustratively, each of the dollies includes an on-board processor and/or power supply for autonomous operation, and is deployed from a remote location. The remote location can be at least one of a facility waiting area, a location on a chassis of the autonomous truck and a charging station. The dollies can include sensors that allow movement and alignment with respect to the OTR trailer and wheel sets, and can provide signals to a controller. The controller can be provided with respect to at least one of the autonomous truck and a system server. A tether selectively extends from an attachment location on the autonomous truck to at least one of the dollies. The tether can carry at least one of pneumatic pressure and electrical power. The autonomous truck can be arranged to secure the dolly with respect to a chassis thereof when the dolly is in an undeployed state.

In another embodiment, a system for transporting an over-the-road (OTR) trailer in a yard comprises a robotic tug, which is adapted to pass under the OTR trailer when it is supported on landing gear thereof and to engage a kingpin of the OTR trailer. The tug includes sensors that identify and locate the kingpin and landing gear, and that provide signals to a controller associated with a system server. The tug further provides power for motion and a vertically moving support that selectively lifts the kingpin when engaged thereto. Illustratively, the system and method further comprises at least one of (a) a dolly assembly that engages wheel sets on each of opposing, respective sides of the OTR trailer, in which the dolly assembly is adapted to lift the wheel sets out of contact with the ground and provide braking and lighting in response to signals that are coordinated with motion of the robotic tug, and (b) a robotic manipulator mounted with respect to the robotic tug that removably engages at least one of a brake pressure connection and an electrical connection on the OTR trailer, to thereby provide power and pneumatic pressure from a source associated with the robotic tug.

In another embodiment, a system and method for determining a relative angle of a trailer with respect to a truck in a confronting relationship, in which the truck is attempting to move in reverse to hitch to the trailer is provided. A spatial sensing device is located to face rearward on the truck, the sensing device oriented to sense space beneath an underside of the trailer. A processor identifies and analyzes data points generated by the sensing device with respect to at least one of landing gear legs of the trailer and wheel sets of the trailer, and thereby determines the relative angle. The sensing device can comprise a high-resolution LIDAR device that generates points, and associated groups of points (e.g. 3D point clouds), using projected rings of structured light. The processor identifies point groups/clouds, and compares the point groups to expected shapes and locations of the landing gear legs. If one of the landing gear legs is occluded, then the processor is adapted to estimate a location of the occluded landing gear leg to determine the relative angle. The processor is also adapted to locate and analyze a shape and position of the wheel sets to, at least one of, (a) confirm a determination of the relative angle based on the landing gear legs and (b) determine the relative angle independently where analysis the landing gear legs is unavailable or inconclusive. The processor can be arranged to determine a location of a kingpin of the trailer.

In an embodiment, a system and method for determining a relative location of a kingpin of a trailer with respect to a truck in a confronting relationship, in which the truck is attempting to move in reverse to hitch to the trailer, is provided. A spatial sensing device is located to face rearward on the truck. The sensing device is oriented to sense space beneath an underside of the trailer. A processor identifies and analyzes data points (e.g. 3D point clouds) generated by the sensing device with respect to at least one of the kingpin, landing gear legs of the trailer and wheel sets of the trailer so as to, thereby, determine the relative location of the kingpin. Illustratively, the sensing device is a high-resolution LIDAR device that generates the points/point clouds using projected rings of structured light. The processor identifies point groups/clouds and compares the point groups/clouds to expected shapes and locations of the kingpin and landing gear legs. The processor can be arranged to iteratively image with the LIDAR device and locate groups of points that represent the expected locations. The processor thereby provides the relative location of the kingpin in response to a confidence value above a predetermined threshold.

BRIEF DESCRIPTION OF THE DRAWINGS

The invention description below refers to the accompanying drawings, of which:

FIG. 74I is a side view of the tug vehicle and trailer of FIG. 74H in alignment, preparing to engage and lift the kingpin;

FIG. 77 is a fragmentary perspective view of the trailer and associated landing gear located adjacent to the automatically deploying jack stand of FIG. 76, shown in a deployed position with pads confronting the bottom of the trailer;

FIG. 78 is a fragmentary perspective view of the trailer and associated landing gear located adjacent to the automatically deploying jack stand of FIG. 76, shown in an engaged position with pads bearing against, and supporting the bottom of the trailer;

FIG. 79 is a fragmentary perspective view of a trailer and associated wheel set parked on an inflatable, sawtooth-shaped automated chocking pad, shown in a deflated, un-deployed condition, according to an embodiment;

FIG. 80 is a fragmentary perspective view of the trailer and associated wheel set of FIG. 79 in which the automated chocking pad is in an inflated, deployed condition with sawteeth engaging and restraining the wheel sets against motion;

FIG. 81 is a fragmentary perspective view of a trailer and associated wheel set parked adjacent to a manifold that deploys a plurality of inwardly extending, inflatable tubes to provide an automated chocking assembly, shown in a deflated, un-deployed condition, according to an embodiment;

FIG. 82 is a fragmentary perspective view of the trailer and associated wheel set of FIG. 81 in which the automated chocking assembly is in an inflated, deployed condition with tubes engaging and restraining the wheel sets against motion;

FIG. 83 is a fragmentary perspective view of a trailer and associated wheel set parked on an automated chocking assembly that uses a centerline track with a sliding, transverse pipe/bar having retractable, opposing retractable pipe/bar extensions, shown in an un-deployed condition, according to an embodiment;

FIG. 84 is a fragmentary perspective view of the trailer and associated wheel set, with the opposing pipe/bar extensions of the automated chocking assembly of FIG. 83 in an extended, deployed condition, prepared to engage the wheel sets;

FIG. 85 is a fragmentary perspective view of the trailer and associated wheel set, with the deployed pipe/bar extensions of the automated chocking assembly of FIG. 83 slid into engagement with the wheel set to restrain it against motion;

Figure 86:
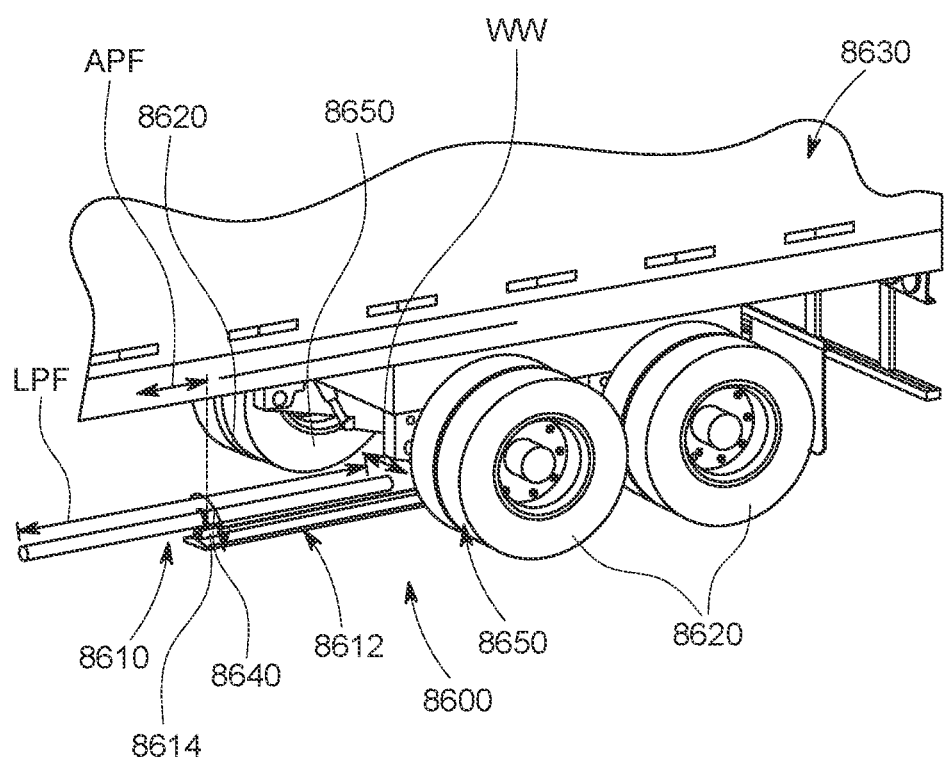
Figure 87:
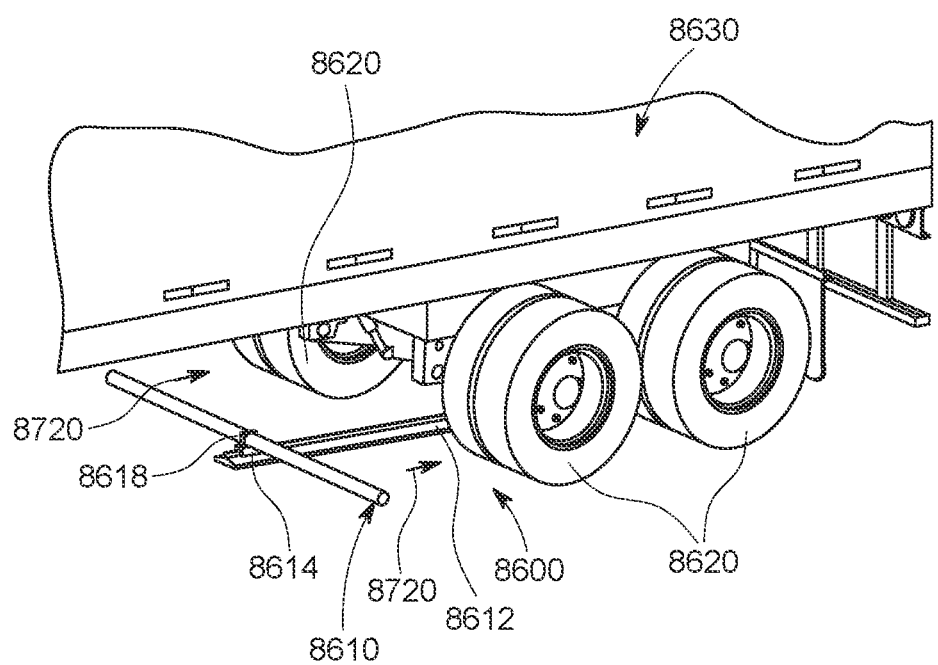
Figure 88:
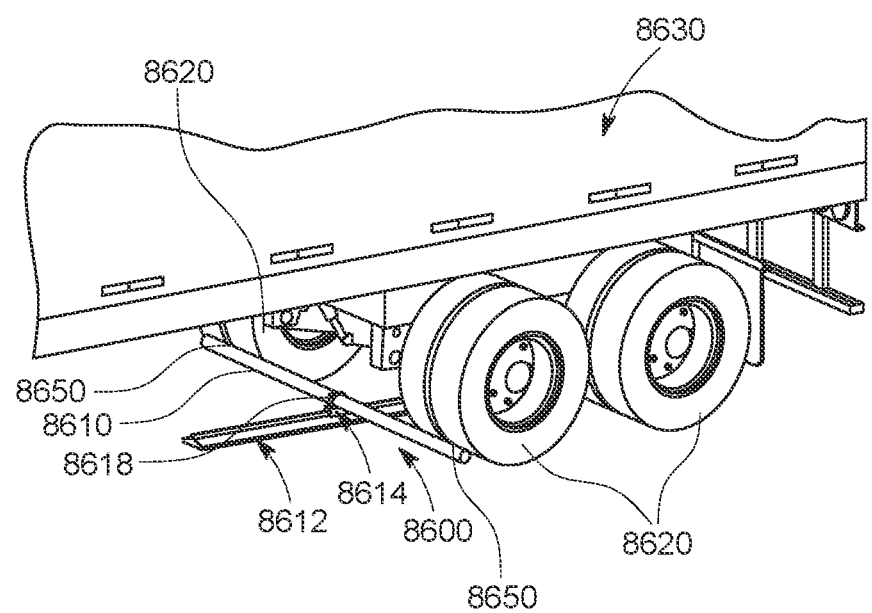
Figure 89:
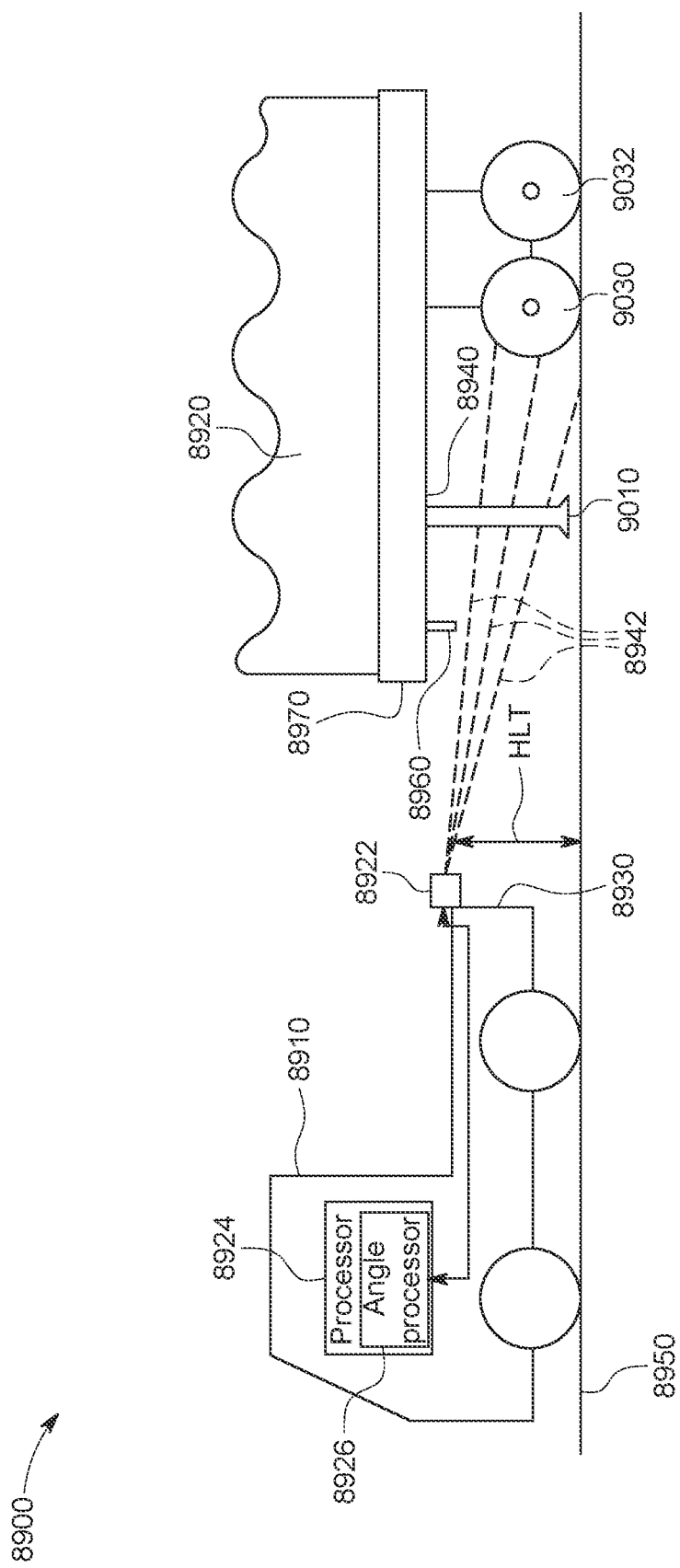
Figure 90:
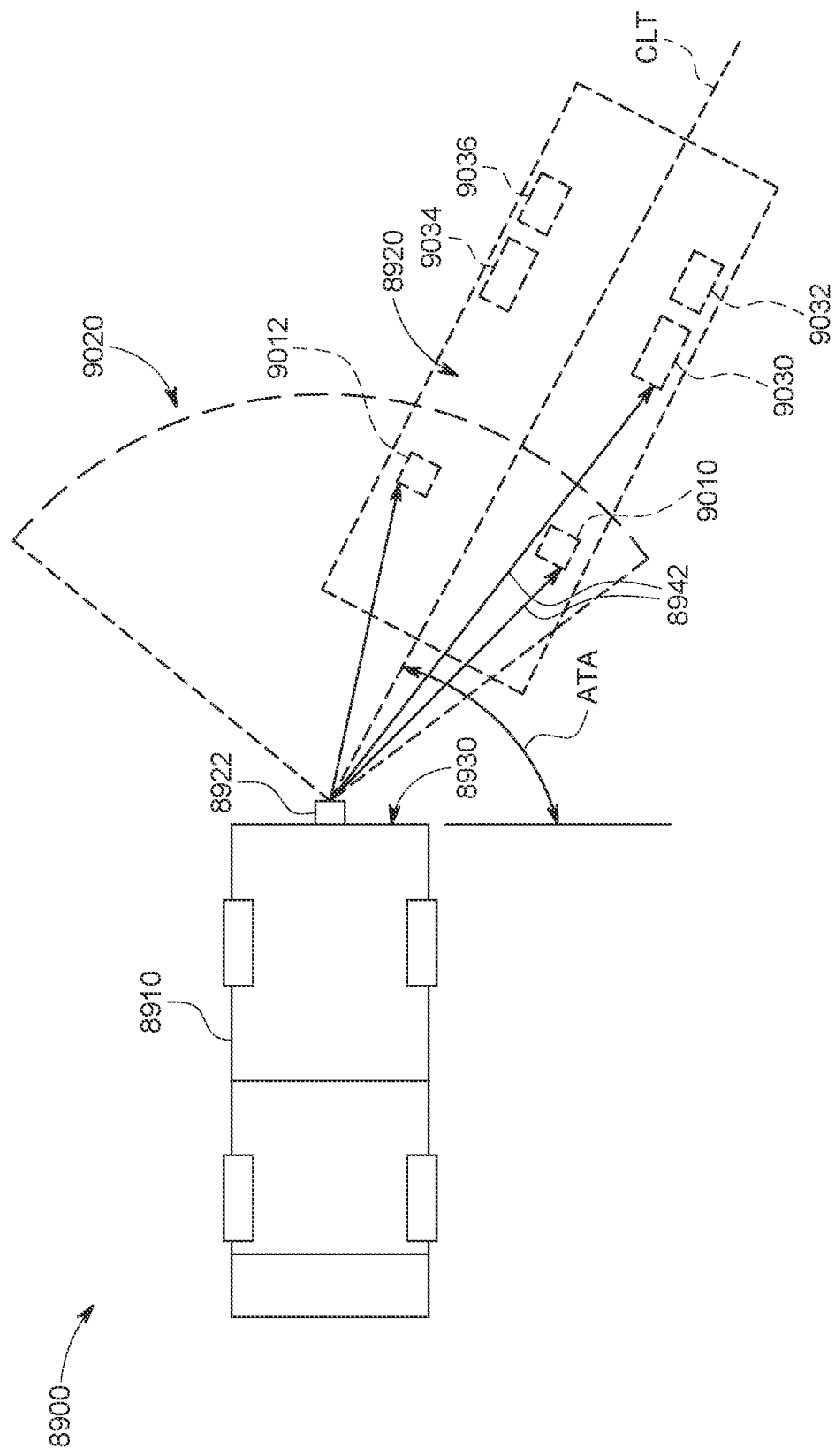
Figure 91:
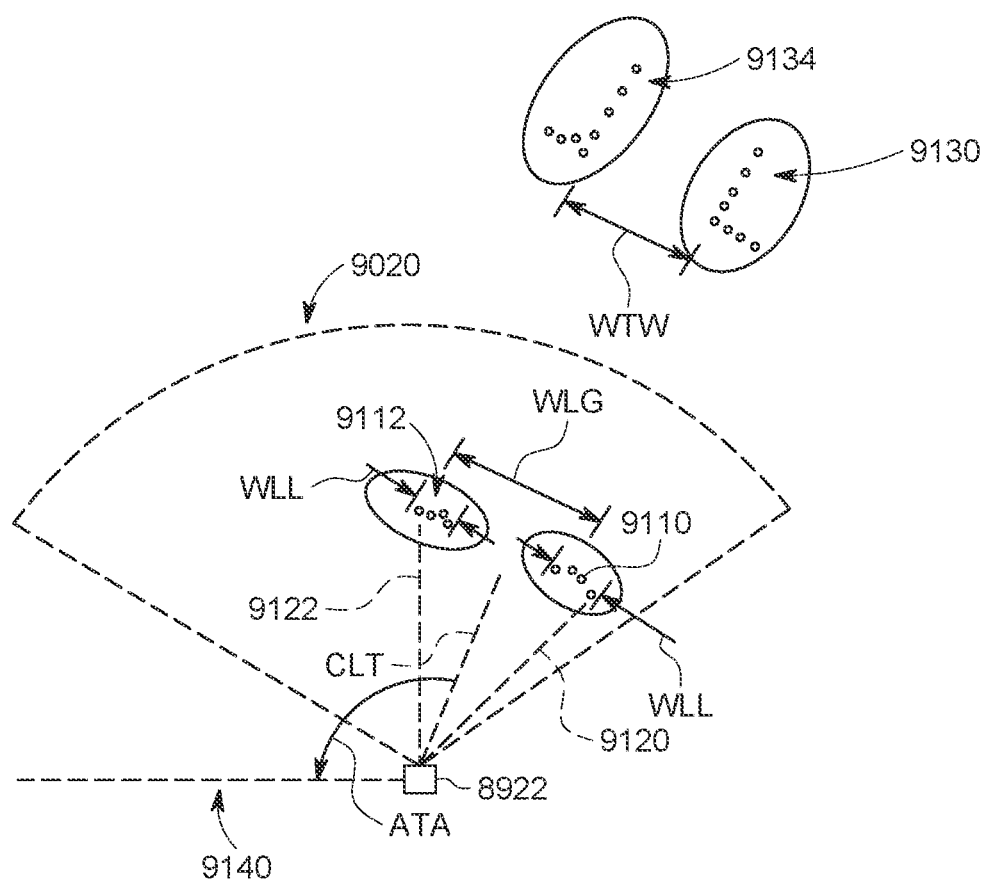
Figure 92:
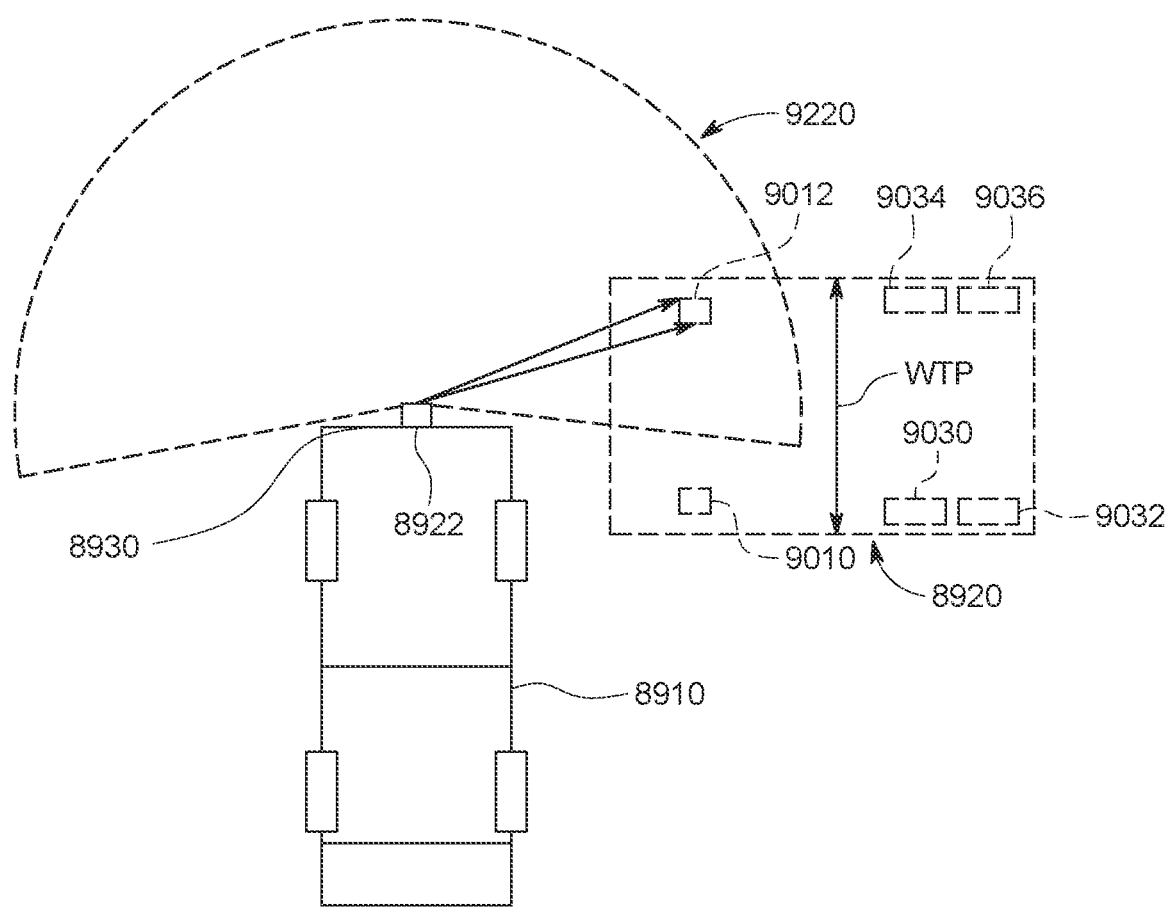
Figure 93:
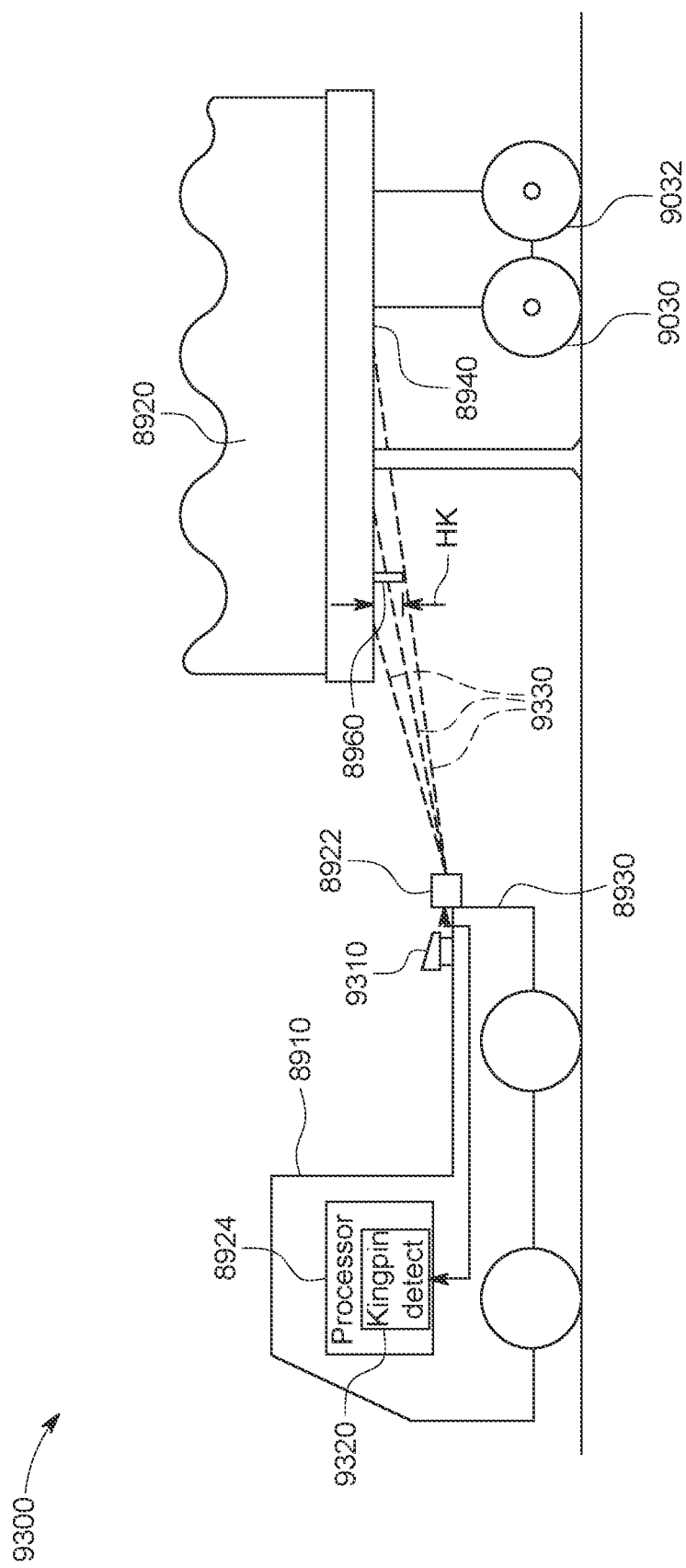
Figure 94:
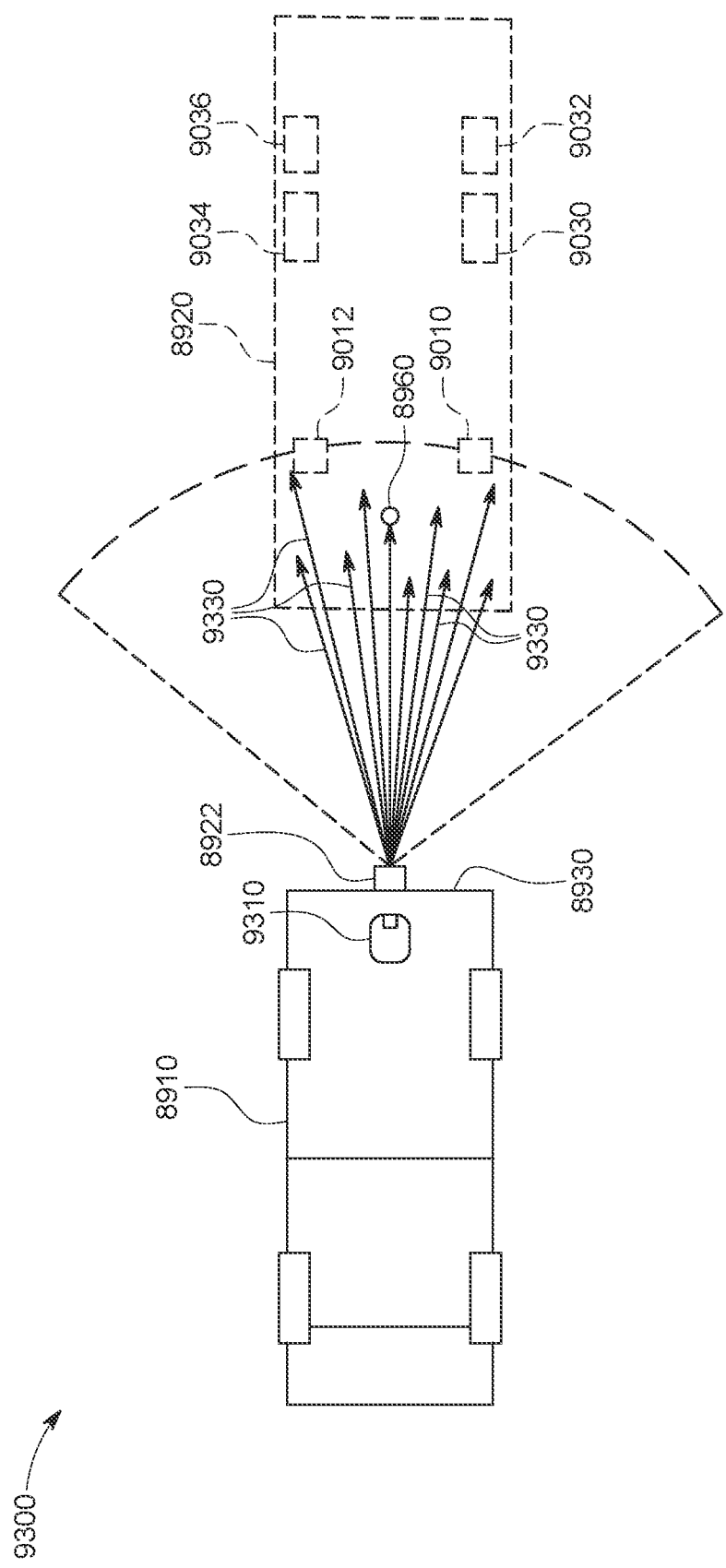
Figure 95:
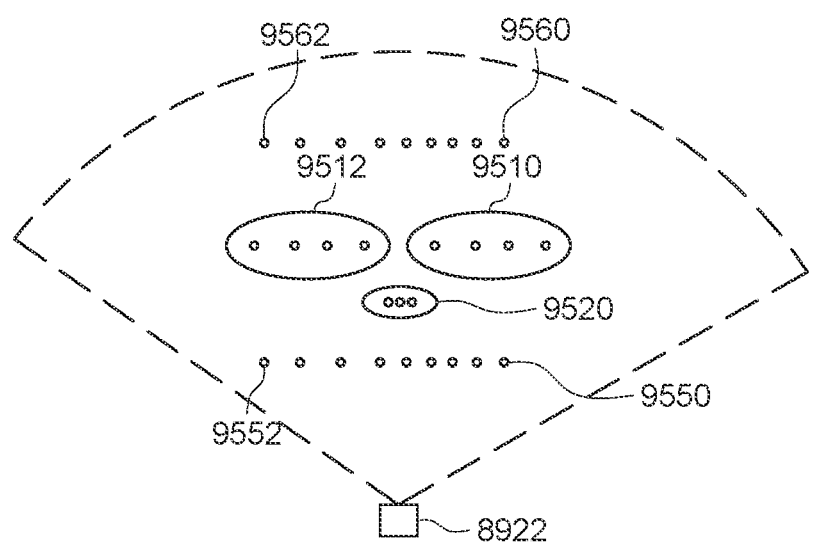
Figure 96:
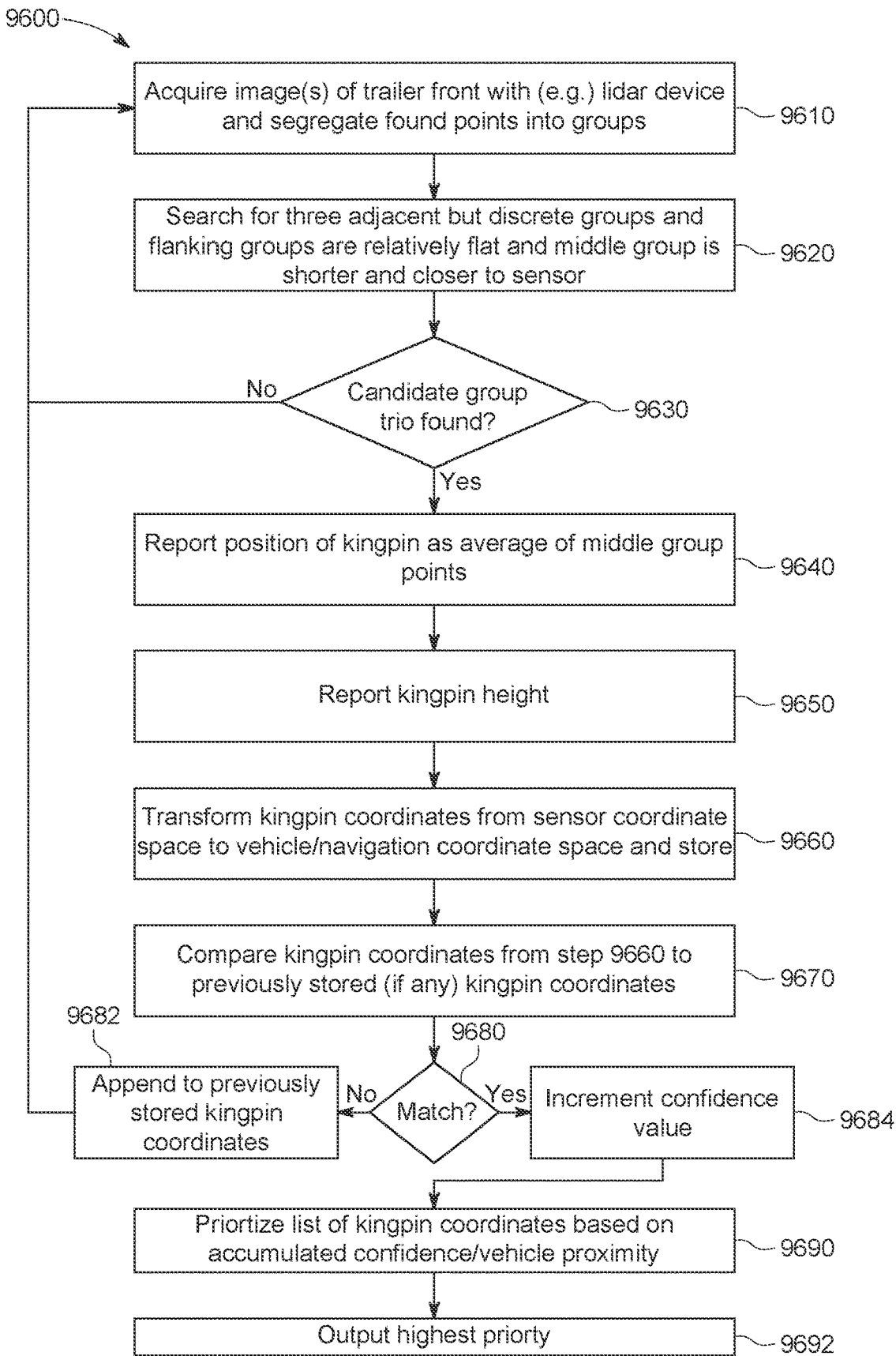

FIG. 86 is a fragmentary perspective view of a trailer and associated wheel set parked on automated chocking assembly that uses a centerline track with a sliding, transverse pipe/bar having a pivot mechanism on the slider to rotate the bar between an un-deployed orientation, parallel to the track, and a deployed orientation transverse to the track, shown in the un-deployed orientation, according to an embodiment;

FIG. 87 is a fragmentary perspective view of the trailer and associated wheel set, with the pipe/bar of the automated chocking assembly of FIG. 86 in a rotated, deployed orientation, prepared to engage the wheel sets;

FIG. 88 is a fragmentary perspective view of the trailer and associated wheel set, with the deployed pipe/bar of the automated chocking assembly of FIG. 87 slid into engagement with the wheel set to restrain it against motion;

FIG. 89 is a side view of an autonomous (e.g. yard) truck and trailer, arranged to allow hitching thereof together using a truck-rear-mounted high-resolution LIDAR device and associated process(or) that locates and determines the relative angle of the trailer (centerline) with respect to the truck;

FIG. 90 is a top view of the truck and trailer arrangement of FIG. 89 showing locations of trailer landing gear and wheel sets with respect to the beam pattern of the rear-mounted LIDAR device;

FIG. 91 is a top view of the LIDAR-device-scanned area of the trailer of FIGS. 89 and 90, showing point groups representative of landing gear legs and wheels, used in determining the relative trailer angle;

FIG. 92 is a top view of the truck and trailer arrangement of FIGS. 89 and 90 being scanned by the LIDAR device beams where the trailer centerline is oriented at an approximate right angle to the central axis of the beam cone/truck centerline, in which one trailer landing gear leg is occluded from view;

FIG. 93 is a side view of an autonomous (e.g. yard) truck and trailer, arranged to allow hitching thereof together using a truck-rear-mounted high-resolution LIDAR device and associated process(or) that locates and determines the position of the trailer kingpin used to hitch to the truck fifth wheel;

FIG. 94 is a top view of the truck and trailer arrangement of FIG. 93 showing locations of trailer kingpin, landing gear and wheel sets with respect to the beam pattern of the rear-mounted LIDAR device;

FIG. 95 is a top view of the LIDAR-device-scanned area of the trailer of FIGS. 93 and 94, showing point groups representative of the kingpin and landing gear legs, used in determining the position of the kingpin within the vehicle/navigation coordinate space; and FIG. 96 is a flow diagram showing a procedure for identifying and determining the position of the trailer kingpin using the LIDAR device in accordance with FIGS. 93-95.

DETAILED DESCRIPTION

I. Overview

Figure 1:
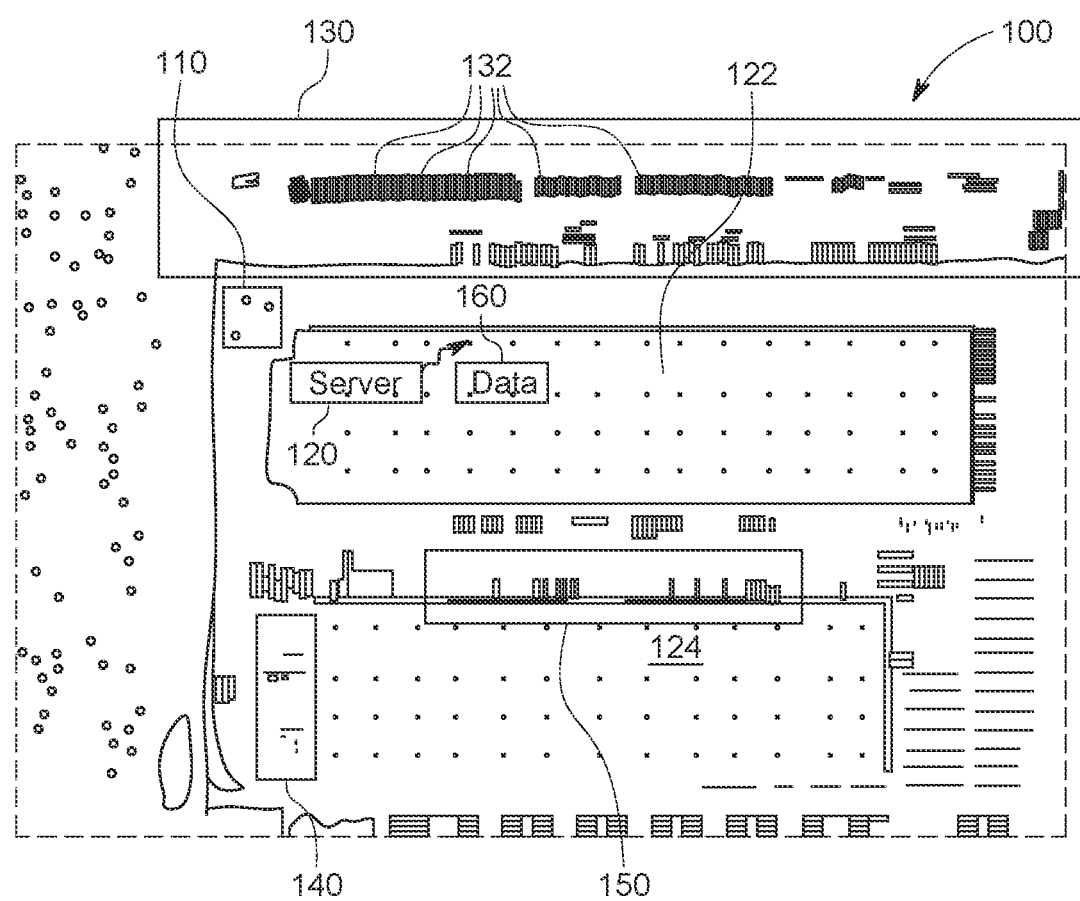
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or elsewhere—such as a storage depot). In a standard operational procedure, the OTR transporter arrives with a trailer at a destination's guard shack (or similar facility entrance checkpoint) 110. The guard/attendant enters the trailer information (trailer number or QR (ID) code scan-imbedded information already in the system, which would typically include: trailer make/model/year/service connection location, etc.) into the facility software system, which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant would then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (YMS), which can reside on the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its marked parking space in order to retrieve the trailer. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth ($5^{th}$) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage, confirming tire inflation levels, and verifying other safety criteria.

The hitched trailer is hauled by the AV yard truck to an unloading area 140 of the facility 100. It is backed into a loading bay in this area, and the opened rear is brought into close proximity with the portal and cargo doors of the facility. Manual and automated techniques are then employed to offload the cargo from the trailer for placement within the facility 100. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 100. The trailer, with rear swing (or other type of door(s)) open, is backed into a loading bay and loaded with goods from the facility 100 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors on the AV yard truck and/or other manual or automated data collection devices—for example, terrestrial and/or aerial camera drones.

Having described a generalized technique for handling trailers within a facility reference is now made to FIGS. 2-4, which show exemplary yard trucks 200 and 300 for use with the various embodiments described hereinbelow. The yard truck 200 (FIG. 2) is powered by diesel or another internal combustion fuel, and the yard truck 300, 400 (FIGS. 3 and 4) electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200, 300, 400 of each example respectively includes at least a driver's cab section 210, 310, 410 (which can be omitted in a fully autonomous version) and steering wheel (along with other manual controls) 212, 312, 412 and a chassis 220, 320, 420 containing front steerable wheels 222, 422, and at least one pair of rear, driven wheels 224, 424 (shown herein as a double-wheel arrangement for greater load-bearing capacity). The respective chassis 220, 320, 420 also includes a so-called fifth ($5^{th}$) wheel 240, 340, that (with particular reference to the truck 300, 400 in FIGS. 3 and 4) is arranged as a horseshoe-shaped pad 342, 442 with a rear-facing slot 344 (FIG. 3), which is sized and arranged to receive the kingpin hitch (shown and described further below) located at the bottom of a standard trailer (not shown). The fifth wheel 240, 340, 440 is shown tilted downwardly in a rearward direction so as to facilitate a ramping action when the truck is backed onto the trailer in FIG. 2. In FIG. 4, the fifth wheel 440 is shown raised by a lever arm assembly 446, which, as described below, allows the landing gear of the trailer (when attached) to clear the ground during hauling by the truck 400. The lever assembly 446 or other fifth wheel-lifting mechanisms can employ appropriate hydraulic lifting actuators/mechanisms known to those of skill so that the hitched trailer is raised at its front end. In this raised orientation, the hitch between the truck and trailer is secured.

The AV yard truck can include a variety of sensors as described generally above, that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.).

Figure 2:
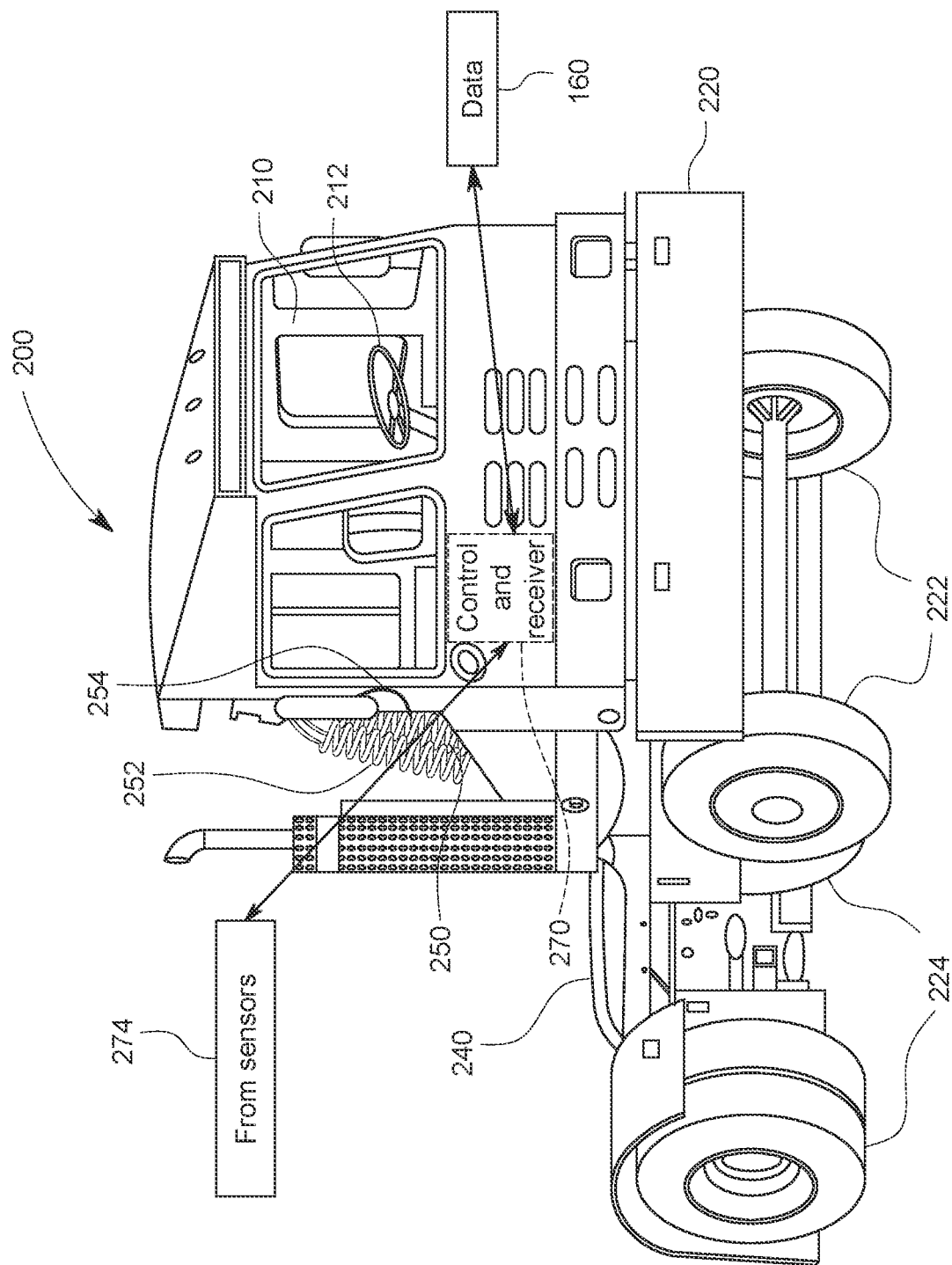
FIG. 2 is a perspective view of a fuel-powered AV yard truck for use in association with the system and method herein.
Figure 3:
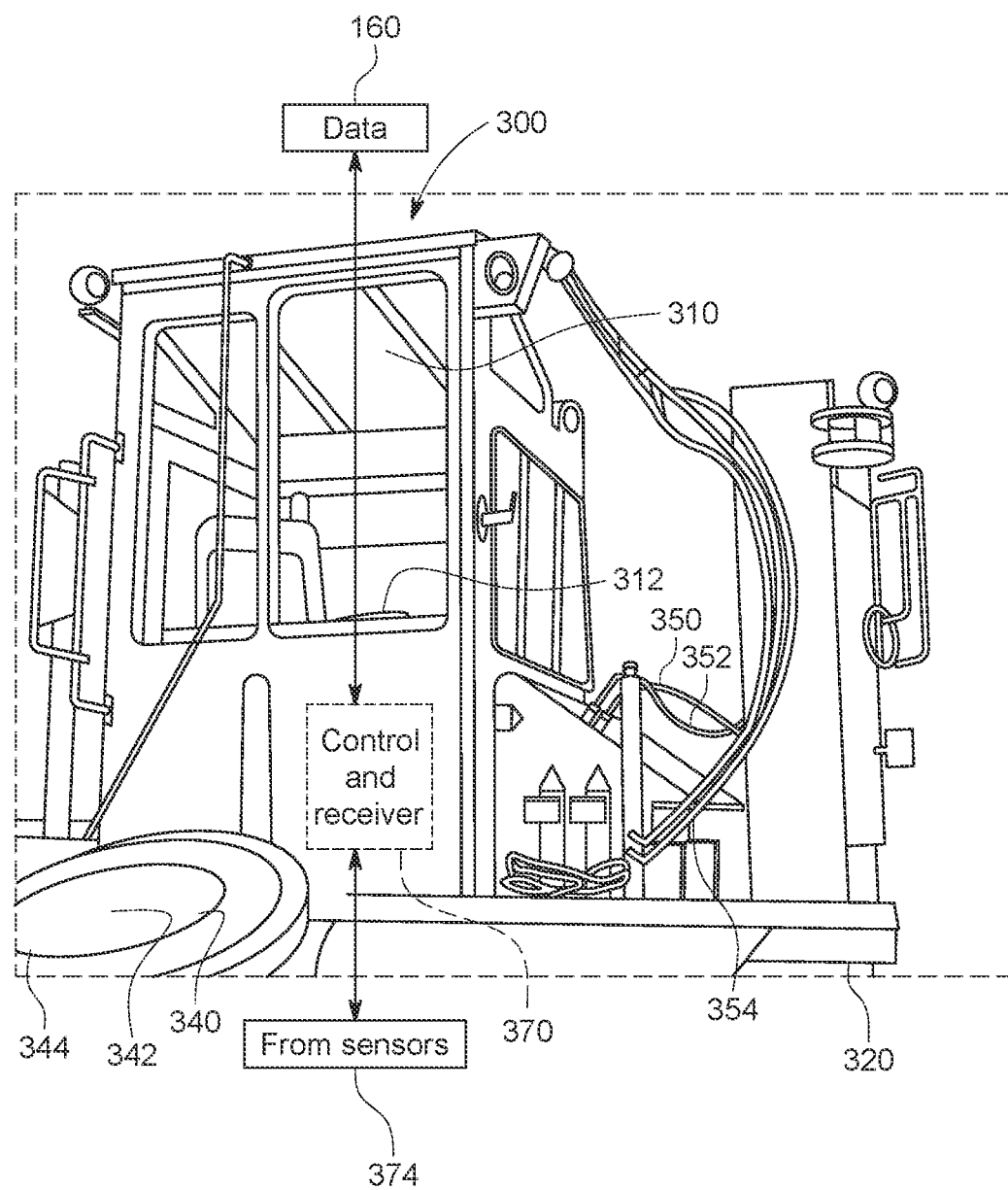
FIG. 3 is a rear-oriented perspective view of an electrically powered AV yard truck for use in association with the system and method herein, showing service connections (e.g. pneumatic braking and electrical) thereof.
Figure 4:
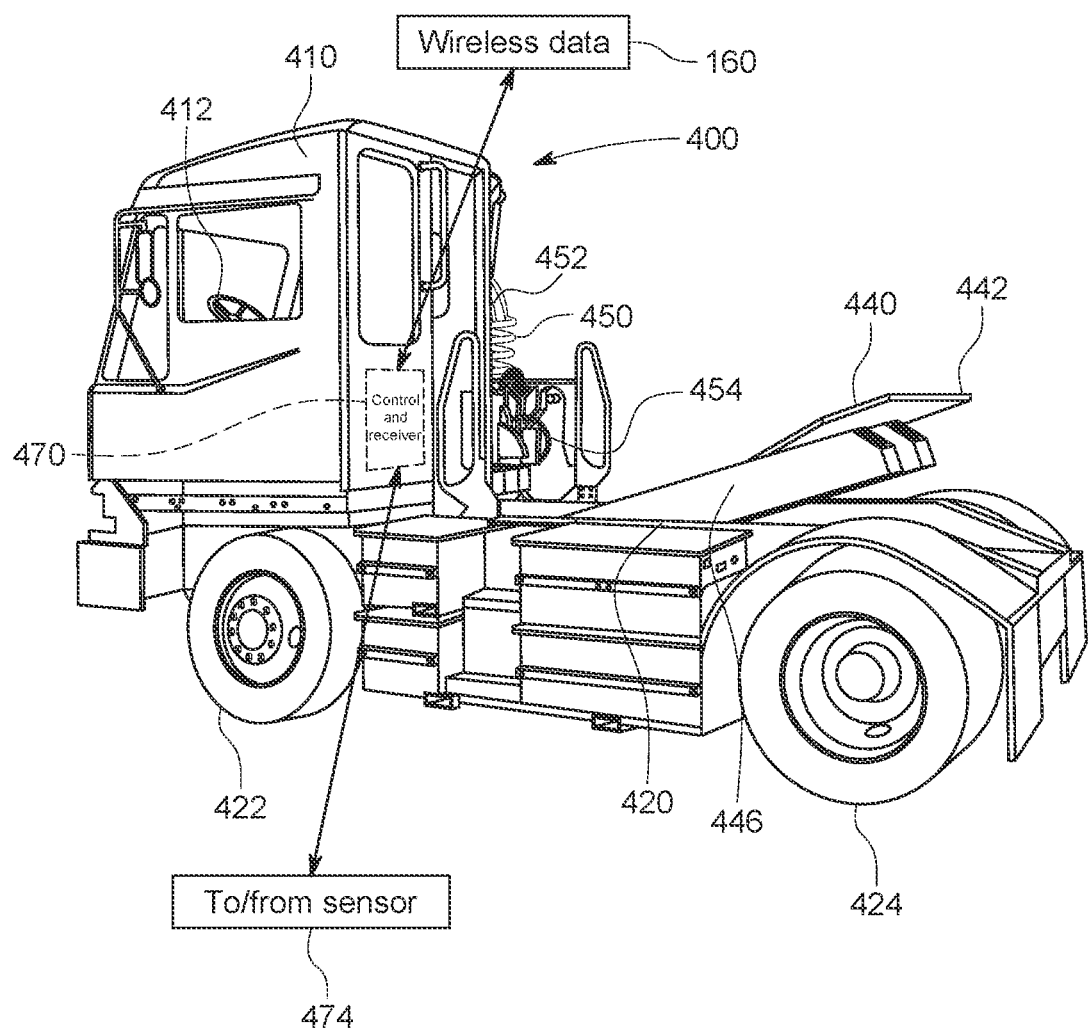
FIG. 4 is a rear-oriented perspective view of another electrically powered AV yard truck, showing a truck chassis raised fifth wheel thereof.
Figure 5:
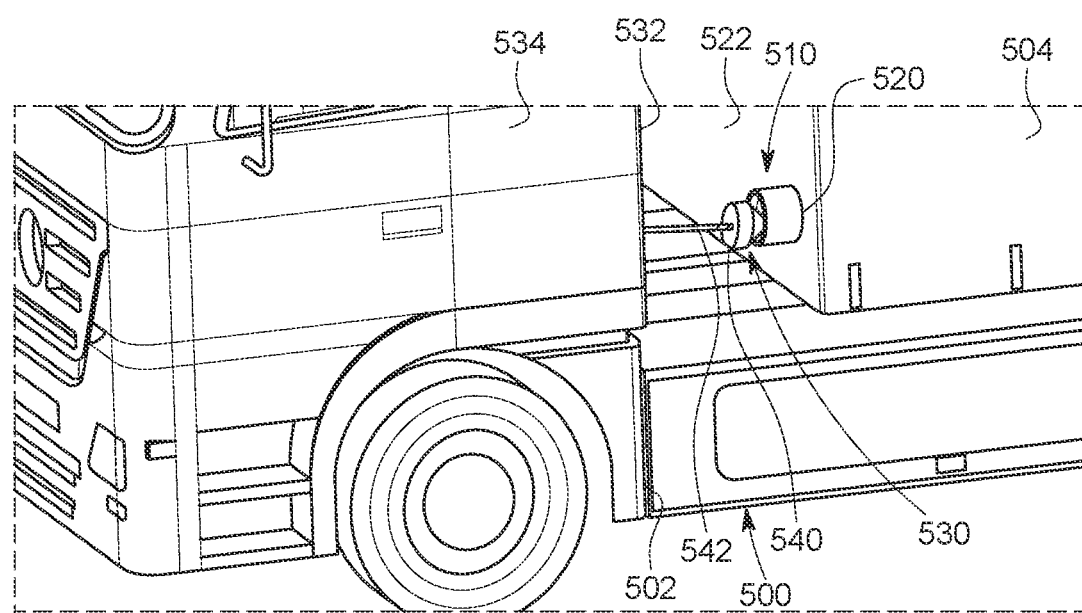
FIG. 5 is a partial, side-oriented perspective view of a hitched AV yard truck and trailer showing a pneumatic connection consisting of a truck-mounted probe and a trailer-mounted receptacle according to an embodiment.

Notably, the AV yard truck 200, 300 and 400 of FIGS. 2, 3 and 4, respectively, includes an emergency brake pneumatic hose 250, 350, 450 (typically red), service brake pneumatic hose 252, 352, 452 (typically blue) and an electrical line 254, 354, 454 (often black), that extend from the rear of the cab 210, 310, 410 and in this example, are suspended front the side thereof in a conventional (manually connected) arrangement. This allows for access by yard personnel when connecting and disconnecting the hoses/lines from a trailer during the maneuvers described above. The AV yard truck 200, 300, 400 includes a controller assembly 270, 370 and 470, respectively, shown as a dashed box. The controller 270, 370, 470 can reside at any acceptable location on the truck, or a variety of locations. The controller 270, 370, 470 interconnects with one or more sensors 274, 374, 474, respectively, that sense and measure the operating environment in the yard, and provides data 160 to and from the facility (e.g. the YMS, server 120 etc.) via a transceiver. Control of the truck 200, 300, 400 can be implemented in a self-contained manner, entirely within the controller 270, 370, 470 whereby the controller receives mission plans and decides on appropriate maneuvers (e.g. start, stop, turn accelerate, brake, move forward, reverse, etc.). Alternatively, control decisions/functions can be distributed between the controller and a remote-control computer—e.g. server 120, that computes control operations for the truck and transmits them back as data to be operated upon by the truck's local control system. In general, control of the truck's operation, based on a desired outcome, can be distributed appropriately between the local controller 270, 370, 470 and the facility system server 120.

II. Pneumatic Line Connection Between Yard Truck and Trailer

A. Probe and Receptacle Assemblies

A particular challenge in creating an AV yard truck and trailer system, which is substantially or fully free of human intervention in its ground operations, is automating the connections/disconnections of such hoses and electrical leads between the truck and the trailer in a manner that is reliable and accurate. FIGS. 5-8 show a basic arrangement 500 consisting of an AV yard truck 502 and trailer 504. The trailer can be conventional in arrangement with additions and/or modifications as described below, which allow it to function in an AV yard environment. The truck 502 and trailer 504, shown hitched together in this arrangement with at least one connection (e.g. the pneumatic emergency brake line) 510 to be made. It is common for yard trucks to make only the emergency brake connection when hauling trailers around a yard—however it is expressly contemplated that additional connections can be made for e.g. the service brakes, as well as the electrical leads. The connection arrangement 510 for a single pneumatic line herein comprises a receptacle assembly 520, mounted permanently or temporarily on the front 522 of the trailer 504, and a probe assembly 530 that extends from the rear face 532 of the truck cab 534. The connection arrangement 510 in this embodiment provides a positive, sealed pressurized coupling between one of the source pneumatic lines (e.g. the emergency brakes) from the truck to the trailer. Pressure is generated at the truck side (via a pump, pressure tank, etc.), and delivered to components that drive the trailer brakes when actuated by the truck control system 270, 370.

Figure 8:
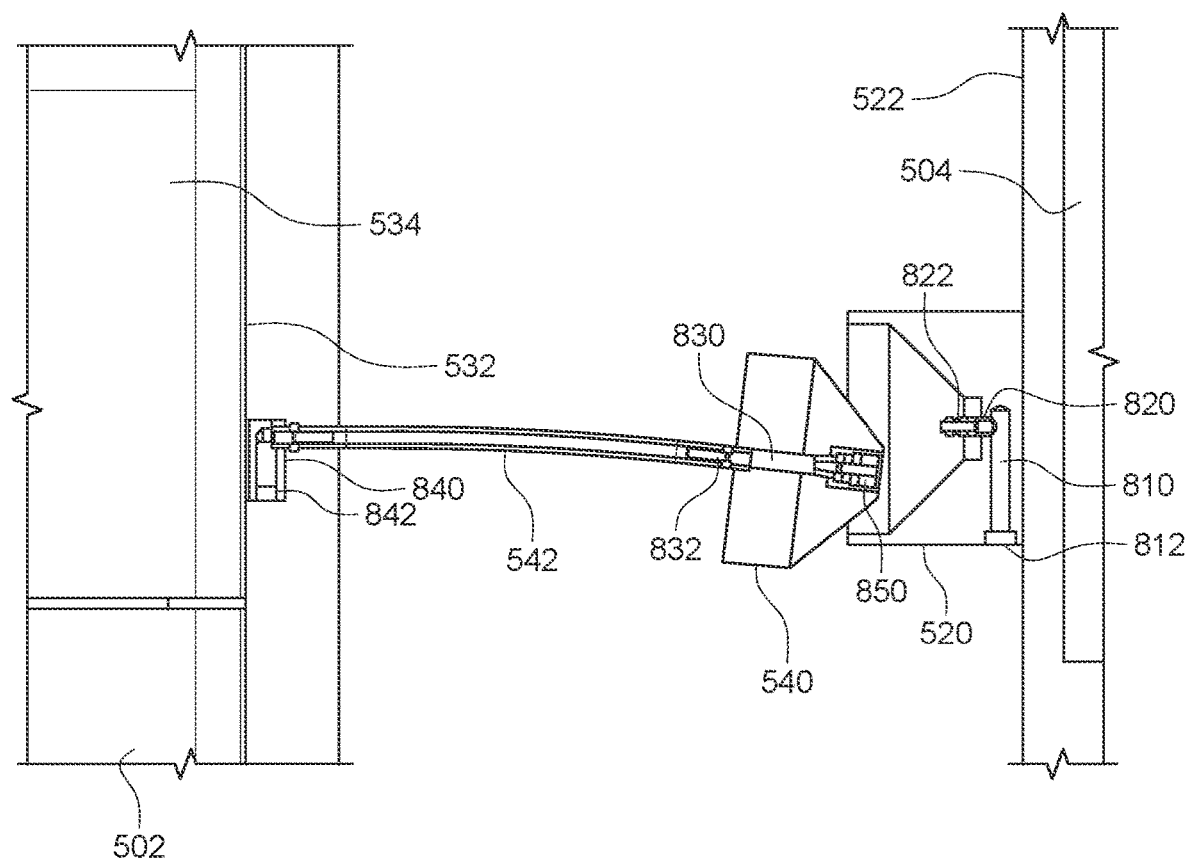
FIG. 8 is an exposed side view of the probe and receptacle arrangement of FIG. 5 showing exemplary pneumatic connections for, e.g. the emergency braking circuit between the AV yard truck and the trailer.

The receptacle assembly 520 and probe assembly 530 consist of interengaging, frustoconical shapes, wherein the probe head 540 is mounted on the end of a semi-rigid hose member 542 (e.g. approximately 1.5-4.5 feet), which can be supported by one or more guy wires mounted higher up on the back of the truck cab. The cone shape is sufficient to allow for a connection between the head 540 and receptacle 520 when the truck is backed straight onto the trailer. With reference particularly to FIG. 8, the receptacle of this embodiment is attached directly to the front face 522 of the trailer 504, and includes a central bore 810 that extends between a side-mounted port (that can be threaded or otherwise adapted to interconnect a standard trailer pressure line) 820 and a pressure (e.g. male) quick-disconnect fitting 822. The geometry of such a fitting should be clear to those of skill. The probe head 540 also include a bore 830 that joins to a proximal fitting 832 that couples the semi-rigid hose member 542 to the head 540. The proximal end of the semi-rigid hose member 542, in this embodiment, is attached to a base 840 affixed to the rear face 532 of the truck cab 534. The location of the base 840 is selected to align with the receptacle 520 when the trailer and truck are in a straight front-to-rear alignment. As described below, a variety of mechanisms can be employed to align and direct the head 540 into the receptacle. The base 840 also includes a side port 842 that interconnects with the AV trucks braking pressure source/circuit, and is selectively pressurized when brakes are actuated. The conical probe head 540 includes, at its distal end, a (e.g. female) quick-disconnect pressure connector 850 that is adapted to sealingly mate with the receptacle connector 822. The probe connector 850 can be arranged to lock onto the receptacle connector 822 when driven axially a sufficient distance onto the receptacle connector. The receptacle connector can include one or more circumferential detents and appropriate internal springs, collars and ball bearings can be used in the construction of the probe connector to engage the detent(s) and thereby effect this interlocked seal between the connectors 822, 850. Alternatively, or additionally, pneumatic and/or electromechanical locking mechanisms can be used to lock the connectors together. Unlocking of the connectors 822, 850 during disconnection can be effected by simply pulling the arrangement apart—thereby overcoming axial resistance the locking force, activating a pneumatic and/or electromechanical unlocking mechanism or any other mechanical action that allows the mechanism to unlock. The diameter and angle of the probe and receptacle cones are variable. In an embodiment, the ports 812 and 842 of the receptacle 520 and probe 540 are connected to hoses that can be directly tapped into the pneumatic lines on each of the trailer and the truck. Alternatively, the ports 812, 842 can each be connected to hoses that each include a conventional or modified (described below) glad hand connector. That glad hand interconnects permanently or temporarily (in the case of the trailer) with the standard pneumatic line glad hand.

The probe 540 and receptacle 520 can be constructed from variety of materials, such as a durable polymer, aluminum alloy, steel or a combination thereof. The connectors 822 and 850 can be constructed from brass, steel, polymer or a combination thereof. They typically include one or more (e.g.) O-ring seals constructed from polyurethane or another durable elastomer. The semi-rigid hose 542 can be constructed from a polymer (polyethylene, polypropylene, etc.), or a natural or synthetic rubber with a fiber or steel reinforcing sheath.

Figure 8A:
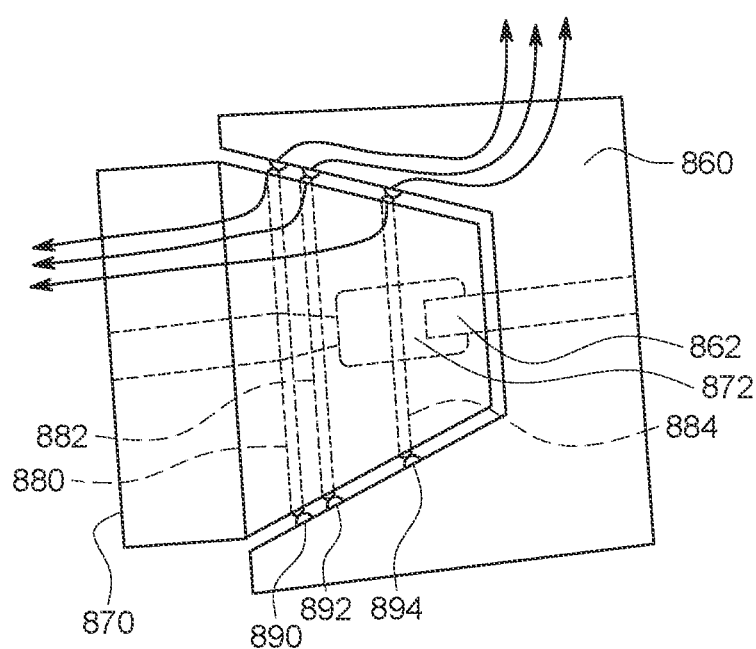
FIG. 8A is an exposed side view of an exemplary probe and receptacle arrangement similar to that of the arrangement of FIG. 5, including a plurality of electrical contacts for interconnecting electrical service between the AV yard truck and the receptacle when the pneumatic service is connected.
Figure 8B:
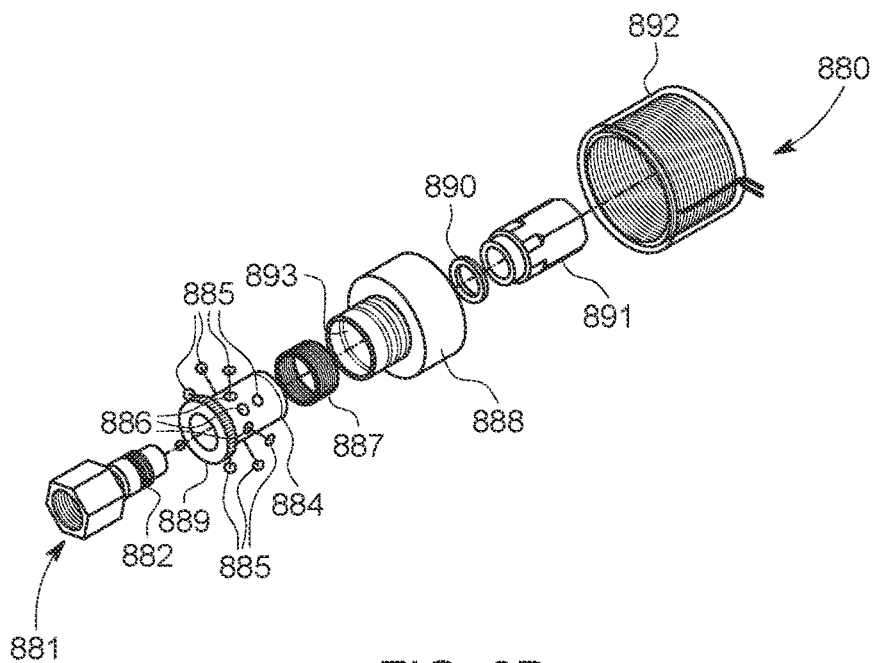
FIG. 8B is an exploded perspective view of an air-connecting mechanism with actuating collar to lock the female connector (truck/coupling side) to the male connector (trailer/receiving side), according to another embodiment.

As shown briefly in an embodiment in FIG. 8A, the receptacle 860 and probe 870 (which operate similarly to the probe 540 and receptacle 520 described above) can be adapted to include electrical contacts—for example a plurality of axially spaced-apart concentric rings 880, 882, 884 on the outer, conical surface of the probe 870—that make contact with corresponding rings or contacts 890, 892, 894 on the inner, conical surface of the receptacle 860 when the probe and receptacle connectors (862 and 872, shown in phantom) are fully engaged. This can complete the electrical connection between the trailer electrical components (lights, signals, etc.) and the switched power feeds on the truck. Appropriate plugs and sockets can extend from the probe and receptacle to interconnect standard truck and trailer electrical leads. Note that a variety of alternate electric connection arrangements can be employed in alternate embodiments in conjunction with, or separate from the pneumatic probe and receptacle.

With reference to the embodiment of FIGS. 8B-8E, a connector/coupling assembly 880 capable of electrical actuation to selectively change it between a locked and unlocked state is shown. This assembly 880 can be adapted to interoperate with the probe and receptacle assemblies described above, or other coupling and receiver arrangements, as described in embodiments hereinbelow. The coupling assembly 880 consists of a male coupling 881, which can be part of a receiver or probe as appropriate. In this embodiment, it comprises a conventional (e.g.) ½-inch NPT, threaded pipe, airline quick-disconnect fitting with one or more, unitary, annular locking trough 882. The trough 882 can define a semicircular cross section shape. The female portion of the overall assembly 880, adapted to releasably connect and lock-to, the male fitting 881 is formed as a sliding quick-disconnect fitting as well. In this embodiment, the inner sleeve 884 is sized to slide over the male fitting 881 when coupled together. A set of circumferential (e.g.) ball bearings 885 reside in holes 886 formed about the circumference of the sleeve 884. The ball bearings 885 of the female fitting are sized to become fully seated in the sleeve's circumferential holes 886 so that the male coupling can slide onto the female fitting in an un-engaged state. In this orientation they are free of interference with the male coupling's shaft. These ball bearings are adapted to pop radially, partially out of their respective holes once the male coupling is fully seated in the female fitting, thereby engaging the trough 882 and locking the coupling assembly together. Thus, this forms a locking engagement. A spring 887 resides behind the inner sleeve 884. The ball bearings 885 are forced into the engaged position when an overlying, iron or steel (magnetic) sleeve 888 is located fully forward against a front shoulder 889 on the inner sleeve 884 (see FIG. 8E). This locking bias is provided by the spring, which also bears on a rear pipe fitting 891. In this position, the inner surface of the magnetic sleeve 888 is arranged to force the balls 885 inwardly against the mail fitting's trough 882. Thus, a positive lock between male and female components is formed. An O-ring seal 890, which is part of the female coupling seals this locked arrangement against air leakage (and thereby allows a pressurized connection to form).

Figure 8C:
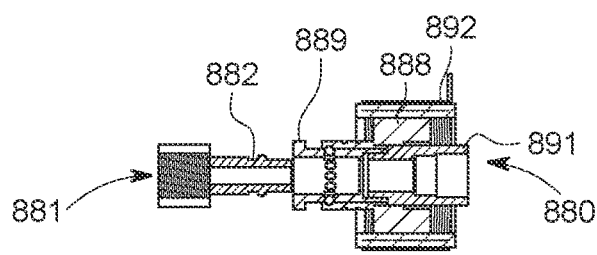
FIGS. 8C-8E are side cross sections of the mechanism of FIG. 8B showing a connection process for the connecting and locking the female connector to the male connector, respectively in a disconnected, connected and locked state.
Figure 8D:
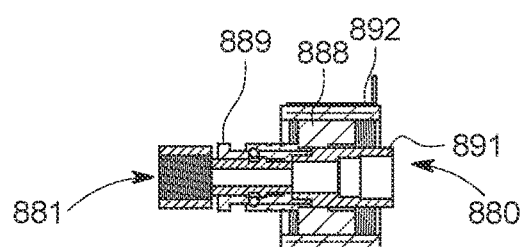

Notably, an outer annular (or other shape) sleeve 892 comprises an electromagnetic coil (e.g.) a solenoid. This coil, when energized forces the magnetic sleeve 888 axially rearwardly (against the bias of the spring 887), and places the ball bearings 885 in alignment with an annular trough 893 within the front, inner surface of the magnetic sleeve 888. This trough allows the ball bearings 885 to pop radially outwardly from the holes 886 sufficiently to disengage them from the male fitting trough 882, thereby allowing axial movement of the male fitting relative to the female coupling. This unlocked state is shown in FIGS. 8C and 8D.

Figure 8E:
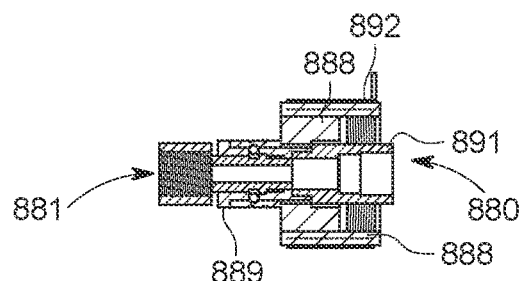

In operation, an electrical current is delivered to the outer sleeve/solenoid 892 via a relay or other switch that receives a signal from (e.g. the AV yard truck controller). An onboard battery (not shown) of sufficient power can be included in the female coupling assembly. Alternatively, power can be supplied by the AV Yard truck's electrical system. The magnetic sleeve, thus, moves axially rearwardly as shown in FIG. 8C. This position allows the ball bearings 885 to move radially inwardly as the male fitting is moved axially inwardly relative to the inner sleeve 884 (shown in FIG. 8D). During this step, the outer sleeve/solenoid 892 remains energized by the switch and battery. Once fully engaged, the switch disconnects the battery and the spring 887 drives the magnetic sleeve forwardly (as it is now free of bias by the magnetic solenoid). The ball bearings 885, thus encounter the non-indented part of the magnetic sleeve's (884) inner surface and are driven radially outwardly into the male fitting's trough 882, thereby forming a sealed lock as shown in FIG. 8E.

Disconnection of the male fitting 881 occurs when the outer sleeve/solenoid 892 is again energized by the switch/battery (typically based on a signal from the controller). In various embodiments, the male fitting 881, inner sleeve 884 and rear base fitting 891 can be constructed from a non-magnetic material, such as a durable polymer, brass, aluminum, titanium, nickel, etc. It should also be clear to those of skill that a range of variations of the assembly of FIGS. 8B-8E can be implemented, in which (e.g.) the solenoid is normally locked and the spring causes an unlocked state, the arrangement of components can be varied, etc. In an embodiment, the male fitting (which is not energized) can be part of the trailer's receptacle and the female coupling (which is energized) can be part of the AV yard truck's pneumatic line. Hence, the female coupling is brought into engagement with the male fitting by one of the various techniques described herein (e.g. a robotic arm, manipulator, framework, etc.).

B. Reel-Connected Probe

Figure 6:
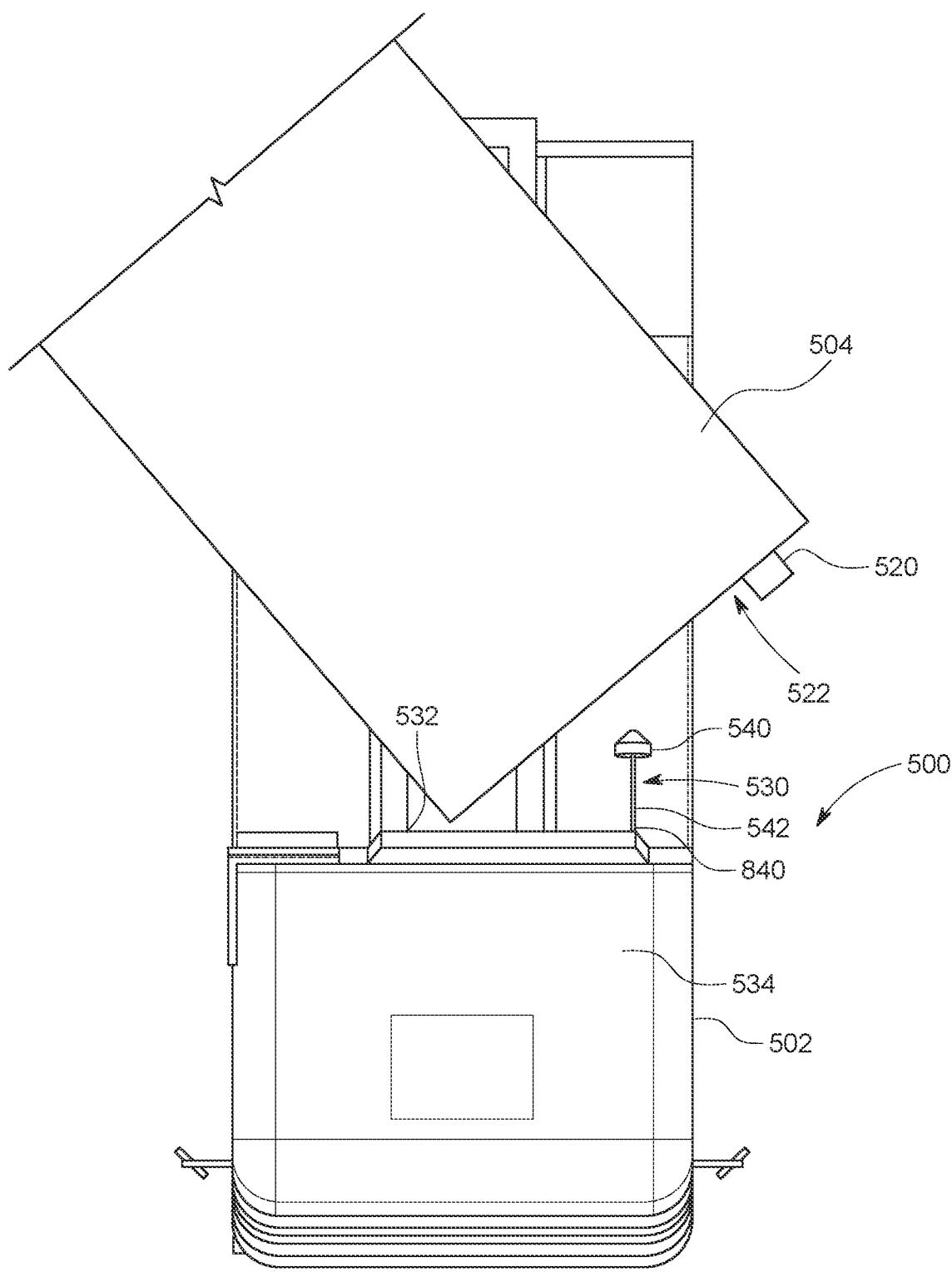
FIG. 6 is a partial top view of the hitched AV yard truck and trailer of FIG. 5 showing the trailer turned at an angle with respect to the truck so that the receptacle and the probe located remote from each other.
Figure 7:
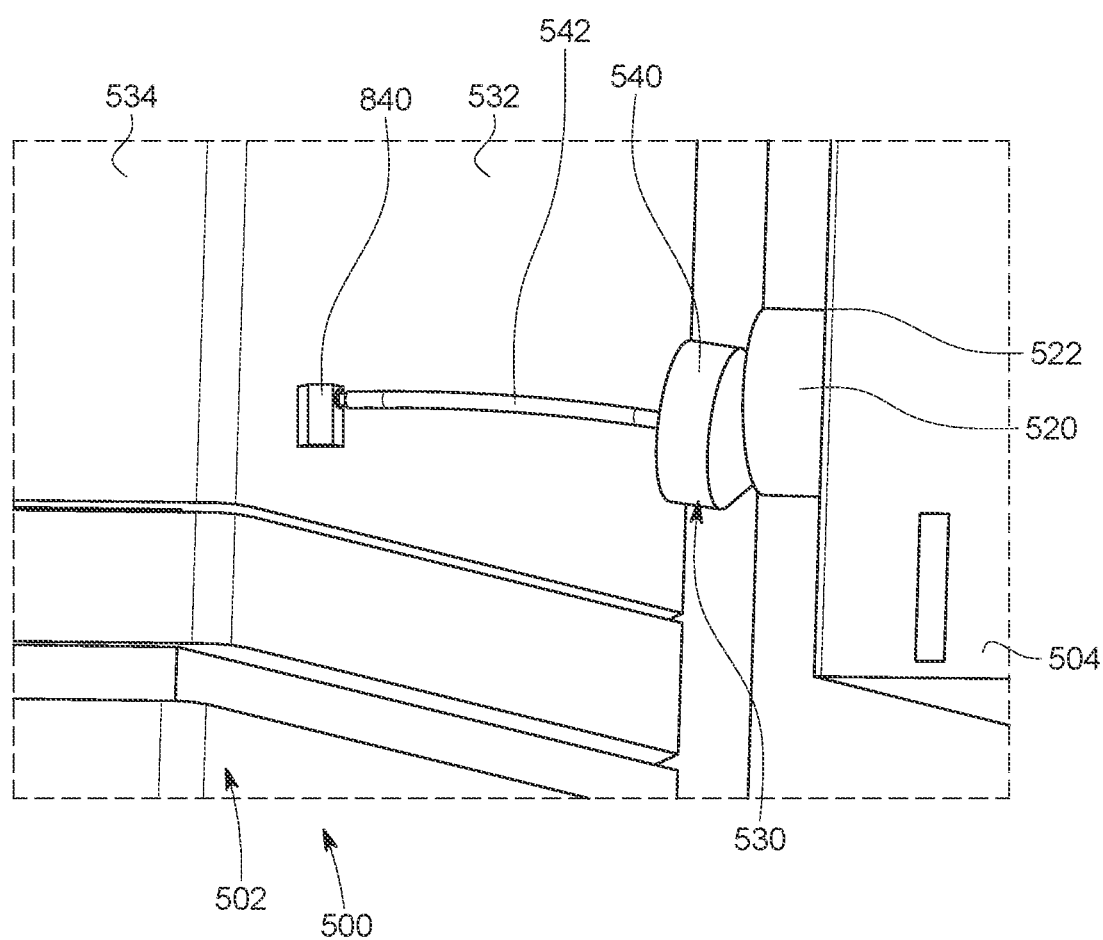
FIG. 7 is a more detailed perspective view of the probe and receptacle arrangement of FIG. 5, showing the probe guided into the receptacle during a connection process.
Figure 9:
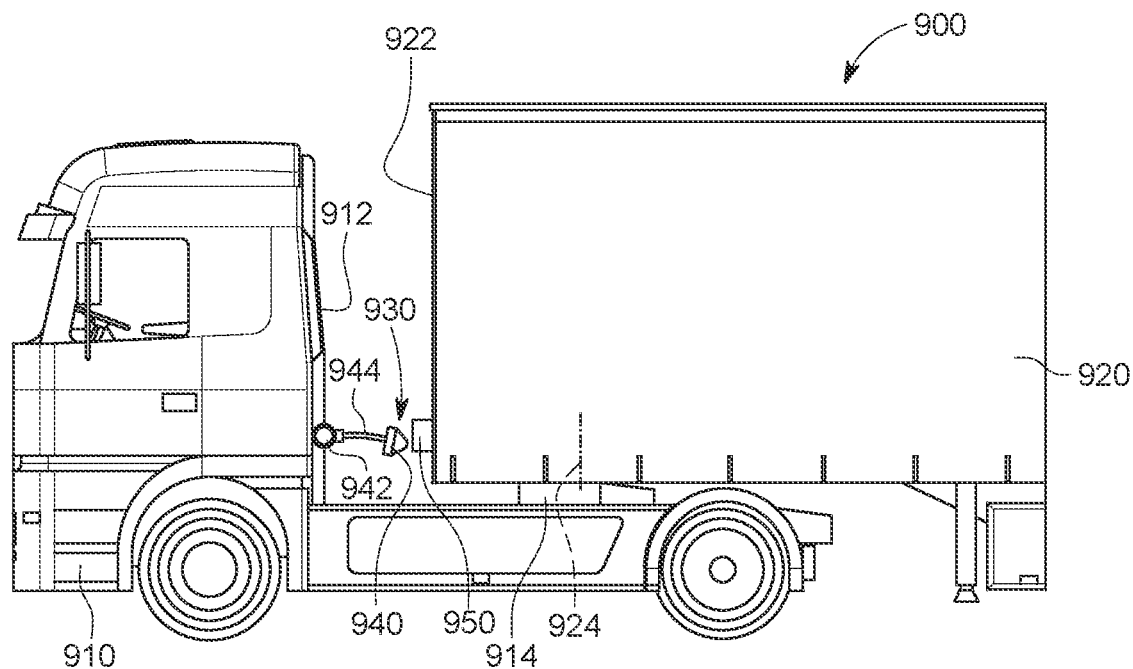
FIG. 9 is a side view of an exemplary AV yard truck and trailer having a truck-mounted probe and trailer-mounted receptacle for connecting (e.g.) pneumatic emergency brake service, in which the probe is mounted on a tensioned cable and spool assembly to allow for turning of the trailer with respect to the truck, according to an embodiment.
Figure 10:
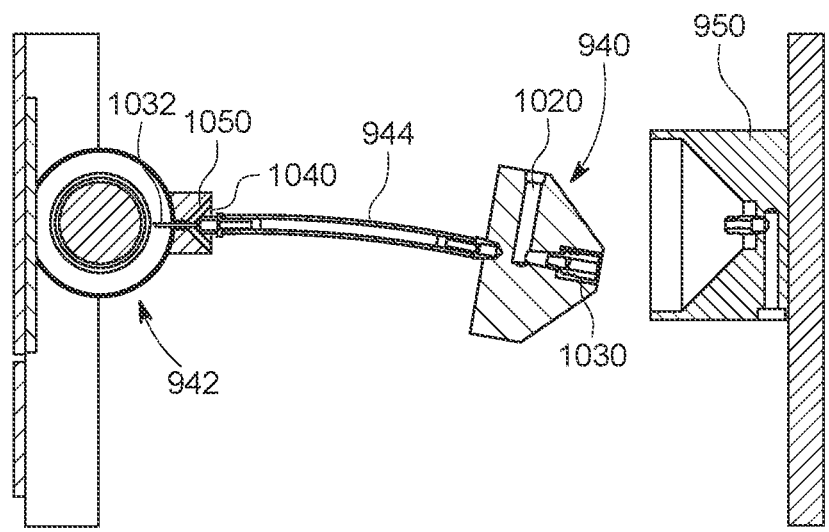
FIG. 10 is a more detailed side cross section of the probe and receptacle arrangement, including cable and spool assembly of FIG. 9.

Reference is now made to FIGS. 9 and 10 that show an arrangement 900 having a pneumatic connection 930 for use with an AV yard truck 910 and trailer 920 according to another embodiment, in which the probe assembly 940 is attached to a reel or spool 942. This arrangement recognizes that the trailer front face 922 often moves away from the cab rear face 912 during turns (i.e. where the kingpin pivots on dashed-line axis 924 about the fifth wheel 914). This condition is also shown in FIG. 6, where the receptacle 520 is spaced at a significant distance from the probe 540. To address the variability of spacing between the receptacle 950 and probe 940 (of the present embodiment of FIGS. 9 and 10) during turning motion, and more generally deal with shifting of position between the truck and trailer, the probe 940 is mounted on a semi-rigid tube 944, that is (in this embodiment) free of any air conduit. The illustrative, frustoconical probe 940 includes a side port 1020 (FIG. 10) that routes air to the (e.g. female) pressure connector 1030 at the probe's proximal end. The probe side port 1020 interconnects to the truck pressure line in a manner similar to that described above for probe 540. This connector and the associated receptacle (950) components are otherwise similar to the embodiment of FIGS. 5-8 described above and interconnection is made according to a similar operation. That is, the truck is backed into the trailer with the probe 940 and receptacle 950 in relatively straight-line alignment. Then, the probe 940 is guided into the receptacle 950 by interengagement between respective frustoconical surfaces until a positive lock between associated pressure connectors occurs. As in the embodiment of FIGS. 5-8, the rigidity of the semi-rigid tube 944 is sufficient to prevent buckling as the connectors are biased together to create a lock. Once locked, as the probe 940 is tensioned by movement of the trailer 920 relative to the truck 910, the tension is relieved by paying out a cable from the spool 942 that is attached to the proximal end of the tube 944. The spool 942 can be spring-loaded so that it maintains a mild tension on the tube 944, and associated probe head, at all times. The hose attached from the pneumatic source to the probe side port 1020 can be flexible (e.g. contain spring coils as shown generally in FIG. 2), or can otherwise absorb stretching and contraction. Note that the proximal end of the tube includes a (positive) frustoconical end member 1040 that mates with a (negative) frustoconical receiver 1050 on the spool 942. This assembly forms a backstop for the tube 944 when the probe head is biased into the receptacle 950 and ensures that the spool cable 1032, when fully retracted, draws the cable fully back into the spool 942, free of any kinks near the base of the tube 944. The spool can be constructed in a variety of ways, such as a wrapped/wound clockwork-style spring, and appropriate gearing to generate a predetermined torque over a predetermined number of revolutions (which should be clear to those of skill). The spool 942 can alternatively be motorized, paying out cable and drawing it in, based on prevailing tension. In this embodiment, the spool 942 acts as both a cable (1032) winding device, and a base for the probe assembly 940 in a single unit. Note the cable spool can be a commercially available component. In addition, the pressure connectors can be commercially available components, such as those used in standard pneumatic hose applications.

Figure 11:
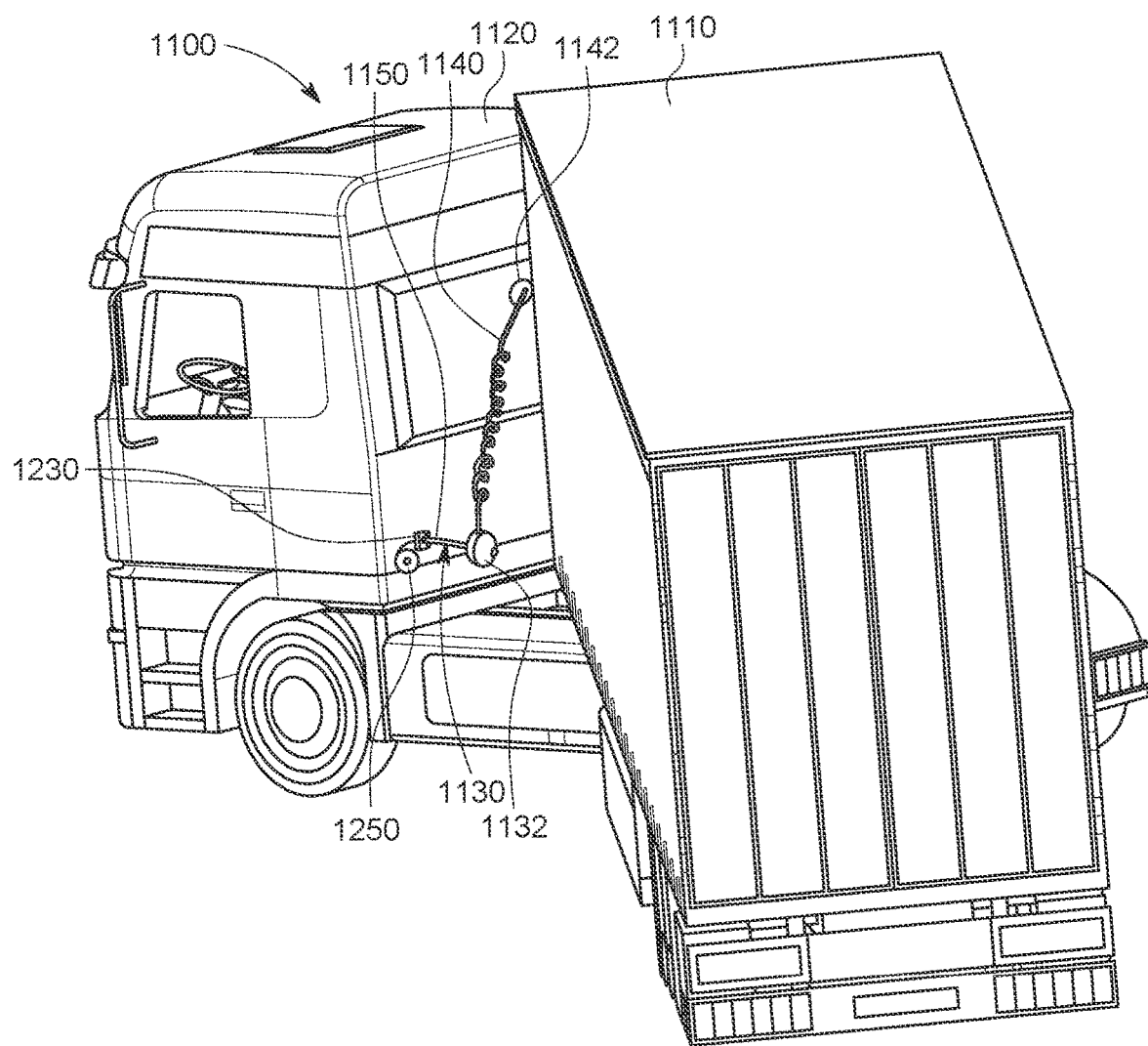
FIG. 11 is a rear-oriented perspective view of an AV yard truck and trailer in a hitched configuration showing a truck-mounted probe and trailer-mounted receptacle for connecting (e.g.) pneumatic emergency brake service, in which the probe is mounted in connection with an adjacent tensioned cable and spool assembly to allow for turning of the trailer with respect to the truck, according to an embodiment.
Figure 12:
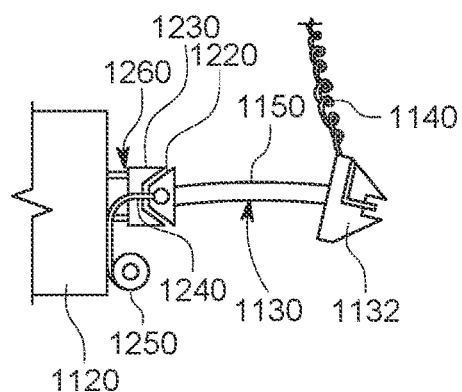
FIG. 12 is a more detailed side cross section of the probe and receptacle arrangement, including cable and spool assembly of FIG. 11.

This arrangement 1100 is further detailed in the embodiment of FIGS. 11 and 12, in which the trailer 1110 contains a receptacle (not shown) as described above or in accordance with another embodiment (described below), and the truck 1120 contains the probe assembly 1130 that is adapted to removably engage the receptacle as described above. The head 1132 of the probe assembly 1130 includes a side-mounted pressure port and associated hose 1140 (e.g. an emergency brake pneumatic line from the truck's (1120) conventional outlet 1142 for such). The probe head 1132 is mounted on a semi-rigid tube 1150, as described above, with a (positive) frustoconical end member 1220, which is adapted to seat in a conforming, (negative) frustoconical receiver 1230, as also described above. The receiver is permanently, or temporarily, affixed to the rear face of the truck 1120. The end member 1220 provides an anchor for a tension cable 1240, and that cable 1240 extends through the receiver 1230 to an external spring-wound spool 1250. The spool exerts a mild tension on the probe assembly 1130 in a manner described above. The spool 1250 can be constructed by any acceptable technique and can be a commercially available component. The spool 1250 is also affixed to the face of the truck at an appropriate location. A chase that allows the cable 1240 to pass from the receiver to the spool 1250 can be provided (e.g. a gap 1260).

C. Removable Receptacle Assemblies/Alternate Pressure Connections

Figure 13:
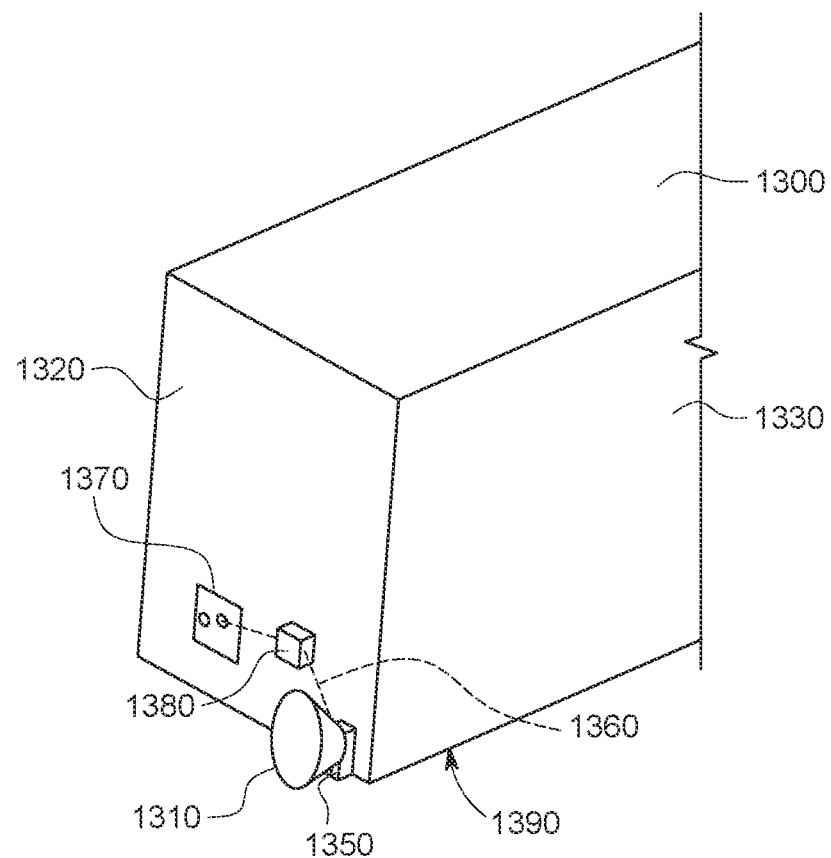
FIG. 13 is a partial rear-oriented perspective view of a trailer having a frustoconical receiver for a pneumatic connection for use with an AV yard truck according to an embodiment.
Figure 14:
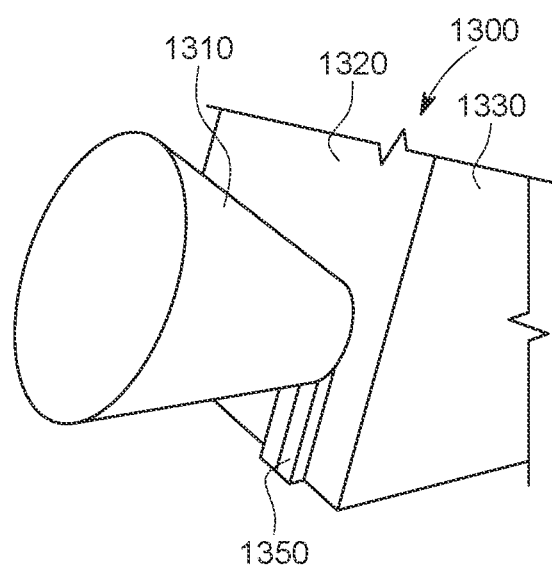
FIG. 14 is a more detailed perspective view of the conical receiver of FIG. 13 showing an interconnected bracket assembly allowing for selective attachment to and detachment of the receiver from the trailer body.
Figure 14A:
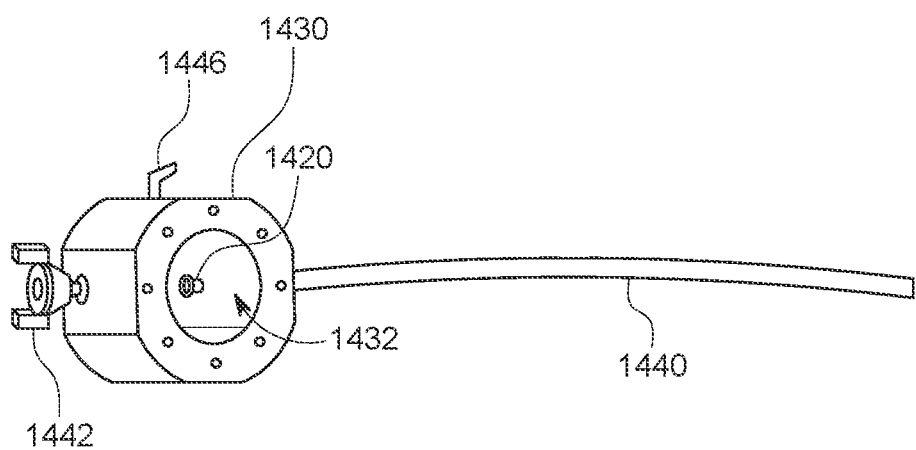
FIG. 14A is perspective view of an illustrative receiving receptacle with an interconnected pneumatic line/air-hose that connects to the trailer pneumatic line's existing glad hand.
Figure 23:
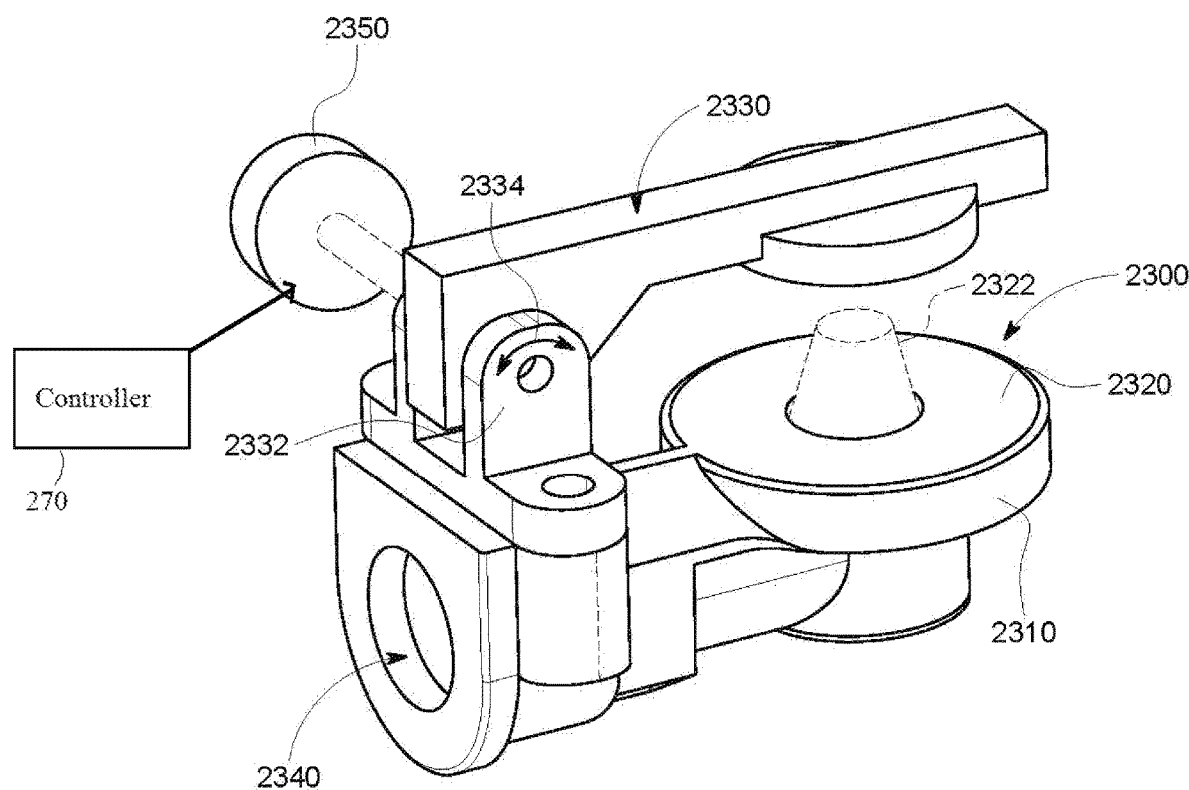
FIG. 23 is a top-rear-oriented perspective view of a modified glad hand connector for use in forming pneumatic connections, according to various embodiments.
Figure 24:
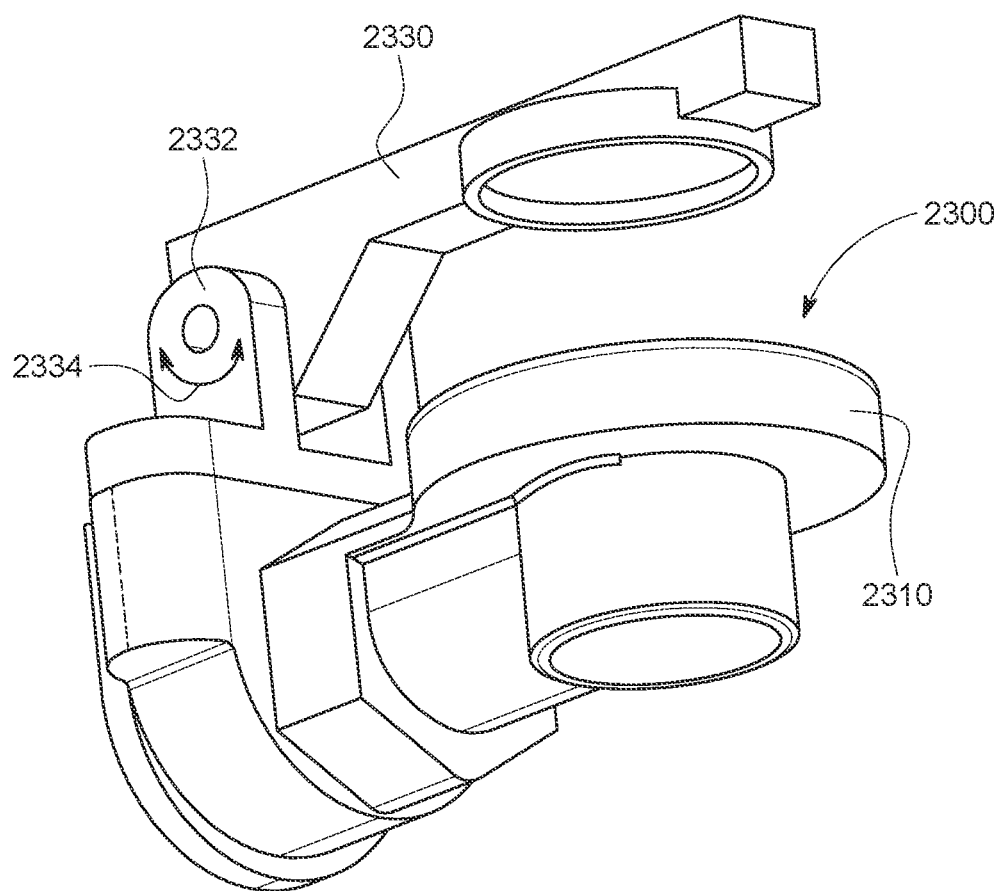
FIG. 24 is a bottom-front-oriented perspective view of the modified glad hand of FIG. 23.
Figure 25:
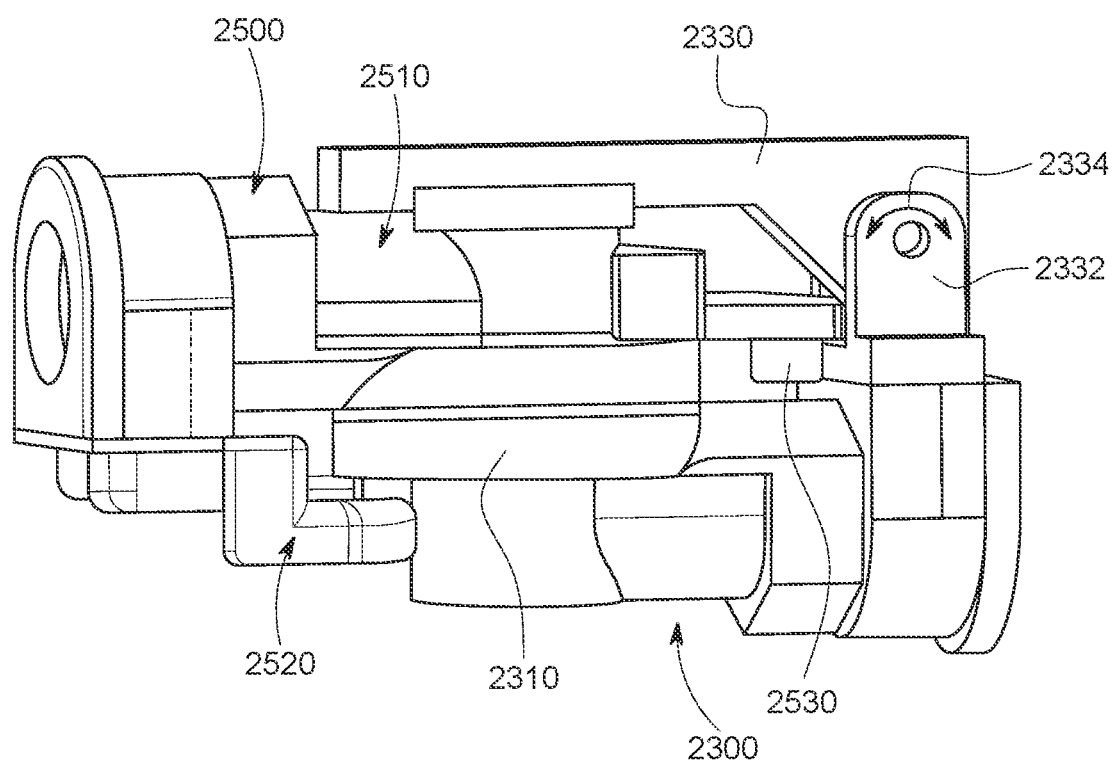
FIG. 25 is a side-oriented perspective view of the modified glad hand of FIG. 23, shown secured to a conventional glad hand (e.g. on trailer emergency brake line) with the movable thumb clamp thereof engaged to the top of the conventional glad hand body.

FIGS. 13, 14 and 14A show an arrangement 1300, consisting of a removable receptacle assembly 1310 that is mounted variably on the front face 1320 of the trailer 1330. As shown, a clamping assembly, or other form of mounting bracket 1350, can be temporarily or permanently fixed to the trailer in a manner that locates the receptacle (in this example, a frustoconical shape) 1310 at a position on the front face 1320 of the trailer 1330. In an operational embodiment, the clamping assembly 1350 can be attached at the guard shack (110 in FIG. 1), at the desired location, so as to provide the needed autonomously operable pneumatic connection. As part of the attachment, a pneumatic hose (dashed line 1360) can be attached to a conventional port 1370 of the trailer 1330. The pneumatic circuit can direct to the port 1370 from a continuous hose extending from the receptacle 1310, or via an intermediate connection (represented as box 1380) between a separate (conventional) trailer pneumatic hose and a receptacle hose. The intermediate connection 1380 can be accomplished using e.g. a conventional or customized glad hand connector arrangement. A modified glad hand arrangement is described in further detail (FIGS. 23-25 below).

As shown further in FIG. 14A, a male, quick-disconnect-style fitting 1420 (for example, similar or identical to fitting 881 in FIG. 8B) is shown located coaxially within the cylindrical or frustoconical well 1432 of a receiver housing 1430. The receiver housing 1430 can be constructed from a variety of materials, such as aluminum alloy, steel, polymer, or combination of materials. The housing can be adapted to be secured directly to the trailer body (e.g. along the front face as described above) or using a mounting plate assembly, as described hereinbelow (see, for example, FIGS. 18-22). The fitting 1420 can be connected directly, or via a port arrangement within the housing, to a trailer pneumatic line 1440—for example, an emergency brake line. A valve knob 1442 or other pressure regulating system (e.g. a safety valve) can be integrated in the housing port system. A variety of attachments, brackets, accessory mounts, switches, can be applied to the receiver housing 1430, represented generally by the handle 1446, which can reside in a threaded well or other structure.

Figure 15:
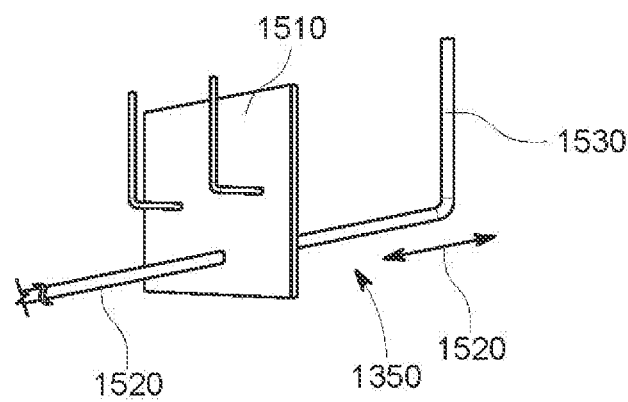
FIG. 15 is a perspective view showing a movable clamp for allowing selective attachment and detachment of the bracket.
Figure 16:
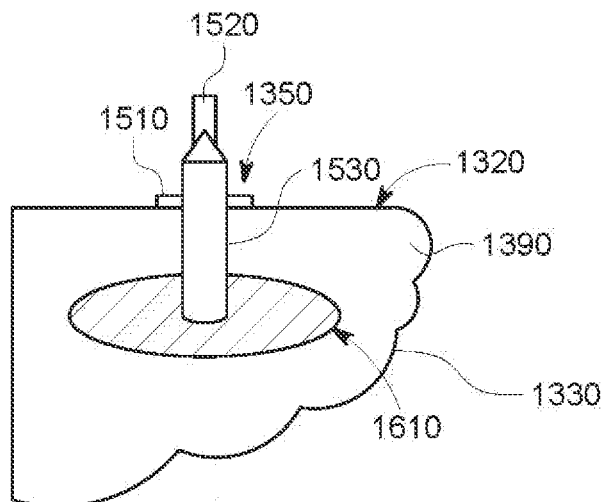
FIG. 16 is a partial bottom perspective view of the trailer of FIG. 13 showing the insertion of the bracket end hook or post into a slot in the trailer bottom.

With further reference to FIGS. 15 and 16, the clamping assembly 1350 can consist of a plate 1510 that slides (double-arrow 1522) along a bar 1520, and can be locked relative to the bar using any appropriate mechanism—e.g. a pinch, clamp, turn screw, etc. The bar 1520 terminates in an upright post or hook 1530 located at a rearmost end of the bar 1520. Note that the receptacle in this embodiment can be similar to those described above, containing an internal pressure connector for use with a probe head of appropriate design. The post/hook 1530 is adapted to extend upwardly into a slot, step or hole 1610 at the bottom 1390 of the trailer 1330. The post/hook engages a front edge of the slot/step/hole 1610 as shown (FIG. 16) when the clamp is tightened, with the plate 1510 engaged against the front face 1320 of the trailer 1330. In this manner, the plate 1510 and associated receptacle (1310) are firmly attached in a desired position to the trailer front face when located in the yard. The clamping arrangement 1350 can be detached from the trailer 1330 at (e.g.) the guard shack as the trailer is placed into storage, exits the yard, or is hitched to an OTR truck, with conventional connections made to the trailer's pneumatic lines and electrical leads by the truck. The plate 1510 can include a frictional backing (e.g. a silicone, rubber or neoprene layer/sheet) to avoid marring the surface of the trailer and to resist shifting once clamped.

Figure 17:
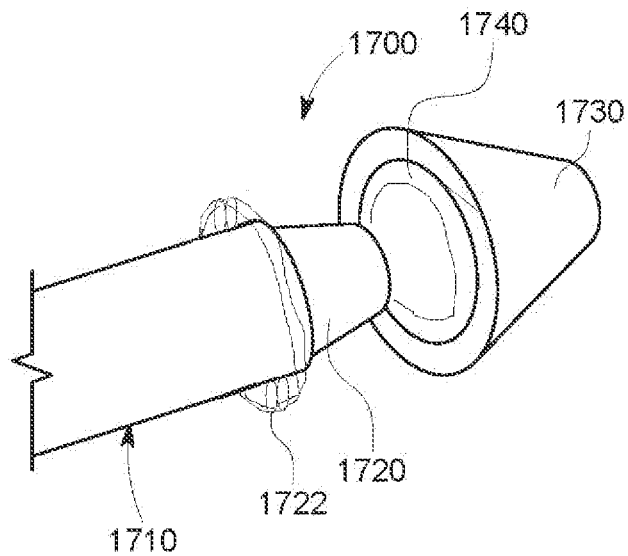
FIG. 17 is a perspective view of a pneumatic connection system for an AV truck and trailer, showing frustoconical receiver or receptacle attached to a trailer and a probe assembly with an inflatable ring for securing the probe and receptacle together with a pressure-tight seal.
Figure 18:
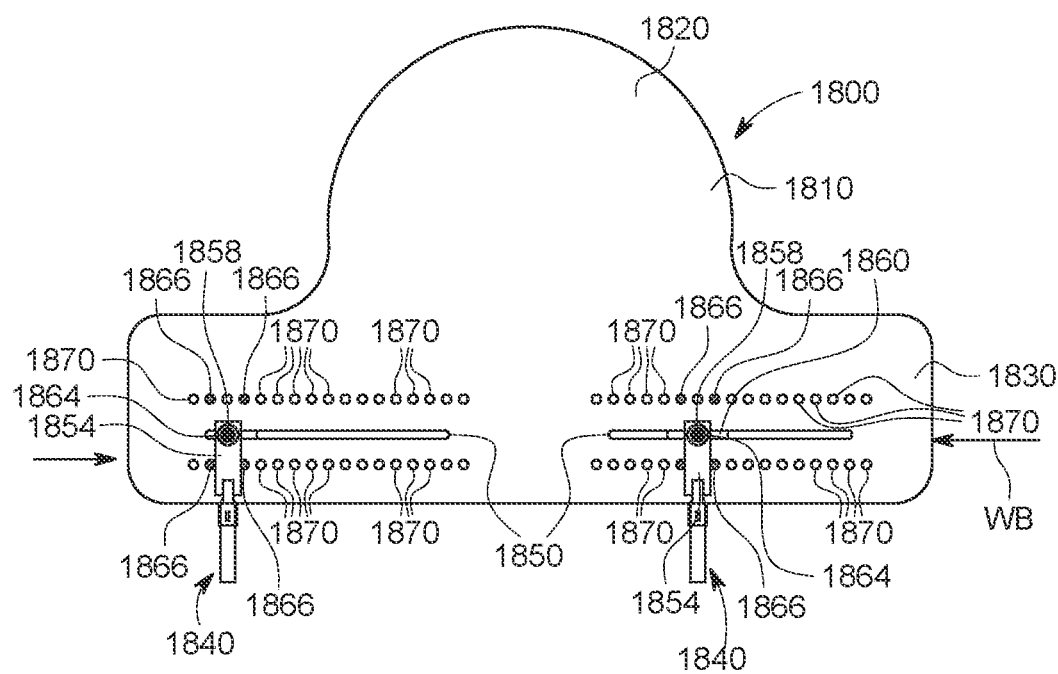
FIG. 18 is a front view of a removable plate for mounting one or more receptacles for connection of pneumatic and/or electrical service on a trailer, including a pair of bar-clamp-like brackets that engage a slot in the bottom/underside of the trailer, according to an embodiment.
Figure 19:
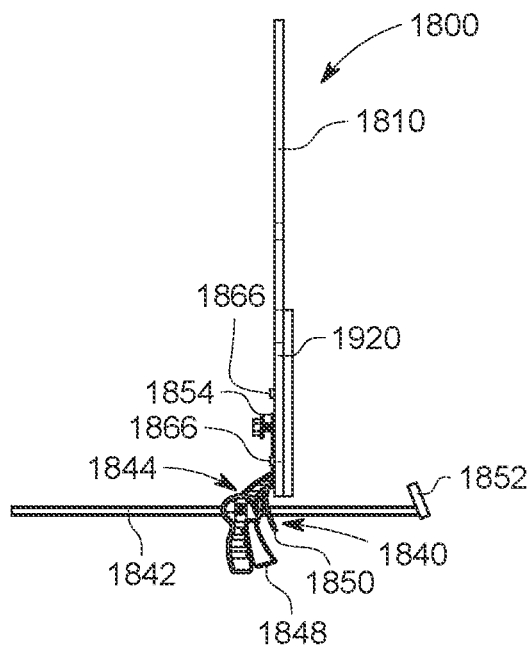
FIG. 19 is a side view of the plate and bracket assembly of FIG. 18.
Figure 20:
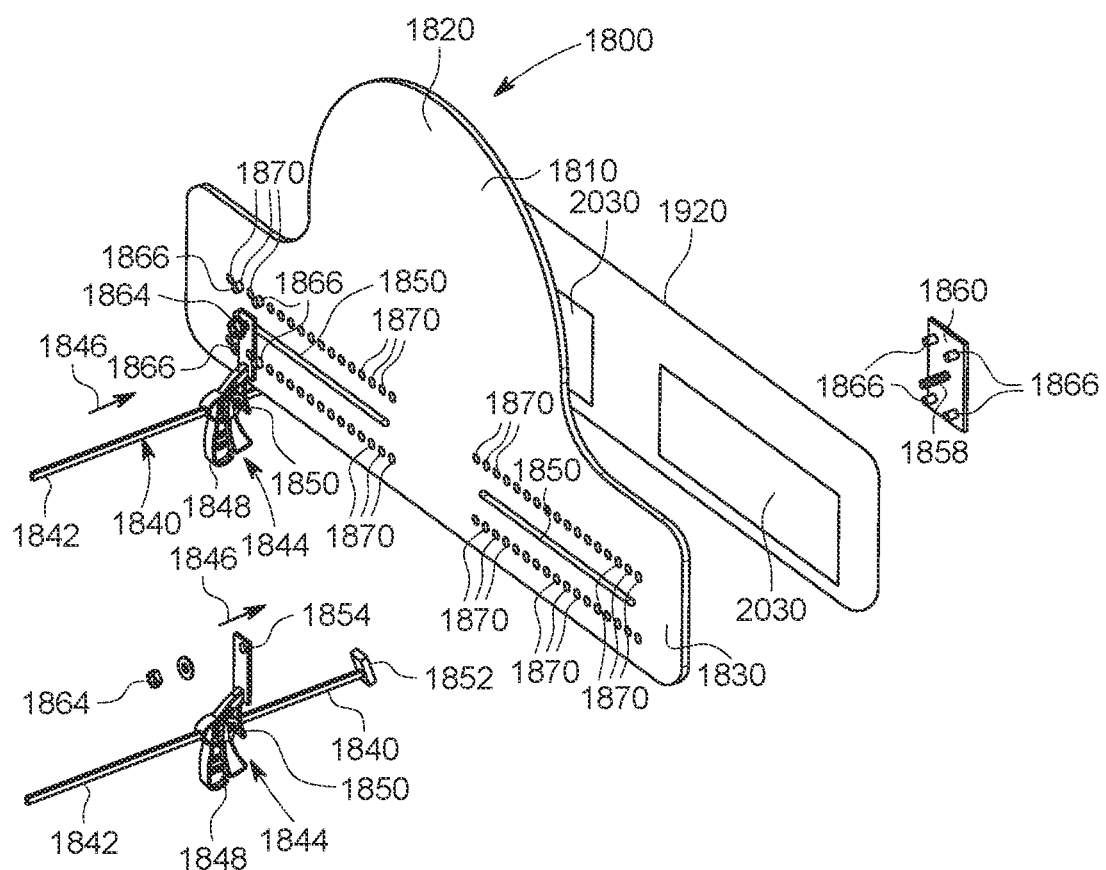
FIG. 20 is an exploded view of the plate and bracket assembly of FIG. 18.

As discussed above, the clamped, or otherwise affixed, receptacle can employ a quick-disconnect-style pressure connector (see, for example FIGS. 8B-8E, above), or an alternate arrangement can be employed. Alternatively, the receptacle can be adapted to receive an alternate form of connector, such as that shown in FIG. 17. As shown in the arrangement 1700 of FIG. 17, the probe assembly 1710 can define a (positive) frustoconical probe head 1720 constructed from an appropriate material (e.g. metal, polymer, etc.), as described generally above, that mates with a (negative) frustoconical receptacle 1730, with an internal geometry that accommodates an expanding, inflatable locking ring 1722, located at the proximal end of the probe head 1720. When pressure is applied (either tapping the pressure of the pneumatic line or a separate pressure source that is switched on during connection), the ring 1722 expands to bear against (e.g.) an annular shoulder 1740 of the receptacle to sealably lock the probe and receptacle together. In this manner, the arrangement resists pull-out and defines a gas-tight pressure seal. Additional internal pressure connectors can be provided in this arrangement with or without (free-of) a quick-disconnect locking mechanism.

Note that the pressure connection in any of the embodiments herein can also be sealably locked and unlocked using appropriate motorized and/or solenoid operated actuators.

Reference is made to FIGS. 18-22, which show a further embodiment of a detachable receptacle, or other form of removable connection between the truck pneumatic line(s) and the trailer's (2100 in FIG. 21) pneumatic lines, and optionally, its electrical leads (not shown). Note that this arrangement 1800 can be used to carry a plurality of receptacles/connectors for both pneumatic pressure and electricity. In the present embodiment, a single receptacle 2110 is mounted on the plate 1810 of the arrangement 1800, with a single side-mounted port 2210 (the close-up depiction 2200 of FIG. 22) to interconnect with an air hose of the trailer (e.g.) braking system via a standard/conventional port and hose. The plate can be constructed from any acceptable material, such as a metal (e.g. aluminum, steel, etc.), polymer (e.g. polycarbonate, acrylic, PET, POM, etc.), composite (e.g. fiberglass, carbon fiber, aramid fiber, etc.), or a combination of materials. In an exemplary embodiment, the plate includes an upper, semi-circular extension 1820 and a lower rectangular base 1830. The plate's upper extension 1820 and base 1830 are shaped in one of a variety of possible geometries. The upper extension is shaped and sized to accommodate the receptacle (or other connector), which can be mounted to it by adhesives, fasteners, clamps, and/or other attachment mechanisms. The rectangular base 1830 is sized in width WB sufficiently to allow placement of the clamp assemblies 1840 in appropriate slots 2120 that are typically located near the front face 2140 of the trailer bottom 2130. In an embodiment, the width WB of the base 1830 can be between approximately 1 and 2 feet, although a smaller or larger dimension can be defined in alternate embodiment.

The clamp assemblies 1840 are each mounted at an appropriate widthwise location on the base 1830 of the plate 1810, riding within horizontal slots 1850. The clamp assemblies each include a bar 1842 upon which a clamp member 1844 slides. The clamp members 1844 are in the form of conventional bar clamps that progress along a clamping direction (arrow 1846), as the user repetitively squeezes a grip 1848. Clamping pressure is released and the clamps can be moved opposite arrows 1846 to a more open state by toggling releases 1850. The bars include a hook or post 1852 that engages the slot 2120 in the trailer bottom 2130. The upper portion of each clamp member 1844 includes a flange 1854 that interengages a bolt 1858 on a lateral adjustment plate 1860 that bears against an opposing side of the plate 1810 when the flange 1854 is secured to the plate as shown. The bolt 1858 of the lateral adjustment plate 1860 passes through the slot 1850 in the plate 1810, and is secured to the flange 1854 by a nut 1864. The nut can be (e.g.) a standard hex nut, wing nut or threaded lever (for ease of attachment). The lateral adjustment plate 1860 also includes at least four pegs 1866, which surround the bolt 1858. These pegs are adapted to seat in holes 1870 located above and below each slot 1850 on the plate 1810. In this manner the clamp members 1844, of the corresponding assemblies 1840, can be adjusted and secured laterally (horizontally) along the plate 1810 so that each post/hook 1852 is located appropriately to engage a slot 2120 in the trailer bottom 2130. The back of the plate 1810 can include an elastomeric (e.g. neoprene, rubber, foam) backing 1920, which resists sliding friction when the plate 1810 is clamped securely to the trailer front face 2140 and protects the face 2140 from marring and scratching. The backing 1920 can include cutouts 2030, which allow the clamp assemblies 1840 to be adjusted along respective plate slots 1850.

In an alternate embodiment, the forward extension of the rods is mitigated by attaching the plate directly to the forward ends of each rod and providing a separate grippable clamp member that engages the front face of the trailer separately. In such an arrangement, the plate floats forward for the trailer face. Other arrangements in which a clamp engages slots on the trailer bottom and thereby secures an upright plate containing a connector are also expressly contemplated.

In an alternate embodiment, the receiving receptacle/receiver on the trailer can be mounted in a preferred available location on the front face of the trailer by the use of (e.g.) fasteners—such as an interengaging fabric sheet and/or tape fastener, including but not limited to, industrial grade hook-and-loop tape/sheet and/or Dual-Lock™ recloseable fasteners (available from 3M Corporation of Minneapolis, MN), or similar mechanisms, as a removably attached device when onsite (or permanently affixed). In an embodiment, the receiving receptacle is also marked with an identifying bordering pattern that the associated ranging/locating software can use to orient the robotic arm that removably carries the AV yard truck's connector/probe/coupling arm, and align this coupling device.

Figure 21:
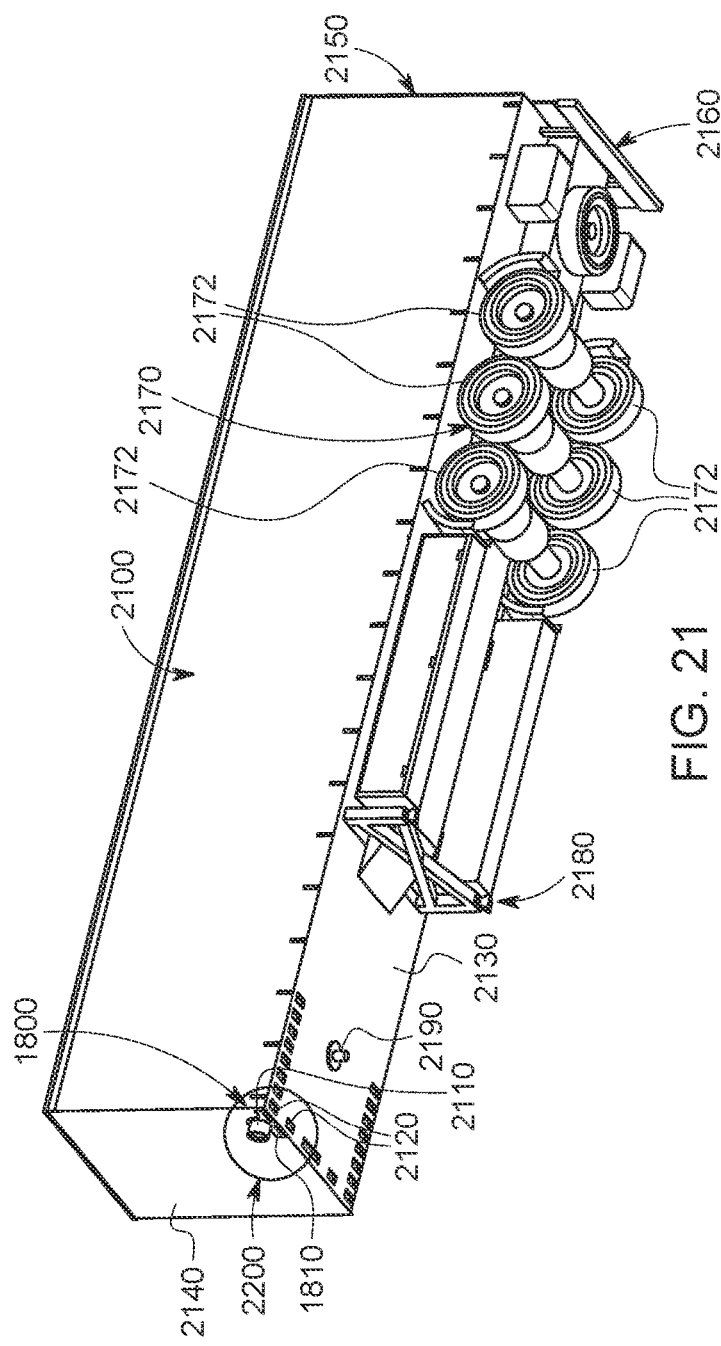
FIG. 21 is a bottom-oriented perspective view of a trailer showing various operational components thereof, including an attached, plate and bracket assembly with receptacle, according to FIG. 18.
Figure 22:
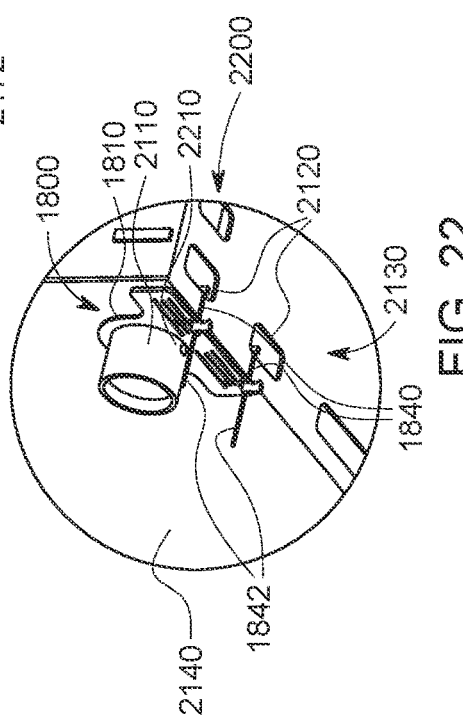
FIG. 22 is a more detailed fragmentary perspective view of the attached, plate and bracket assembly shown in FIG. 21.

For purposes of other sections of this description, the depiction of the trailer 2100 in FIG. 21 is now further described, by way of non-limiting example. The trailer rear 2150 can include swinging or rolling doors—among other types (not shown). An underride protection structure 2160 is provided beneath the rear of the body. A set of wheels 2172—in the form of a bogey arrangement 2170 is shown adjacent to the rear 2150. A movable landing gear assembly 2180 is provided further forward on the trailer bottom 2130. The kingpin 2190 is also depicted near the front face 2140 along the bottom 2130.

D. Modified Glad Hand Connector and Uses

FIGS. 23-25 depict a modified glad hand connector 2300 for use in various embodiments of the pneumatic connection arrangement herein. In general, the glad hand is modified to clamp so as to enable automatic connection to a stock fitted trailer, with a uniformly accepted glad-hand. This allows the vast majority of trailers currently on the road, regardless of model/brand, to avoid the need of a specialty retrofit in order to integrate with an AV yard truck as described herein, and its automated trailer attachment systems. The modified clamp, compatible with conventional glad hands, comprises a base 2310 with a rubber grommet 2320, which can optionally include a hollow central cone (dashed member 2322) protruding from the standard rubber grommet 2320 (to insert, and assist in glad-hand alignment, as well as allow the passage of air). The cone can be omitted in alternate embodiments and a conventional grommet geometry or another modified geometry—for example, a pronounced profile that compresses more when engaging an opposing glad hand grommet.

A thumb-like clamp (or "thumb") 2330 is provided on a pivoting clevis 2332 (double arrow 2334) at the inlet port 2340 of the modified glad hand 2300, to pivot toward the grommet 2320 when locked and pivot away from the grommet 2320 when released. As shown particularly in FIG. 25, the modified glad hand 2300 is interconnected with a standard glad hand fitting 2500, for example, part of the trailer pneumatic system. As shown, the thumb 2330 compresses on the top 2510 of the standard glad hand 2500 while the conventional turn-locked locking shoulder 2530 is unused, as such is omitted from the modified glad hand. Rather, in this embodiment, the seal between opposing glad hand grommets is secured by the pressurable engagement of the thumb 2330. The thumb 2330 is, itself, actuated between an engaged position (as shown) and a released position (not shown, but pivoted out of engagement with the standard glad hand) by an appropriate rotational driving mechanism—for example, a direct-drive or geared rotary solenoid and/or stepper motor 2350, that can include position locks or a rotational pneumatic actuator. Alternatively, a linear actuator, or other force-translation mechanism, can be employed with appropriate links, gearing etc. The actuator 2350 receives signals from an appropriate controller within the vehicle's overall control system when a connection is to be made or released.

In a further embodiment, the glad hand body (or a portion thereof) can be magnetized or provided with (e.g. powerful rare-earth) magnets, thereby allowing for magnetically assisted alignment and a positive pressure seal with the trailer glad hand. Such magnetic connection can also be used to assist in connection and alignment of other types of connectors, such as the above-described probe and receptacle connector assemblies.

In various embodiment, the modified glad hand can be used to interconnect directly from the AV yard truck's pneumatic system to that of the autonomously hitched/unhitched trailer. A variety of mechanisms can be used to perform this operation. Likewise, the connection described above, or another form of connection can be used with an appropriate guiding mechanism/system that can be integrated with various sensor or the rear face of the truck (e.g. cameras, LiDAR, radar, etc.).

In any of the embodiments described herein, it is contemplated that the receptacle can be arranged to coexist with conventional (e.g. glad hand) connectors and/or electrical connectors. A Y-connector (not shown), can be arranged to route to the receptacle(s) and to conventional trailer connectors—e.g. standard or custom glad hands that integrate with the conventional air system on (e.g.) an OTR truck or conventional yard truck. The Y-connector can include appropriate valves and venting so that it seals when needed, but allows escape of air to depressurize the system as appropriate. Battery powered or electrical-system-connected air valves (e.g. linear or rotary solenoid driven valves) of conventional design can be employed. This allows the receptacle assembly to act as a true retrofit kit, that can be mounted upon and stay with the trailer after it leaves the yard, or can be mounted offsite—for example, for trailers that will frequent the automated facility of the present embodiments.

E. Automated Guidance of Trailer Pneumatic and Electrical Connectors

Figure 26:
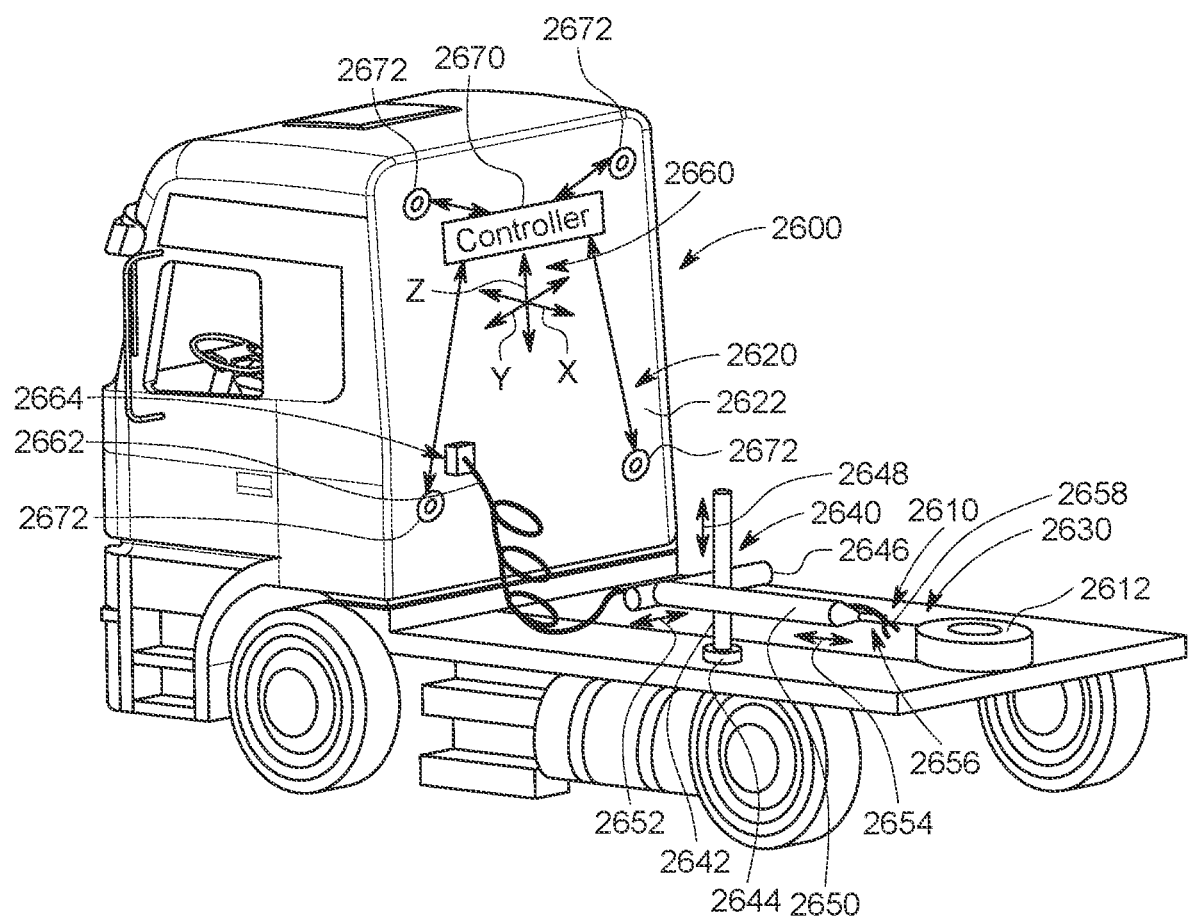
FIG. 26 is a rear perspective view of an AV yard truck showing a multi-axis robot arm assembly for connecting a truck pressure or electrical connector to a trailer receptacle according to an embodiment.

Reference is made to FIG. 26, which shows an AV yard truck 2600 having a conventional chassis bed 2610 with a fifth wheel 2612, and a cab 2620 in front of the chassis bed 2610. The area 2630 in front of the fifth wheel 2612 has sufficient space (between the rear face 2622 of the cab 2620 and the front face of a hitched trailer (not shown)) to accommodate a robotic framework 2640. In this exemplary embodiment, the framework 2640 consists of an upright post 2642 that is secured to the chassis bed 2610 at an appropriate location (for example offset to the left side as shown). The post 2642 can be secured in a variety of ways that ensures stability of the robotic framework 2640—for example, a bolted flange 2644 as shown. The upright post 2642 provides a track for a horizontal bar 2646 to move vertically (double-arrow 2648) therealong. Motion can be provided by drive screws, rack and pinion systems, linear motors, or any appropriate electrical and/or pneumatic mechanism that allows displacement over a predetermined distance (for example, approximately 1-2 feet in each direction). The horizontal bar 2646 could also support a rearwardly directed telescoping arm 2650 so that it can move (double-arrow 2652) horizontally/laterally from left to right (with respect to the truck 2600). The arm can move (double-arrow 2654) horizontally from front-to-rear using a variety of mechanisms that should be clear to those of skill, thereby placing an end effector 2656 ("coupling device") at precise x, y, z-axis coordinates (axis 2660) within a predetermined range of motion. The end effector can carry a modified glad hand or probe head as described above for attachment to the trailer glad hand or (e.g.) receptacle. The end-effector-mounted coupling device 2658 has a side-ported pneumatic hose 2662, that is, itself, linked to the vehicle port 2664 on the rear face 2622 of the cab 2620. That is, the end effector 2656 is moved via the controller 2670, which receives inputs from sensors 2672 of the type(s) and function(s) described above (camera, laser rangefinder, etc.). These sensors determine the position in 3D space of the trailer connector when present (e.g. after hitching is complete).

In operation, using the robotic framework 2640, the alignment of the telescoping end effector 2656, and associated connector 2658 (e.g. the modified glad hand clamp) is directed, in part, by sensors 2672 in the form of 2D or 3D cameras. However, more detailed information of the trailer type and precise receptacle location can also be read off of the trailer (e.g.) using a QR/Bar or other appropriate, scannable ID code, RFID or other data-presentation system. This embedded value can provide a precise x, y, z-coordinate location of the receptacle and optionally the rotations, Ox, Oy and Oz, about the respective x, y and z axes. In an embodiment, the location can be computed in relation to a fixed point, such as the code sticker itself, kingpin, trailer body edge and/or corner, etc. In another embodiment, the receiving connector is surrounded by a specific pattern of passive reflective stickers that can be used to home in on the specific location of the receiving connector.

As described above, a conventional or custom passive or active RFID sticker/transponder, or another trackable signaling device can be placed directly on the trailer connector (e.g. glad hand), to assist the end effector 2656 in delivering the connector(s) 2658 precisely to the alignment position. The sticker can either be placed at the time of the guard shack check-in, or by the driver, as the OTR connectors are disengaged.

Figure 26A:
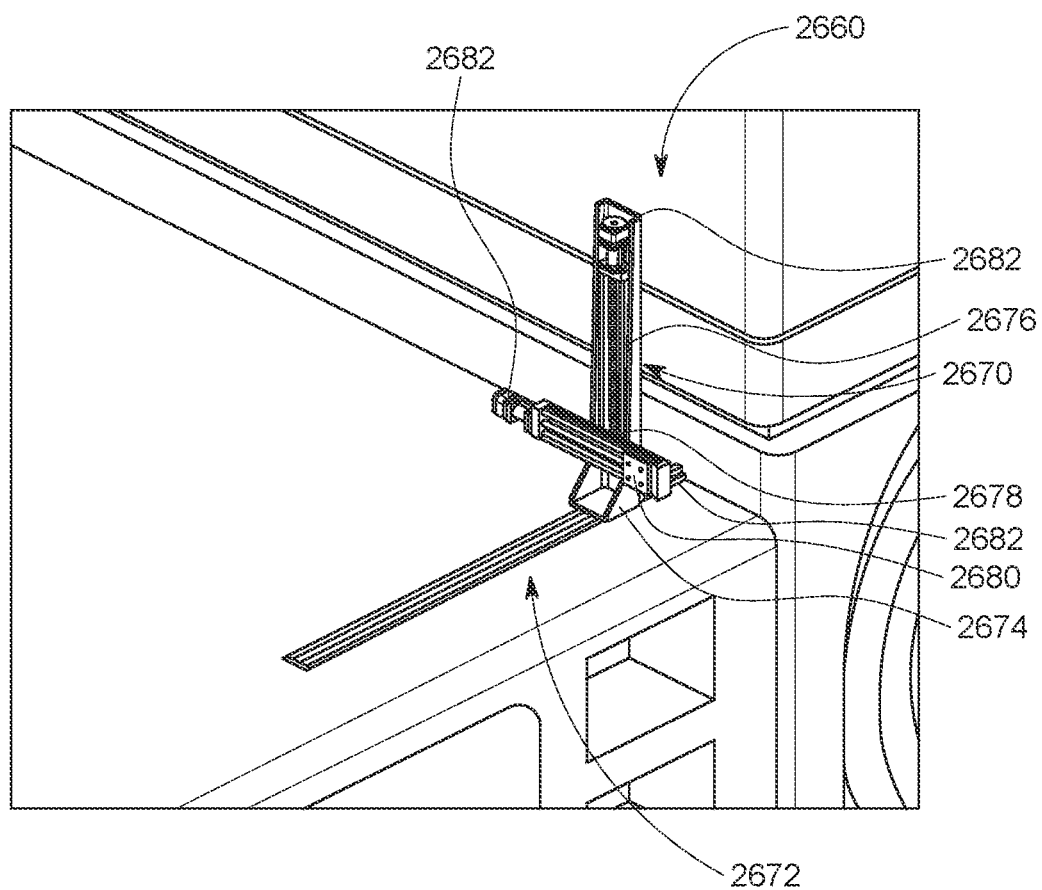
FIG. 26A fragmentary perspective view of the rear of an AV yard truck having a three-axis (triple) linear actuator adapted to deliver a coupler to a receiver according to an embodiment.

Another embodiment of a robotic manipulator 2670, mounted on the rear of an AV yard truck 2660, is shown in FIG. 26A. This manipulator, 2670, also adapted to handle the AV yard truck's service connector (e.g. emergency brake pneumatic line connector) and defines three orthogonal axes of motion. It consists of a horizontal, base linear actuator or motor 2672, arranged to carry a shuttle 2674 forwardly and rearwardly a sufficient distance to reach the receiver on the trailer (not shown) in a rearward orientation and clear the trailer's swing motion in a forward location (e.g. at least approximately 1-4 feet of motion in a typical implementation). The shuttle 2674 supports a perpendicular linear motor 2676 that moves a third, orthogonally arranged horizontal linear motor 2678 upwardly and downwardly (vertically, e.g. approximately 1-3 feet). The third motor 2678 includes a mounting plate 2680 that can hold a gripper or other hand assembly that can move in one or more degrees of freedom (e.g. 1-3 feet) and selectively grip the service connector for insertion into the trailer receiver/coupling. The linear motors can be effectuated by a variety of techniques. For example, each can include a stepper or servo motor 2682 at one end, that drives a lead screw. Other mechanisms, such as a rack and pinion system can be used in alternate arrangements. As with other manipulators herein, the range of motion for each axis or degree of freedom is sufficient to ensure that during transit of the truck, the robot does not interfere with normal operation, including swing of the trailer during turning, and also to ensure that the hand or end effector of the robot can reach and insert a carried connector/coupling into an appropriate receiver/receptacle on the trailer during hitching and hook-up.

Figure 27:
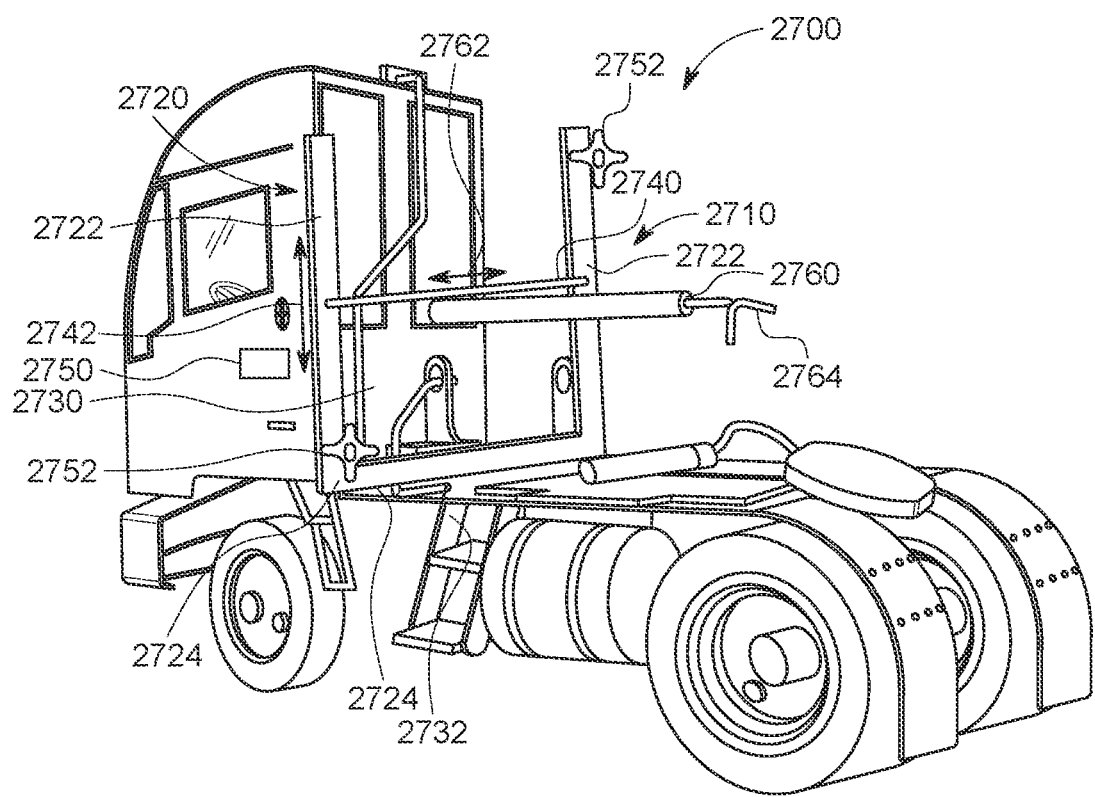
FIG. 27 is a rear perspective view of an AV yard truck showing a robotic framework and telescoping arm and end effector assembly for connecting a truck pressure or electrical connector to a trailer receptacle according to an embodiment.

FIG. 27 depicts an AV yard truck 2700 with automated connection system 2710 according to another embodiment. This system 2710 employs a U-shaped frame 2720 with opposing uprights 2722 on each of opposing sides of the cab rear face 2730, and a base bar 2724 mounted to the chassis 2732. The uprights 2722 each carry a gear rack that is engaged by a servo or stepper driven pinion on each of opposing sides of a cross bar 2740. The cross bar 2740 moves upwardly and downwardly (vertically, as shown by double-arrow 2742) based on control inputs from a controller 2750 that receives position information on the trailer connector based on rear-facing, cab mounted cameras 2752, and/or other appropriate sensor type(s). A telescoping arm 2760, with appropriate end effector 2764 (and/or directly arm-attached connector/glad hand), moves laterally (horizontally, as shown by double-arrow 2762) based on the controller using (e.g.) a leadscrew drive, linear motor or rack and pinion system. Telescoping is provided by another motor or actuation system that should be clear to those of skill, thereby providing at least three (3) degrees of freedom of motion. The end effector 2764 can, optionally, include articulated joints, knuckles and/or other powered/movable structures clear to those of skill (in both this embodiment and the embodiment of FIG. 26). The framework system 2710 can be custom-built, or fully/partially based upon an existing, commercially available system, such as a printing servo frame.

Figure 28:
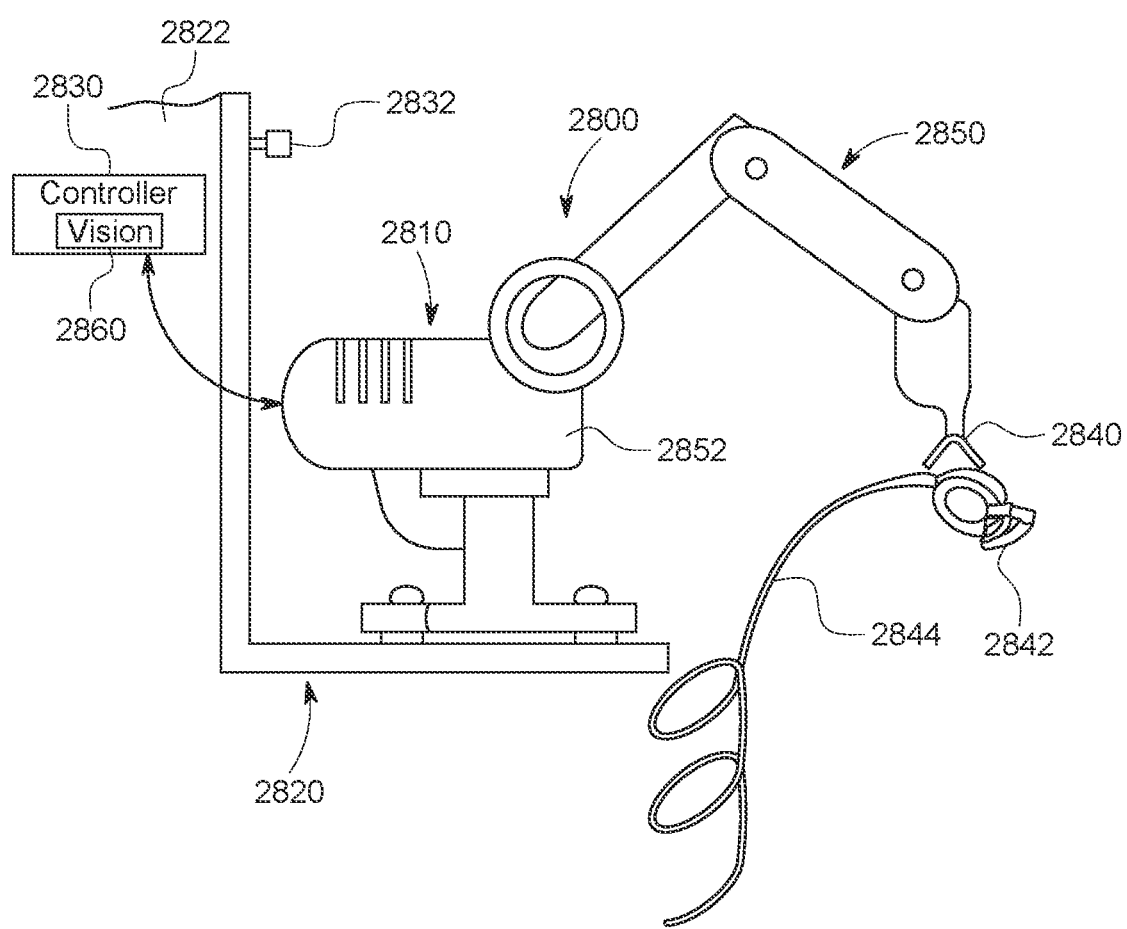
FIG. 28 is a fragmentary side view of a truck chassis showing a multi-axis robotic arm and end effector assembly for connecting a truck pressure or electrical connector to a trailer receptacle according to an embodiment.

With brief reference to FIG. 28, an automated connection arrangement 2800 can comprise a multi-axis robot 2810, available from a commercial supplier, (or custom built), and adapted to outside/extreme environments as appropriate. The design and function of such a robot should be clear to those of skill. In general, the robot 2810 is mounted to the chassis 2820, behind the truck cab 2822. It communicates with a controller 2830, which receives inputs from one or more sensor(s) 2832. As described above, the sensors 2832 can be used to identify both the trailer connector and its associated 3D location and the 3D location of the end effector 2840, and the associated connector 2842, which is carried by that end effector. The connector 2842 is shown connected to a hose 2844, that is, likewise, connected to the truck pneumatic and/or electric system. The end effector is a distal part of fully articulated (e.g. 5 or 6-axis) robot arm 2850 and base 2852. It is servoed (i.e. it is guided using sensory feedback) by commands from the controller 2830. Where 2D or 3D camera sensors are employed (in any of the embodiments herein), they can be connected to a vision system 2860. A variety of commercially available vision systems can be employed—typically operating based on pattern recognition, and trained on model (e.g.) 3D data. Such systems are available from a variety of vendors, such as Cognex Corporation of Natick, MA. These systems include modules for robot control.

Using a fully-articulated, multi-axis robot can enable the connector 2842 to be either modified or conventional (e.g. a standard rotation-locked glad hand). In the case of a conventional connector, the robot 2810 can be trained to move the end effector containing the connector along its several axes, in which the robot arm 2850 and base 2852 is trained to align and rotate the (e.g.) glad hand into a securely locked/sealed position during connection, and to counter-rotate/unlock the glad hand during disconnection.

Figure 28A:
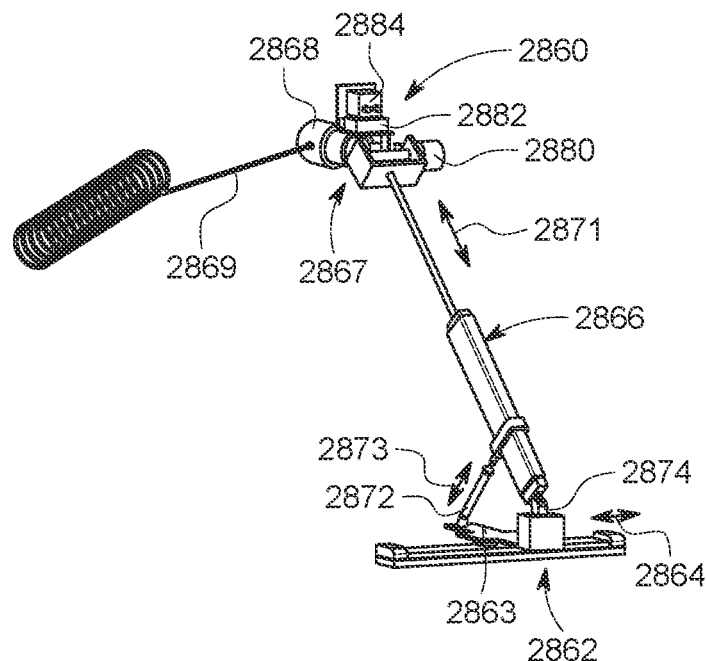
FIG. 28A is rendering perspective view of an AV yard-truck-mounted robotic manipulator, including an arm/wrist/hand delivery mechanism with interconnected trailer pneumatic line (air hose) and coupling device, according to an embodiment.
Figure 28B:
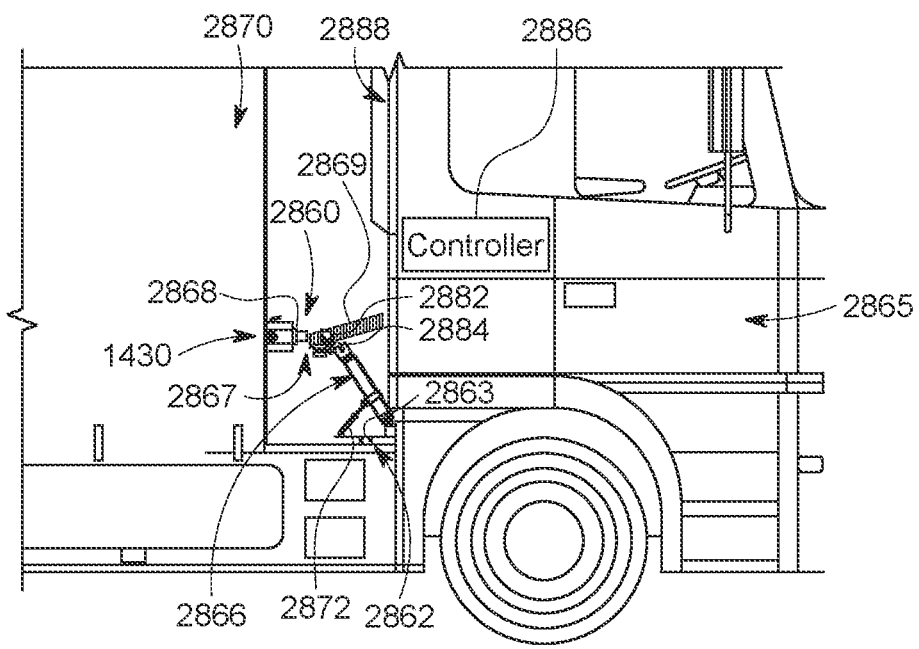
FIG. 28B is a fragmentary side view of an exemplary AV yard truck and trailer hitched thereto, having of the arm/wrist/hand delivery mechanism of FIG. 28A, and a corresponding receiver mounted on the trailer.
Figure 28C:
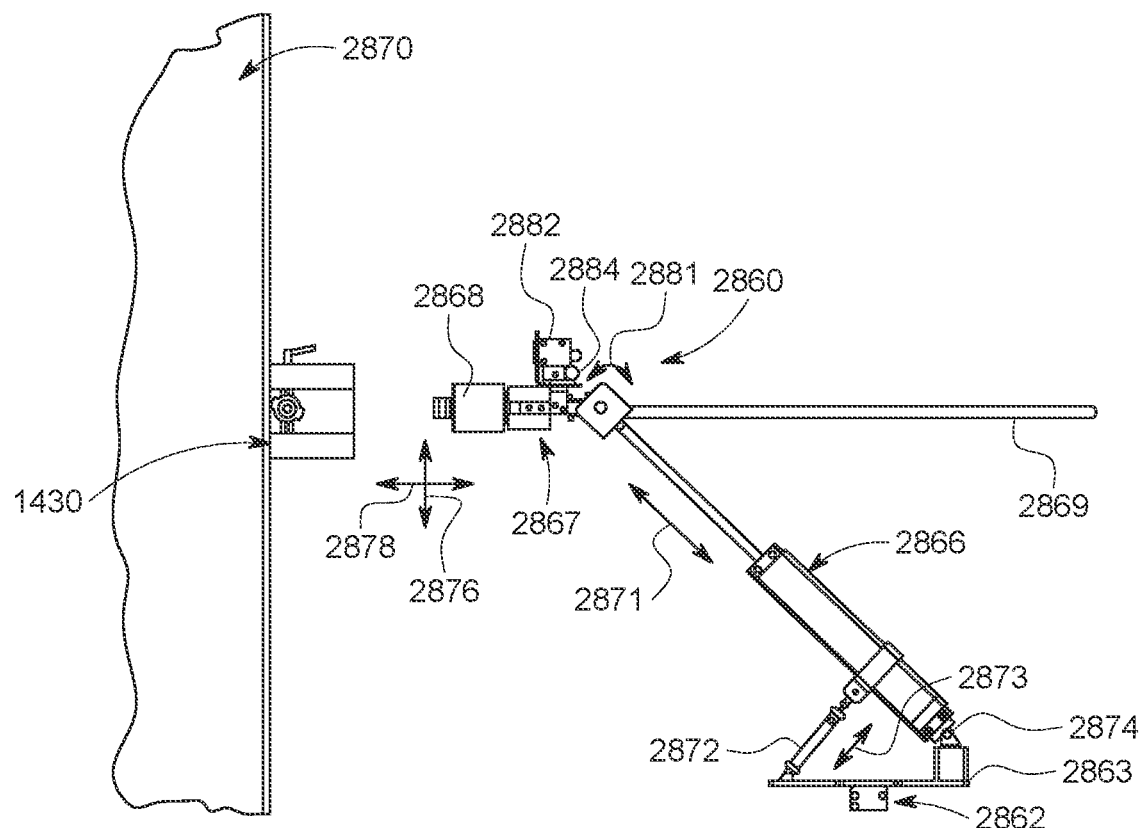
FIG. 28C is a side view of the arm/wrist/hand delivery mechanism of FIG. 28A shown making a connection to the trailer-mounted receiver.

FIGS. 28A-28C depict an automated connection arrangement 2860 according to another embodiment. The arrangement 2860 consists of a horizontally, left-right, positioned linear actuator or screw-drive base 2862 (as also described generally above—see, for example, FIG. 26A) with a baseplate 2863 mounted to the actuator/screw-drive 2862, allowing for lateral movement (double arrow 2864) across the back of the truck 2865 (e.g. approximately 1-3 feet). Attached to the baseplate 2863 is a large hydraulic or pneumatic piston 2866, with an articulating end-effector (also termed a "hand") 2867, shown holding onto a releasable coupling assembly 2868 (see, for example the female portion of the connector 880 in FIGS. 8B-8E above), which can remain connected to the trailer receiver after the end-effector/hand 2867 has been retracted. Also associated with the coupling 2868 is a side-ported pneumatic line/hose 2869 that connects back to the main AV yard truck air-system. Routed with the pneumatic line 2869 is electrical power, used to operate an actuation device on the air-connection device (e.g. solenoid sleeve 892 in FIGS. 8b-8E), as well as to optionally connect electrical power to the trailer 2870 (as described above—see for example, FIG. 8A). In addition to the large piston 2866 that is primarily used to selectively extend (e.g. 1-4 feet) the end effector 2867 out toward the trailer 2870 and retract the end effector away from the trailer 2870 (double-arrow 2871), there is a smaller hydraulic or pneumatic piston 2872 that is pivotally affixed to both the baseplate, and as the belly side of the large piston 2866. Motion (double-arrow 2873, 3-9 in) of this smaller piston 2872 is responsible for allowing the entire arrangement to move up/down by inducing rotation about a base pivot 2874. More particularly, the motions of three discrete actuators is coordinated to allow the end effector 2867 and its gripped connector 2868 to move in two orthogonal directions—vertically (double-arrow 2876 and horizontally (forwardly/rearwardly—double-arrow 2878). That is, as the large/main piston 2871 strobes inwardly and outwardly, and appropriate height is maintained by changing the position of the smaller piston 2872 (which also has a smaller effect on front-to-rear position). A rotary actuator 2880 changes the relative angle (double-curved-arrow 2881) of the end effector 2867 so that the gripped connector 2868 remains horizontally aligned (level) with the trailer receiver 1430 (described above). That is, as the smaller piston 2872 changes the angle of the larger piston 2866 relative to the truck, the rotary actuator re-levels the end effector. Appropriate motion sensors, accelerometers, gyros and other position/attitude sensors can be employed to maintain level. Such sensors can be located on the end effector and/or elsewhere on the arrangement 2860. Alternatively, or additionally, using stepper motors, differential controllers, etc., the angular orientation of the end effector 2867 can be computed based on the relative positions of the two pistons 2866, 2872, and the rotary actuator 2880 can be adjusted to level the end effector 2867 (in a manner clear to those of skill).

In an embodiment, a camera 2882 and ranging device 2884 of conventional or custom design are mounted on top of (or at another location on) the end effector. These components are interconnected via wires or wirelessly to a processor (e.g. the AV yard truck controller 2886, or a module thereof), which operates a vision system to assist in coupler/receiver alignment (as described above). Ranging and alignment are also assisted by any of the previously mentioned optional components or arrangements above (e.g. reference position to known location, reflective patterned stickers, etc.).

In operation, the arrangement 2860 of FIGS. 28A-28C, initiates function after the AV yard truck 2865 hitches to the trailer 2870 under operation of the controller 2886. The controller (or another processor/module) 2886 then instructs the end effector 2867, which is gripping the coupler 2868 to move from a retracted position toward the receiver 1430 on the trailer. The camera 2884 and range finder 2882 acquire the receiver 1430 using a variety of techniques as described herein. Other cameras on the truck rear face 2888 can also assist in locating the receiver as appropriate. The controller 2886, or a localized motion module/processor on the arrangement 2860 servos the linear motor 2862 to laterally (side-to-side) align the end effector 2867 and coupler 2868 with the receiver. Subsequently, or concurrently, the large and small pistons 2866 and 2872 are stroked (large piston outwardly and small piston inwardly) while the rotary actuator 2880 rotates to maintain a level angle, thereby bringing the coupler 2868 into engagement with the receiver 1430. After engagement, the electronic locking solenoid in the coupler de-energizes and causes the (e.g. female) quick disconnect fitting to springably lock onto the receiver (e.g. male) fitting. The end effector 2867 then releases and the arrangement returns to a retracted location on the truck chassis rear—out of interfering contact with the trailer. The connection is made only by the flexible pneumatic line 2869, which can bend and stretch freely as the trailer swings relative to the truck during normal driving motion.

Disconnection of the coupled connectors 1430, 2868 is the approximate reverse of connection, as described above. That is, the end effector moves back into engagement with the coupler 2868 and grips it. The solenoid in the coupler energizes, allowing for unlocking from the fitting in the receiver. The pistons 2866, 2872 and rotary actuator 2880 move in a coordinated manner to withdraw the coupler and move it to a neutral (retracted) location. The linear actuator 2862 can also move to a neutral location as appropriate. The trailer is then unhitched in a manner described above.

III. AV Yard Truck Operation

Figure 29:
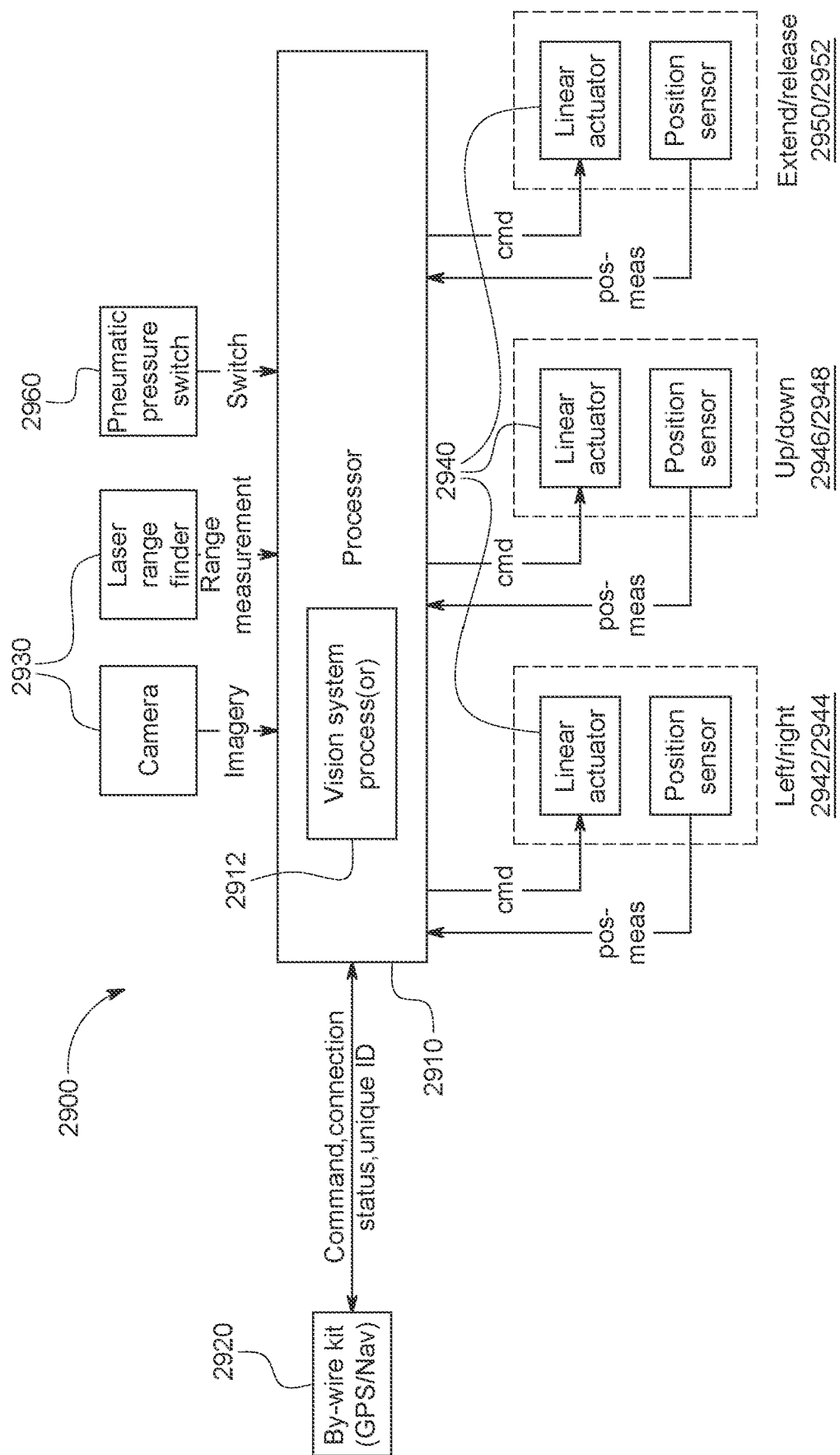
FIG. 29 is a block diagram showing generalized procedures and operational components employed in hitching an AV yard truck to a trailer, including the connection of one or more service lines using a robot manipulator according to an embodiment.

Further to the general operation of an AV yard truck as described above, once the designated trailer has been successfully secured/hitched to the AV yard truck (pneumatic line(s), optional electrical connections, and kingpin), the fifth wheel is raised by operation of the controller, in order to clear the landing gear off the ground, and the trailer is then hauled away. Reference is made to the block diagram of FIG. 29, showing an arrangement 2900 of functions and operational components for use in performing the steps described above—particularly in connection with the hitching of a trailer to the AV yard truck. As shown, the processor/controller 2910 coordinates operation of the various functions and components. The AV yard truck is instructed to drive to, and back into, a slip containing the trailer. This movement can be based on local or global navigation resources—such as satellite based GPS and/or yard-based radio frequency (RF) beacons 2920. Once within optical range, the camera(s) and/or other sensors (e.g. RF/RFID-based) 2930 can transmit images of the trailer to the vision system process(or) 2912, locating the trailer's receptacle or similar connector. As the receptacle/connector is identified, the truck and/or manipulator (e.g. robotic framework, robot arm, etc.) 2940 can be servoed by the vision system to attempt to align the end effector and associated truck probe/connector with the trailer receptacle/connector. This can include a variety of motion commands (denoted "cmd"), including moving the framework/arm left 2942, right 2944, up 2946 and down 2948, and extending/retracting 2950 the (e.g.) telescoping arm/member of the robot manipulator to move the truck probe/connector a desired 3D location and impart a required attachment motion i.e. insertion of a probe into the receptacle. Appropriate knowledge (denoted as "pos-meas" of current arm position (e.g. counting stepper motor/encoder steps, providing servo feedback and/or using visual tracking via a guidance camera assembly) can be returned to the processor 2910 as the arm components move. The arm can be released (block 2952) at this time so the connection between the truck and trailer pneumatics (and optionally, electrics) is able to flex as the vehicle turns. Once connected, the pneumatic pressure of the truck is switched on (block 2960) by the controller. The controller also then lifts the fifth wheel when using appropriate hydraulic/pneumatic (more generally, "fluid" herein) pressure actuators on the truck to raise the trailer landing gear out of engagement with a ground surface and allow it to be hauled to another location in the yard.

IV. Door Opening

If the trailer is either equipped with a rolling door, or swing doors have already been secured in the open position by OTR driver (see above), or other representative, then the load can be directed to a pre-designated (un)loading dock. However, if the trailer is equipped with secured swing doors, in the closed position, then it is desirable to provide an automated mechanism to allow for the doors to be opened in an automated manner. In an embodiment, as shown generally in FIG. 30, the hitched-together truck and trailer 3010 can be backed down to either a redesignated empty loading bay, or a stand-alone station (e.g. a wall) 3000, that has been modified to include network connected camera(s) 3020 and a set of articulating arms 3032 that are part of a robotic assembly 3030. Through the use of the camera(s) 3020, a remote operator and/or processor 3040 (that can include vision system and robot-servoing modules) operates the arms 3032, and be capable of grasping door latches 3052 (shown in phantom), unlocking the doors 3050, swinging them approximately 270 degrees, and securing them to the sides 3054 of the trailer. Each arm 3032 can include an articulated end effector 3034 that acts as a grasping device. Illustratively, instead of securing the conventional hooks and eyebolts found on most trailer door arrangements, securing doors 3050 to the side 3054 of the trailer 3010 can be accomplished by the robotic arm delivering a stand-alone clamping mechanism 3060, which can be deployed to temporarily secure the door to the bottom of the trailer body as shown. A more detailed view of an exemplary clamping mechanism is shown in FIG. 30A. The clamps can be constructed from a flexible polymer and/or a metal having discrete or integral spring members that allow for a removable pinch action. As such, the clamps can frictionally bias the lower edges of the doors against each side, free of slippage, but such friction can be overcome by grasping and removing the clamp. In general the robot and arms should allow clearance for the doors between an opened and closed condition (e.g. approximately 3-6 feet).

Figure 31:
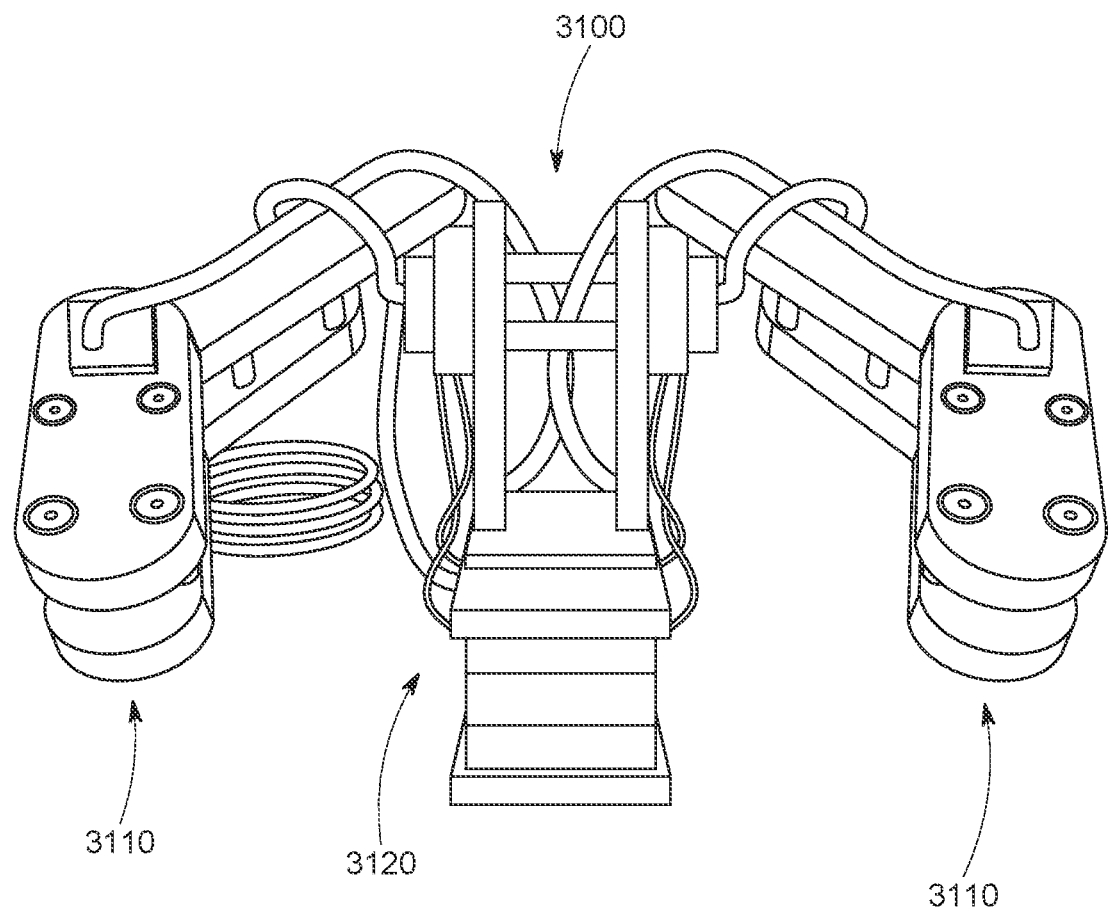
FIG. 31 is a perspective view of an exemplary, multi-arm robot for use in the door station of FIG. 30.

By way of non-limiting example a multi-arm robot assembly, which can be commercially available, can provide the basis for a manipulator used in handling doors. Such a commercially available robot 3100 is shown by non-limiting example in FIG. 31. It consists of two independently moving arm assemblies 3110 attached to a central base 3120. A variety of alternate arrangements are contemplated, and such arrangements can facilitate motion is various degrees of freedom, as required to carry out latch-unlocking, swinging and securing functions as desired.

In operation, after the doors are swung open at the door station, the open-doored trailer can then be backed by the AV yard truck into an active unloading bay. Likewise, the process can be reversed once the trailer has been reloaded and is ready to depart the yard. That is, the yard truck hitches and/or hauls it away from the loading dock and backs it into the door station. The robot arrangement (3030) is used to unclamp the doors, swing them closed and secure the latches.

Figure 32:
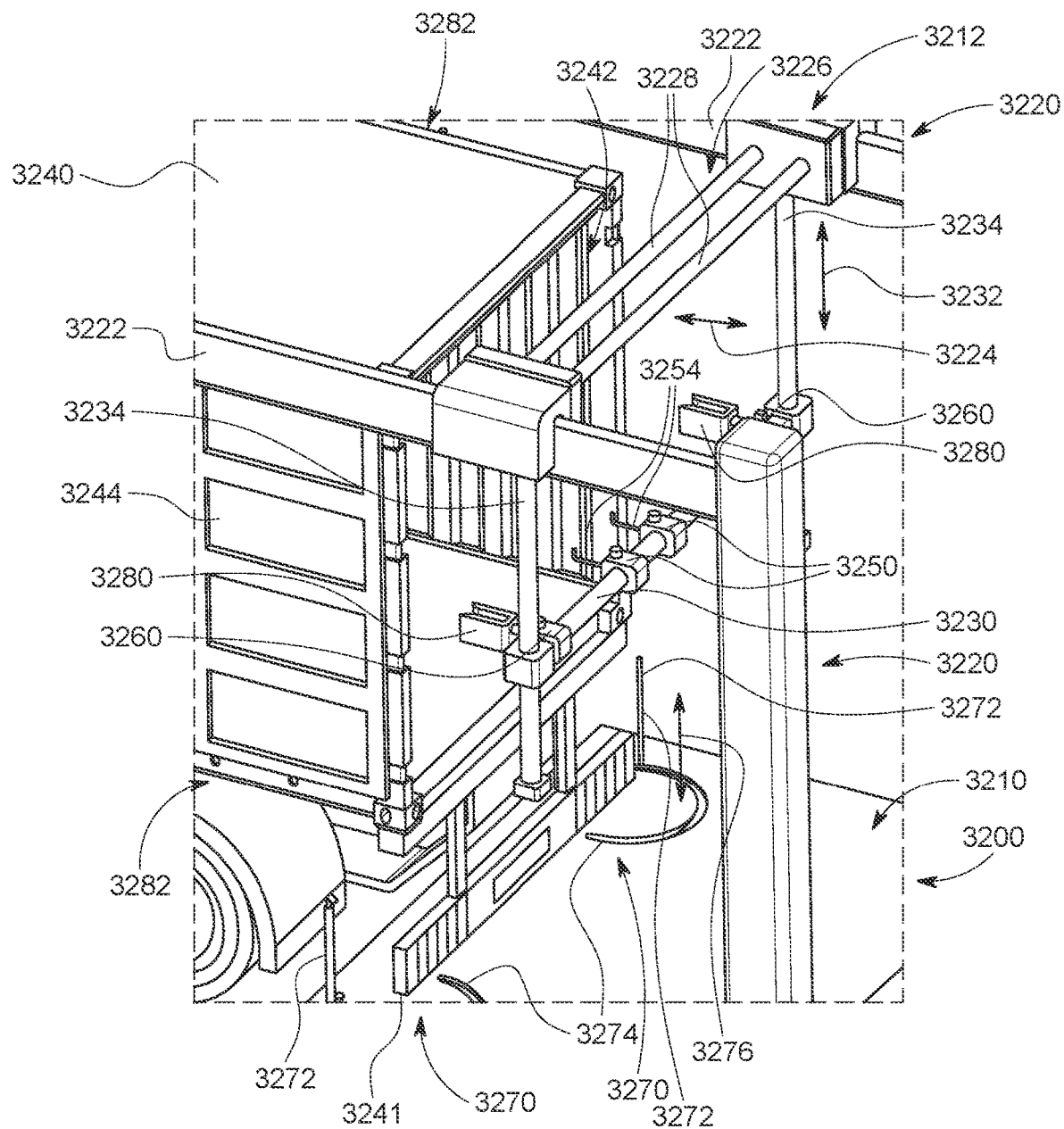
FIG. 32 is fragmentary perspective view of an exemplary trailer rear located adjacent to a door station consisting of floor base having retractable door-opening posts and a framework into which the trailer backs, having door unlocking and open-door-fixing mechanisms that selectively engage the trailer swinging rear doors.
Figure 32A:
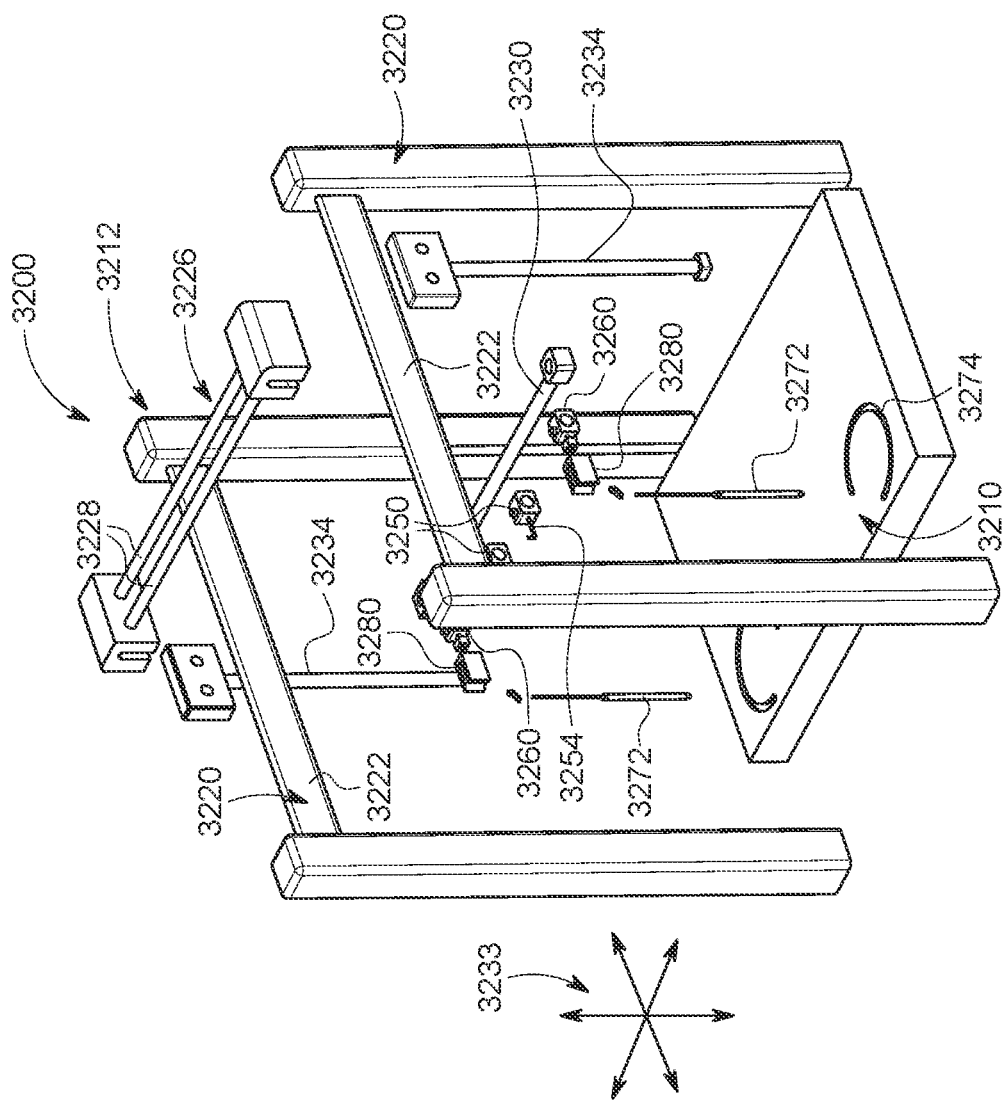
FIG. 32A is an exploded perspective view of the door station of FIG. 32.

In another embodiment, shown in FIG. 32, the door station 3200 employs unique mechanisms for each discrete task. Each mechanism (a basic rod, set of rods, or rod(s) with end effectors) is responsible for performing a particular task. The station 3200 consists of a floor base 3210 and an upright, framework 3212 composed of a pair of spaced-apart (U-shaped) gantry frame members 3220 (e.g. approximately 8-14 feet apart, 8-14 feet long, 6-14 feet tall). With further reference to FIG. 32A, the structure of the framework 3212, and overall door station, is also shown in exploded view. The framework 3212 supports a vertically moving (double-arrow 3232) cross beam or slide 3230. The top beam 3222 on each frame member 3220 defines a slide, upon which moves (in a forward/rearward direction—double-arrow 3224) a linear slide. The linear slide 3226 include (e.g.) lateral bars 3228, which carry spaced-apart, vertical posts 3234. These posts 3234 are spaced apart at least the width of the trailer 3240. The posts carry, and allow vertical movement (double arrow 3232) of a lateral cross beam or slide 3230. Note that linear motion (vertically and horizontally, and up/down, front/rear, left/right—see axis 3233) of the various sliding components herein can be effectuated by a variety of mechanism, which should be clear to those of skill, including rack and pinion systems, driven lead screws, linear motors, pneumatic/hydraulic (fluid) pistons.

The cross beam/slide 3230 includes a several mechanisms that can (optionally) move horizontally along the cross beam 3230 and extend as needed (under front/rear motion of the linear slide 3226) to engage the rear 3242 of the trailer 3240. Note, briefly, the presence of an underride bar 3241, which can be clamped by a dock-lock or other safety mechanism as described further below. These cross-beam-mounted mechanisms include a door unlatching mechanism 3250 and an open door locking/fixing mechanism 3260 (on each of opposing sides of the cross beam 3230). The door unlatching mechanism 3250 employs a pair of forwardly extended, upturned hooks, or other suitable end-effector (e.g. a gripper jaw, electromagnet, etc.), 3254 that enter below each latch by coordinated motion of the forward/rearward-moving linear slide 3226 and the upward/downward movement of the cross beam 3230. Once hooked, each latch is lifted and the hooks 3254 are moved rearwardly to rotate the lifted latches and thereby rotate and unlock the (typically conventional trailer door rods).

Once unlatched, the doors are swung open using the opening mechanism 3270 residing in the floor base 3210. Notably, the door opening mechanism 3270 of this embodiment, defines a pair of posts or rods 3272 that each uniquely rise (double-arrows 3276) out of each of two (left and right) lunate curved slots 3274 on the floor base 3210, and, once engaged with the interior of each respective (now-unlatched) swing door 3244, execute motion in an arc along its path to position each door flush, or close to flush, along the side 3282 of the trailer 3240. Note that the posts 3272, while tracing a semicircular path (defined by slots 3274) to swing open the doors can follow a partial-polygonal, elliptical, irregularly curved and/or straight line path to move the doors to the sides of the trailer. Moreover, while extending/retracting posts are shown, another structure, such as a cam wheel with a rising post, or similar arrangement can be used in alternate embodiments. Also, while not shown, the posts 3272 can be driven beneath the floor by a rotating drive plate, swinging arm, curved rack and pinion, or a variety of other mechanical systems that should be clear to those of skill.

Once the posts 3272 have moved the doors to a swung-open position, along the sides of the trailer as shown in FIG. 32, a separate device 3260 mounted on the cross beam 3230 at opposing sides thereof, delivers a flexible, rubberized (or the like) horseshoe or clip-shaped clamp 3280 over the now-sandwiched door 3244 and trailer side 3282 to prevent it from swinging closed, and maintain it engaged against the side 3282 of the trailer.

Figure 32B:
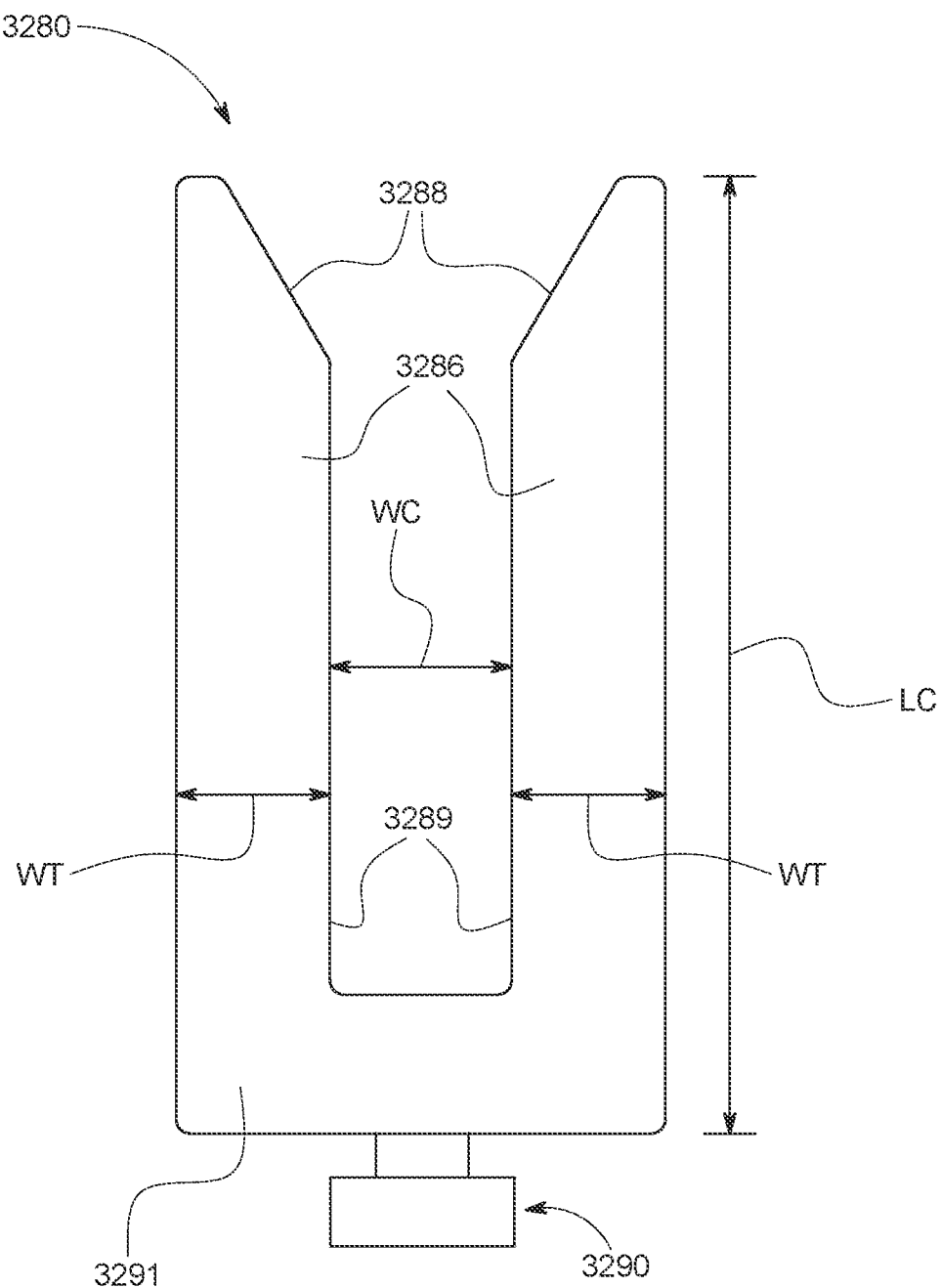
FIG. 32B is a plan view of an exemplary door-fixing clamp that can be applied to a swung-open trailer door to maintain it in such position during transit and unloading for use in the open-door-fixing mechanism of FIG. 32.
Figure 32C:
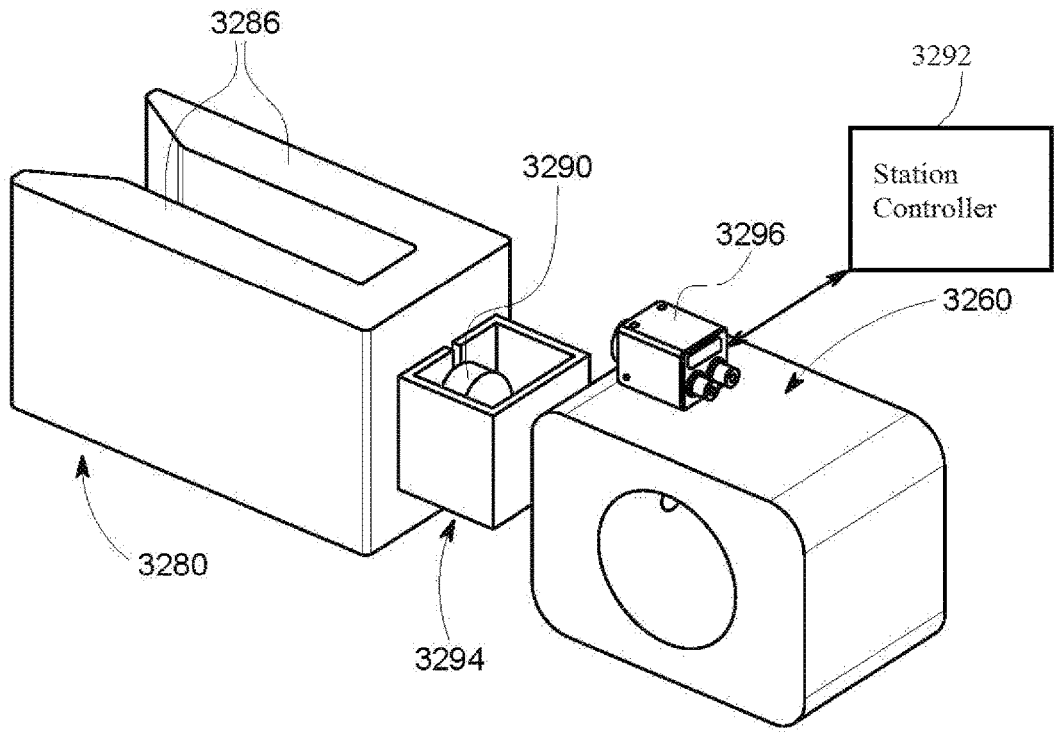
FIG. 32C is a perspective view of the door-fixing clamp and associated gripper mechanism of the open-door-fixing mechanism of FIG. 32, shown gripping the clamp.
Figure 32D:
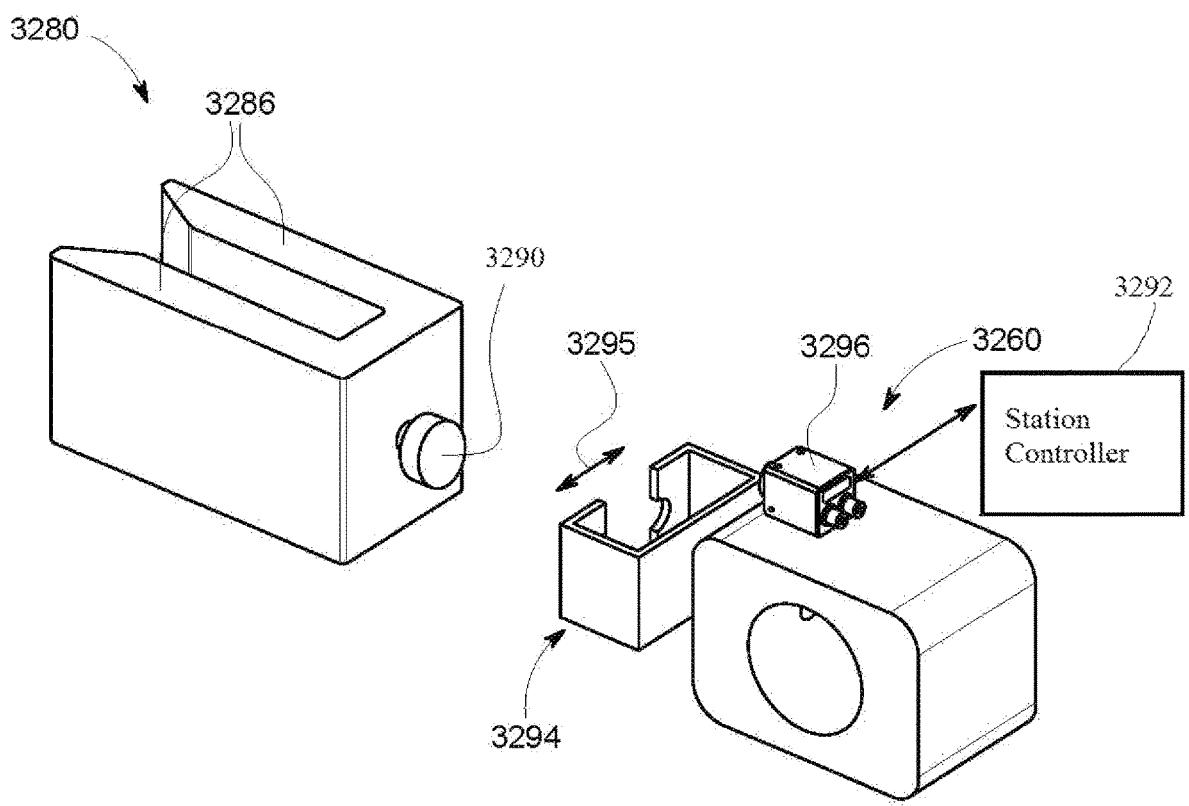
FIG. 32D is a perspective view of the door-fixing clamp and associated gripper mechanism of FIG. 32C, shown releasing the clamp.

With particular reference to FIGS. 32B-32G, the structure and operation of a trailer swing-door hold-open mechanism according to an embodiment is shown in greater detail. As shown in FIG. 32B, the clamp 3280 is shown in plan view. The clamp 3280 is constructed from a durable, flexible material—e.g. synthetic or natural rubber, nylon, ABS, or a composite (e.g. glass-filled nylon). Alternatively, the clamp can be constructed wholly or partially from metal—with sufficient spring constant or an integrated spring component. The clamp 3280 has a length LC—which should be sufficient to allow it to firmly/frictionally engage the swung-back trailer door free of slippage—for example 4-15 inches. The clamp 3280 is shaped similar to a clothespin, with a pair of opposing tines 3286, with opposing, tapered free (distal) ends 3288. The ends 3288 assist in guiding the clamp onto the swung-open door. The width WC between the tines 3286 should be chosen based upon the thickness TD (FIG. 32E) of the sandwiched door and side. For example, the width WC is approximately 2-5 inches. The inner surfaces 3289 of the tines 3286 define parallel planes as shown, but one or both can alternatively define a polygonal (non-planar) and/or curved inner surface to facilitate gripping and holding of the swung-back door against the trailer side. The thickness of the clamp (perpendicular to the page can vary (e.g. 1-3 inches), as can the width WT of each tine 3286 (e.g. 1-3 inches). These parameters help to determine the durability and spring constant of the clamp. The proximal, connected end 3291 of the clamp 3280 includes a T-shaped stud 3290, that is sized and arranged to be selectively gripped (FIG. 32C) and released by a horizontally moving (double-arrow 3295 in FIG. 32D) gripper 3294. An electrical connector 3296 that powers an actuator (e.g. a solenoid) can be used to operate the gripper 3294 between the gripped and released states. Appropriate springs and other mechanisms can also be employed on the gripper 3294, in a manner clear to those of skill. The gripper 3294, and other functional elements of the door station, can be interconnected with a local door station controller 3292 that is also linked to the overall autonomy system within the facility (e.g. the server 120).

It should be noted that the door station arrangement described herein effectively addresses the automation of the door-unlatching and opening task, but also more generally reduces or eliminates wasted time, fuel and safety hazards resulting from the need for a driver to exit the cab of his/her truck every time swing doors are to be opened. Hence, the applicability of the door station arrangement herein extends not only to automated yard operations, but also to conventional, manually attended yards where trailer swing doors require handling.

Illustratively, the door station arrangement can be positioned in one or more designated locations in a trailer yard (e.g. near the guard shack where trailers check in, or in a designated parking spot. The arrangement described above can, more generally, be part of an overhead gantry or a portable system.

A swing door opening system according to the door station arrangement can be operated by an operator onsite, or a remote operator responsible for operating multiple systems across wide-spread geographies. In a training procedure, a vision system associated therewith can use available (or custom) pattern recognition and robot servoing vision tools (using cameras, which can be stationary and/or located on the manipulator/cross beam of the arrangement) to understand how to open the swing door(s) of many configurations. Such doors can represent a wide range of commercially available configurations, including those with 2, 3 or 4 lock rods/latches, handles at different heights and with/without e.g. rear door aerodynamics, such as the well-known TrailerTail®, rear, folding aerodynamic structure, available from Stemco LP of Longview, TX. In an illustrative operating environment, a trained system can potentially employ multiple (e.g. tens, hundreds, thousands), of these door stations, operating automatically at yards across the world. Such systems can include a manual override capability in the event it is desirable or mandatory that a human operator (i.e. a teleoperator, sitting in a remote control location) take over and control the door station manipulators accordingly and/or to notify an onsite person at the specific yard in which the door station resides. It is contemplated that the door station, and any other automated system described herein, can include an emergency stop switch, or other manual control, which is readily accessible and stops operation in the event of an emergency. Additional safety measures, such as animal/human presence detectors—relying on shape, heat signature and/or other biometric data, can be employed to ensure that automated systems do not harm a living entity.

Figure 32E:
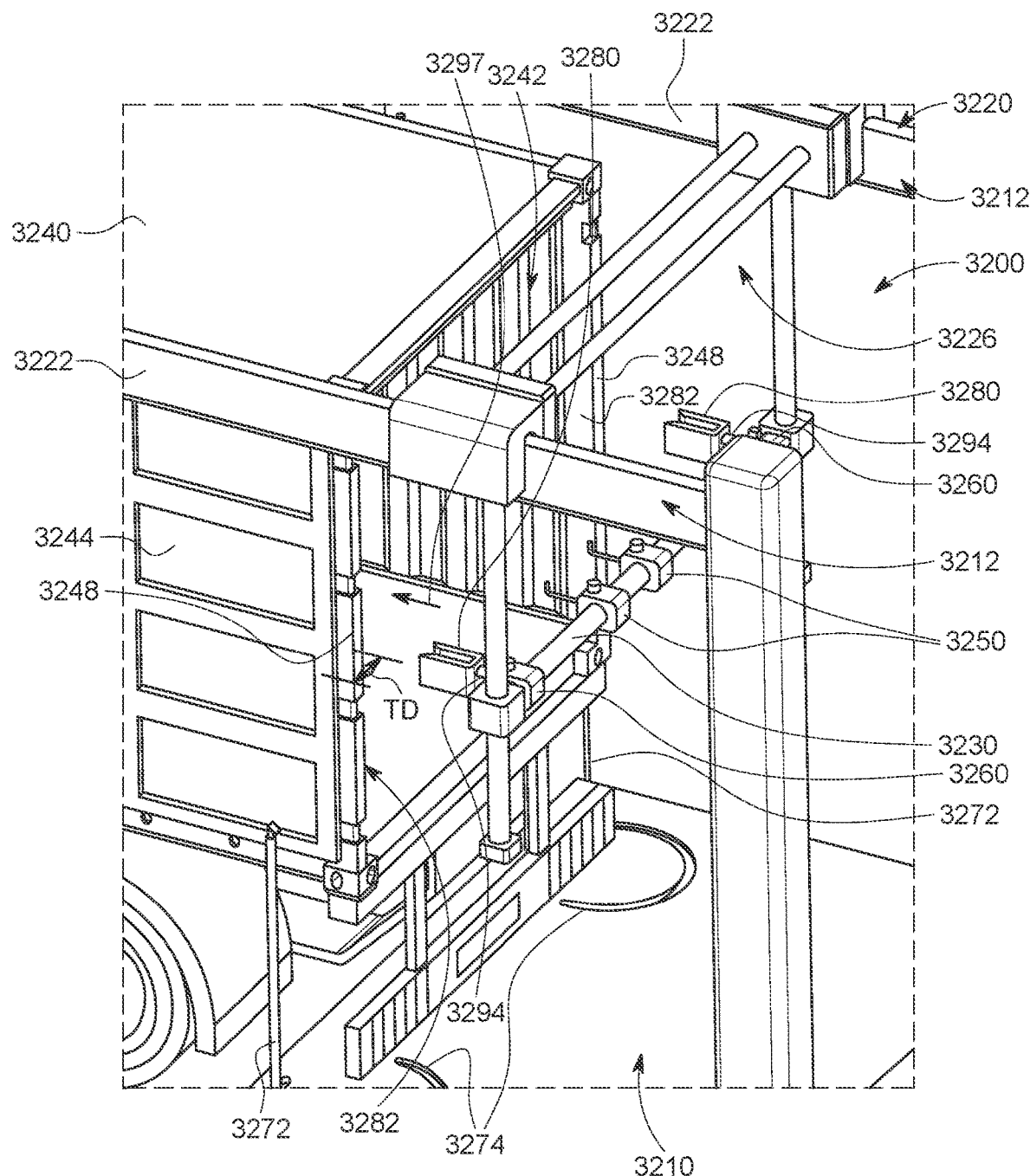
FIG. 32E is a fragmentary perspective view of the exemplary trailer rear and door station of FIG. 32 showing the open-door-fixing mechanism moving to apply clamps to the edges of the swung-open doors, as the door-opening posts are extended from the floor base to maintain the doors in swung-open positions.
Figure 32F:
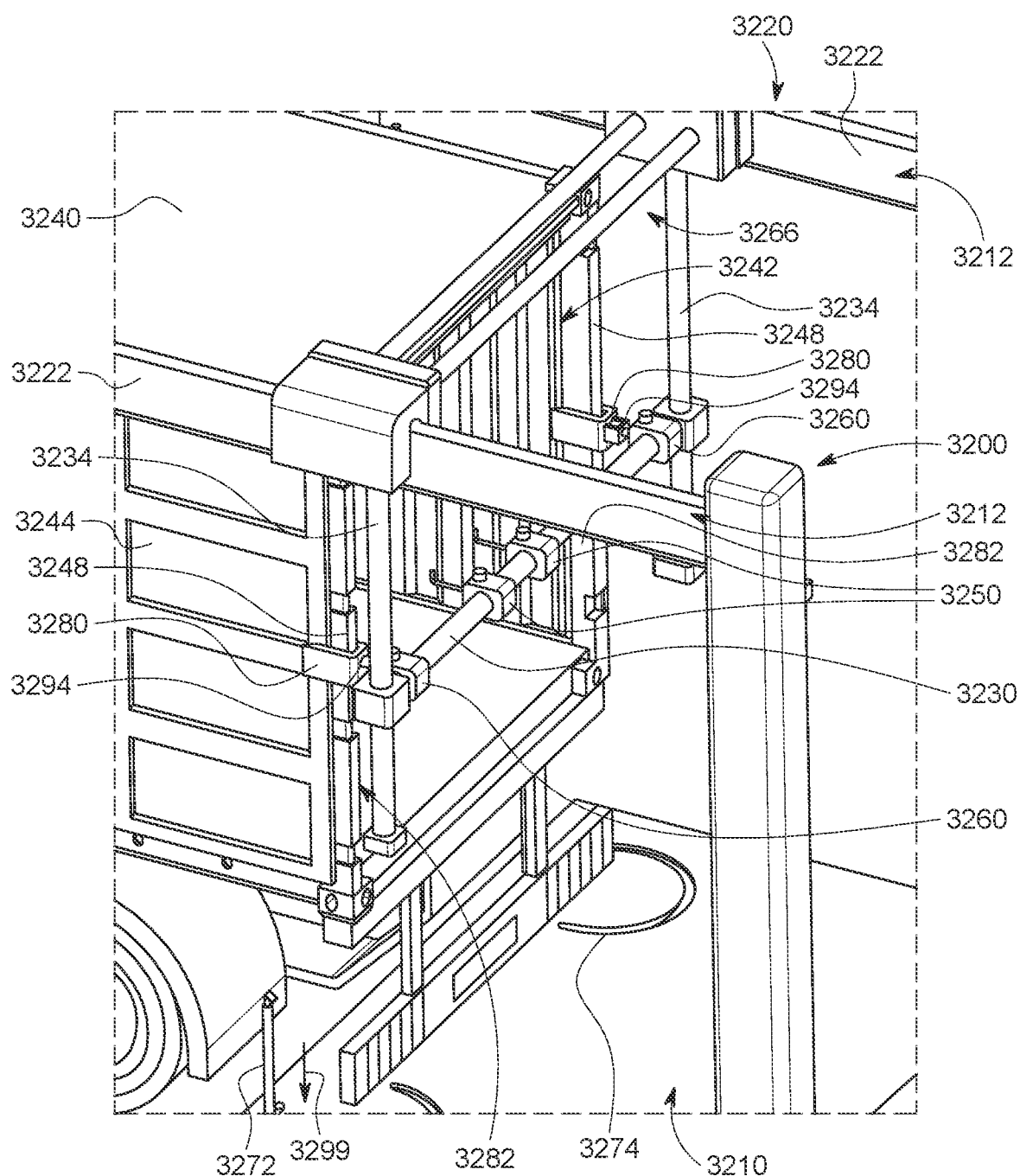
FIG. 32F is a fragmentary perspective view of the exemplary trailer rear and door station of FIG. 32 showing the open-door-fixing mechanism applying clamps to the edges of the swung-open door, as the door-opening posts retract into the floor base.
Figure 32G:
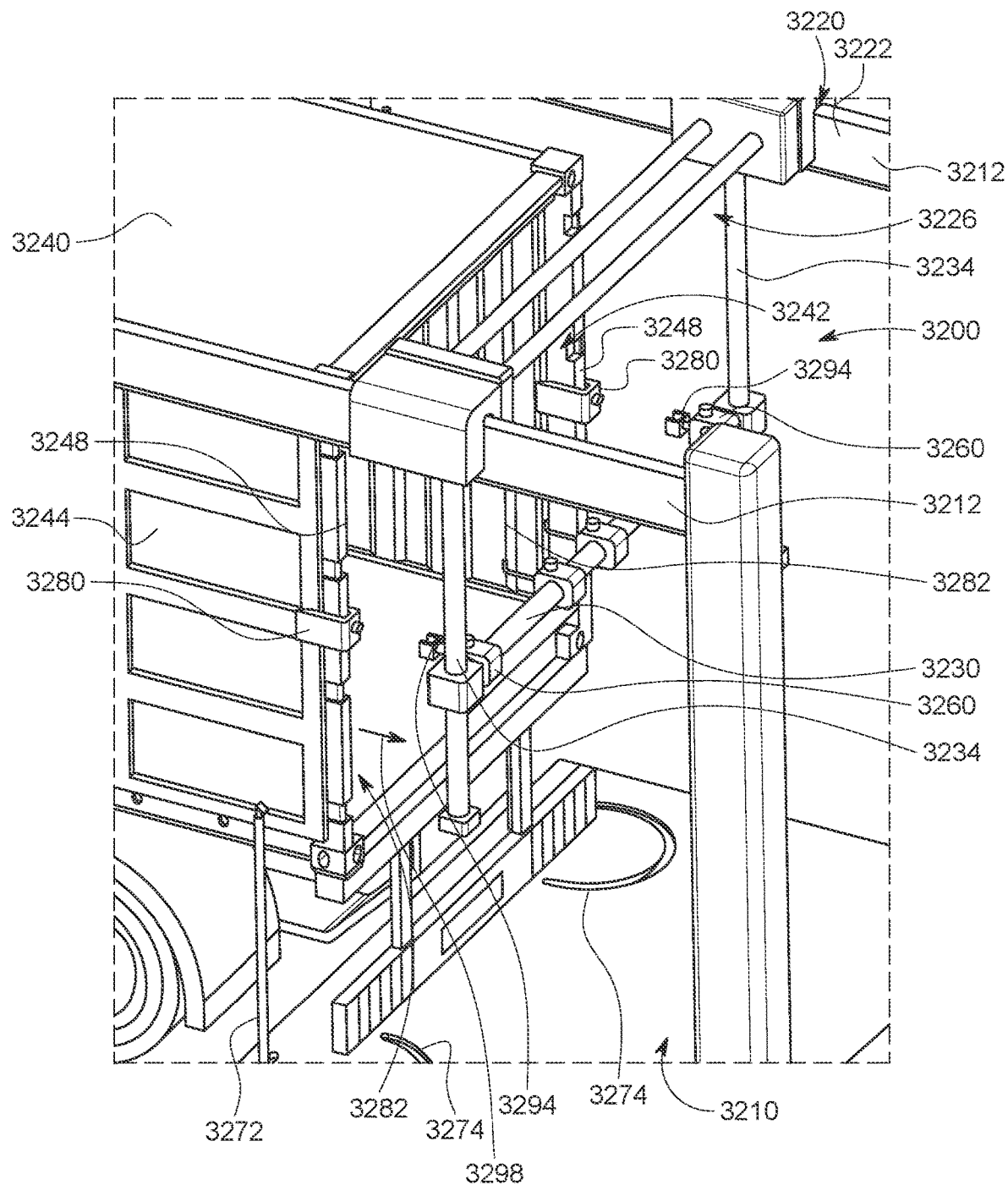
FIG. 32G is a fragmentary perspective view of the exemplary trailer rear and door station of FIG. 32 showing the open-door-fixing mechanism moving away from the edges of the swung-open doors, with the clamps released from the grippers and securing the doors in swung-open positions.

In operation, as shown in FIG. 32E, once the doors are swung open by the posts 3272, the linear slide 3226 moves forwardly (arrow 3297) on the top beams 3222 to move the clamps 3280 (gripped by grippers 3294 on the locking/fixing mechanism 3260) toward the edges 3248 of the swung-back doors 3244. Then, in FIG. 32F, the forward motion of the linear slide 3226 biases the clamps 3280 over the edges 3248, and into engagement with the swung back doors 3244 and trailer sides 3282. The gap of width WC between clamp tines 3286 (FIG. 32B) is smaller than at least a portion of the thickness TD of the stacked/sandwiched door and side so that the tines are flexed (elastically deformed) outwardly as the clamp 3280 is driven over the edge 3248. The clamp material and elastic deformation of the tines collectively generate a frictional holding force that maintains the door 3244 against the side 3282 in the swung-back orientation. The posts 3272 can now be retracted (arrow 3299) into the floor base 3210 (sufficiently to allow clearance with respect to the doors and other trailer components), as the doors are now secured by the clamps 3280. Thus, as shown in FIG. 32G, the linear slide 3226 moves rearwardly (arrow 3298) to provide clearance with respect to the trailer 3240 and prepare for the next trailer to enter the station 3200. At this time, the clamp grippers 3294 are empty, and can be reloaded with new clamps (3280) from a magazine or other source (not shown).

Note that the geometry and material of the depicted clamp 3280 is highly variable in alternate embodiments—e.g. it can have a more C-clamp-like appearance with contact pads that are limited in surface area. It can also be constructed from two separate clamp members that are hingedly joined and include (e.g. a separate mechanical (e.g. wrapped) spring. Likewise, the gripper assembly can operate in a variety of ways and employ a variety of mechanical principles to deliver and releasably attach the clamp to the swung-back door. The system (using the depicted clamp 3280 or another type of clamp) can include powered and/or non-powered release mechanisms—for example a mechanism that releases the clamp when the slide 3226 is driven sufficiently onto the door edge 3248. It is desirable generally that the station swing the doors back and then apply a holding device that can be later removed by a robot or manual operator when no longer desired—for example, after loading is completed.

In an alternate embodiment, the functions and/or operation of the door station can be implemented using a mobile door-opening mechanism. The mechanism can be mounted on the trailer at the (e.g.) guard shack or integrated into the trailer.

Another form of mechanism can be provided on a moving base (e.g. a commercially available or custom mobile robot) deployed to the trailer and perform the same functions as the station at (e.g.) the time of hitching or unhitching to and from the AV yard truck. The robot can be autonomous, using on-board sensors, and/or guided by an operator. Such robots are currently employed in military, law enforcement and other tasks in which remote manipulation is desired tasks and can be adapted to the present embodiment.

V. Locking Trailer to Dock

In operation, using sensors such as visual cameras, LiDAR, radar, and/or other on-board sensing devices, the AV yard truck reverses, and aligning the trailer with a pre-designated (un)loading dock. The sensors on the AV yard truck safely guide the truck and trailer down the loading bay ramp and securely place the trailer against the bay door. Once secured, if outfitted, a dock-lock can be activated at the loading dock, and loading/unloading can thereafter be initiated.

In various embodiments, a so-called dock-lock can be a commercially available system that is located beneath the loading dock surface and deploys clamps when the trailer is to be secured for loading/unloading. The system can be initiated automatically or by a loading dock operator. In general, the dock-lock clamps engage a suitably sturdy structure on the rear of the trailer—for example the under-ride-prevention frame/bar assembly (see structure 2160 in FIG. 21). When deployed, certain commercially available systems operate a visible indicator light system. A green light is illuminated inside the loading area when locked and a red light is illuminated outside when locked. Conversely, when unlocked, a red light is provided inside and a green light is provided outside. The AV yard truck camera(s) and/or facility cameras that are integrated with the system server (120 in FIG. 1) can be adapted to identify the type and color of the light and use this to guide movements of the AV Yard truck—for example, it refrains from hauling the trailer until it reads an exterior green light. Alternatively, or additionally, sensors can be provided directly on or to the locking mechanism and provide status information directly to RF, or other types of, receivers, interconnected with the AV yard truck and/or facility server.

In general, once a trailer is docked and locked, depending upon the current demand for the services AV yard truck, it can be programmed to stay in position or to disconnect and perform its next task, returning later to reconnect. Also, when members of the (un)loading crew have completed the task, an individual of this crew can designate the trailer as ready to be moved. The AV yard truck sensors will read the signal of the dock-lock mechanism, for when it is safe to depart. Once away from the dock, if required, the trailer doors can then be shut by any of the previously described options. Depending upon yard protocols, the AV yard truck would then bring the trailer back to the staging area or to another pre-designated location, disconnect, whereupon another visual inspection could be performed, and updating of the YMS can be completed.

VI. Additional AV Yard Truck Devices and Operations

A. Secondary Pressure Source

In order to simplify yard truck to trailer connection for the large variations in service connection locations that exist, one option is to produce adapter connectors that could be applied to any configuration, producing a universal connection location on any trailer. This connector can be provided and/or connected at the guardhouse, or by the driver during OTR disconnection. In addition, a provided glad-hand to universal connection air-line adapter' could be connected to the trailer's existing glad-hand system by the OTR driver, during disconnection. This can allow for a variety of options, more suitable for AV truck connection, to be accomplished. Also, in addition to the universal adapter, the system can include a cone that shrouds the universal connector and allows for a reduction in the need for accuracy of alignment. The cone can physically assist in the guiding and alignment of the service line connection.

To avoid the need for any service (pneumatic, etc.) connection from AV yard truck to trailer, in an alternate arrangement, a compressor or pre-compressed air tank can be secured to the trailer (e.g. at the guardhouse, or by the driver, during OTR disconnection). The pressurized air can be capable of releasing the emergency brakes of the trailer via a (e.g. RF) signal (from the AV yard truck), or a physically closed contact occurring during the kingpin hookup of the AV yard truck that senses that the trailer is now hitched to the truck. This system can then be removed when the trailer exits the yard via the guard shack. As needed, the tank can be recharged for future reuse by a compressor system within the yard.

B. Wheel Dolly

Another option that would preclude the necessity of an AV yard truck to connect to service connections employs a trailer wheel dolly. The OTR driver backs its trailer into a designated spot with two stand-alone wheel dollies in position. The driver then drives the trailer wheels up a small ramp and into a cradle of each respective dolly. The trailer wheels are then secured to the respective cradles. For the duration of the trailer's time onsite at the yard, the dolly remains attached, and can be remotely controlled (e.g. using RF signals generated by the truck controller) by the AV yard truck to lock and unlock the localized emergency braking system on the dolly. In an embodiment, the brakes can be electromechanically controlled (in a custom manner, or a manner clear to those of skill) using an on-board battery, or the battery (which is rechargeable and can be serviced by an automated charging robot, or at a charging station) can power a compressor with a storage tank (accumulator) that provides air to the brakes based on an electrically actuated switch. The switch receives control signals from an on-board controller/processor on the dolly via the RF signals transmitted from the truck. The battery can also power switched tail/marker lights on the dolly that are operated via the controller/processor based on truck signals. That is, like other embodiments herein, when the truck operates some or all, marker, brake, reverse, or other safety lights, the lights on the dolly are similarly operated. In another embodiment, a compressor is omitted and a rechargeable tank or canister of compressed air is stored on the dolly, connected via the actuated switch to the dolly brakes. The tank, which can vary in size to accommodate the form factor of the dolly, can be recharged with compressed air—to its maximum pressure—by an appropriate manually operated or automated compressor station within the facility as required—a pressure transducer can transmit signals to the truck and/or server to monitor when recharge is needed. As described herein, such a pressurized tank/canister can be used directly in the trailer's brake circuit and the monitoring/recharge of such a unit can occur similarly to the above description.

C. Landing Gear Clearance

Figure 33:
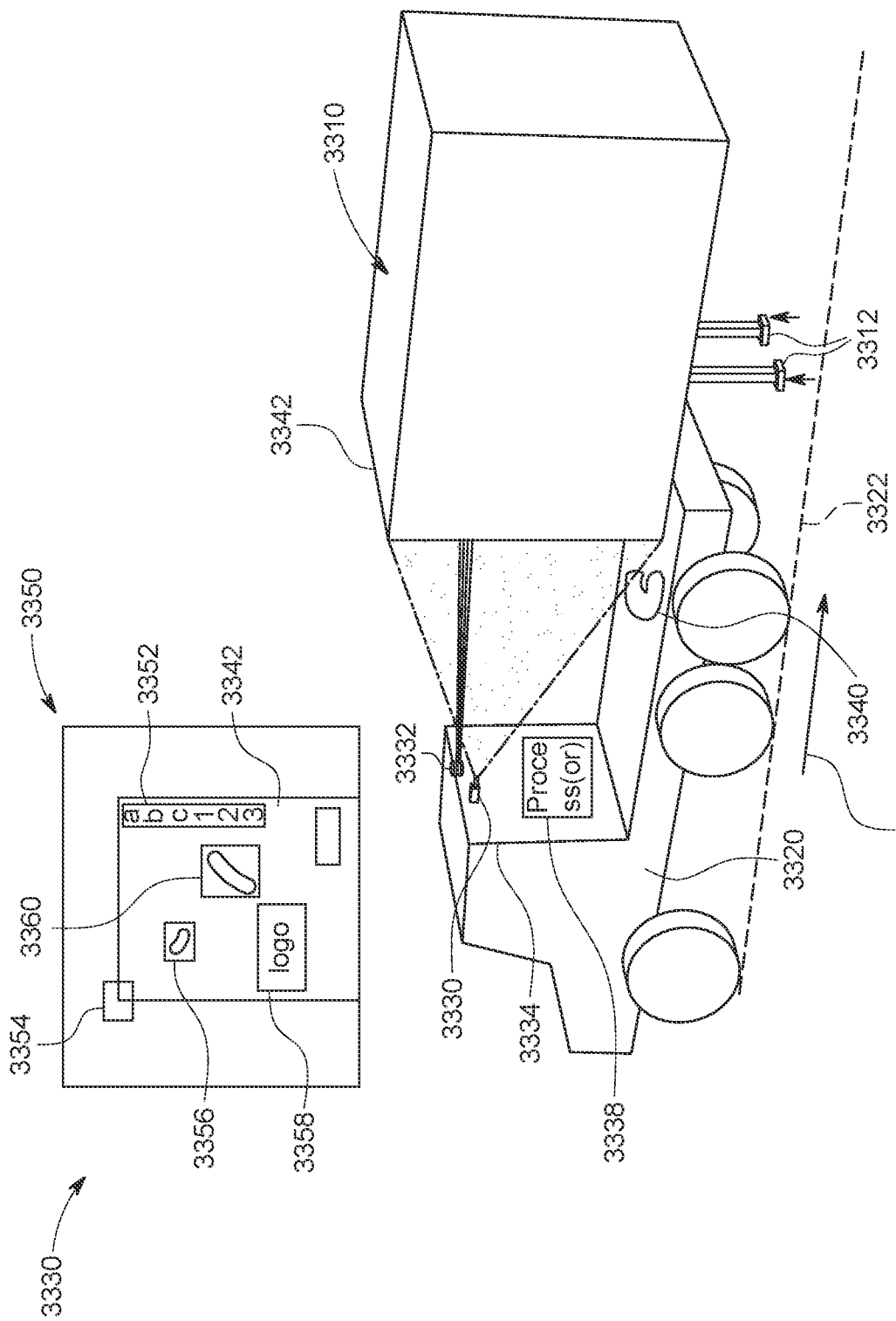
FIG. 33 is a rear-oriented perspective view of an exemplary AV yard truck and trailer hitched thereto, depicting a camera/ranging sensor combination mounted on the back of the yard truck and used to identify and track a unique feature on the front panel of the trailer.

With reference to the depicted scene 3300 in FIG. 33, it is highly desirable to avoid damage to the trailer and/or equipment associated with docking. It is typically required when a yard truck 3320 connects to a trailer 3310 that the landing gear 3312 of the trailer is off the ground (dashed line 3322) before movement of the yard truck can occur. A human yard truck operator will make a visual inspection of the landing gear and trailer before pulling forward. An AV yard truck can use the same approach to verifying that the trailer is properly raised off the ground (dashed line 3322). Illustratively, a camera 3330 and ranging sensor 3332 can be mounted on the upper rear face of the cab 3334, and can be coupled together in order to make this determination. The camera 3332 can be used to monitor a unique visual feature on the trailer, while the ranging sensor 3330 provides additional information allowing the onboard processor system 3338 to calculate that unique feature's position in space. The determination of the height of the fifth wheel 3340 (shown in phantom) is based on the difference in the vertical position of the identified unique feature on the front panel of the trailer between the beginning and end of the hookup maneuver. Note that the camera 3330 and ranging sensor 3332 can also be used for other AV yard truck functionality.

In operation, at the start of the yard truck/trailer hookup maneuver, before the yard truck 3320 backs up (arrow 3338) to the trailer 3310, a computer vision algorithm/process module, which can be instantiated in the processor 3338, processes data from the camera 3330 and selects a unique feature (or features) on the front face (also termed a "panel") 3342 of the trailer 3310. The feature(s) can be tracked throughout the hookup maneuver. As shown in the exemplary image 3350, the feature(s) can be lettering or other markings, a corner of the trailer, or an imperfection on the trailer of sufficient distinction to constitute a trackable feature. By way of example unique features can be identified by applying low-level corner detectors on the input image and identify a corner-rich sub-region of the image. Once corner detections have been produced, they are clustered into groups with each group having its own bounding box 3352, 3354, 3356, 3358, and 3360 containing a set of corresponding corner detections.

Figure 33A:
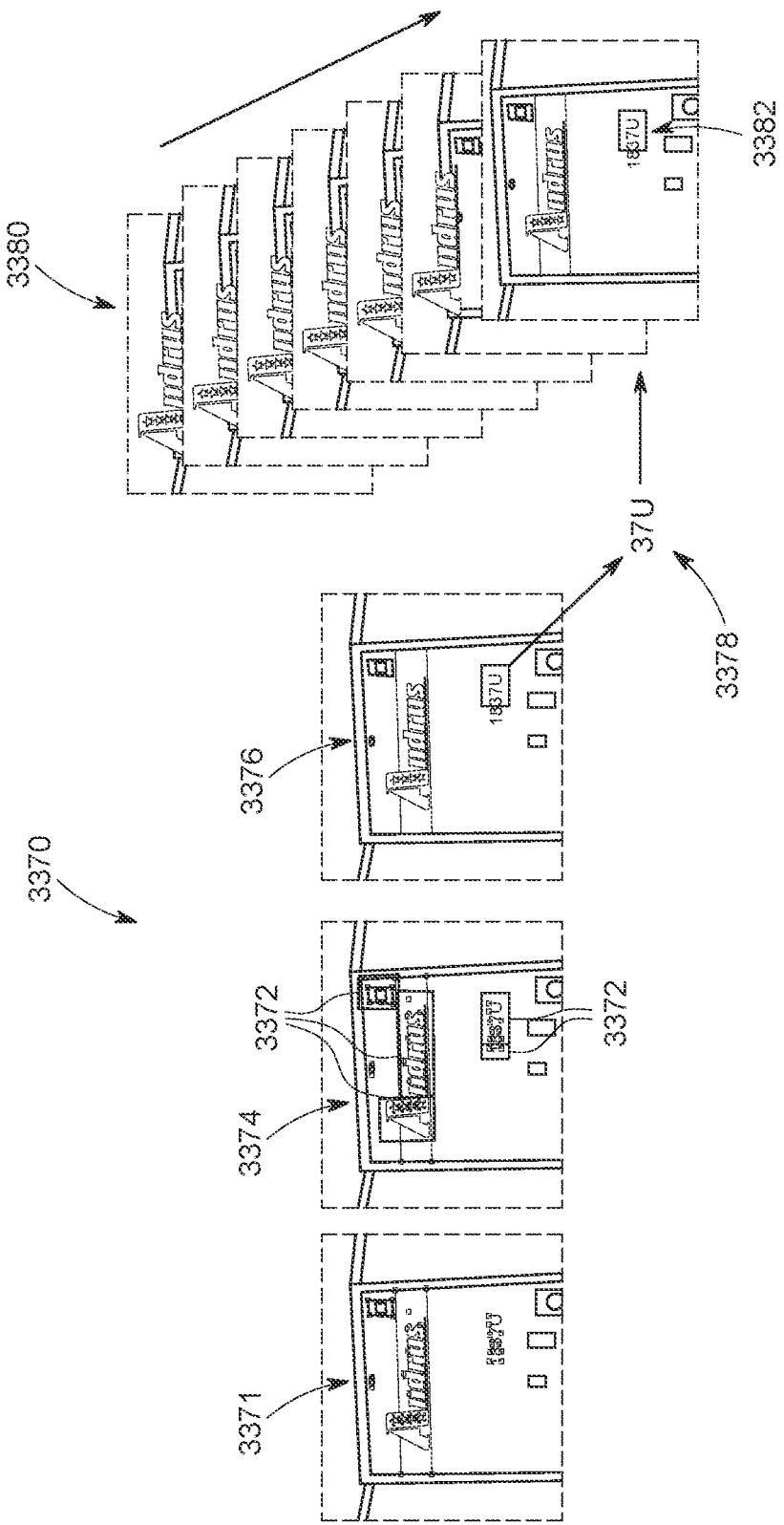
FIG. 33A is a diagram showing image processing stages used to extract tracking features in subsequent image frames during the backup maneuver of an exemplary yard truck.

More particularly, and with further reference to a procedure 3370 FIG. 33A, corner features are identified in acquired image frame 3371. They are grouped with appropriate bounding boxes 3372 in processed image frame 3374 (based on original acquired frame 3371). As shown in processed frame 3376, the bounding is then used to extract a reference feature template image 3378, which is then matched in subsequent acquired image frames 3380 to find the selected feature 3382.

Figure 33B:
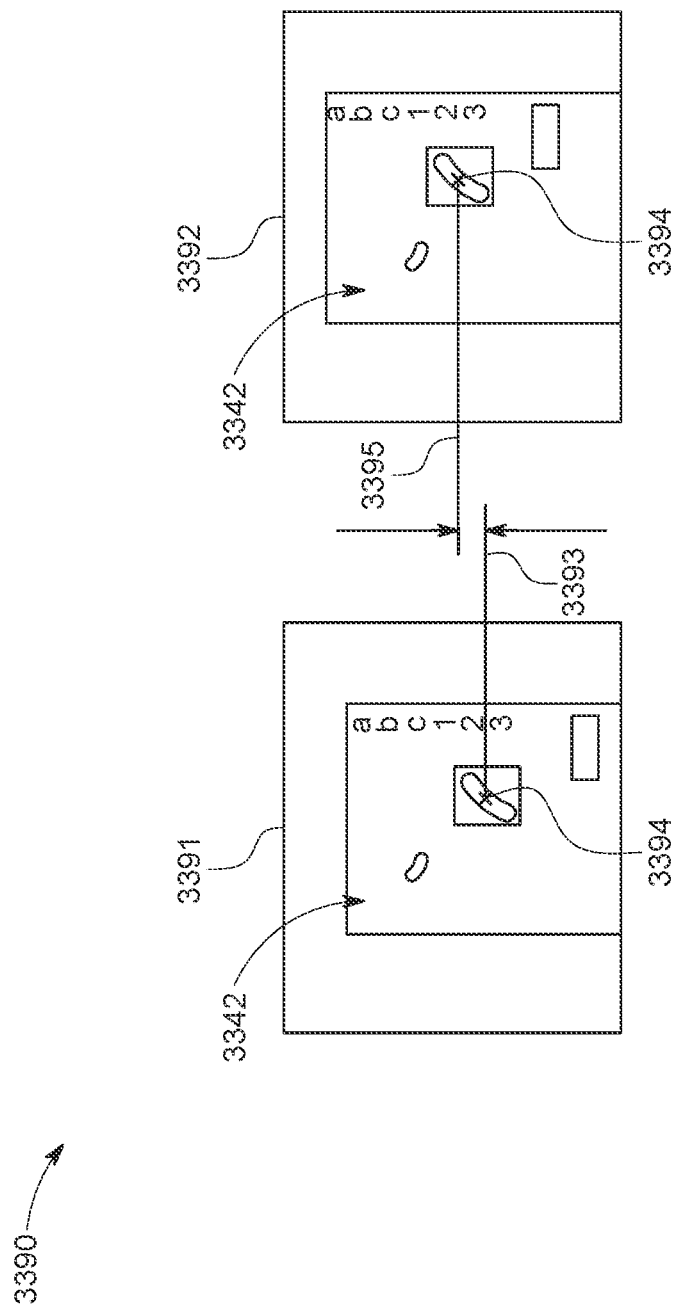
FIG. 33B is a diagram showing images of the back of a trailer indicating the vertical tracked feature shift in the imagery used to estimate a height differential of the trailer, and thus, the height of the fifth wheel landing gear off the ground.

At the time that the unique feature is identified, the ranging sensor 3332 then calculates the distance to the trailer front panel 3342. With this combination of sensor data, the position of the feature can be estimated relative to the yard truck 3320. As the yard truck 3320 backs up to the trailer 3310, the unique feature will be tracked, and the trailer distance will be measured, providing a continuous position measurement of the unique feature relative to the yard truck. When the yard truck 3320 completes the backup to the trailer 3310, the fifth wheel 3340 is raised. If the fifth wheel 3340 is properly engaged with the trailer 3310, then the front end 3342 of the trailer will raise off the ground and the position of the tracked feature will reflect this elevation change. This is represented by the two, side-by-side image frames 3391 and 3392 in the representation 3390 of FIG. 33B. Left frame 3391 represents the image of the trailer front end 3342 before it is engaged by the fifth wheel, and thus, rests on the landing gear at a first level. This level is revealed by the corresponding level (line 3393 of the tracked feature 3394). The vision system identifies a height change (line 3395) in the tracked feature 3394 in the right frame 3392, after the fifth wheel has engaged and raised the level of the trailer front 3342. It is this height change, in which the vertical component of the position of the tracked feature 3394 allows for the computation of the elevation that the fifth wheel raises the landing gear off the ground. In addition, the tracking of the level of the feature also allows for the yard truck system to incrementally lower the trailer closer to the ground when backing down to (or raise when pulling away from) a loading dock, in order to avoid damaging sensitive equipment and skirting around the dock. More generally the controller and/or server can provide information on dock heights and the height control process can adapt the trailer height by raising and lowering the fifth wheel to ensure the top of the trailer is positioned low enough to clear the particular dock (or other overhanging obstruction).

D. Trailer Location

It is also highly desirable to determine the unknown location of trailers in logistical distribution center settings. In many instances, it is the responsibility of a human truck driver to drive by sets of parked trailers in order to find the specific one that has been designated to be hauled. The truck driver makes this determination by looking for the unique trailer identification number on each trailer (e.g. along the front face), and then comparing it to the assigned trailer number on his/her manifest. Autonomous trucks operating in a logistical yard setting can be adapted to perform a similar task in accordance with an embodiment, and employ sensing equipment and software algorithms to extract trailer identification numbers (or other identifying indicia), which can then be compared against the assigned trailer number provided by the system server, YMS, etc. In addition to determining trailer locations and subsequently yard inventory and mapping, there are other discrete tasks that could be employed by this mobile computing and sensing platform. These tasks include, (a) detecting anomalies in the yard, (b) detecting traffic that is not obeying traffic rules (such as exceeding speed limits, not stopping at stop signs, driving on the wrong side of the road/route, etc.), and (c) detecting crashes/collisions (minor or major) in the yard.

Figure 34:
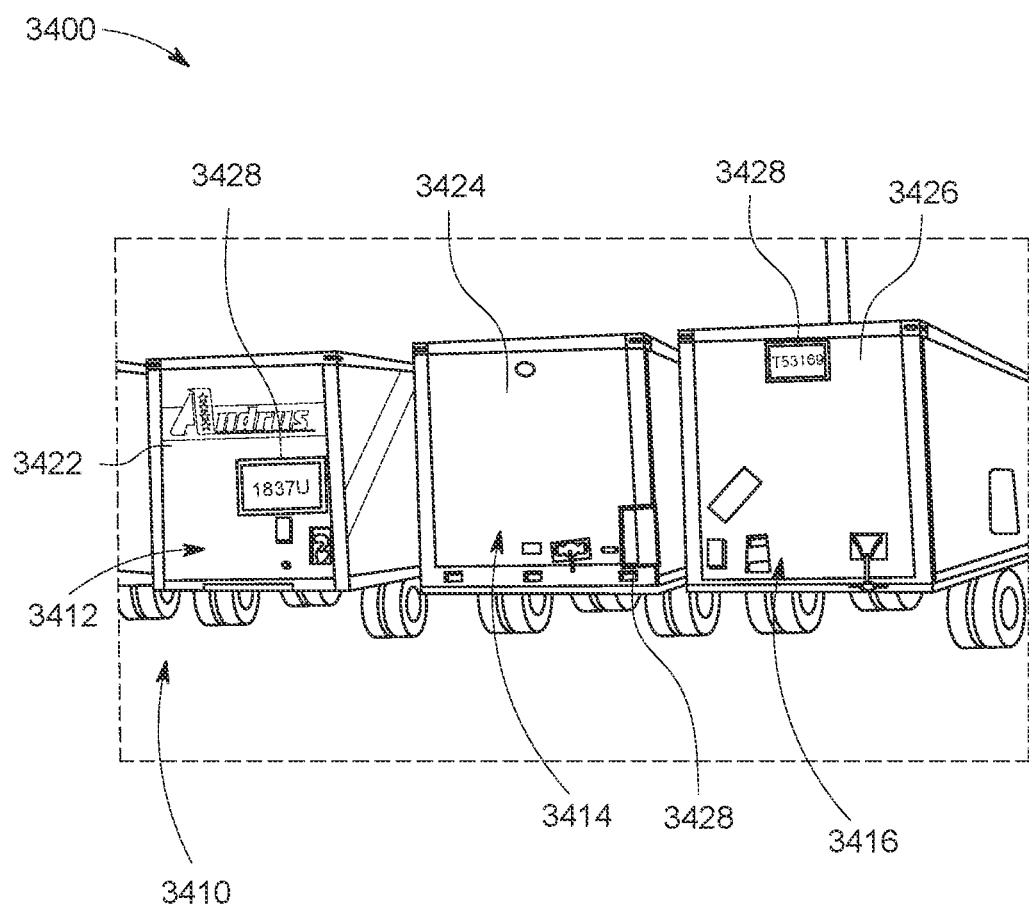
FIG. 34 is a diagram showing a plurality of side-by-side OTR trailer fronts, and an associated plurality of respective locations for application of trailer identification numbers thereon.
Figure 34A:
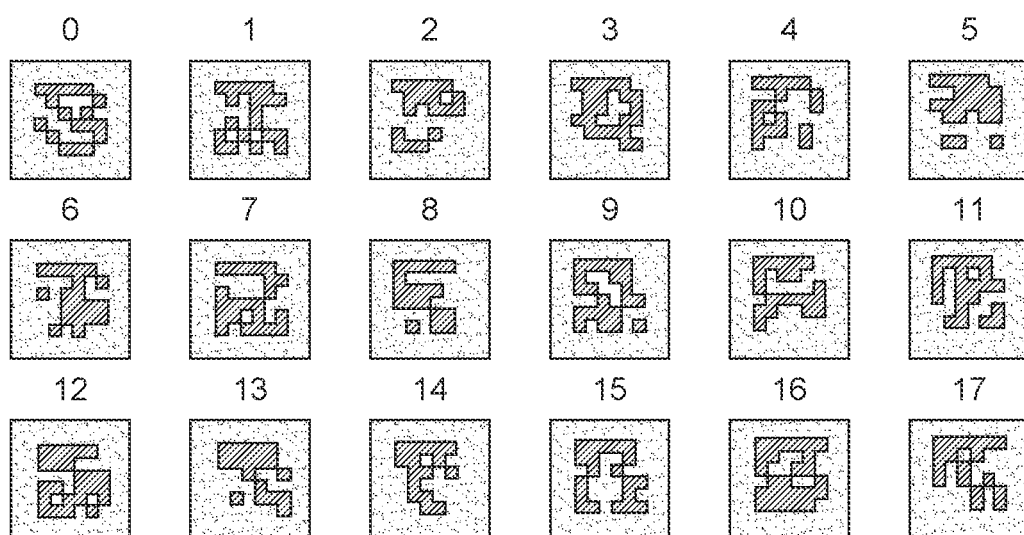
FIG. 34A is a diagram showing a plurality of discrete, exemplary ARTags that can be placed on the front panel of a trailer to simplify the task of visually recognizing the specific trailer using an automated computer vision system.

Illustratively, and with reference to the scene 3400 of FIG. 34, as the AV yard truck is traversing the depicted parking area 3410 for trailers 3412, 3414 and 3416, LiDAR (Light Detection and Ranging) is used to localize (position relative to the AV yard truck) each trailer that is being passed. Once the localization of a trailer has occurred, a computer vision system within the trucks on-board processor or on a remote, interconnected computer/server can process the camera imagery of the trailer's front panel 3422, 3424, 3426, respectively, looking for potential regions that contain unique trailer identification markings. By way of example, markings 3428 are identified on each trailer front face (3422, 2424, 3426), in different locations thereon. These markings can consist of a string of alphanumeric characters or a unique visually encoded fiducial (a unique marker, e.g. a QR code, other ID code, and/or ARTag. By way of background, an AR (Augmented Reality) Tag (also generally termed "ARTag") is a fiduciary marker system to support augmented reality, among other uses. Such tags enable the appearance of virtual objects, games, and animations within the real world. ARTags generally provide for video tracking capabilities that calculate a camera's position and orientation relative to physical markers in real time. Once the camera's position is known, a virtual camera can be positioned at the same point, revealing the virtual object at the location of the ARTag. It can, thus, provide a vision system in an AV yard truck/autonomous vehicle with viewpoint tracking and virtual object interaction. An ARTag is typically a square pattern printed on a surface the corners of these tags are easy to identify from a single camera perspective, so that the homography to the tag surface can be computed automatically. The center of the tag also contains a unique pattern to identify multiple tags in an image. When the camera is calibrated and the size of the markers is known, the pose of the tag can be computed in real world distance units. A plurality of such ARTags 3430 are shown by non-limiting example in FIG. 34A. After using (e.g.) conventional vision system processes to identify these unique ID codes, an appropriate ID-decoding process can be used to determine any underlying alphanumeric (or other symbolic) data contained in the Tag/code. Appropriate ID finding and decoding processes/software are commercially available through vendors, such as Cognex Corporation of Natick, MA.

Figure 34B:
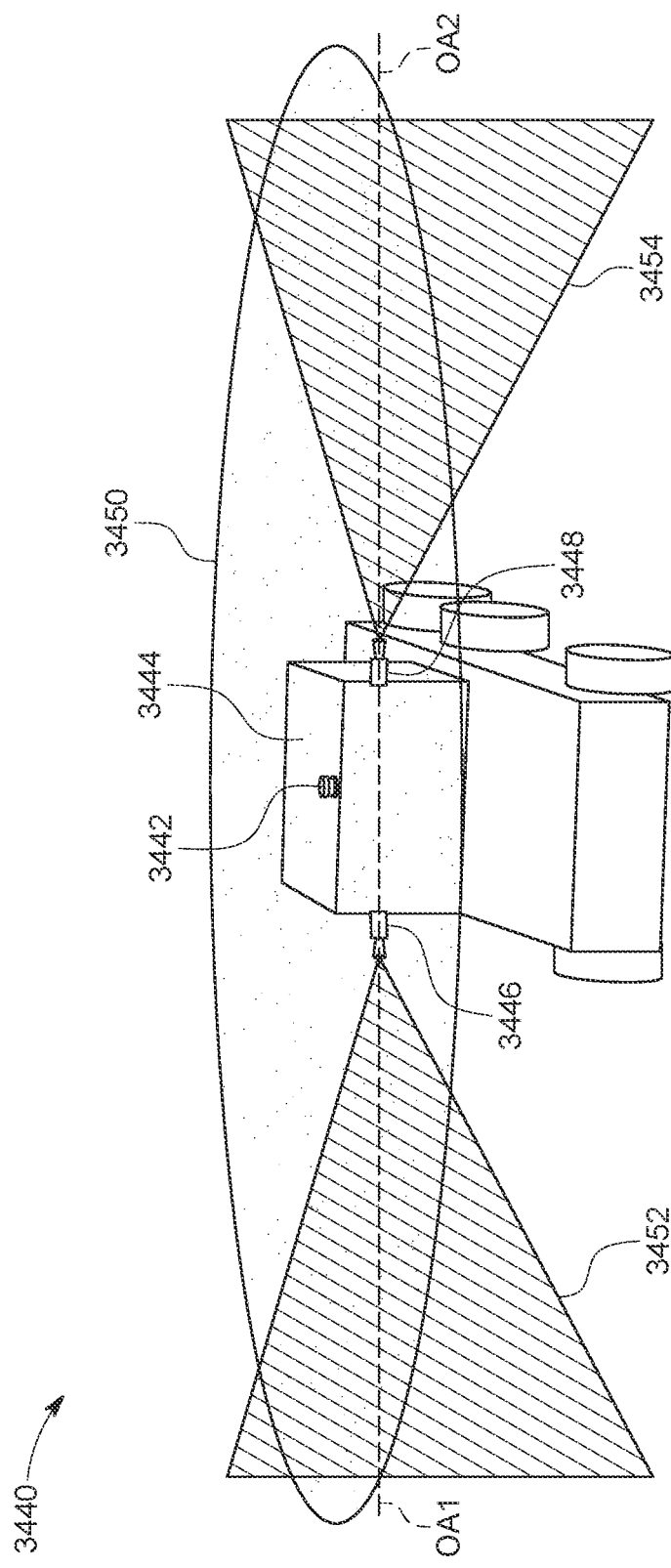
FIG. 34B is a rear-oriented perspective view of an AV yard truck showing mounted sensor coverage to assist in identifying trailers to the left and right of the yard truck.

With reference to FIG. 34B, an exemplary AV yard truck 3440 is depicted, having a sensor system to perform the automated extraction of trailer identification information. The system can include a multi-scan LiDAR 3442, mounted (e.g.) on the cab roof 3444, and one or more camera(s) 3446 and 3448, mounted on an appropriate location on the AV yard truck cab (e.g. opposing left and right sides) to appropriately image such trailers during motion around the yard. As shown, the LiDAR 3442 can scan an approximately 360-degree field 3450, while each camera 3446 and 3448 can image an outwardly diverging (e.g. expanding cone) field of view 3452 and 3454, respectively. The resulting field of view can capture trailers passed on either side of the AV yard truck 3440, and slightly ahead of and behind the truck (as well as those trailer front faces disposed at various non-perpendicular angles to each camera's optical axis OA1 and OA2. Front and/or rear cameras (not shown) can also be provided to the truck 3440 as desired to ensure approximately 360-degree visual coverage as appropriate. Alternatively, one or more cameras can be mounted on moving mounts that change position on a periodic basis, acquiring images from a plurality of perspectives over time, at a sufficient rate to ensure that objects are identified at the prevailing travelling/passing speed of the truck.

Figure 34C:
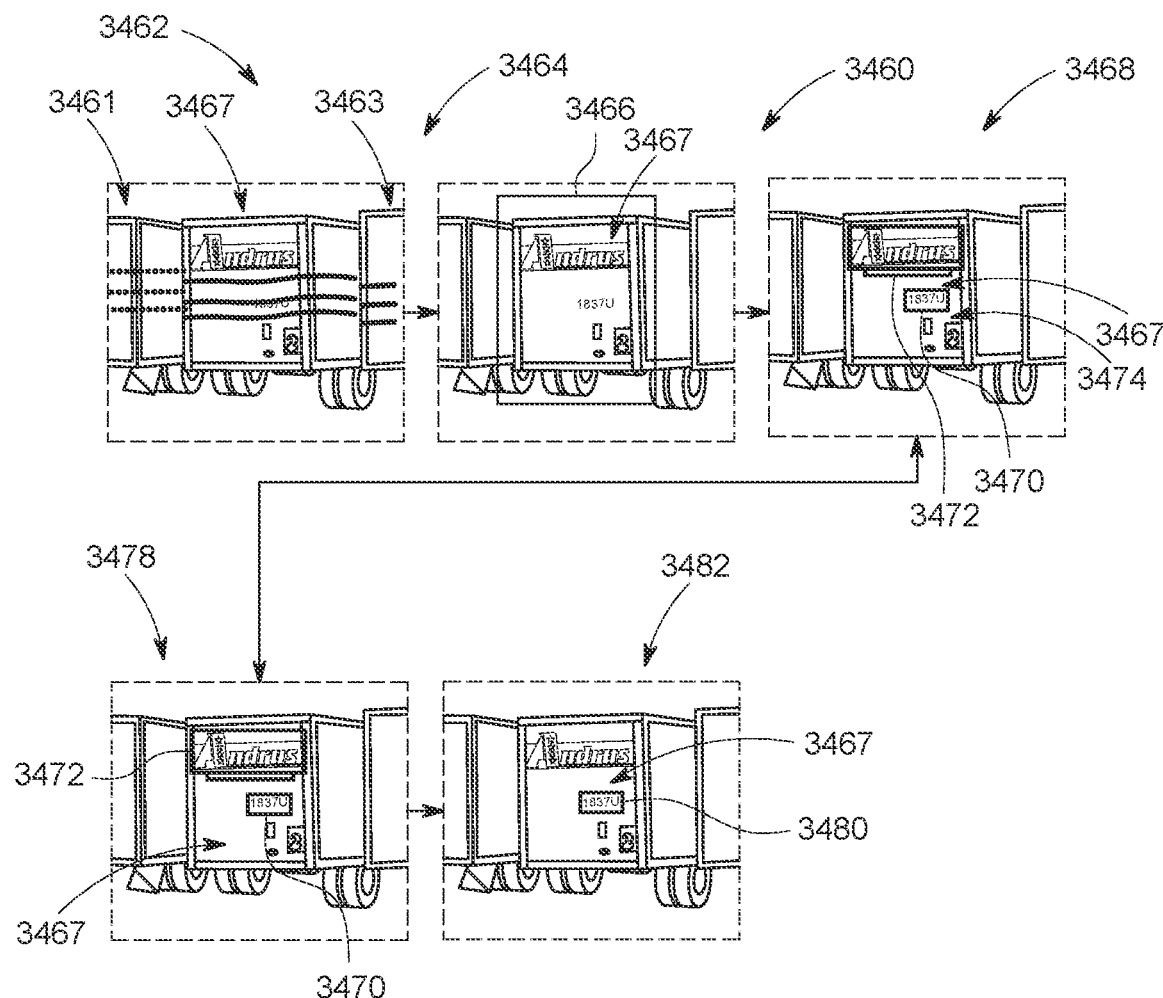
FIG. 34C a flow diagram represented by a sequence of image frames that represent a procedure for sensor processing so as to extract a trailer identification number from the front of a trailer.

In operation, as shown in the image-based flow diagram 3460 of FIG. 34C, the LiDAR 3442 is used to sense the individual trailers 3461, 3463 and 3467 on each side of the AV yard truck 3440 (frame 3462). The LiDAR scan(s) is/are analyzed to localize a candidate trailer feature set in frame 3464. This localization (represented by bounding box 3466 around a particular trailer 3467) can entail comparing the signal received from the LiDAR to known signatures trained in the processing system. Once the location of a trailer is determined relative to the yard truck, visual processing of images acquired by the camera(s) 3446, 3448 can occur. If the analysis involves extracting the existing trailer identification number, then the potential locations of candidate text 3470, 3472 on the front panel 3474 of the acquired image of the trailer are identified (Frame 3468). Once these candidate text regions have been identified, the corresponding sub-windows (e.g. bounding boxes) that contain the candidate regions are analyzed using (e.g.) optical character recognition OCR (which can be part of a vision system process/software package) to extract the actual text in these regions (frame 3478). Text is compared to known types, and any identified/decoded text that does not meet the characteristics of a trailer identification number is discarded leaving the most probable option 3480 (Frame 3482). If ARTags are used on the trailer and in the process, instead of relying on extracting the trailer identification number, a similar set of processing stages/frames are to identify the trailer location, but the computer vision algorithm will look for ARTag candidates rather than text candidates. Note that ARTags have a very unique appearance, and thus, should possess very few ambiguous candidate image subregions. Once the subregion is identified, the ARTag can then be translated into its corresponding numerical identifier.

E. Loading Dock Communications

From a safety perspective, as with its human-driver counterpart, it is desirable to provide a coordinated handoff of approval between an AV yard truck system and associated loading dock personnel (herein defined to include controllers, robots and robotic systems-in an automated warehouse environment) in order to enable movement/hauling of a trailer. In an embodiment, a communications system coordinates a safe handoff between autonomous systems and dock personnel to ensure that an AV yard truck does not separate from the dock without (free of) explicit permission to do so by dock personnel. The system also interoperates with other systems (e.g. a dock-lock or an automated wheel chock system) to coordinate the physical securing of a trailer when initially parked at the dock, in order to prevent the inadvertent movement of a trailer during loading/unloading. In addition, the communications system also facilitates a notification to dock personnel of a trailer's arrival at the dock, thereby permitting an opportunity to gain efficiency in loading/unloading operations.

Manual loading dock operations according to a prior art implementation currently rely upon visual signals, which are transmitted to the yard truck operator. A diagrammatic representation of a basic implementation of such a signal system 3500, and associated light unit 3510, is shown below in FIG. 35. The exemplary signal unit 3510 consists of a red light 3520 and green light 3530, and manual inputs of locking state, shown here as (e.g.) three-position toggle switch that includes the selection between (a) a chocked trailer (green at the dock), (b) an unchocked trailer (red at the dock), and (c) the dock closed (red at the dock, and optionally, outside the dock). If the trailer is not presently undergoing a loading process, and can safely be hauled away, then the green signal light 3530 is illuminated. If the trailer is not being hauled away, then the red signal light 3520 is illuminated. Note that the driver of the yard truck (in this non-automated example) can also provide input to the wheel chock state by moving the three-position toggle switch 3540, thereby indicating that the trailer wheels are chocked, not chocked, or if the dock is not operational for maintenance. The signal unit 3510 connects to the building/yard infrastructure 3560 via a wiring harness or other power/data link 3550, to interoperate with dock door position signals, and internal controls and status lights interior to the dock facility.

Figure 35:
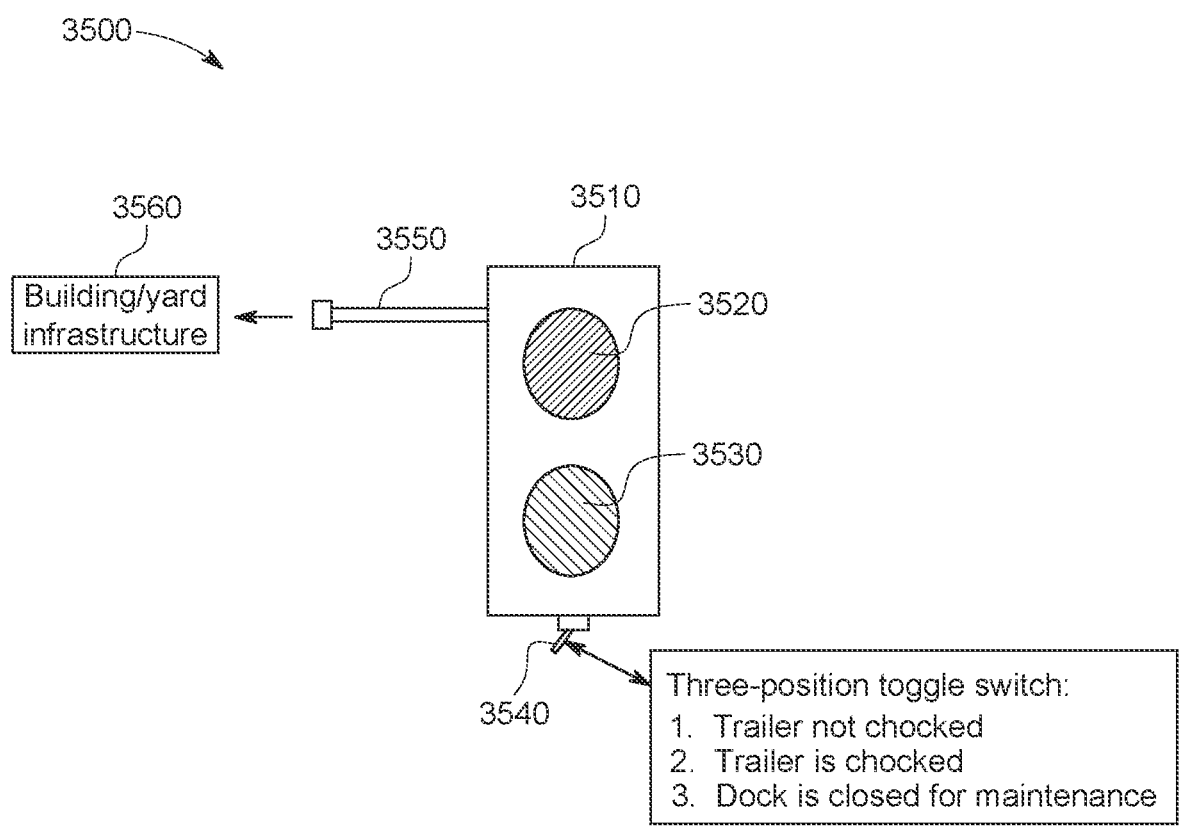
FIG. 35 is a schematic representation of a loading dock signal system and corresponding signal unit according to a prior art implementation, featuring a red light and a green light to indicate whether a trailer is safe to unload and/or haul away, or if the dock is open or closed.
Figure 36:
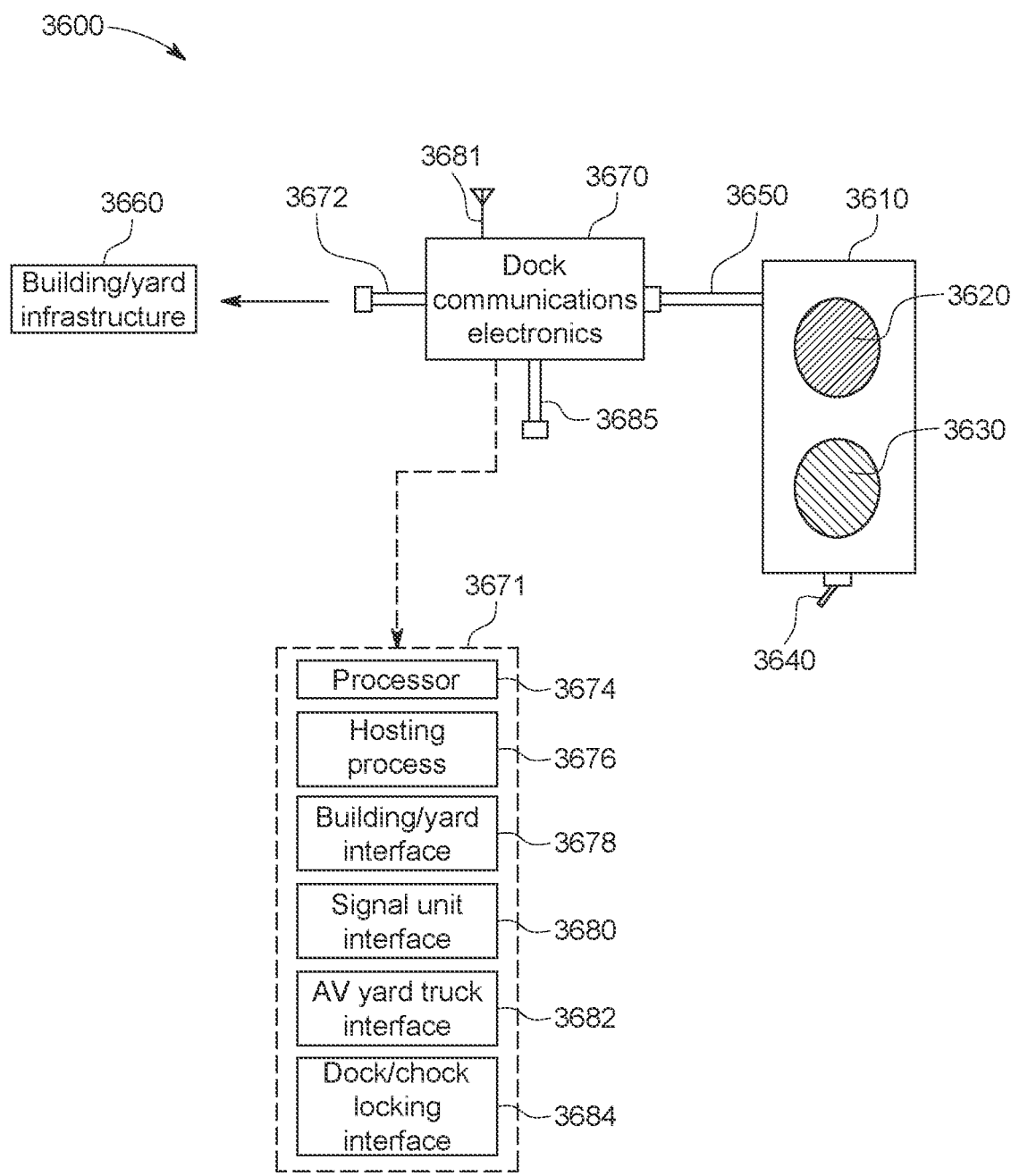
FIG. 36 is a schematic representation of a loading dock signal system with dock communications electronics added via wiring harnesses to allow for use in an autonomous truck environment, according to an embodiment.

In an embodiment, shown in FIG. 36, a signal arrangement 3600, similar to the manually operated arrangement 3500 of FIG. 35 is shown. The signal unit 3610 can be constructed similarly or identically, and include a red light 3620, green light 3630, three-position switch 3640 and wiring harness/link 3650. Illustratively, an electronic communications device (interface) 3670 between the (e.g.) conventional signal unit 3610, which can be a pre-existing element in retrofit implementation, and the building/yard infrastructure (3660) connection via a wiring harness/link 3672. As shown further within the dashed box 3671, the communications device 3670 contains a processor 3674, a hosting process/software application 3676, interface(s) 3678 to the building/yard infrastructure 3660, interface(s) 3680 to the (e.g.) conventional signal unit 3610, interface(s) 3682 to the AV yard truck (described variously above) via a wireless data radio/link 3681, and optionally, interface(s) 3684 to any dock/chock locking system (as described herein), if so equipped, via a wiring harness/link 3685. It should be clear that the use of a communication device/interface 3670 allows for the use of an existing (e.g. installed or off-the-shelf) signal unit. The dock communications electronics is responsible for providing readout of safe movement signals from the building/yard and providing those via a software interface to the autonomous system over the wireless data link. Additionally, with feedback from the autonomous system (e.g. on the Server), and optional dock/chock locking system, the dock communications electronics can provide status of locked/chocked or not locked/chocked to the building/yard infrastructure. However, this arrangement (3600) cannot generally change a physical switch state on the existing signal unit. This embodiment provides for electronic readout of safe state and provides this readout to the autonomous system without the need for measuring light state via a sensor, such as an external camera that senses the current light color or the location in the imaged unit of the illuminated signal (i.e. top for red, bottom for green, etc.).

Figure 37:
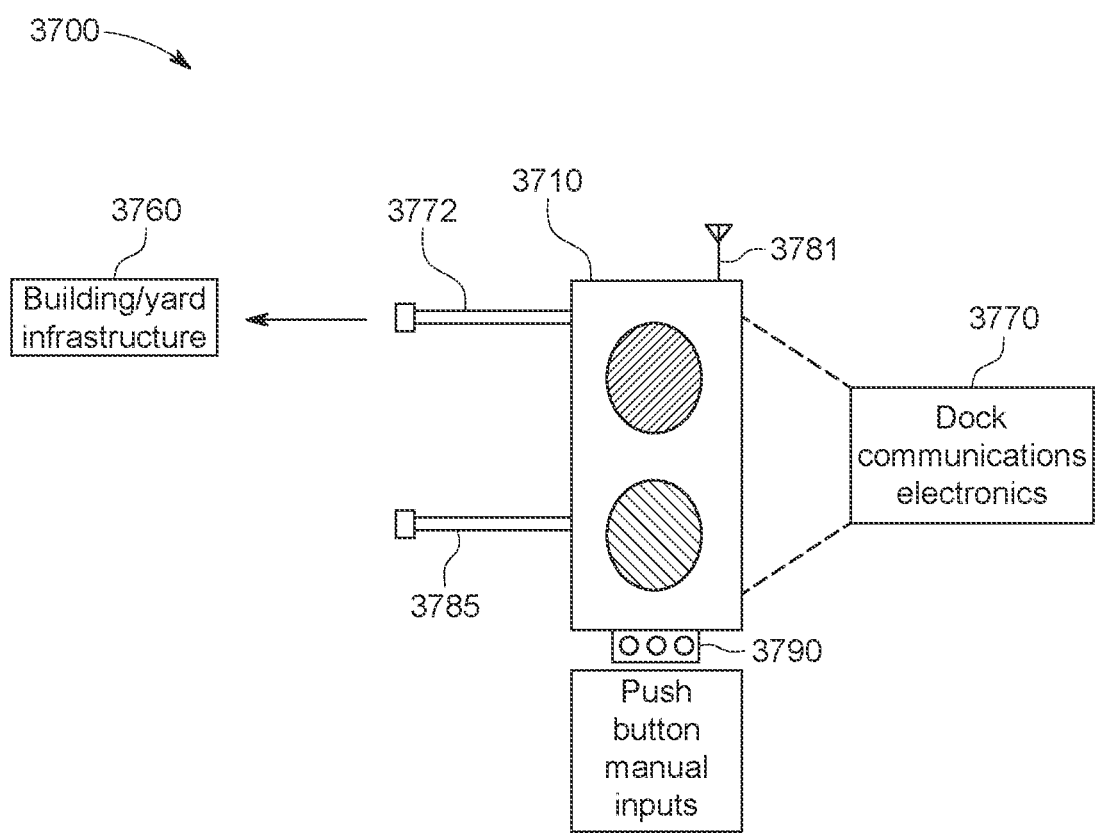
FIG. 37 is a schematic representation of a dock signal system with a custom/purpose-built dock signal units having additional capabilities to interoperate with autonomy systems of an autonomous truck environment, according to an embodiment.

FIG. 37 depicts another arrangement 3700 in which the signal unit 3710 is purpose-built (custom-built) with integrated interface components as described herein, or is retrofit with such integrated components, using a conventional signal unit as a basis for the retrofit. In this embodiment, shown in FIG. 37, the signal unit 3710 includes the dock communications electronics 3770 internal to (integrated with) the signal unit 3710. Similar or identical in function to the components of block 3671 (FIG. 36), the integrated electronics 3770 can include a processor, hosting process, interface to building/yard infrastructure 3760 (with associated wiring harness/link 3772), signal unit circuit (internal) interface, AV yard truck interface, with wireless radio link 3781 built onto the housing of the signal unit 3710, and optional dock/chock locking interface (with associated wiring harness/link 3785). As shown, the overall arrangement of wiring harnesses is simplified/reduced, and there is (typically) one physical unit to integrate at the dock (i.e. the integrated signal unit 3710). User inputs with respect to locked/chocked or not locked/chocked are integrated into the unit 3710 via pushbuttons 3790, so that manual inputs versus autonomous inputs of states (e.g. (a) a chocked trailer (green at the dock), (b) an unchocked trailer (red at the dock), and (c) the dock closed (red at the dock, and optionally, outside the dock) are consistent.

Figure 38:
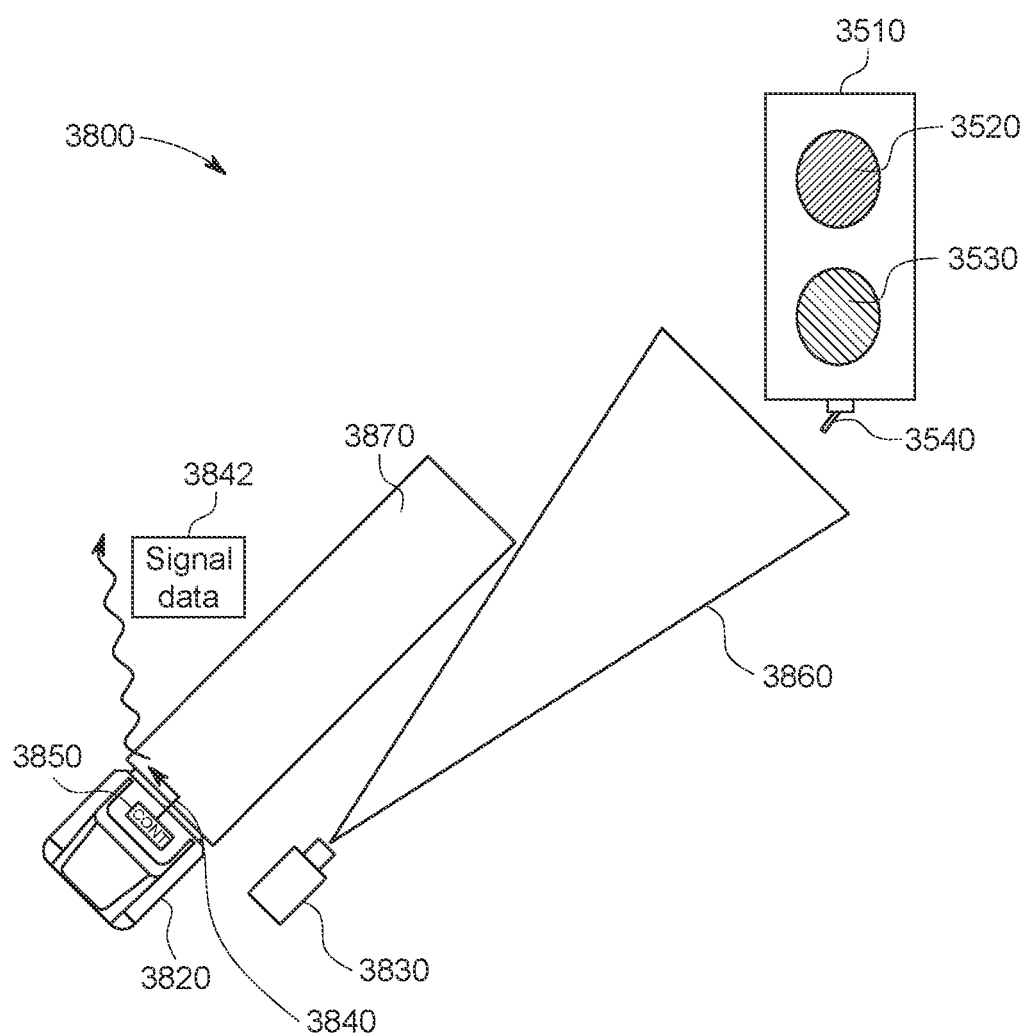
FIG. 38 is a diagram showing a system and method using an AV yard-truck-mounted camera or equivalent sensor to detect and report the status of a signal unit as described in (e.g.) FIG. 35, according to an embodiment.

FIG. 38 shows another illustrative arrangement 3800 for utilizing a conventional-style signal unit (e.g. the above-described signal unit 3510 in FIG. 35). In this embodiment, the system observes the state of illumination (red 3520 or green 3530) of this conventional signal using one or more sensors 3830 mounted onboard (or associated with) the AV yard truck 3820 according to an embodiment herein. An example of one type of sensor is a color or grayscale electro-optical camera of appropriate design. However, other types of sensor/sensors are contemplated for use with this arrangement, such as a photodetector with a filter that only allows one form of light (red or green to pass). Data 3842 from the sensor(s) 3830 is analyzed and interpreted by a process(or) and/or software application within the AV yard truck controller 3850 or remote processor (e.g. the server), via the truck's wireless data link 3840, to determine if the red and/or green signal lights are illuminated—in much the same manner as a human operator of the yard truck would determine the system state. The results of this analysis and interpretation is provided to the AV yard truck system. It is contemplated that the sensor (camera 3830) is mounted so that the signal light(s) 3520, 3530 reside within its working range and field of sensing/view 3860 when the truck is located at an appropriate position in which receipt of such information is timely and convenient—for example when the truck is aligned with the dock for hauling, hitching and/or unhitching of the trailer 3870.

A generalization of the dock signal system is conceived, in which the actions of a robotic system operating in a yard or shuttle drive can be inhibited until proper authorization is provided. These generalized authorization concepts permit greater integration into yard and shuttle operations and provide for flexibility with respect to the robot operating in coordination with people, vehicles, and other material handling equipment.

Actions which may be inhibited may be thought of broadly and include both physical movements and virtual interactions with other components, vehicles, workers, robots, equipment, infrastructure components, dispatch (command and control), and so forth. These actions include all physical or virtual interactions a robotic system operating in a yard and shuttle run environments may make. Examples include, but are not limited to, a) Authority to enter and move through an intersection, b) Authority to enter and move through a pedestrian crosswalk, c) Authority to move around or under a crane, side loader, or other material handling equipment, d) Authority to enter or exit specific regions (e.g. charging stations, maintenance bays, etc.), e) Authority to maneuver around areas where maintenance, construction, or repairs work is taking place, f) Authority to approach or move away from swing door opening/closing stations, g) Authority to approach or move away from other robotic systems, such as automated swing door opening/closing stations, h) Authority to connect to site infrastructure data networks.

Several mechanisms are conceived to provide authorization, including physical, virtual, and sensed. Physical mechanisms are inputs that a person engages with in order to provide or remove authorization. These mechanisms include, but are not limited to, switches such as momentary or toggle switches. The state of these inputs is read electronically and are provided to the robot via wireless data communication. Virtual mechanisms are inputs that are engaged with via software interfaces, both to the robot and via software user interface applications. Sensed mechanisms refer to means by which the robot may obtain authorization (or not) via its onboard sensor suite, instead of being provided state data over wireless data transmitted to the robot. Various mechanisms are possible including sensor measurement of the state of signal lights, sensing and recognition of gestures made by personnel, and so forth.

Input to authorization mechanisms may be provided by people directly, or via other equipment (robotic or not) in the yard and shuttle environments. People include both other workers in the operational environment, as well as safety operators or observers, which may be stationed onboard the robot, in a chase vehicle, or a dismount location on the ground.

Onboard the robot, state of authorization mechanisms is read or sensed, and then used by the robot to determine of certain actions can be initiated or inhibited. These behaviors may be intimately intertwined with the primary objectives the robot has been tasked to fulfill, or peripheral interactions and behaviors. Without authorization, the robot does not proceed with actions upon which authorization is required. Upon reception of authorization, the robot can proceed with actions upon which it has been authorized to perform.

F. Charging User Interface

An electric vehicle demands regular recharging to replenish battery power for vehicle movement and powering of auxiliary equipment. For an autonomous system, consisting of one or more autonomous electric vehicles under control of a management system, it is desirable to incorporate knowledge of charge state/status into the system's operation for proper utilization of the vehicle (e.g. efficient allocation of its current battery resource to tasks), and to operationally coordinate opportunistic times when each asset is to be recharged to maximize operational utility.

Figure 39:
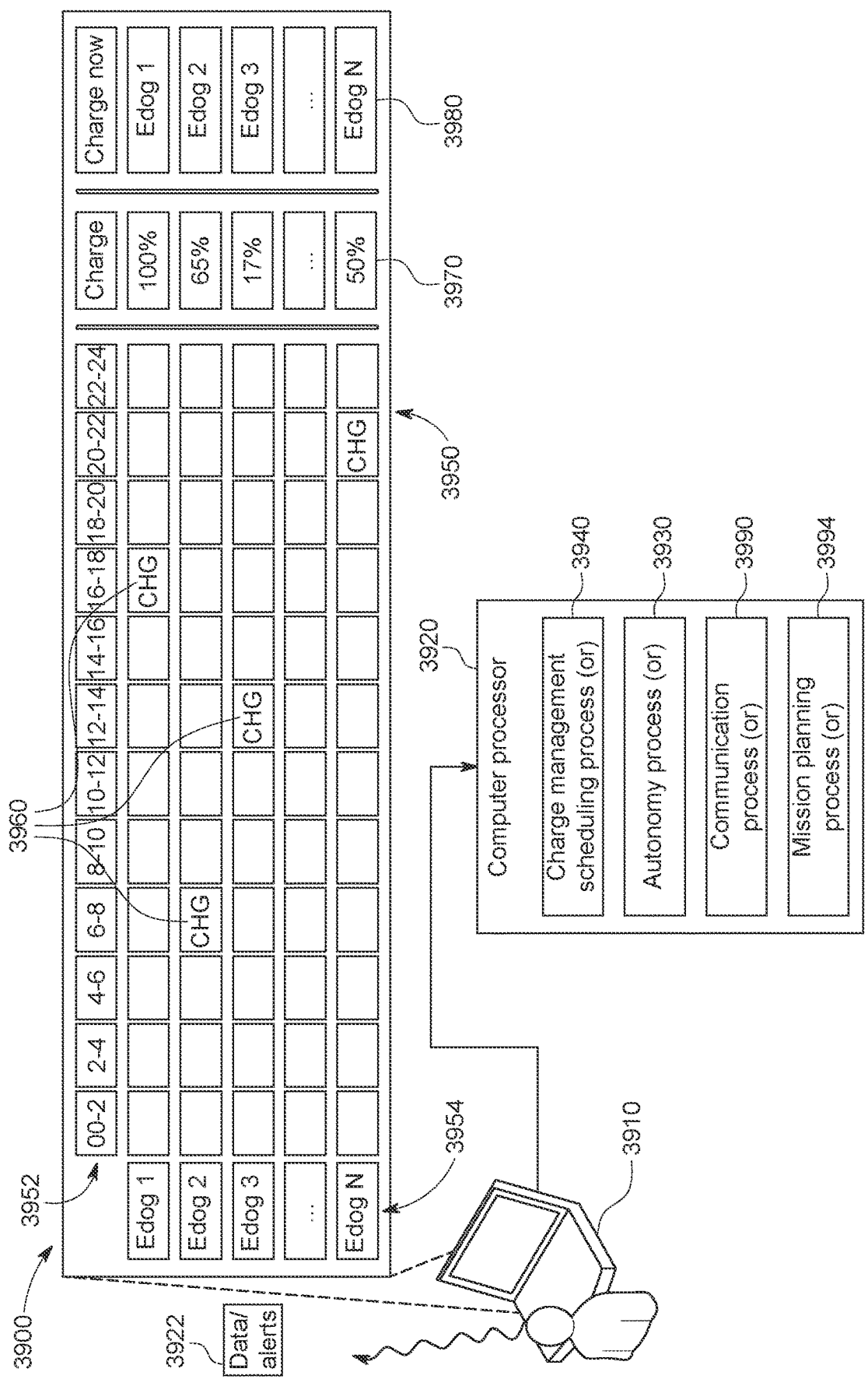
FIG. 39 is a block diagram showing an exemplary computer system for use in an electric AV yard truck environment having a charging management and scheduling process (or) and an associated user interface for input of desired charging time slots.

FIG. 39 depicts an embodiment of a user interface (UI) arrangement 3900 for specifying ideal times for charging an autonomous electric vehicle, such as the illustrative AV yard truck according to the various embodiments herein. With the organization and designation by the system of ideal charging times, the autonomy system (having a generalized autonomy process(or) 3930 running on one or more computer systems 3910 (e.g. PC, laptop, server, tablet, and/or cloud-computing environment, etc.), and associated processors 3920) can consult with these times to determine when vehicle(s) should be returned to a charging station. This organization/designation permits charging times (when and for how long) to be incorporated into operational plans for the site, for example to avoid conflicts between vehicle downtime for charging and needed uptime for operational requirements, and for this information to be provided to the autonomy system. A charge management/scheduling process(or)/software application executing on the processor 3920 of the computer system 3910 at the facility contains a user interface screen (or (e.g.) web page generator for portable screens, such as smartphones, tablets, laptops, etc.) 3950 for display and input of ideal charging times (columns 3952) for individual vehicle assets (rows 3954). The operator inputs desired charging times (designated as an entry "CHG" 3960), and the autonomy system process(or) 3930 honors these times, in response to communication from the charge management/scheduling process(or) 3940, by returning vehicle(s) to charging stations for the designated charging slot. The UI can optionally show current charge state (column 3970), and an option for the operator to asynchronously command an asset to return to a charge station now (column 3980). The system will still permit a specifically designated asset to perform a mission in its otherwise designated charging timeslot, if the asset has sufficient charge and the operator chooses to override the charging slot. Once an asset is below a sufficient charge, the electric vehicle cannot accept new movement assignments other than navigating to the charging station.

In another embodiment, personnel can be notified of when certain charging levels are reached, when assets are staged for manual connection to charging infrastructure, and when assets can be removed from charging infrastructure. These notifications can be optionally displayed onscreen on the UI screen 3950 located at the facility, as described above. Other notification options can include automated emails, text messages, and other notification methods (alerts 3992) to site personnel, via network and/or communication link and associated process(or) 3990.

Another embodiment of the charging interface can include scheduling into mission planning software for autonomous vehicle movements. The mission planning system receives as input this schedule and uses designated charging slots as constraints in computing movement plans for the autonomous vehicle(s).

Yet another embodiment includes incorporation of current charge state, along with an optional specification of ideal charging times, into mission planning process(or)/software 3994 for autonomous vehicle movements. The mission planning system receives feedback of current charge state via wireless telemetry from the assets it is providing mission plans for. Charge state is incorporated as a constraint the mission planning system must satisfy. Thus, the mission planning system is responsible for managing movements in addition to maintaining the vehicles in a healthy charged state. The mission planner can be optionally guided by specification of ideal charging time slots, as discussed above, in order to provide guidance to plans computed by the mission planner.

A further embodiment includes the automated logging of requested vehicle movements, charge state, and actual charging time slot and duration. The logged information is used as input data to support analysis of operational flow of the site, and management of charge state on vehicle assets. These analyses support refinement of operational models, including but not limited to, updated desired charging times for electric assets.

When instructed by the charging/charge monitoring process described above to return to a charging station, it is contemplated that charging of the vehicle can be implemented by a user, manually plugging the vehicle into a port or by a manipulator that, similar to the process of connecting a trailer service connections, finds the charging port and connects a charging lead from the station. Alternatively, the vehicle can align with floor or wall contacts that engage appropriate pads on the vehicle, or a form of inductive (wireless) charging arranged in accordance with skill in the art, can be employed. It should be clear that a variety of automated charging arrangements can be employed when a vehicle is automatically or manually recalled by the process above. Relatedly, in addition to scheduling ideal charging times to maximize vehicle and task efficiency, methods are conceived of in which power consumption of an autonomous vehicle can be reduced during different phases of operation. In particular for a base vehicle that is an electric vehicle (EV), extending the time between charges directly contributes to operational efficiency in yard and shuttle operations. By selective enablement of autonomy hardware, including but not limited to computers, sensors, and actuators, power may be saved. Enablement may involve direct power application or removal, in addition to various low-power and suspended states of hardware components. These enablements are conceived as determined by operating conditions and mission segment execution. For example, if the vehicle is driving in the forward direction, sensing and processing associated with perception of items of interest behind the vehicle are of less concern, and thus do not need to be powered and executed at all, or with significantly less fidelity. This affords power savings, since the autonomy system can use substantially less power in this case. This strategy can be applied across the operational profile of the autonomy system to identify components that can be powered down or put into a low-power/suspended state when not utilized.

Additional power savings are conceived for the base vehicle, when equipped with an autonomy system, and especially in the case of an EV. As the autonomy system has knowledge of the operational profile and mission segments, equipment on the base vehicle can be selectively powered or placed into low-power/suspected states when not utilized. As an example, when the autonomy system has determined the vehicle should remained stationary, it can command full application of brakes and configure the base vehicle to remove power from drive motors altogether.

Finally, a vehicle equipped with an autonomy system can be commanded in such a way to save power. Again, in the case of a base vehicle that is an EV, power savings can be significant. As an example, missions can be planned and executed such that the use of regenerative braking (versus use of friction braking mechanisms) can be optimized, which reduces the power consumed by the complete system.

G. Automated 'Tug-Test'

A truck tug-test is a mechanism by which the fifth-wheel connection of a truck to its trailer is confirmed by placing the truck into a forward gear and pulling against the trailer while the trailer's brakes are still engaged. If the truck encounters strong resistance, this proves that the fifth wheel engagement has been successful.

Figure 40:
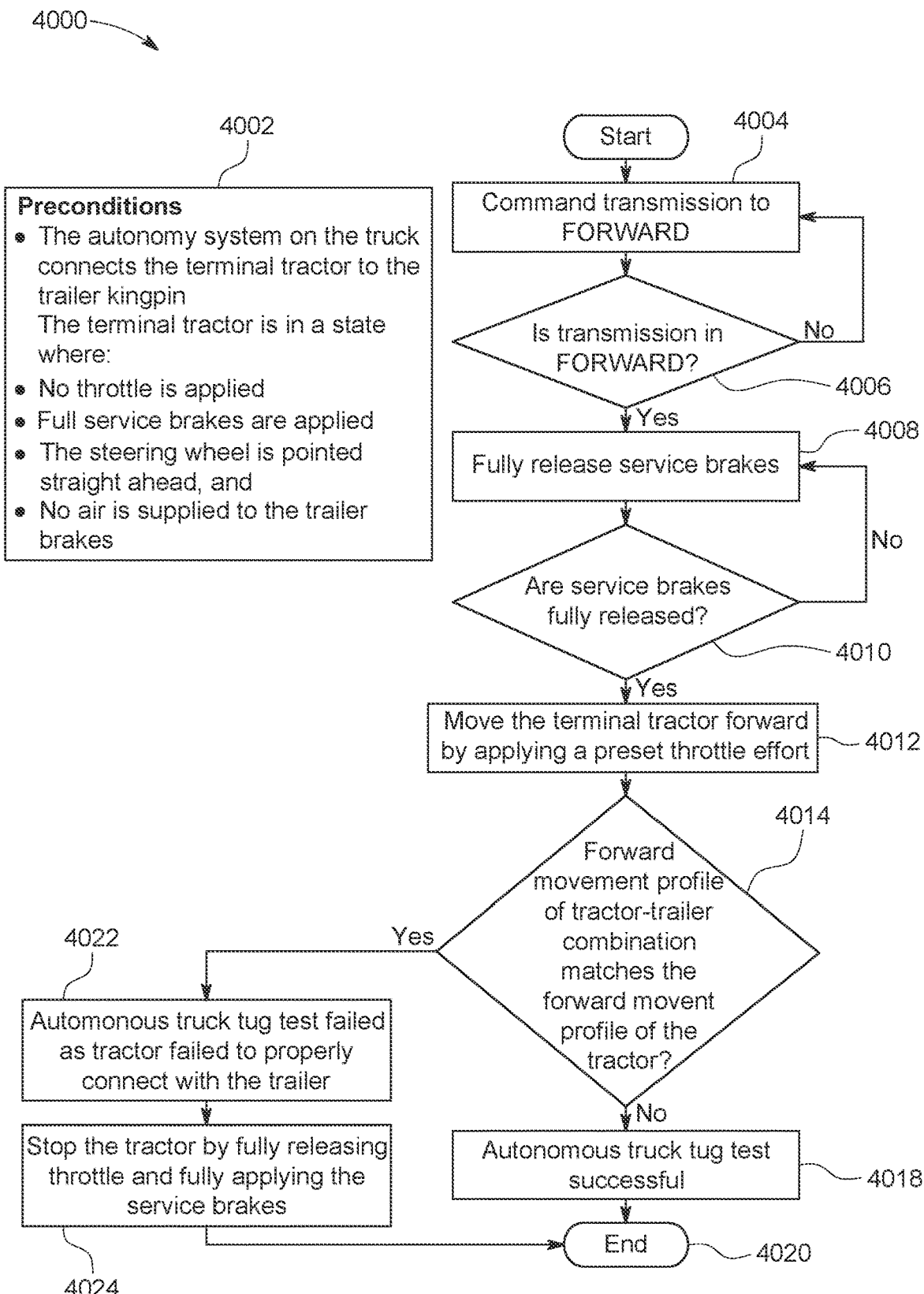
FIG. 40 is a flow diagram of an exemplary tug-test procedure for use with an autonomous truck to verify proper hookup of a trailer thereto.

From a safety standpoint, it is desirable that this same tug-test be employed by an autonomous (e.g. AV yard) truck. With reference to the procedure 4000 of FIG. 40, the autonomous truck tug-test procedure 4000 assumes that before being activated the truck is positioned such that the entire fifth wheel is under the front edge of the trailer floor/skid plate (the trailer is physically sitting on the tractor fifth wheel) there is no gap between the fifth wheel and the trailer floor/skid plate, and the fifth-wheel has been raised sufficiently so that the trailer's landing gear is clear of the ground (in order to avoid landing gear damage during test). Further, the autonomous truck tug-test procedure 4000 is adapted to detect proper mechanical coupling with a fifth wheel in the absence of any feedback from the fifth wheel unlatch control valve, thereby indicating if the kingpin jaws on the fifth wheel are in the open position.

Before beginning the autonomous truck tug-test procedure 4000 to confirm proper mechanical coupling of a fifth wheel with a trailer, the autonomy system on the truck connects the truck's fifth wheel to the trailer kingpin and gets the truck in a state where, a) no throttle is applied, b) full service brakes are applied to the truck, c) the steering wheel is pointed straight ahead, and d) no air is supplied to the trailer brakes (precondition box 4002).

The autonomous truck tug-test procedure 4000 begins by commanding the transmission to transition to FORWARD (or DRIVE) in step 4004. As soon as the transmission, via the controller, returns a status value indicating that it is in FORWARD (decision step 4006), the autonomous truck tug-test procedure 4000 fully releases the service brakes in step 4008, and when confirmed (decision step 4010), the autonomous truck tug-test procedure 4000 then drives the truck forward (step 4012), by commanding a preset throttle effort, and monitors, (a) the tractor longitudinal acceleration, and (b) the tractor forward distance traveled. Additionally, depending on the drive train on the truck, the autonomous truck tug-test procedure 4000 also monitors either the drive motor current and/or the engine RPMs. If, upon the application of the preset throttle effort, it is determined by the process(or) that the actual forward movement of the truck system does not match (or is less than an experimental percentage based upon current and future testing) the forward motion profile of the truck without a trailer connected to it (decision step 4014), then the autonomous truck tug-test procedure concludes that the mechanical coupling of the fifth wheel with the trailer is successful (step 4018), and the procedure 4000 concludes (step 4020), and the system is notified of such success. Conversely, if after step 4012, the truck moves, and its forward motion profile is the same/similar to when no trailer is connected (decision step 4014), then the autonomous truck tug-test procedure 4000 concludes that the mechanical coupling of the fifth wheel with the trailer has failed (step 4022) and immediately notifies the system while releasing the truck throttle and fully applying the service brakes (step 4024). The procedure again ends at step 4020 awaiting a repeat attempt to hitch the trailer and/or operator intervention.

In various embodiments, a multiple tug test procedure can consist of successive single tug tests. Upon successful completion of initial tug-test, and following connection of air and electrical cables to the trailer, the fifth wheel is commanded to raise the trailer to a driving height, with possibly a forward motion to ensure that the back of the trailer is not dragging weather stripping on dock doors. After the trailer has been lifted to a driving height, some customers and application areas would prefer that an additional, final tug be performed as an additional check that the mechanical mating of the tractor and trailer is complete. In this case, since air has been provided to the trailer to remove emergency brakes, either this air must be removed to re-engage emergency brakes, or air must be supplied on the service brakes to the trailer. Following, a brief forward throttle or propulsion is applied to the tractor, to perform a tug on the trailer and ensure the tractor remains engaged with the trailer.

Figure 40A:
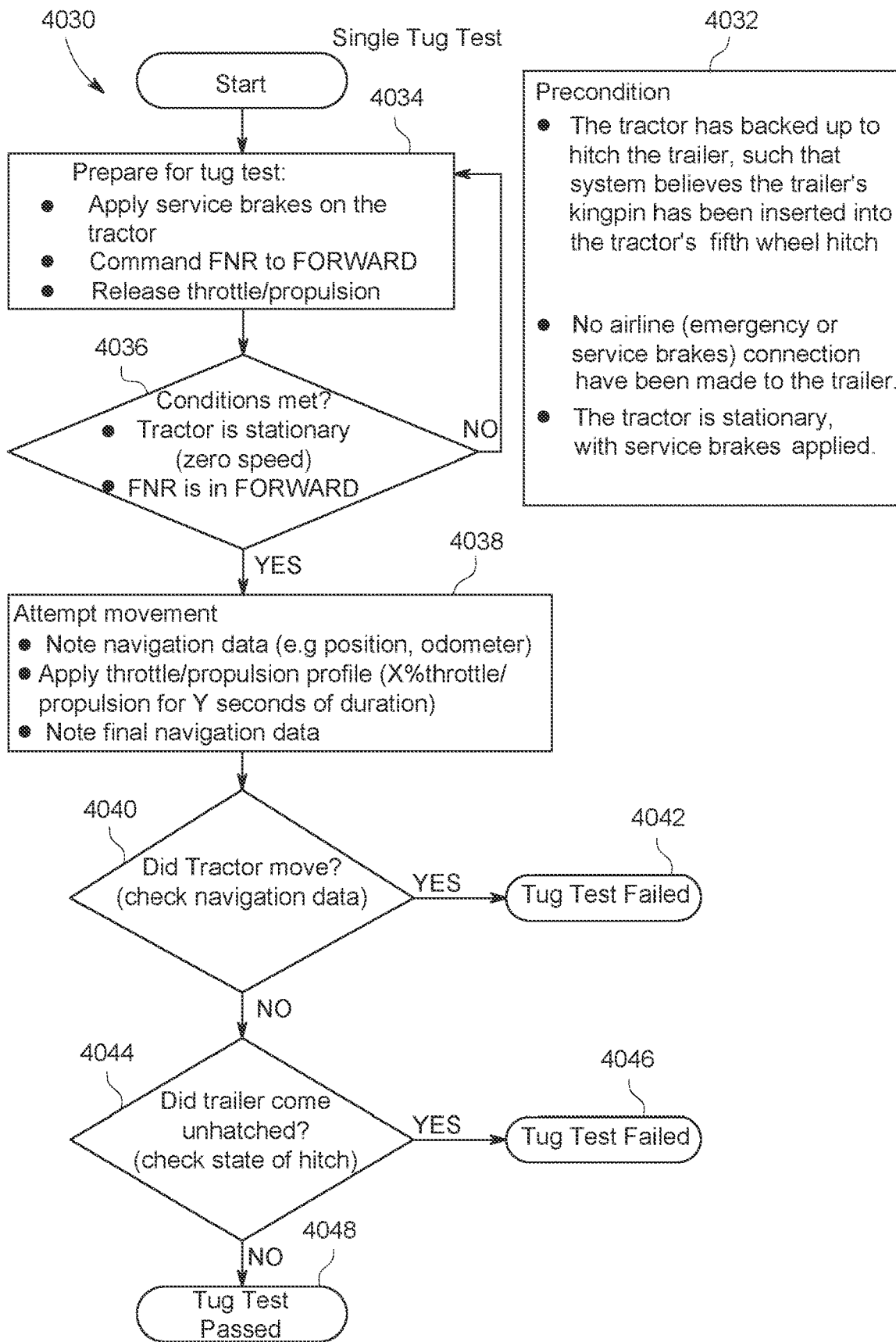
FIG. 40A is a flow diagram of an exemplary single tug-test procedure for use as part of a multiple tug-test procedure to verify proper hookup of a trailer.

With reference to the procedure 4030 of FIG. 40A, the autonomous truck tug-test procedure 4030 assumes that before being activated the truck is positioned such that the entire fifth wheel is under the front edge of the trailer floor/skid plate (the trailer is physically sitting on the tractor fifth wheel) there is no gap between the fifth wheel and the trailer floor/skid plate, and the fifth-wheel has been raised sufficiently so that the trailer's landing gear is clear of the ground (in order to avoid landing gear damage during test). Further, the autonomous truck tug-test procedure 4030 is adapted to detect proper mechanical coupling with a fifth wheel in the absence of any feedback from the fifth wheel unlatch control valve, thereby indicating if the kingpin jaws on the fifth wheel are in the open position.

Before beginning the autonomous truck tug-test procedure 4030 to confirm proper mechanical coupling of a fifth wheel with a trailer, the autonomy system on the truck a) has backed the tractor up to hitch the trailer such that the system believes the trailer's kingpin has been inserted into the tractor's fifth wheel hitch, b) no airline (emergency or service brakes) connections have been made to the trailer, and c) the tractor is stationary, with service brakes applied (precondition box 4032).

Preparation for the tug test includes applying service brakes on the tractor, commanding the FNR to FORWARD, and releasing the throttle/propulsion (step 4034). The system confirms the conditions that a) the tractor is stationary (zero speed) and b) FNR is in FORWARD (decision step 4036). If the conditions are not met, the procedure returns to step 4034. If the conditions are met, the procedure then attempts movement at step 4038. Attempting movement at step 4038 includes a) noting navigation data (e.g. position, odometer), b) applying a predetermined percentage (X %) of throttle/propulsion profile for a predetermined number of seconds (Y). At decision step 4040, the procedure determines if the tractor moved, based on navigation data. If the tractor moved, the tug test has failed, and the procedure ends at step 4042 awaiting a repeat attempt to hitch the trailer and/or operator intervention. If the tractor did not move, the procedure advances to decision step 4044 and determines if the trailer cam unhitched by checking the state of the hitch. If the trailer became unhitched, the procedure ends at step 4046 awaiting a repeat attempt to hitch the trailer and/or operator intervention. If the trailer did not come unhitched, the procedure ends at step 4048 with the iteration of the tug test being passed.

Figure 40B:
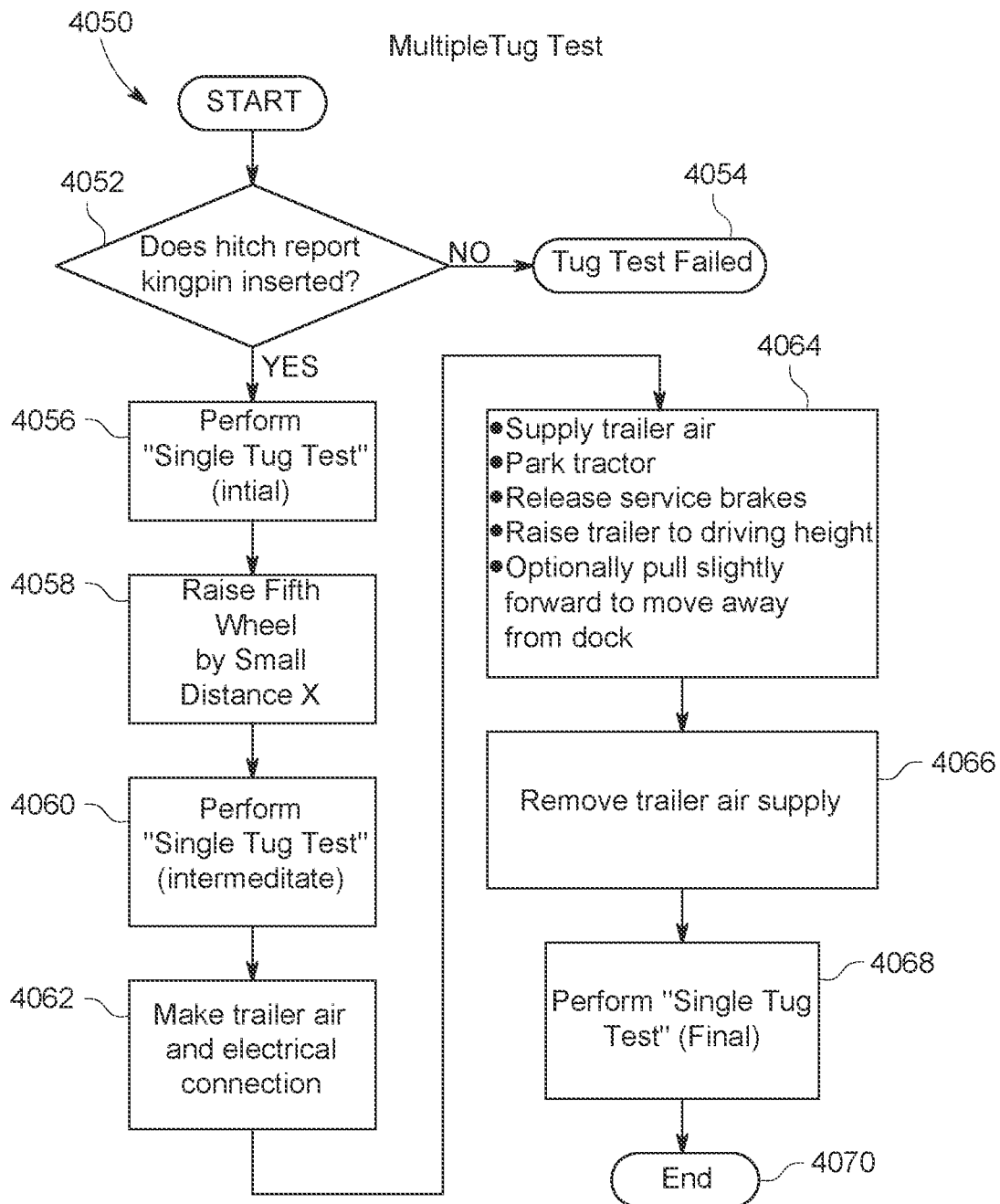
FIG. 40B is a flow diagram of an exemplary multiple tug-test procedure incorporating repeated use of the single tug-test procedure of FIG. 40A to verify proper hookup of a trailer.

The procedure 4030 can be repeated as multiple parts of a multiple tug test procedure 4050, as shown in FIG. 40B. At decision step 4052, the system determines if the hitch reports the kingpin is inserted. If the hitch reports that the kingpin is not inserted the procedure ends at step 4054 awaiting a repeat attempt to hitch the trailer and/or operator intervention. If the hitch reports that the kingpin is inserted, the procedure advances to step 4056 to perform the first iteration of the single tug test procedure 4030. If the first iteration of the tug test is passed and ends at 4048 (FIG. 40A), the multiple tug test procedure 4050 then raises the fifth wheel by a predetermined small distance at step 4058. After raising the fifth wheel by the predetermined small distance, the multiple tug test procedure 4050 performs the single tug test procedure 4030 a second time at step 4060. If the second iteration of the tug test is passed and ends at 4048 (FIG. 40A), the multiple tug test procedure 4050 then makes the trailer air and/or electrical connections at step 4062. After making the connections, at step 4064 a) the trailer is supplied with air, b) the transmission is put in park, c) the service brakes are released, d) the trailer is raised to driving height, and (optionally) e) the tractor pulls slightly forward to move the trailer away from the dock. The trailer air supply can then be removed at step 4066. At 4068, the multiple tug test procedure 4050 can perform the single tug test procedure 4030 for a third and final time. If the single tug test procedure 4030 is passed at step 4068, the procedure ends at step 4070 and the system is notified of success.

Different customers and mission environments require selection and customization of the automated tug-tests. The automated tug-test conceived here is configurable with respect to enablement of individual tugs, and selection of parameters of the complete test.

H. Autonomous Mode-to-Driver Mode Change

The ability of an autonomous vehicle to seamlessly and securely change modes between manned, unmanned, and unmanned with human safety operator is key to its successful operations in its designated operating environment. Nearly all control inputs for mode changes on present day autonomous vehicles are switches, knobs, or buttons that are mounted on the vehicle that any human operator can switch, turn, or push. While this is convenient, it is not secure, as it allows an unauthorized individual to approach the vehicle and change its mode.

The autonomy controller of the vehicle (as shown and described generally above), which interoperates with the vehicle's drive-by-wire system, can be adapted to securely change the operating mode of an autonomous vehicle (i.e. one that is fitted with an human operator cab/control system), while preventing unauthorized, accidental, haphazard, or in some cases malicious mode changes. This system and associated mode-change procedure provides an extra layer of security on the autonomous vehicles (e.g. AV yard trucks)

to ensure that only authorized personnel can intentionally and securely can change its operating mode.

Figure 41:
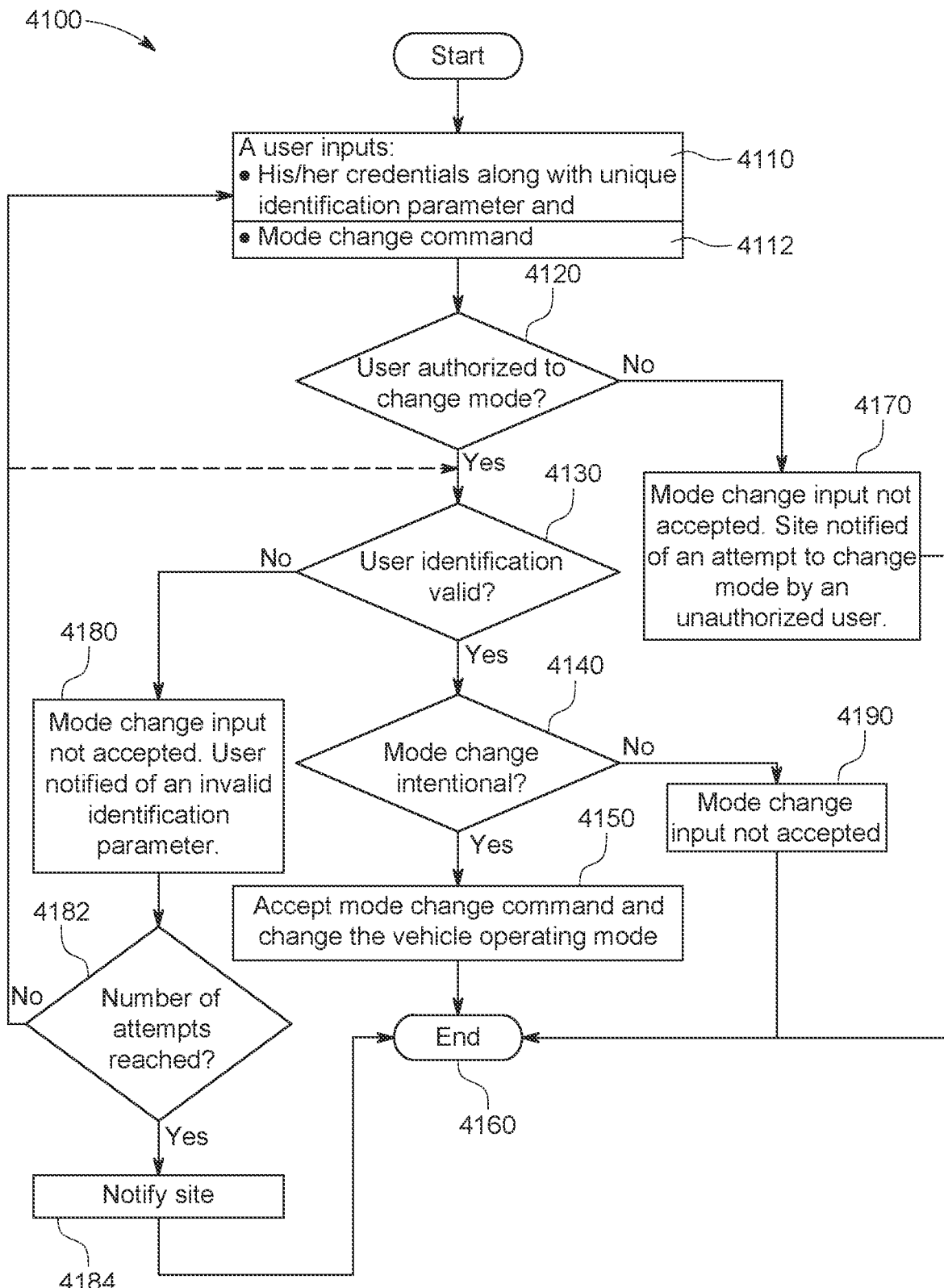
FIG. 41 is a flow diagram of an exemplary mode change procedure for gaining access to driver system operations over from autonomous mode.

Reference is now made to the procedure 4100 of FIG. 41, which can operate within the autonomous vehicle (e.g. AV yard truck), and be presented to a would-be user/driver via an appropriate interface, such as a touchscreen display within the vehicle cab or on the exterior door (thereby limiting access to the cab). An autonomous vehicle equipped with this system contains or accesses a list of pre-authorized users (e.g. in a preprogrammed table look-up or by querying the server database over a wireless link), who are allowed change the vehicle operating mode. Additionally, the system can store or access identification data (e.g. human biometric data, such as voiceprint, fingerprints or retinal scan) and query the user with an appropriate interface (e.g. visual and/or audio input), or can require the user to enter a unique, stored password, and/or any other unique identification parameter. Such identification data is stored and requested for each of the authorized users for authentication to change the vehicle operating mode. In order to command an operating mode change, a user enters his/her credentials (step 4110), with unique identification parameter, in order to authenticate to the system and input a commanded mode change (substep 4112). The system then queries the stored data and attempts to validate the user against permitted users that have been authorized to change the vehicle operating mode (decision step 4120). If the user is authorized, then the procedure 4100 determines (decision step 4130 whether the users identification is, itself, valid, by querying identification data and comparing it to the input version—a variety of available and/or customized validation software, hardware and techniques can be employed to perform this step (4130). If the user is fully permitted and identified, then the procedure 4100 determines (decision step 4140) whether the mode change was intentional and permitted. This decision can involve one or more metrics that either allow or prevent a mode change, including, but not limited to, vehicle location (i.e., is the vehicle somewhere likely to necessitate or desire a human operator or pose a danger to such operator?), whether it is presently moving (i.e., is this a hijacking, or joyride?), current vehicle load (i.e. is the load valuable, secure, etc.?), whether the vehicle is damaged or in need of recharge/maintenance, where human intervention is needed. If there is no bar to mode change and/or it is intentional, then the mode change is executed in step 4150 and the procedure ends (step 4160), with the user taking over driving functions using the drive-by-wire manual controls.

However, in the procedure 4100, if the user is not authorized to drive the vehicle, then decision step 4120 branches to step 4170 and the input is not accepted. The server at the facility and/or another appropriate location (e.g. the guard shack, security, etc.) is notified of an attempt to input mode changes by an unauthorized user and the procedure 4100 terminates (step 4160). If the user is authorized but not successfully authenticated, then decision step 4130 branches to step 4180. The user is notified of an invalid authentication parameter and (optionally) given one or more attempts to reenter correct authorization data (via step 4110, etc.). After a predetermined number of attempts (e.g. three), the procedure 4100 can also notify the facility server, guard shack security, etc. (step 4184). The location of the vehicle is known via the autonomy system and tracking processes inherent therein, thus security can be brought to the location. Alternatively, the vehicle can be locked, containing the user and driven to a secure location autonomously. If the mode change is deemed unintentional or not permitted (decision step 4140), then step 4190 denies the mode change and the procedure ends (step 4160). Other actions, such as notifying the facility, security, etc. can be taken, depending upon the circumstances of the denial.

It should be clear that a wide range of additional and/ alternative procedure steps can be employed in the mode-change procedure 4100 of FIG. 41. This steps can afford additional options, such as physically locking and unlocking doors and certain controls, causing the vehicle to stop, etc. A manual vehicle emergency stop function can also be provided (e.g. a large button on the inside or outside of the vehicle), as a basic form of manual override that may or may not require authorization. Appropriate notifications can be transmitted to the facility and other interested parties as appropriate.

I. Railcar Intermodal Container Ordering

A significant use of AV yard truck technology is in association with intermodal freight facilities. Such facilities are now common in association with rail freight where the use of ISO-standard shipping containers—typically either 20 feet or 40 feet in length, and having dual locked, swinging doors at one end—have replaced boxcars in many applications. The use of containers allows a cargo to be loaded at a highly distant site—for example a factory in China, lifted onto a ship, unloaded at a port, and whence onto a railcar. The container is then hauled by rail to a remote destination from the port, and eventually unloaded onto a specialized trailer at a railyard for haulage from the railyard to a final destination (e.g. a warehouse, fulfillments center, etc.) using an over-the-road truck. Railcars (also termed herein well-cars) are adapted to carry (typically) one, two or three containers of appropriate length in a single layer, or in a stacked orientation with two layers. The railcar often defines a lowboy configuration, with a depressed well-bed, to afford additional clearance through tunnels, and under wires, overpasses, bridges, etc., which transect the tracks.

Figure 42:
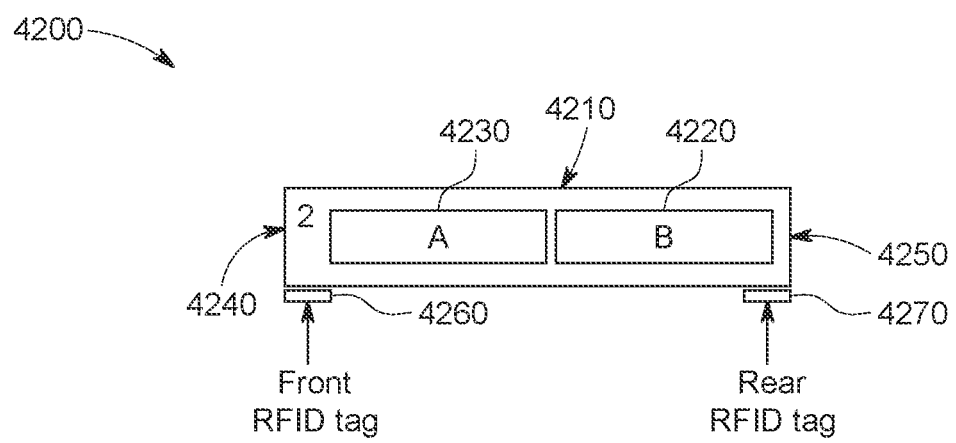
FIG. 42 is a schematic top view of an exemplary railcar having RFID markers for use in determining well locations in an autonomous yard truck environment according to an embodiment.
Figure 43:
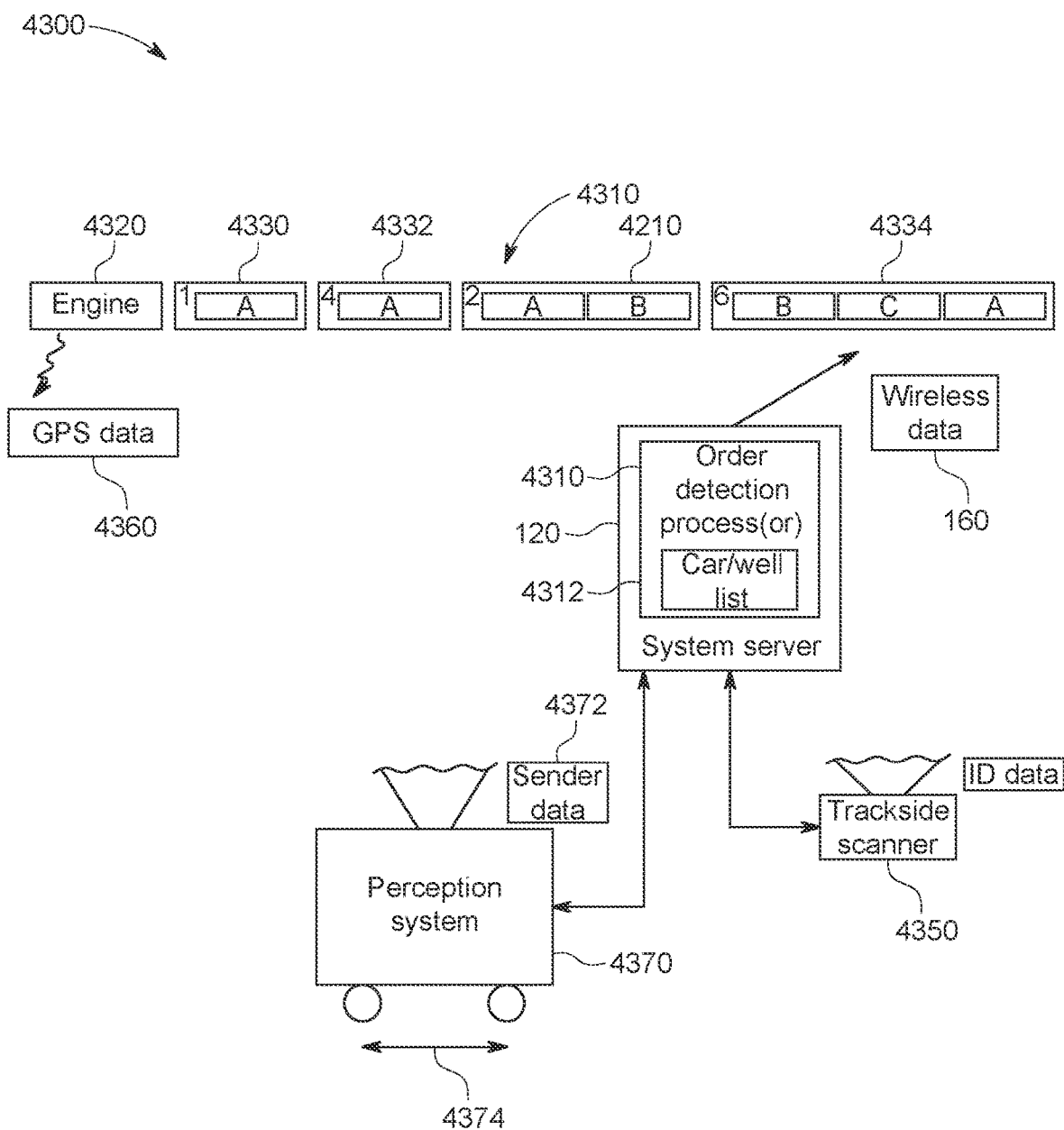
FIG. 43 is a schematic top view showing a train having a plurality of railcars with RFID markers for use with a yard-based scanning or mobile perception system that locates well positions and ordering thereby.
Figure 44:
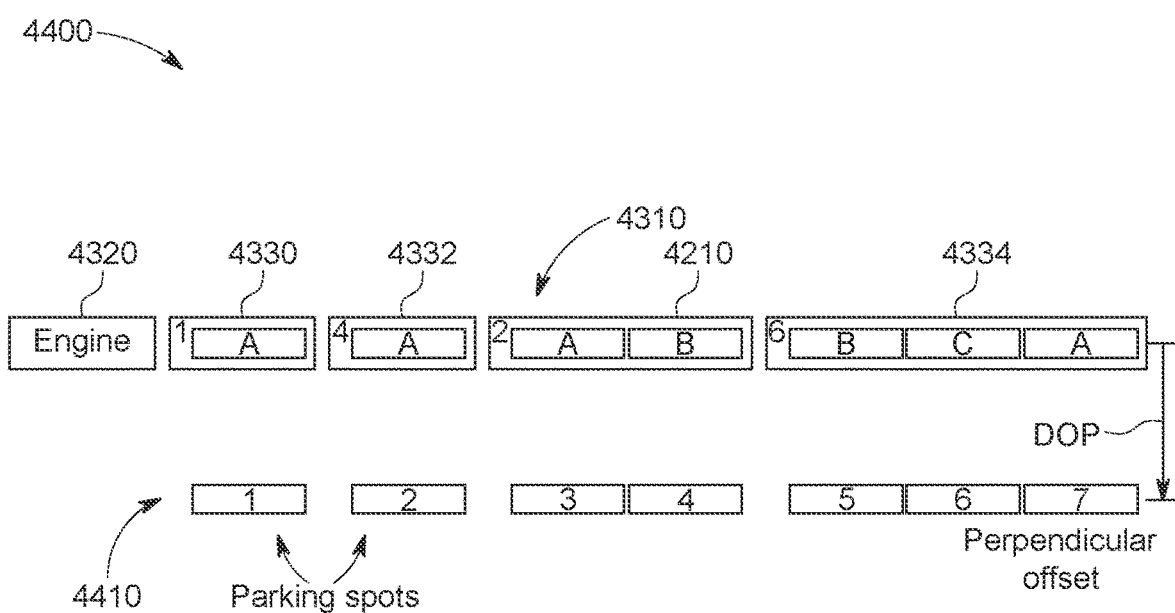
FIG. 44 is a schematic top view of a parked train and a plurality of associated trailer parking locations identified and organized by the sensing and/or perception system of FIG. 43.

FIGS. 42-44 depict an automated railcar detection and mapping system and method, which allows autonomous vehicles to properly position trailers, container chassis with containers and/or empty container chassis alongside a train for loading and unloading of railcars in an intermodal railyard environment. FIG. 42 shows an arrangement 4200 with an exemplary railcar (well-car) 4210 in top view. The railcar contains wells 4220 and 4230 (also labelled A and B in a two-well configuration) for at least two intermodal containers that reside in a well of the railcar 4210. As shown, the railcar has been fitted with a wireless identification device or other discrete identifying fiducial (e.g. a visual ID tag) on its front and rear ends 4240 and 4250, respectively. In an embodiment, the identifier for front and rear of the railcar comprises the depicted radio frequency identifier (RFID) tag 4260 and 4270. Note that such tags are provided by the yard or the railcar operator and are registered within the system or otherwise accessed from an online server (e.g. via the Internet). These RFIDs can report a variety of identifying data about the car and/or cargo or can be limited to providing orientation data—i.e. which one is the front and which one is the rear.

Reference is further made to the arrangements 4300 and 4400, respectively in FIGS. 43 and 44. When a train 4310 (drawn by engine 4320) of single-well, double-well, or triple-well 4330, 4332, 4210 (described above), and 4334, enters the subject railyard, the order of the well-cars and well locations are not necessarily known by the yard operator. Knowledge of the particular position of each railcar well is desirable to enable autonomous delivery of containers, which are then loaded by a crane, or other mechanism, onto the adjacent well-cars. Additionally, for railcars/well-cars with multiple wells (double, labelled A and B, and triple, labelled A, B and C), the car orientation should be known so that the position of each well can be determined by the system.

With reference particularly to FIG. 43, the detection process(or) 4310, which can be part of the overall server 120 and part of the (e.g. wireless) data 160 passed between the system server(s) and the truck(s), determines the position and orientation of each railcar and all wells within each railcar to enable autonomous delivery of containers. The process outputs a parking location manifest detailing the appropriate container position for each well in the train. This process consists of at least two primary steps, including (a) determining the well location and (b) computing the parking location manifest.

One technique in order to determine well location entails the use of the above-described RFID arrangement. Each railcar will have RFID tags installed at the front and rear. As also described above, the RFID tags can indicate the railcar's discrete ID and whether the tag is installed at the front or rear of the car. One or more RFIDs can be provided to each car—in a minimal installation a single RFID denotes either the front or rear and the opposite, non-tagged, car end is inferred by the system As also described above, additional information about each railcar can be encoded in the RFID or available via other means (such as a database). That additional information can include, but is not limited to, (a) overall length, (b) number of wells, (c) distance from front of railcar to the center of each well, and (d) length of each well. As the railcars enter the railyard, a trackside scanner 4350 (located at one or more appropriate entry point(s) and interoperating with the process(or) 4310) reads the tags and populates a list of railcars in the order of arrival. Each entry in the list can also indicate whether the front or rear arrived first, thereby reporting relative orientation within the train 4310. The result of this scanning and processing is an ordered list 4312 of wells, since once orientations are known, the order of wells within a railcar is also determined.

Once the train stops, the position of the engine 4320 is determined to high accuracy via its onboard GPS 4360, which reports data to the system server 120 and process(or) 4310. The processor 4310 moves down the well order, determining the distance from the engine to each well along the track based upon a tracked comparison between the present location of the engine 4320 and the passage of a car RFID tag through the fixed location scanner 4350. The first well position along the track is stored as the engine's position plus the distance from the front of the first railcar to the center of the first well. The car center can be determined based upon the indicated length of the car (via the RFID) and the relative location of the front and/or rear RFID. Remaining well positions (if any) in the first railcar are determined in the same way. The first well position in the next railcar can then be calculated based on the positions of the preceding railcar wells and knowledge of the car size and number of wells on a per-car basis.

Once the position of each well along the track is known by the process, a manifest of parking locations 4410 (herein numbered 1-7), which correspond to well locations in each of the railcars 4330, 4332, 4334 and 4210, is populated by offsetting the well locations by a configurable distance DOP perpendicular/orthogonal to the extension direction of the track (as depicted in arrangement 4400 FIG. 44). Each parking location (e.g. 1-7) is uniquely identified so that containers can be delivered adjacently trackside for loading into the adjacent well.

Figure 44A:
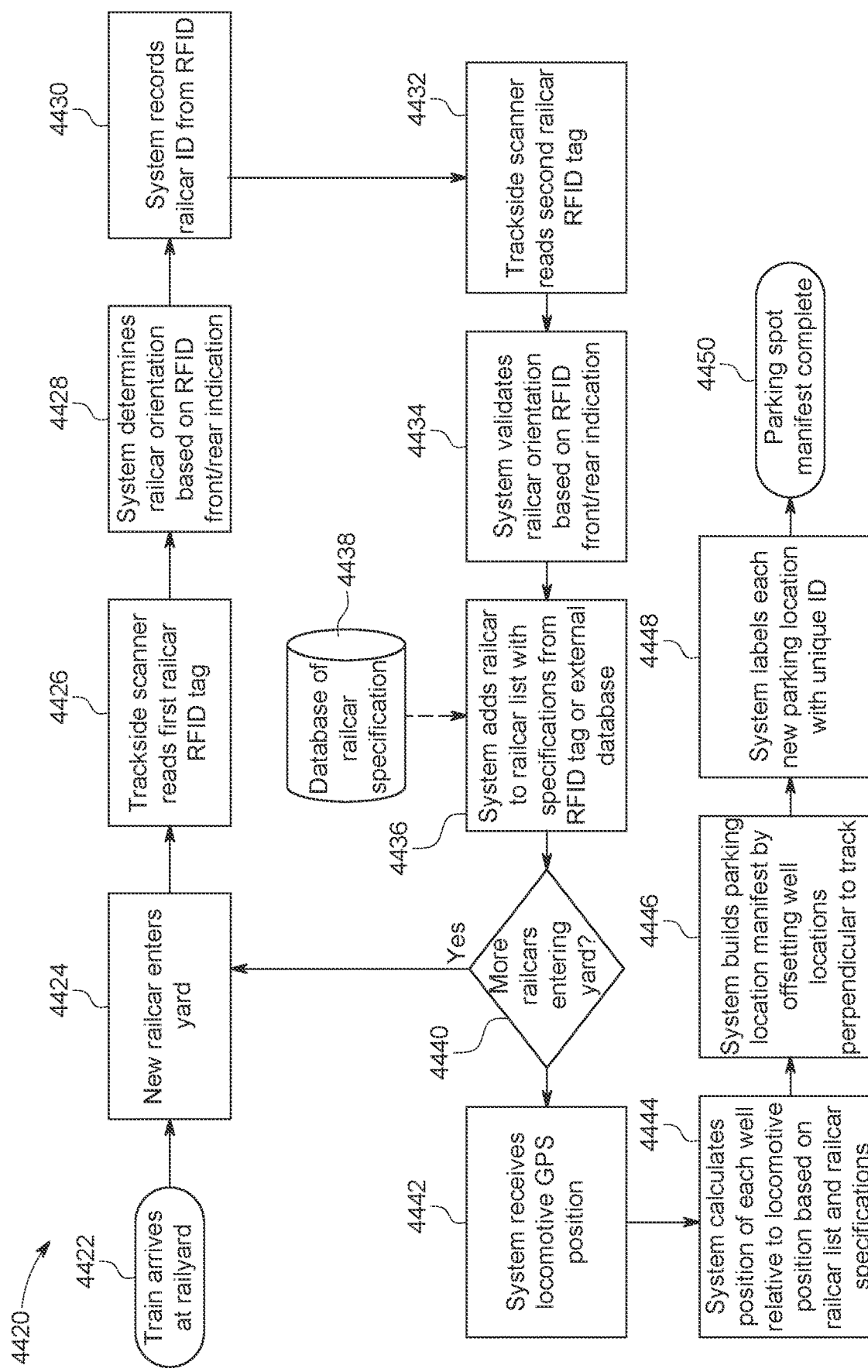
FIG. 44A is a flow diagram of a procedure for using the sensing system of FIG. 43 to determine railcar well order and trailer parking locations according to an embodiment.

Referring now to FIG. 44A, the above-described procedure 4420 for performing the well order and location detection process is shown in further detail. As depicted, a train arrives at the yard (step 4422) pulling an exemplary railcar/well-car (step 4424). As the car passes the scanner, the first RFID on the car (or other fiducial) is read in step 4426. The process(or) determines railcar orientation (front/rear) based upon the RFID in step 4428, and the ID of the railcar is recorded/stored in the system (step 4430). The scanner then reads the second/next RFIF passing thereby in step 4432, based upon motion of the train. This allows the process(or) to validate the orientation of the railcar, as each tag denotes the relative front/rear of the railcar, in step 4434. The scanned/identified railcar is then added to the process(or) list with its relative specifications (as described above) in step 4436. These railcar specifications/identity can be extracted from the ID(s) itself/themselves, and/or can be accessed (based upon a basic car ID) from a remote (e.g. network or Internet-based) database 4438. The scanner and process(or) poll for more railcars (if any) in the train as they pass therethrough, and if they exist (via decision step 4440), the procedure repeats from steps 4424 through steps 4436 until all railcars have been scanned. Then, the procedure 4420 branches (via decision step 4440) to step 4442, in which the system receives the current GPS-based (or other tracking system, such as cellular triangulation) location of the engine. Note that locations of multiple engines in a train can be reported where several units are used to pull the train. At least one—typically the closest to the railcars—is used as a reference.

The procedure 4220 then branches to step 4444, in which the process(or) computes the position of each well relative to the position of the engine using, for example, the list of railcars in the train and associated specifications. Based upon this computation, the process(or) builds a corresponding list of adjacent, trackside parking locations (spots), at an associated perpendicular offset in step 4446. Each of these identified and located parking locations is then labeled with a unique/discrete stored identifier in step 4448. This information is provided to complete the parking location manifest for use by the AV yard truck system (step 4450). Alternatively, a human driver can employ this system using an onboard interface (e.g. a fixed screen, tablet or smartphone) to locate a given well and parking location. In the case of the autonomous arrangement, the trucks are guided to parking locations using the systems navigational controls and associated location determination systems (e.g. GPS, triangulation, embedded sensors, etc.). In the case of a human driven truck, similar navigation aids—with system-input geolocation data on the parking location to which the driver has been dispatched—can be employed. The navigation system guides the driver to the spot using appropriate feedback in a manner clear to those of skill.

An alternate technique for determining well location in each railcar is by use of perception, typically operating while the train is stationary. A perception system 4370, shown schematically in FIG. 43, can consist of a variety of physical and RF-based sensor modalities that deliver associated data 4372, including, but not limited to cameras, GPS, and potentially LIDAR. These sensors are collectively installed onto a moving platform, such as a manually-driven cart or an autonomous vehicle (e.g. yard truck). In operation, the perception system 4370 is moved (double arrow 4374) along the length of the train parallel to the tracks in a railyard after the train comes to a stop. The perception system 4370 can thereby sense the location and extents of each railcar. The extents will imply the number of wells present in each car.

The perception system searches within the extents of each railcar for the railcar ID and well location identifiers. The location of each well identifier relative to the railcar extents indicates the orientation.

As railcar and well identifiers are detected and processed, each well is added to a sequential list to create an overall well order in the list. If any identifiers cannot be located or read, for example due to graffiti or damage, then that well can be marked for follow-up by a human. Once the well is identified, the information can be added to the sequential list.

Figure 44B:
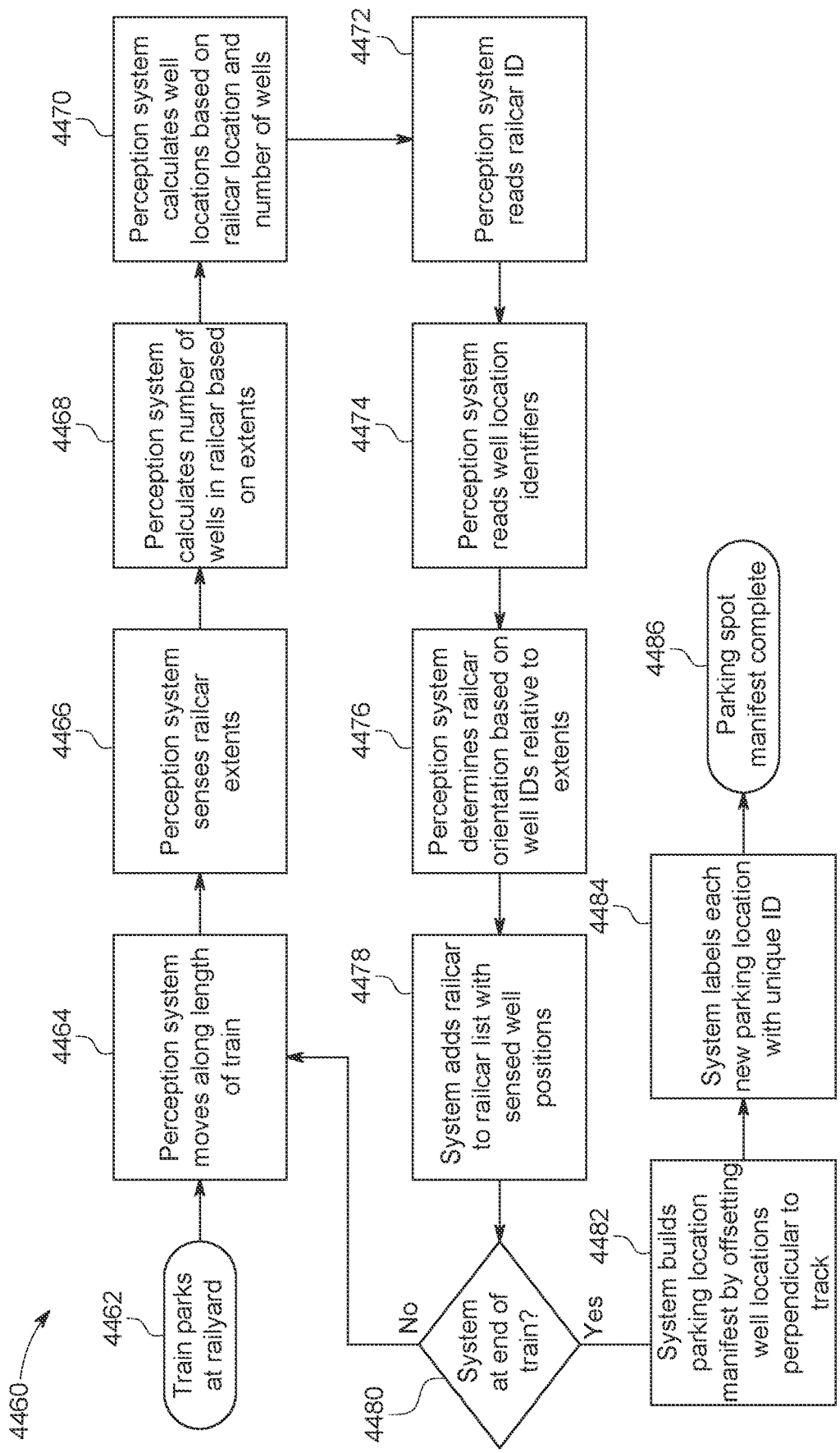
FIG. 44B is a flow diagram of a procedure for using the perception system of FIG. 43 to determine railcar well order and trailer parking locations according to an embodiment.

FIG. 44B depicts a procedure 4460 for performing the above-described well order and location detection process using a perception system (4370 in FIG. 43) in conjunction with a stationary train. The procedure 4460 begins as the train is parked (step 4462) at an appropriate location in the yard—such as the loading/unloading area and moves therealong either manual or under autonomous control of the system server to scan the cars with appropriate sensor(s) (step 4464). The sensors can be used to sense the railcar extents in step 4466, and based on the sensed extents, the perception system (and associated process(or) 4312) computes the number of wells present in each railcar (step 4468). The locations of each of the wells is then computed in step 4470 based upon the sensed railcar location, which is determined by comparing the perception system's onboard location (e.g. GPS, triangulation etc.) in association with the detected presence of the railcar. The perception system then reads a sensed railcar's ID using the appropriate sensing modality (e.g. RFID, optical barcode scanning, etc.) in step 4472. The system can then read well location identifiers (IDs) in step 4474, and can determine the railcar orientation based upon the well IDs relative to the railcar's extents (step 4476). The system then adds the railcar and its associated well locations to the list in step 4478. As the perception system moves from railcar-to-railcar along the length of the train, it repeats procedure steps 4464 to 4478 via decision step 4480 until the last car has been scanned and organized into the list. Once the end of the train is detected (an absence of further cars or an end-of-train indication/ID), decision step 4480 branches to step 4482, and the process(or) 4310 builds a parking location manifest with associated locations perpendicular to the track at an appropriate offset distance (step 4482). The process(or) then labels each new parking location with a unique/discrete ID within the system in step 4484, and the associated manifest is stored as complete in association with the parked train (step 4486).

In alternate embodiments, it is contemplated that the above-described mobile perception system and various sensing modalities can be combined with a stationary and/or separate fixed-base reader, such as the above-described RFID sensor arrangement. The data derived from the various sensors can be combined using techniques described variously above, and in a manner clear to those of skill, to generate a manifest of well and parking locations for use with manual and autonomously driven yard trucks.

Note also that the loading and unloading of containers between yard truck trailers and well-cars can be performed manually using appropriate cranes, forklifts, etc. Such can be directed to engage, lift, move and lower (pick and place) containers based upon location determination and vision system processes, as well as other data sources, including the input locations of wells and parking spaces.

J. Glad Hand Gross Detection

Referring again to the description of the modified glad hand-based connection system, shown and described with reference to the embodiment of FIGS. 23-25, it is contemplated that the conventional (i.e. unmodified) glad hand connections on a trailer front can be used to interconnect pneumatic lines relative to the AV yard truck according to embodiments herein. A trailer that can interoperate with the AV yard truck herein with a minimum of, or substantially free of, modification is logistically and commercially advantageous. The embodiment of FIGS. 45-47 helps to facilitate such operation. More particularly, it is desirable to provide a mechanism for gross detection of the conventional pneumatic connections (typically configured as glad hands) on the front side of the trailer.

Figure 45:
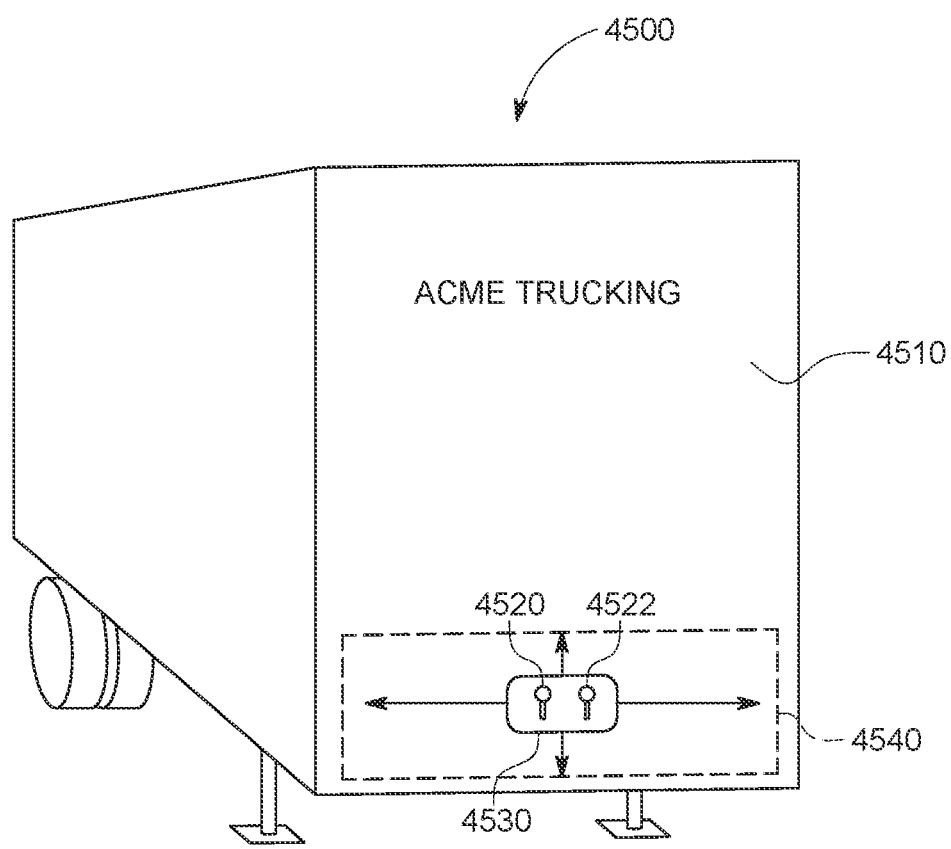
FIG. 45 is a diagram showing the front face of a trailer showing the probable location of pneumatic braking glad hand connections and an associated panel for use in gross location determination by a gross sensing assembly provide on an autonomous truck according to an embodiment.

Reference is made to the exemplary trailer 4500 of FIG. 45. Where a robotic manipulator (described above and further below) is used to maneuver an end effector, containing a pneumatic (glad hand-compatible) connection, to a corresponding glad hand 4520, 4522 on the front 4510 of the trailer 4500, the gross position of the glad hands 4520 and 4522 can help narrow the search for the connection by the end effector. In general, the glad hand(s) are mounted in a panel 4530 that can potentially be located anywhere on (e.g. dashed box 4540), and typically along the lower portion of, the trailer front 4510. A system and method for the gross detection of the glad hand (or similar trailer-mounted pneumatic and/or electrical connection) is provided in this embodiment. This system and method generally provides a sensor-based estimate of the location of the glad hand panel on the front of the trailer is provided in this embodiment.

Once the glad hand panel 4530 is located on the front face 4510 of the trailer 4500, the end effector can be grossly positioned to align with it. Thereafter the connection system can begin a fine manipulation of the end effector to actually engage the glad hand with the end-effector-mounted truck-based connector. An end effector-mounted sensor (e.g. a vision system camera) can be used to finely guide the connector into engagement with the trailer's glad hand. The data from the sensor/camera assembly 4610 is provided to a machine vision system 4650 that determines the location of the glad hands as described below.

Figure 46:
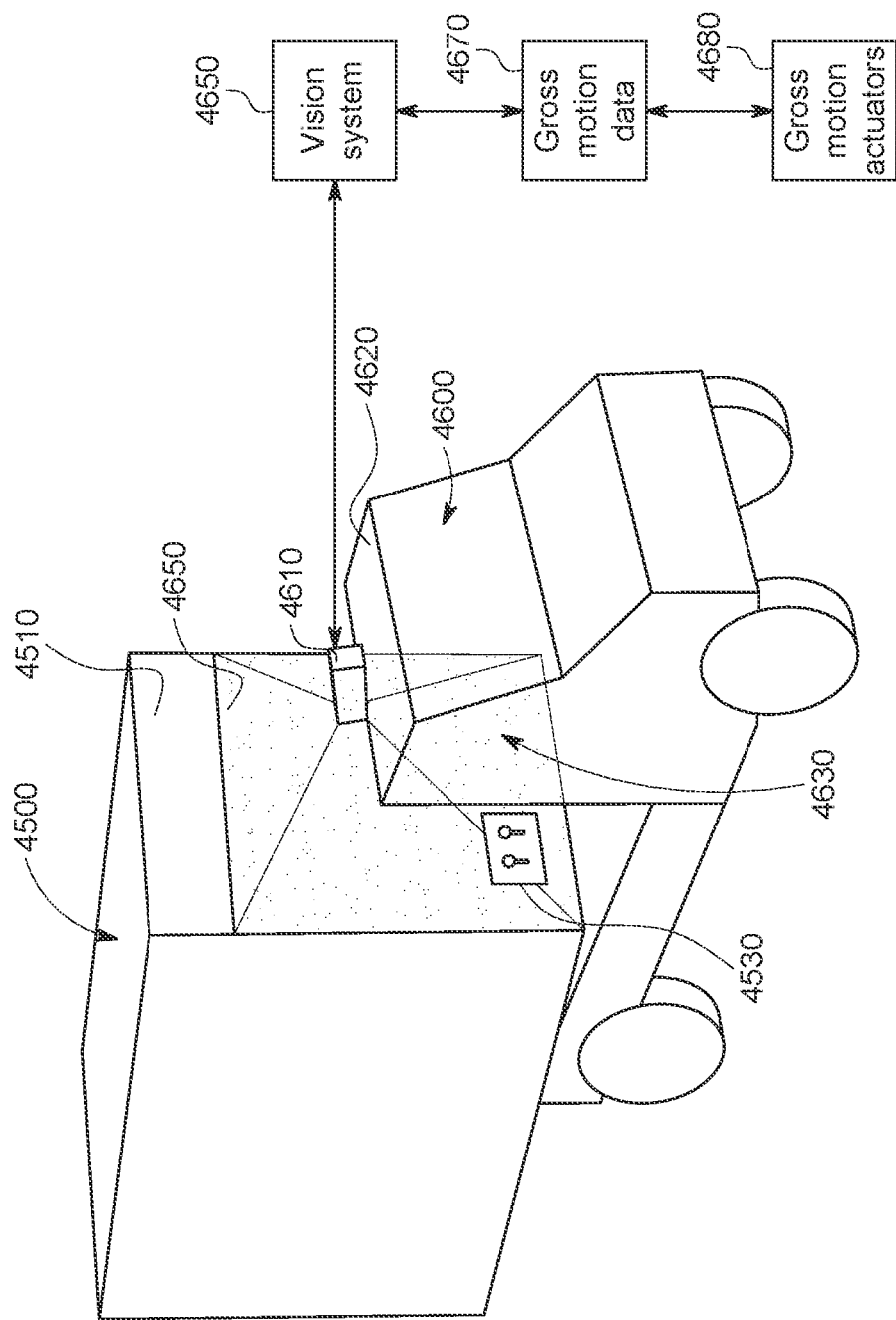
FIG. 46 is a diagram showing an autonomous truck-mounted gross location sensing assembly detecting the characteristics of the front face of an adjacent trailer so as to attempt to localize the glad hand panel thereof.

With further reference to FIGS. 45 and 46, a single-color camera or a combination of a color camera and a 3D imaging sensor 4610 is/are provided at a location on an autonomous truck 4600 that can be used to find the glad hand panel 4530 on the front face 4510 of the trailer 4500. The sensors 4610 for detecting the glad hand panel 4530 can be statically mounted to the truck 4600 on, for example, the roof 4620 of the cab 4630. The sensors 4610 are mounted so that they have coverage over the expected areas on the adjacent trailer front (when hitched or in the process of hitching) where glad hands would be located. The sensor coverage is shown as a shaded area 4652 on the depicted trailer front 4510 in FIG. 46.

In operation, understanding the location of the trailer face bounds the search in the sensor data for the glad hand panel. In an exemplary embodiment, the sensor assembly 4610 can include exclusively a 2D color camera. Using acquired color images of the scene that includes the trailer 4500, the process identifies which image pixels are associated with the front face 4510 and which are background pixels. The front face is highly structured and tends produce prominent contrast-based edges using edge processing tools generally available in commercially available machine vision applications. From the edge information and the (typically) homogeneous color of the front truck panel, the trailer front face 4510 can be identified in the imagery.

In another exemplary embodiment, the sensor assembly 4610 includes a dense 3D sensing, which is used to detect the front face 4510 of the trailer 4500 using the known/ trained 3D geometric signature of the trailer face (for example, a rectangle of a given height and width ratio). The 3D sensing can be accomplished using a variety of arrangements including, but not limited to, stereo cameras, time-of-flight sensors, active 3D LIDAR, and/or laser displacement sensors. These 2D and/or 3D sensing modalities each return the generalized location and boundaries of the trailer front face, and potentially its range from a reference point on the truck.

Figure 47:
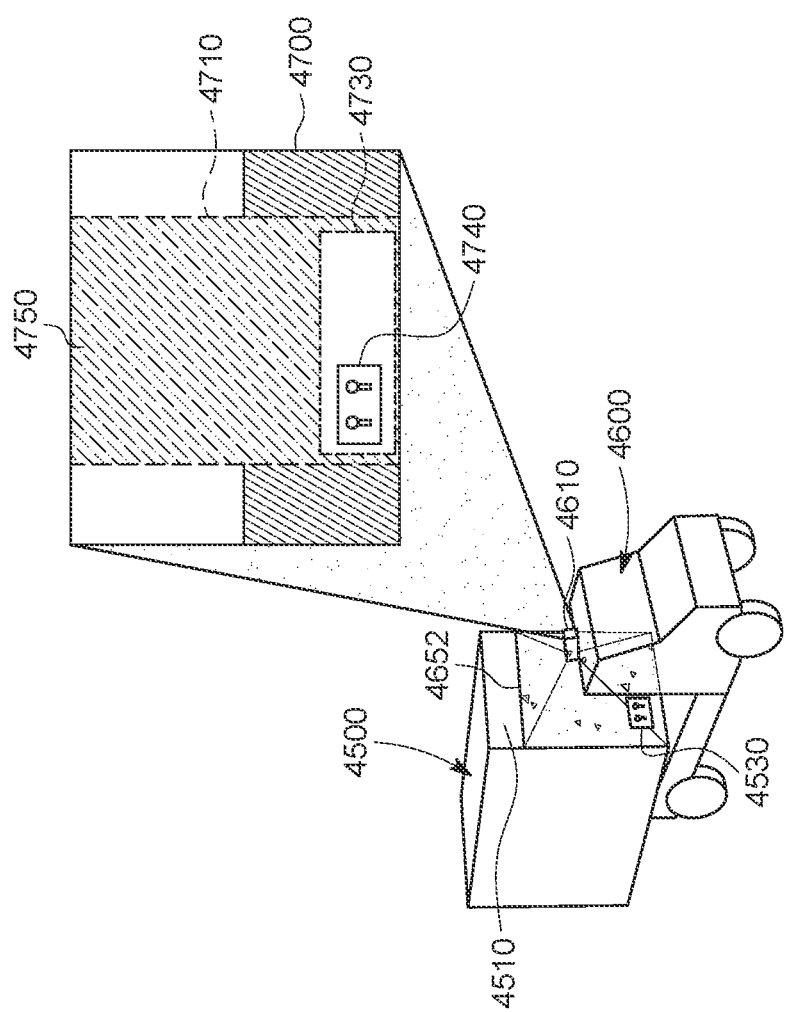
FIG. 47 is a diagram showing the acquired image(s) generated by the sensing assembly of FIG. 46 and the regions therein used to localize the glad hand panel.

After locating the trailer front face and bounding it, the next step in the gross detection procedure is locating the glad hand panel 4530 within the bounds of the trailer front face 4510. With reference to FIG. 47, the reduced search area 4710 comprising the image of the trailer front face 4510 is shown within the overall imaged scene 4700. Within the reduced search area 4710, the expected polygonal (e.g. rectangular) region of the glad hand panel 4740 is identified based on the knowledge that glad hand panels are situated at the bottom (dashed search box 4730) of the trailer front face.

Based upon identification of the outline/edges of the trailer front face within one or more acquired images, as described above, the gross detection procedure is completed as follows:

(a) A diverse color sampling of pixels is made for regions within the identified front trailer face but outside of the expected region where glad hands are situated (the color sample region 4750). This provides a color sampling of the background color characteristics of the trailer.

(b) The background color samples are then compared to the pixel colors within the expected search region (dashed box 4730) for glad hand panels 4740. Since glad hand panels are typically a different color/texture than the background trailer color, the glad hand pixels will produce a low color match response.

(c) Within the expected glad hand search region, the color match responses are thresholded and then grouped using (e.g.) a connected component analysis which will form groupings of pixels. The groupings represent possible glad hand locations.

(d) The groups of pixels are then analyzed for shape properties and groups are discarded that do not have a structured geometric rectangular shape. Additional shape attributes such as size and width-to-height ratio can be used to eliminate false glad hand panel detections. The remaining groups are the highest probability candidates for the glad hand panel.

(e) The shape attributes are also used to score the remaining group candidates. The group with the highest score has the greatest likelihood of being the glad hand panel.

(f) Optionally, in an embodiment in which dense 3D sensing is used, if there are still multiple high probability candidate regions for the glad hand panel, 3D geometric cues can be used to filter out false positive candidates based on the expected 3D characteristics of glad hands.

(g) The location/pose of the identified glad hand panel and associated glad hand(s) in an appropriate coordinate space—for example, a global coordinate space that is relevant to the truck's manipulator based upon calibration with respect to the sensor(s) 4610—is then for use in a fine localization process to be carried out by the robot manipulator in connecting to the glad hand.

(h) The manipulator and its associated end effector can be moved based upon gross motion data 4670 derived from the present location of the manipulator assembly versus the determined location of the glad hand panel 4530 and associated glad hands. This gross motion data 4670 is delivered to the gross motion actuators 4680 of the manipulator assembly, or otherwise translated into gross motion that places the end effector into an adjacent relationship with the glad hands/glad hand panel.

K. Fine Localization of Glad Hand Pose

Once a gross estimation of the glad hand (and/or glad hand panel) location is provided to the system, a sensor-based estimate of the glad hand connector location/pose is computed. As described further below, the robot manipulator contains a separate or integrated gross manipulation system that is adapted to place the connector-carrying end effector, which also carries an on-board fine localization sensor/camera into a confronting relationship with the located glad hand panel. Since the panel can be located anywhere on the trailer front face, the use of a gross manipulator system limits the effort and travel distance required by the fine adjustment actuators of the manipulator—thereby increasing its operational speed and accuracy in making a connection between the truck pneumatics (and/or electrics) and those of the trailer. Thus, after moving the manipulator into a gross adjusted position, the fine manipulation system is now in a location in which it can detect the glad hand pose on the panel. Any stored information already available from the gross position system on connector pose is provided to the fine system so that it can attempt to narrow its initial search. If this information is inaccurate, the search range can be broadened until the glad hand is located by the fine position system.

Figure 48:
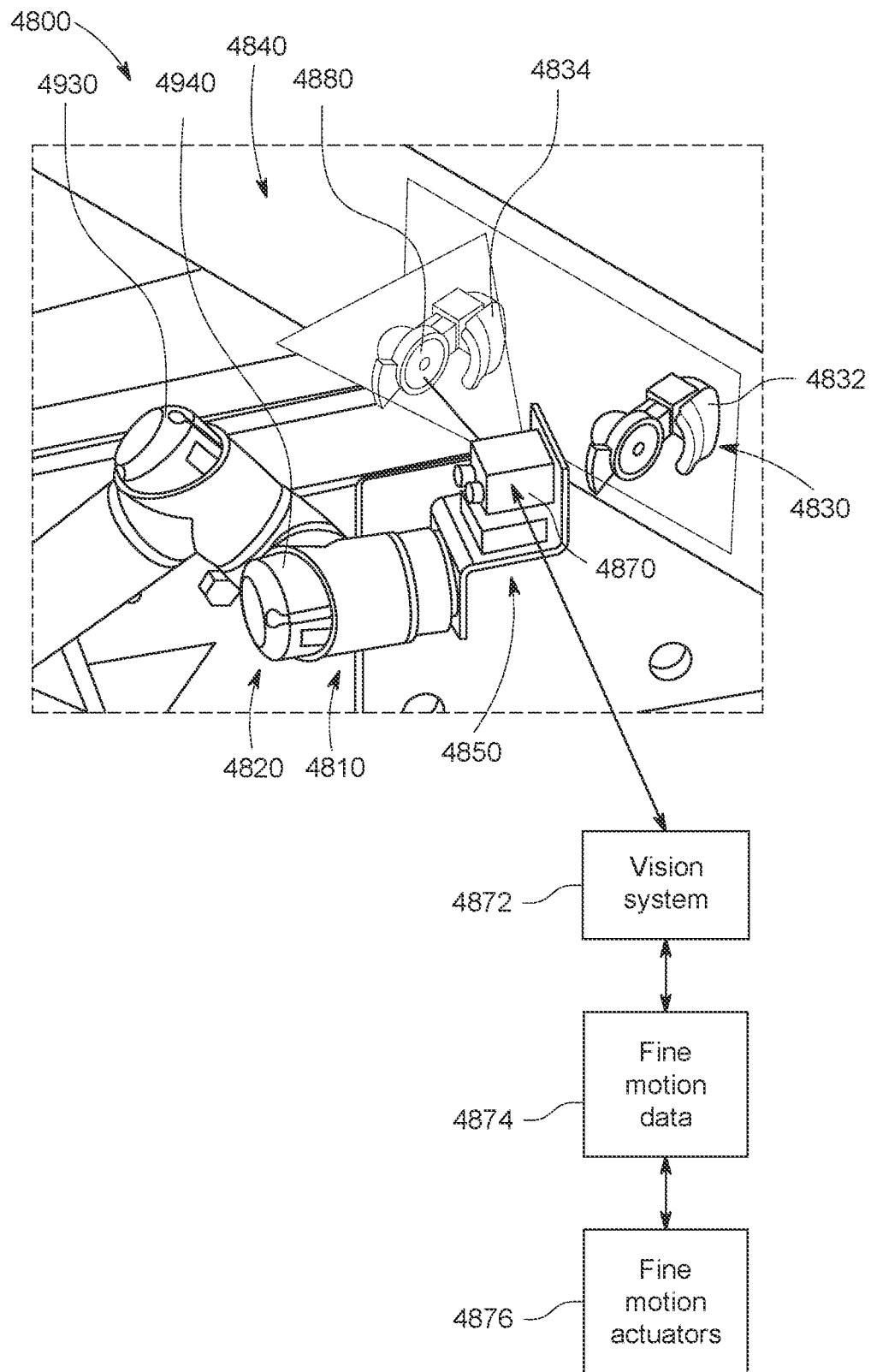
FIG. 48 is a diagram of a trailer hitched to an autonomous truck chassis, showing a fine position end effector mounted on the chassis of an autonomous truck generally in accordance with FIG. 46, having a fine sensing assembly located with respect to tend effector for guiding it to the glad hand of the trailer.
Figure 49:
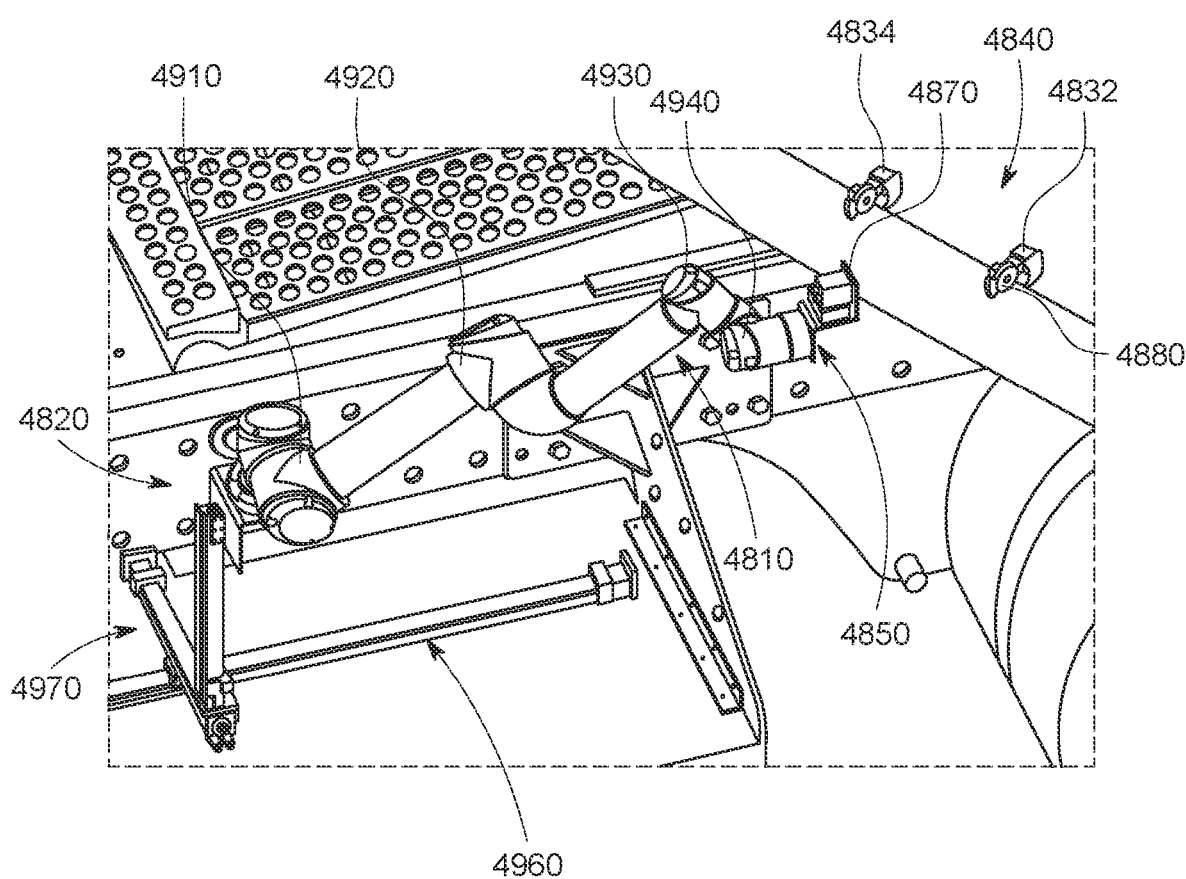
FIG. 49 is a multi-axis (e.g. three-axis) gross positioning assembly mounted on an autonomous truck chassis for moving a robotic arm manipulator and associated end effector so as to locate the end effector and a carried truck-based glad hand connector adjacent to a trailer glad hand panel located by the gross detection system.

Reference is now made to FIGS. 48 and 49 that show a multi-axis robot manipulator assembly 4810 mounted on an autonomous truck rear chassis 4820 in a confronting relationship with the glad hand panel 4830, and glad hand(s) 4832 and 4834 of a trailer front 4840. The trailer 4800 has been, or is being, hitched to the fifth wheel of the truck chassis 4810.

As described above, the robot manipulator assembly 4810 is a multi-axis, arm-based industrial robot in this embodiment. A variety of commercially available units can be employed in this application. For example, the model UR3 available from Universal Robots A/S of Denmark and/or the VS Series available from Denso Robotics of Japan can be employed. The robot includes a plurality of moving joints 4910, 4920, 4930 and 4940 between arm segments. These joints 4910, 4920, 4930 and 4940 provide fine motion adjustment to guide the end effector into engagement with the glad hand 4832. The base joint 4910 is mounted to the gross motion mechanism, which comprises a pair of transverse (front-to-rear and side-to-side) linear slides 4960 and 4970 of predetermined length, mounted and arranged to allow the manipulator end effector 4850 to access any location on the trailer front 4840 that may contain the glad hand(s) 4832 and 4834. The slides can allow the manipulator's base joint 4910 to move according to a variety of techniques, including, but not limited to screw drives, linear motors, and/or rack and pinion systems.

Notably, the end effector 4850 includes the fine motion sensor assembly/pod 4870 according to an embodiment. The sensor assembly 4870 is connected to a vision system and associated process(or) 4872 that can be all or partially contained in the assembly 4870, or can be instantiated on a separate computing device, such as one of the vehicle's onboard processor(s). The vision system can be the same unit as the gross system 4650 (FIG. 46), or can be separate. The gross and fine vision systems 4650 and 4872 can optionally exchange data as appropriate—for example, to establish a single global coordinate system and provide narrowing search data from the gross pose to the fine pose estimate. In general, the fine vision system generates fine motion data 4874 for use by the joints of the manipulator assembly 4810 and this data is transmitted in a manner clear to those of skill in robotic control, to the robot's fine motion actuators 4876. Note that the manipulator can also include force feedback and various safety mechanisms to ensure that it does not apply excessive force or break when moving and/or engaging a target. Such can include mechanisms for detecting human or animal subject presence so as to avoid injuring a subject. One or more of the below-described sensor types/arrangements, typically provided to the assembly 4870, mounted on, or adjacent to, the moving end effector 4850, can be used to finely determine glad hand pose, and servo the robot to that location via a feedback routine:

(a) A color or monochrome camera with motion control can be moved using the delivery motion control hardware to produce multiple image frames of the target area (the glad hands). The collection of frames has a known motion profile and stereo correspondence processing can be performed and coupled with the motion profile to triangulate image points to produce a three-dimensional range image.

(b) A fixed-baseline stereo camera can be defined by a single camera, in which movement of the end effector is replaced by two or more cameras separated by a fixed and known separation. Such an arrangement can be mounted on the end effector or another location, such as the base joint 4910, or the chassis itself. Stereo correspondence processing and triangulation steps are used to produce a three-dimensional range image.

(c) A structured light stereo camera can be used, comprising a single camera in conjunction with an infrared (IR) light pattern projector with a known relative pose to the camera. The stereo correspondence processing incorporates the known projected pattern to simplify the processing and permit more dense coverage of the untextured surfaces of the glad hand. A triangulation process is used to produce a three-dimensional range image.

(d) A near IR camera can be used with a near IR filter to take advantage of near IR illumination. Using a near IR illumination will exaggerate the contact between the rubber gasket in the glad hand and the rest of the glad hand structure and background (as described below).

(e) A short-range laser ranger can be used to provide additional distance information of the glad hand.

(f) Additionally, artificial lighting can also be mounted on the end-effector 4850 to allow the vision sensor in the assembly 4870 to image the glad hand in virtually any lighting or weather conditions. The lighting can be in the visible spectrum or can be in the near IR spectrum (or another spectrum or combination of spectrums) to enhance glad hand gasket detection.

(g) The sensor assembly 4870 can also include other forms of distance-measuring devices, such as time of flight sensors to enhance range measurement between the end effector 4850 and glad hand(s) 4832 and 4834.

Figure 50:
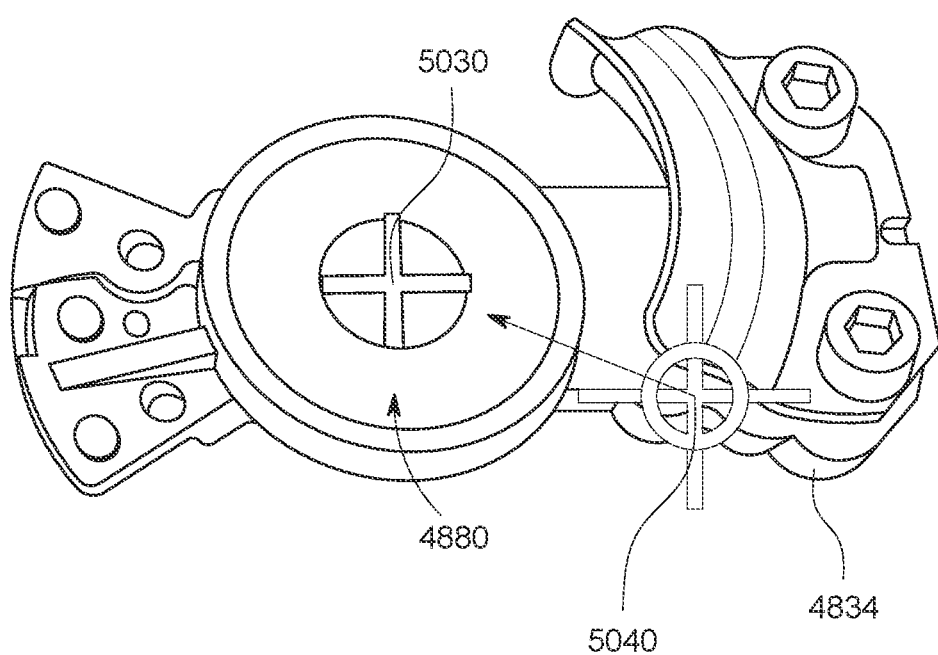
FIG. 50 is a diagram of an image of a trailer glad hand used by the fine sensing system to determine pose for use in servoing a robotic manipulator end effector and associated truck-based glad hand connector into engagement with the trailer glad hand.

One method for fine detection of the glad hand pose is by using machine vision to image and analyze the circular rubber gasket 4880. This gasket 4880 has sufficient contrast to the glad hand and surrounding structure that may be reflected in the camera imagery. The tracking of the rubber gasket 4880 by the fine sensor 4870 can provide a significant amount of information on the glad hand's position relative to the end effector 4850. FIG. 50 shows how the detected rubber gasket 4880 of the exemplary glad hand 4834 is used to generate fine motion control commands for the end effector 4850 to align with the gasket 4880. Since the rubber gasket 4880 is typically annular, with a circular inner and outer perimeter, it can be used to estimate angular offset of the end-effector relative to the (e.g.) center/centroid 5030 of gasket 4880 based on the skew (image center 5040) of the extracted shape in the imagery (which translates into an ellipse defining a particular major and minor axis in an acquired 2D image). The rubber gaskets on glad hands are also typically a standard size, so that the dimensions of the extracted gasket in the imagery can provide a metric of the relative distance/range to the gasket, which can also be used to determine the relative location of the center of the glad hand. A short-range laser ranger (beam 4890) can be provided in the sensor assembly 4870 and used to provide a second measurement of the end-effector range to the glad hand.

Figure 50A:
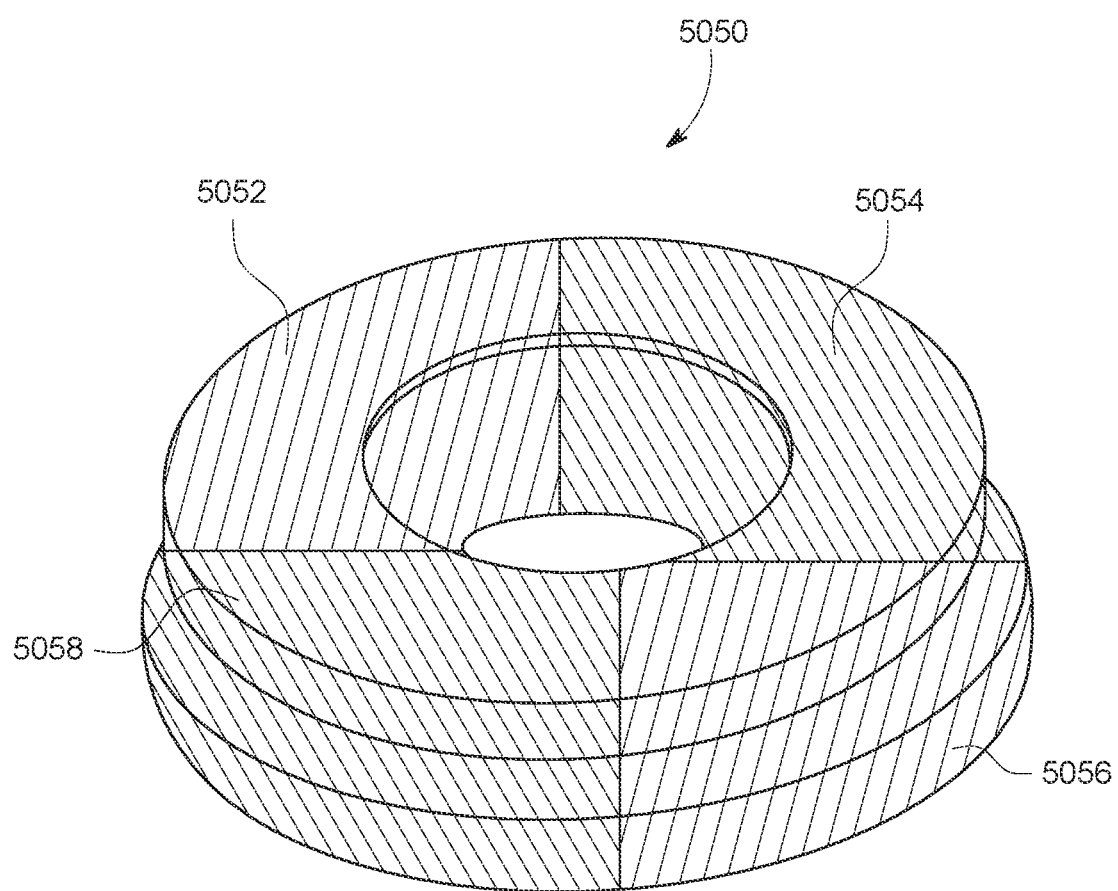
FIG. 50A is a perspective view of an exemplary glad hand gasket with features to enhance autonomous identification, location, and pose of the glad hand gasket.

Another related option for glad hand detection and ranging via the glad hand gasket is to create a custom molded glad hand seal with characteristics that aid in the goal pose identification process. This seal can be impregnated with additive material during polymeric curing, such as magnetic particles, UV reactive particles, or molded to assume a shape or texture that has other visual based feature (colors, patterns, shapes, markers, etc.) that would aid in pose identification through a variety of methods. FIG. 50A is a perspective view of an exemplary glad hand gasket with features to enhance autonomous identification, location, and pose of the glad hand gasket. The glad hand gasket can have different regions with different features so that the system can easily identify the glad hand gasket by these features. As shown in FIG. 50A, the glad hand gasket can have four distinct identification regions 5052, 5054, 5056, and 5058, although it should be clear that a gasket can have more or fewer than four identification regions. The identification regions 5052, 5054, 5056, and 5058 can include different colors in various regions, magnetic particles in various regions, UV reactive particles in various regions, and/or other features to aid in the location and pose identification process.

Figure 51:
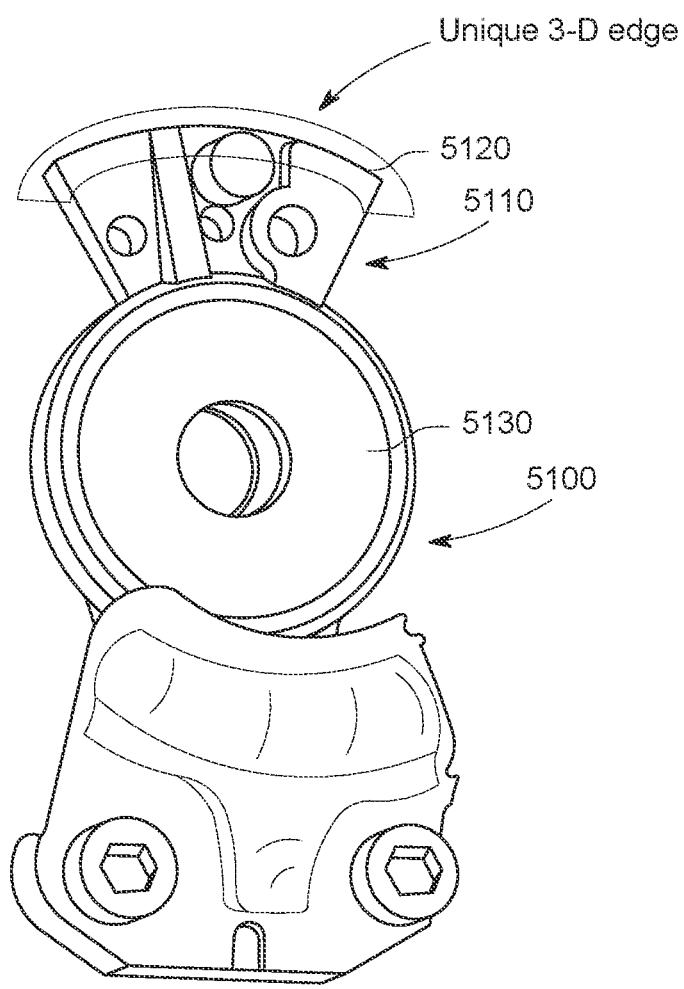
FIG. 51 is a diagram of a conventional trailer glad hand depicting the unique edge of a flange used to identify the pose of the glad hand by the autonomous truck manipulator sensing assembly.

Another method for detecting the glad hand pose is by employing a three-dimensional range image. By way of non-limiting example, the edge 5120 of the unique adapter plate 5110 of the exemplary glad hand 5100, as shown in FIG. 51, can be identified by the fine motion system using three-dimensional shape matching. One exemplary algorithm, which allows identification of this feature, is based upon Iterative Closest Point (ICP) algorithm, relying in part upon constraints related to the consistent geometry of that edge 5120 relative to the glad hand seal 5130. This enables an estimate of the relative position and orientation (pose) of the glad hand seal 5130 for fine positioning. See, by way of useful background information, Besl, P. and N. McKay, *A Method of Registration of 3-D Shapes*, IEEE Transactions on Pattern Analysis and Machine Intelligence, vol. 14, no. 2, February 1992, pp. 239-256.

Figure 52:
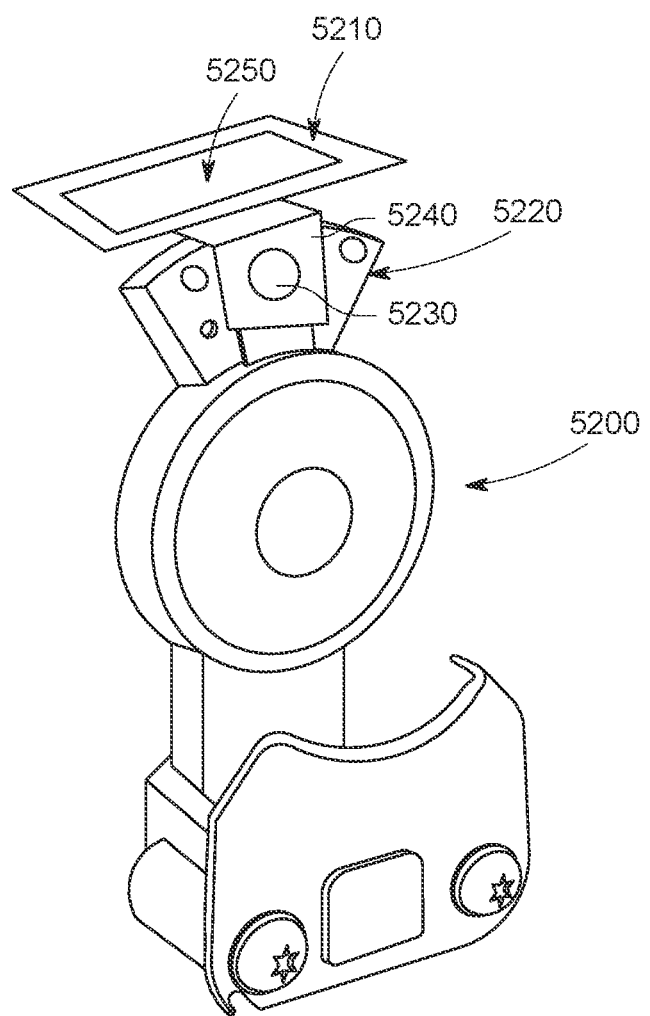
FIG. 52 is a diagram of a conventional glad hand provided with a unique tag used to identify the pose of the glad hand by the autonomous truck manipulator sensing assembly.

In another embodiment, as shown in FIG. 52, a rectangular tag 5210 can be affixed to the exemplary glad hand 5200. This tag 5210 can be located at any position on the glad hand framework that is typically visible to the fine sensor assembly. In this embodiment, it is mounted on the outer end of the adapter plate 5220 using a spring-loaded base 5240. In this example a hole in the base engages a raised cylindrical protrusion 5230 to secure the base 5240 to the adapter. Adhesives, fasteners or other attachment mechanisms can be used as an alternative or in addition to the depicted arrangement in FIG. 52. The tag 5210 provides a visual (or other spectral) reference for simplifying and improving the accuracy of the glad hand fine pose estimate by the sensor assembly. The tag 5210 can be removably attached to the glad hand using the depicted clip base 5240, or other attachment mechanism, so as to provide repeatable positioning of the tag relative to the underlying, associated glad hand. The exposed (i.e. outer) surface of the tag 5210 can define a high-contrast rectangle (or other polygonal and/or curvilinear) of known/stored dimensions. The features of the tag can be extracted by the sensor assembly and associated vision system using thresholding of the observed intensity. The extracted image pixel coordinates can be related to the planar physical dimensions of the tag using a homography (transformation) in accordance with known techniques. This transformation provides the rotation and translation of the tag relative to the sensor's coordinate space. The known transformation between the sensor and delivery coordinate frame and the known transformation between the tag and the glad hand coordinate frame enables an estimate of the glad hand pose for fine positioning.

Figure 53:
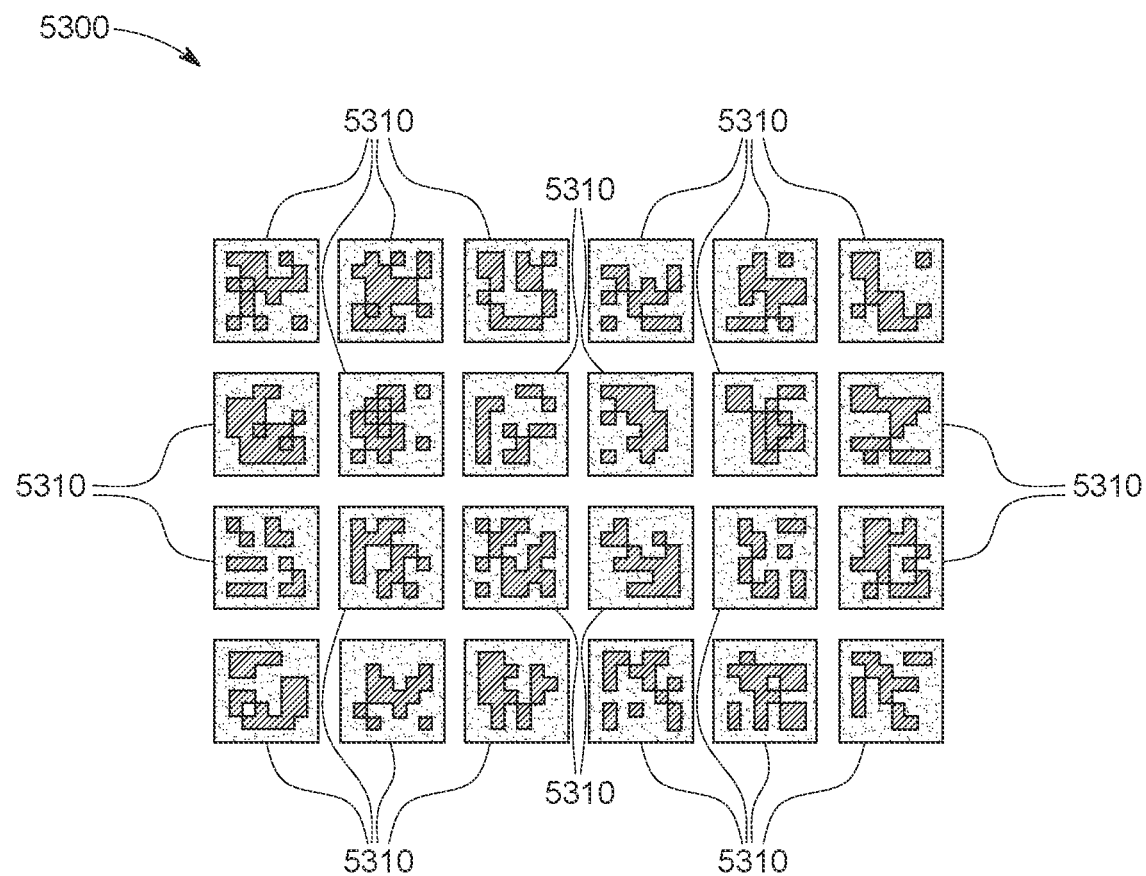
FIG. 53 is a diagram of a unique fiducial-based identifier that can be applied to the surface of the tag of FIG. 52.

An alternative to a single high contrast rectangle for use as the tag 5210 is the use of a visual marker/fiducial embedded within the bounded (e.g. rectangular) area 5250 of the tag 5210. Examples of this type of marker 5300 are depicted in FIG. 53. The advantage offered by this visual marker is more robust detection and homography estimation in degraded environments or when a portion of the tag is occluded. The generation of this form of visual tag and the detection and pose estimation is known in the art and described generally in Garrido-Jurado, S. et al., *Automatic generation and detection of highly reliable fiducial markers under occlusion*, Pattern Recognition, vol. 47, Issue 6, June 2014, pp. 2280-2292; and on the World Wide Web at the Software Repository: https://sourceforge.net/projects/aruco/files/?source=navbar. As shown the marker 5300 can comprise a matrix of 2D ID (barcode) patterns 5310, which provide specific information on the identity, characteristics and/or positioning of the glad hand, as well as other relevant information—such as the identity of the trailer, its extents and characteristics. In alternate embodiments, the tag can define 3D shapes and/or features (for example a frustum) that allow a 3D sensor to more accurately gauge range and orientation of the glad hand.

Visual servoing can be used to achieve proper positioning for a mating operation between the end-effector-carried glad hand/connector and the trailer glad hand. The end effector can be controlled using proportional velocity control under operation of a control loop receiving pose information from the fine vision system 4872. As the sensor's acquired image of the glad hand rubber gasket 4880 gets closer to the desired target position, the commanded velocities of the manipulator joints driving end effector converge to zero, at which point the end-effector is aligned with the glad hand, and ready to perform the mating operation.

A blind movement (rotation about an axis passing through the glad hand gasket centroid) can be used to mate the end effector to the trailer glad hand. That is, once the glad hand location and pose are understood by the fine vision and manipulator system, a blind movement of the end-effector along the estimated normal to the glad hand can occur, making the final physical contact to the glad hand. The move is typically (but not necessarily) blind because the sensors are too close to the target glad hand to produce useful information.

In general, and as described below, once the truck connector (e.g. glad hand) is mated fully to the trailer glad hand, the end effector releases its grip upon the truck glad hand via an appropriate release motion. The motion is dependent upon the geometry of the end effector grasping mechanism. A variety of grasping mechanisms can be employed, and can be implemented in accordance with skill in the art. After releasing the glad hand, the end effector can return to a neutral/retracted position based upon motion of both the fine and gross motion mechanisms to an origin location.

As with other embodiments described herein, the release of the mated truck glad hand from the trailer glad hand can be performed in a similar manner to attachment. The end effector is moved to a gross location and then the fine sensor servos the end effector to the final position in engagement with the mated truck glad hand. The end effector then grasps the truck glad hand, blindly rotates it to an unlocked position and it is withdrawn to the origin.

L. Gross Manipulation Systems and Operation Thereof

As described above, the end effector carrying the glad hand or other truck-based pneumatic (and/or electric) connector can be moved via the manipulator assembly in an initial, gross movement that places the end effector relatively adjacent (and within fine sensor range of) the trailer glad hand(s). Thereafter, the relatively adjacent end effector is moved by the fine manipulation system into engagement with the trailer glad hand.

A gross manipulation system is also desirable if the fine manipulation system lacks the ability to reach glad hands when the trailer is at an angle relative to the truck. The gross manipulation system generally operates to move the fine manipulation system within reach of the trailer glad hands. In operation, the gross manipulation/movement system can have one-two or three axes of motion along sufficient distance(s) to locate the end effector in contact with the trailer glad hand(s) at any expected location along the trailer front face and/or at any pivotal orientation of the trailer with respect to the truck chassis. A generalized gross manipulation system can include: (a) a frame, comprising a structure that is mounted to the yard truck; (b) a platform where the fine manipulation assembly is integrated; (c) an x-axis manipulation mechanism that moves the fine manipulation system in the x-direction (i.e. front-to-rear of the vehicle); (d) a y-axis manipulation assembly that moves the fine manipulation system in the y-direction (side-to-side of the vehicle); and (e) a z-axis manipulation assembly that moves the fine manipulation system in the z-direction (vertically with respect to the ground).

Figure 54:
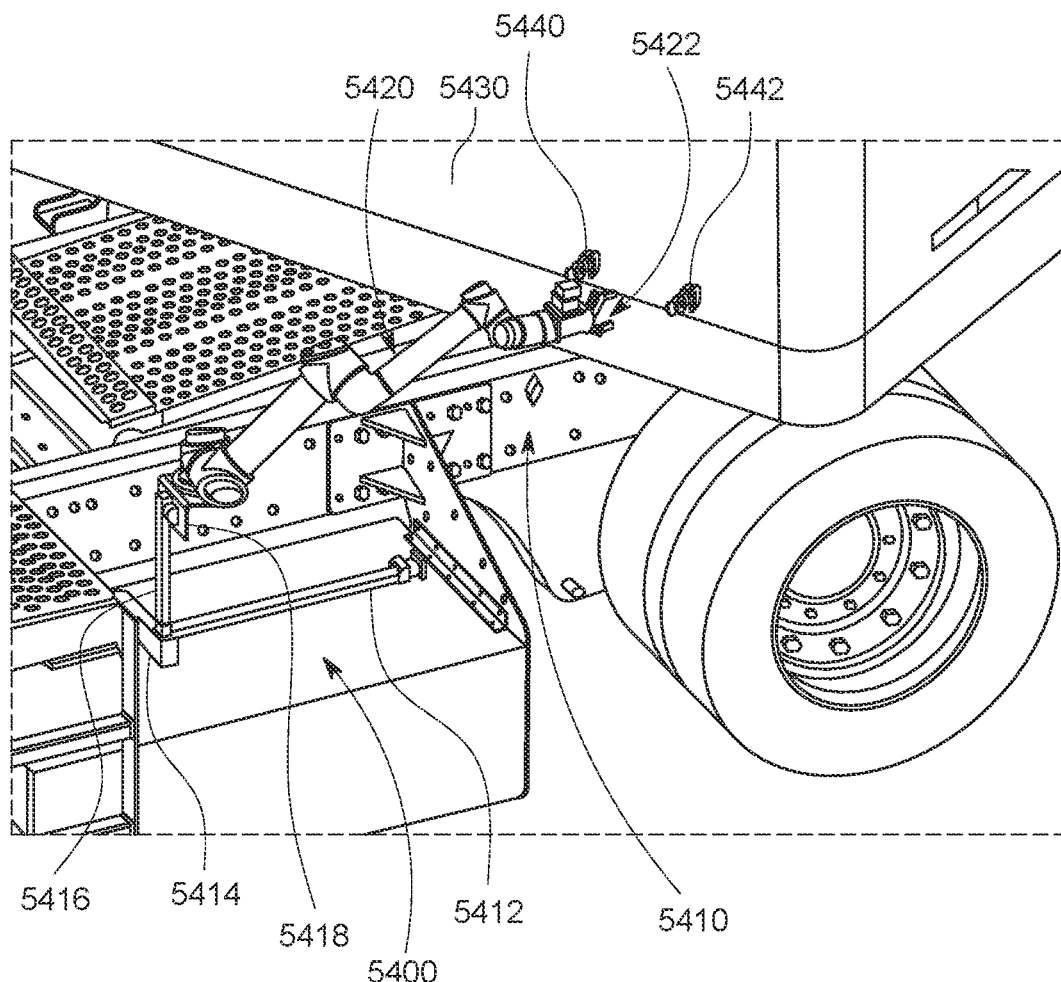
FIG. 54 is a diagram of a trailer hitched to an autonomous truck chassis, showing a multi-axis gross manipulation system carrying fine manipulator robotic arm according to an embodiment.

One embodiment is a 3-axis gross manipulation system 5400 is shown in FIG. 54, located on the side of the autonomous truck chassis 5410. This system 5410 includes an x-axis rail or slider 5412, a y-axis rail/slider 5414 and a z-axis rail/slider 5416. The base 5418 of the robotic manipulator (the depicted multi joint arm assembly) 5420 rides vertically along the z-axis rail/slider 5416, whilst the z-axis rail travels laterally along the y-axis rail/slider 5414. In turn, the y-axis rail slider travels front-to-rear along the x-axis rail/slider 5412, thereby affording the arm base 5418 full three-dimensional gross movement within the range (length) of each rail/slider. Use of a multi-axis system improves the overall motion range for the robotic manipulator arm 5420, and thereby allows the arm's end effector 5422 to reach a larger range of trailer pivot angles and glad hand locations along the trailer front face 5430, including the depicted glad hands 5440 and 5442.

Figure 55:
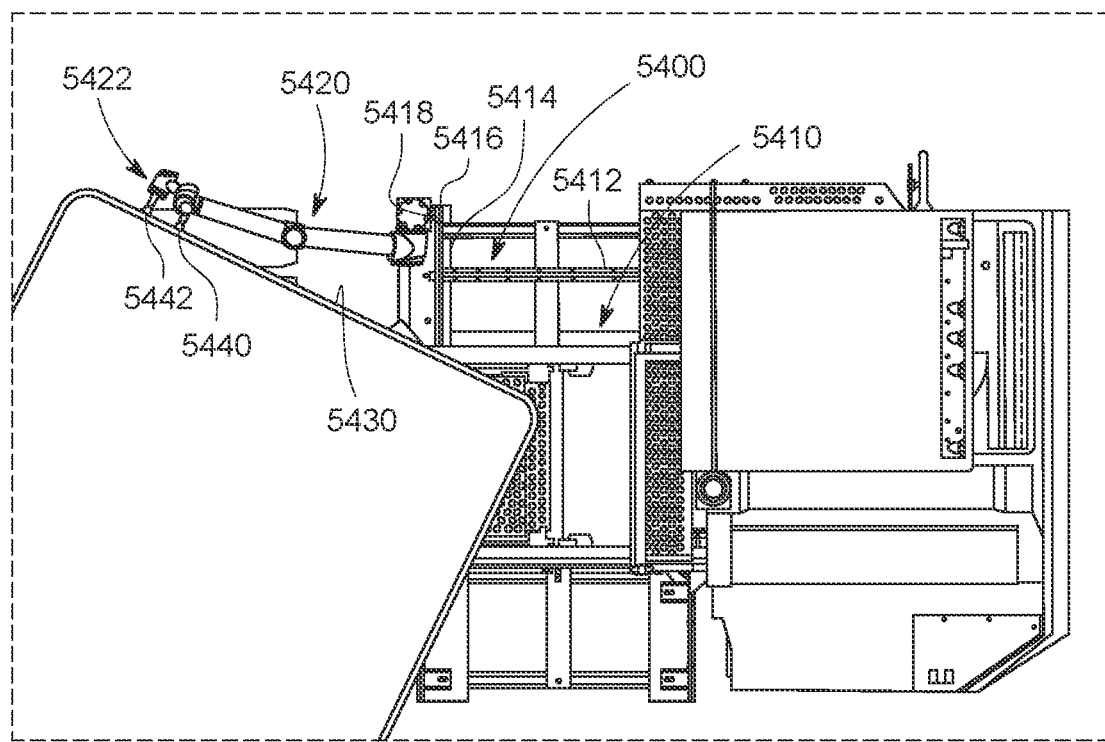
FIG. 55 is a top view of the trailer and autonomous truck of FIG. 54, showing the trailer at a pivot angle on its hitch, in which the gross manipulation system is locating the fine manipulator so that its end effector can reach the trailer glad hand panel.
Figure 56:
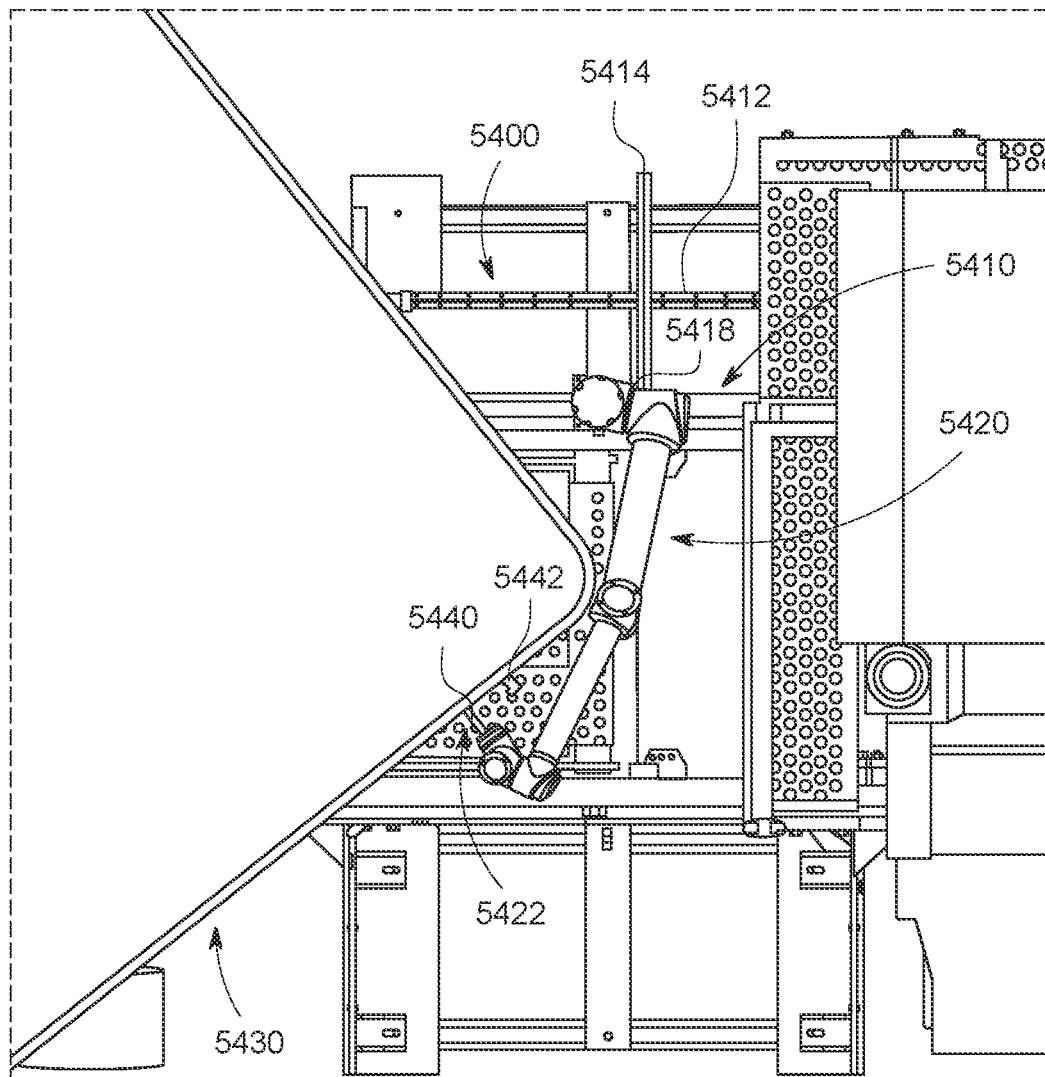
FIG. 56 is a top view of the trailer and autonomous truck of FIG. 54, showing the trailer at another, opposing pivot angle relative to FIG. 55, in which the gross manipulation system is locating the fine manipulator so that its end effector can reach the trailer glad hand panel.

The improved gross motion range provided by the exemplary 3-axis system 5400 is exemplified in FIGS. 55 and 56. In FIG. 55 the trailer front face 5430 is pivoted with respect to the truck chassis at a steep angle that places the trailer glad hands 5440 and 5442 at a distant rearward angle. The manipulator arm base 5418 is moved rearward and leftward on the x-axis rail/slider 5412 and y-axis rail/slider 5414, respectively, to a nearly maximum distance. This allows the end effector 5422 to reach the glad hand(s) 5440 and 5442, even at the extreme geometry depicted. Likewise, in FIG. 56, the trailer front face 5430 is pivoted at an opposing steep angle. In this example, the manipulator arm base 5418 is moved to a slightly forward and rightmost position by the x-axis rail/slider 5412 and y-axis rail/slider 5414, respectively, allowing the end effector 5422 to reach the glad hands 5440 and 5442, which now reside further forward and centered on the chassis, when compared to FIG. 55. The exemplary multi-axis gross manipulation system 5400 can contain one or more of the linear actuation devices described above (e.g. linear motors, lead screws, rack and pinion gears, etc.). Note that the vertical position of the base 5418 along the z-axis rail/slider 5416 is chosen to make the arm appropriately level with the height of the glad hands 5440, 5442. The height/level of the base 5418 may differ from the actual glad hand height to allow for bends in certain manipulator arm joints.

Figure 57:
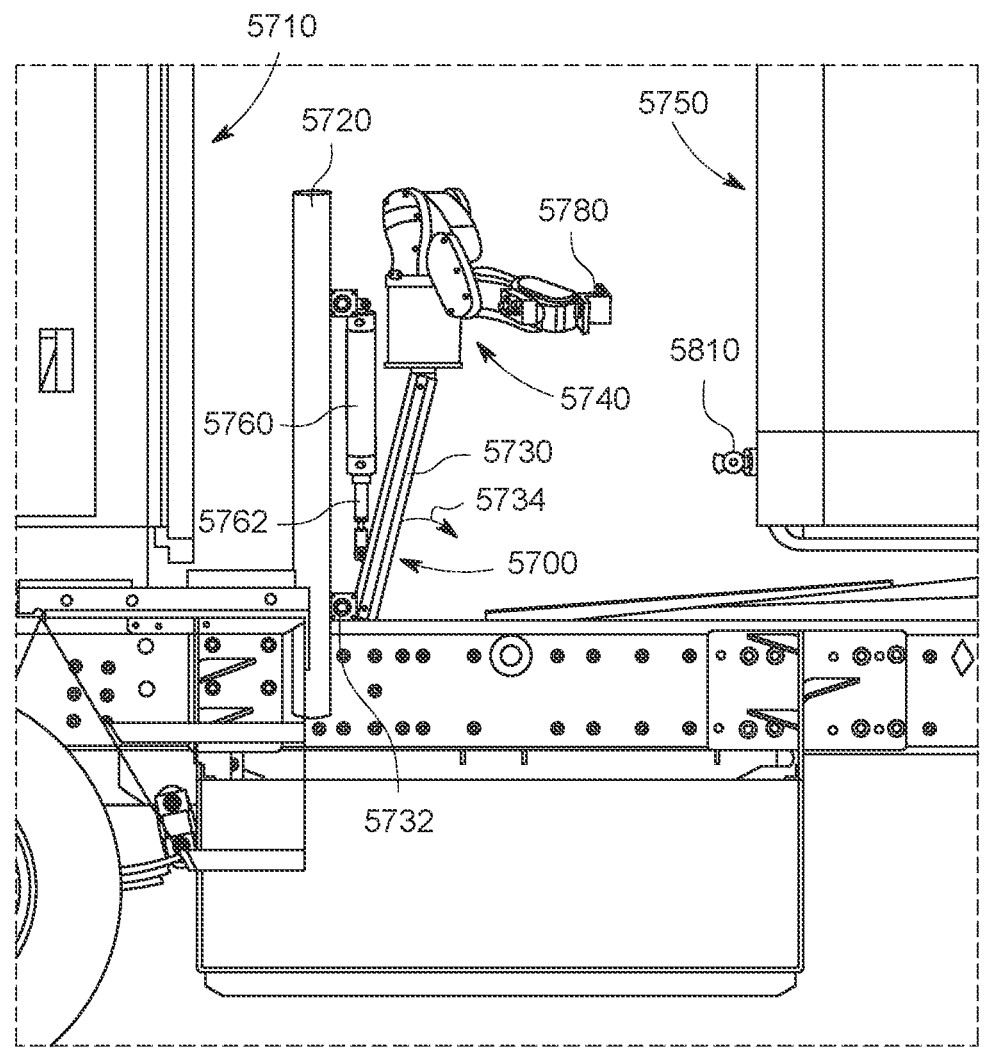
FIG. 57 is a side view of a trailer hitched to an autonomous truck chassis, showing a multi-axis gross manipulation system carrying fine manipulator robotic arm, in which the manipulator system is mounted on a piston-driven, hinged platform in a stowed orientation on the truck chassis, according to another embodiment.
Figure 58:
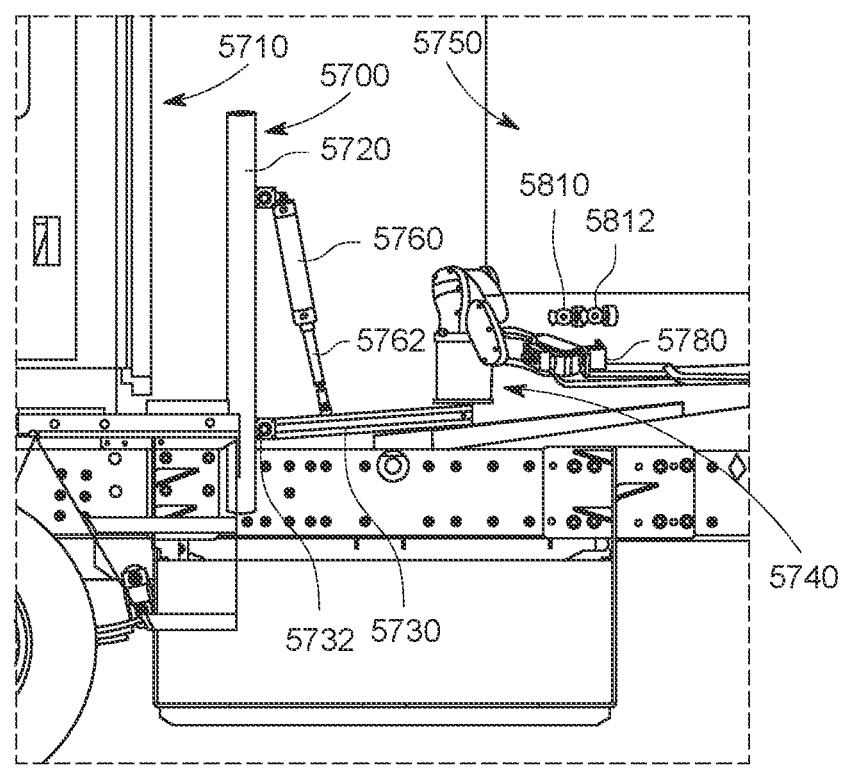
FIG. 58 is a side view of the trailer and autonomous truck of FIG. 57, showing the piston-driven, hinged platform in a deployed orientation on the truck chassis.

Another embodiment of a gross manipulation system 5700 is shown in FIG. 57. In this arrangement, the system is mounted on an upright frame 5720 behind the cab 5710 of the autonomous truck. A platform 5730 is mounted on a hinge 5732. The platform supports the fine manipulation system 5740 at a top end and is adapted to pivot downwardly on the hinge 5732 to adjustably extend (curved arrow 5734) the fine manipulation system 5740 toward the trailer front face 5750. This pivotal extension can be accomplished using (e.g.) any acceptable linear actuator described above. In the depicted exemplary embodiment, a fluid (e.g. hydraulic or pneumatic) piston 5760 is used to extend and retract the hinged platform 5730. The piston is pivotally mounted between the upright frame 5720 and the hinged platform 5730. Extending the piston ram 5762 causes the platform 5730 to hinge downwardly, as shown in FIG. 58. This moves the manipulator arm system 5740 closer to the trailer front face 5750. When the ram 5760 is retracted into the piston 5760, as shown in FIG. 57, the manipulator arm system 5740 is retracted upwardly and towards the cab 5710. This takes it out of interference with the trailer when not in use. The piston 5760 and hinged platform 5730 effect coordinated motion along the x-axis and z-axis directions. The geometry of the platform and motion characteristics of the arm are coordinated in the overall design so as to allow the end effector 5780 to access the glad hand(s) 5810 and 5812 in a range of possible positions and trailer orientations. While not shown, the hinge axis 5732 (or another element in the system 5700) can include a y-axis slider/rail (e.g. a lead screw, linear motor or rack and pinion system that facilitates y-axis (side-to-side) movement). In an exemplary embodiment, the y-axis assembly can be electromechanically driven, while the x/z-axis assembly can be fluid-driven (hydraulic/pneumatic).

It is contemplated in another embodiment that the gross manipulation mechanism can be part of a separate vehicle. This separate vehicle can be manually driven or comprise an autonomous robotic vehicle (not shown)—which can be similar to those commercially available from a variety of vendors for use in hazardous environments, etc. A fine manipulation arm assembly is mounted on the vehicle/robot. The vehicle/robot can move along the truck length and provide fine manipulation access to the truck hoses and trailer glad hands. The separate vehicle can communicate with the yard truck and/or the system server and execute an attach or detach command as desired.

M. Systems for Fine Manipulation and Delivery of a Truck Glad Hand

Upon sensing of the glad hand location on the trailer front face, a combination of fine and/or gross manipulation system can be used to connect the manipulated truck glad hand interface onto the fixed position trailer glad hand. The fine manipulation system is used in accordance with the sensor-based glad hand perception system described above (see Section K).

Figure 59:
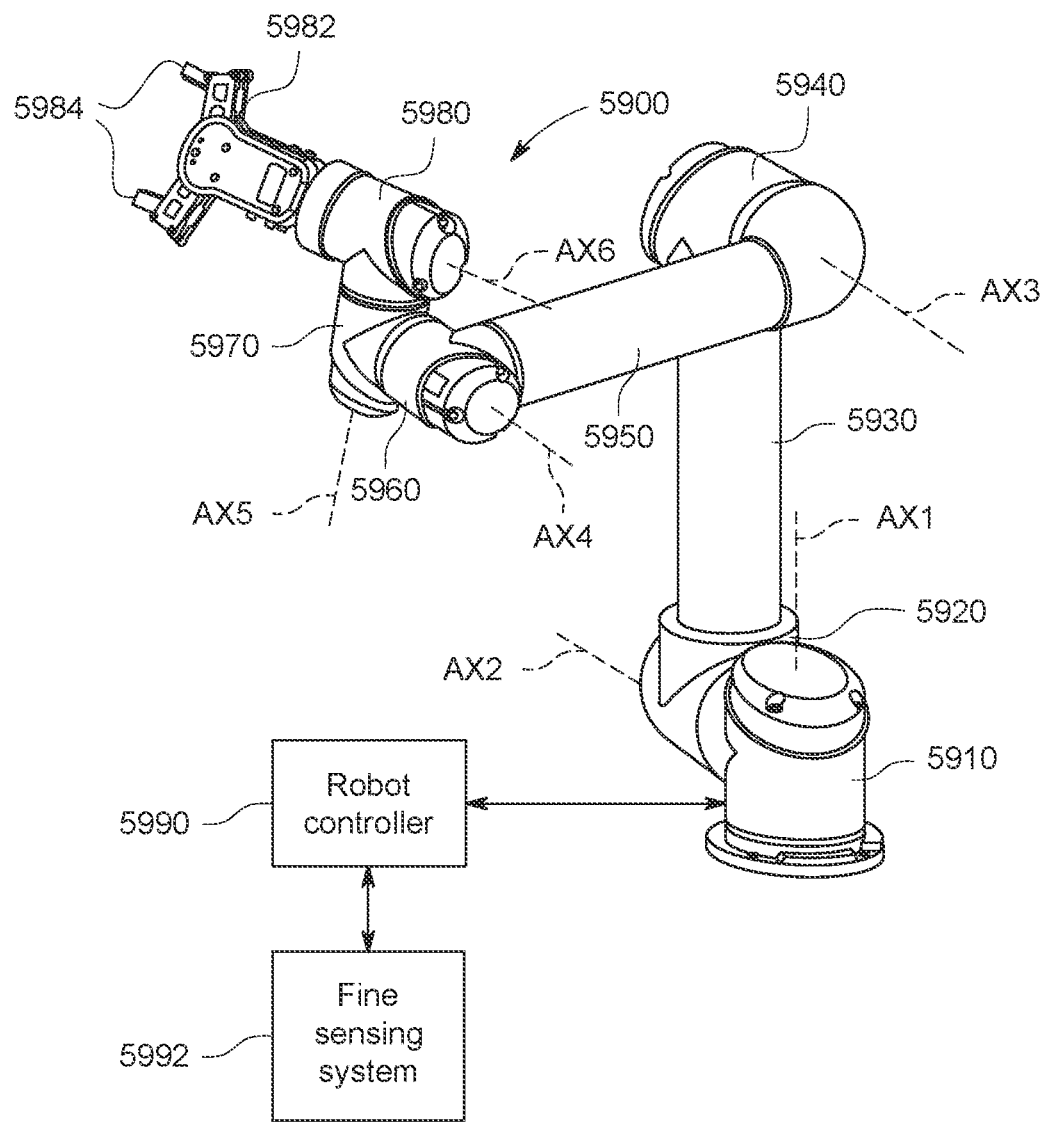
FIG. 59 is a perspective view of a multi-axis (e.g. 6-axis) fine manipulation robotic arm assembly and associated end effector for use in manipulating a truck-based trailer glad hand connector according to various embodiments herein.

An embodiment of this fine manipulation system consists of a tightly controllable, multi-axis robotic manipulator (multi joint arm) that can compensate for variations in trailer pivot angle with respect to the truck, glad hand position on the trailer front face, glad hand angle with respect to the plane of the trailer front face, and overall trailer height. The system is capable of depositing/releasing and grasping/retrieving the glad hand interface. The multi-axis manipulator system can contain any or all modalities for linear travel including electro-mechanical actuation, in which one or more electric motors are used to move the system components, such motors can include integrated or integral motion feedback devices (e.g. stepper motors, encoders, etc.) that allow the robotic controller to monitor motion with respect to a given coordinate space. An example of such an electromechanical manipulator system is shown in FIG. 59. The depicted, tightly controllable, 6-axis robotic arm 5900 can be commercially sourced from, a variety of vendors, including Universal Robotics and Denso, described above. The manipulator arm 5900 includes a base 5910 that is attached to an appropriate platform (such as a gross manipulator, described above). The base can rotate a first transverse joint 5920 about a first vertical axis AX1. The first joint 5920 rotates about a second, transverse axis AX2 so as to swing an elongated arm segment 5930 through an arc. On the distal end of the arm segment 5930 is mounted another joint 5940 that rotates about a transverse axis AX3 to swing an interconnected arm segment 5950 about an arc. The distal end of the arm segment 5950 includes three joints 5960, 5970 and 5980 that rotate the end effector 5982 about three orthogonal axes AX4, AX5 and AX6 in the manner of a wrist. The end effector 5982 can include a variety of actuated mechanisms, including the depicted gripper fingers that move into and out of a grasping configuration. In embodiments a specialized end effector can be used to grasp and release the truck's glad hand interface. The end effector 5982 can be actuated using electrical, pneumatic or hydraulic motive force under control of the robot controller 5990 (that also moves and monitors the joints 5910, 5920, 5940, 5960, 5970, 5980). Alternatively, a separate controller that also communicates with the fine sensing system 5992 can actuate the end effector.

In alternate embodiments, the robotic arm manipulator can define a differing number of motion axes, as appropriate to carry out the desired grasping and releasing tasks. In further alternate embodiments, some or all of the manipulator motion elements can be operated with differing mechanisms and/or motive forces including, but not limited to, hydraulic actuation, using hydraulic pressure to extend or retract a piston in a cylinder and/or pneumatic actuation, using air pressure to extend or retract a piston in a cylinder.

N. Glad Hand Interface Mechanisms and Operational Methods

As described above, various mechanisms can be used to create a pressure-tight connection between the truck pneumatic (and/or electric system) and a fully or substantially conventional glad hand mounted on the trailer front face. Some implementations of a connection mechanism/interface employ a similarly conventional glad hand geometry on the truck pneumatic line, while other implementations utilize a modified connection.

One system entails modification of the truck glad hand to provide a favorable interface that allows for leverage and integration with a robotic end effector to twist and lock the glad hand into place. The system is composed of (a) a conventional glad hand connector on the trailer; (b) a glad hand adaptor, which includes a mechanism to connect the glad hand to a lever; (c) a lever, consisting of a long extension to provide favorable leverage to twist the glad hands into place; and (d) an end effector interface that provides a location for an end effector to grasp and pivotally move the lever.

Figure 60:
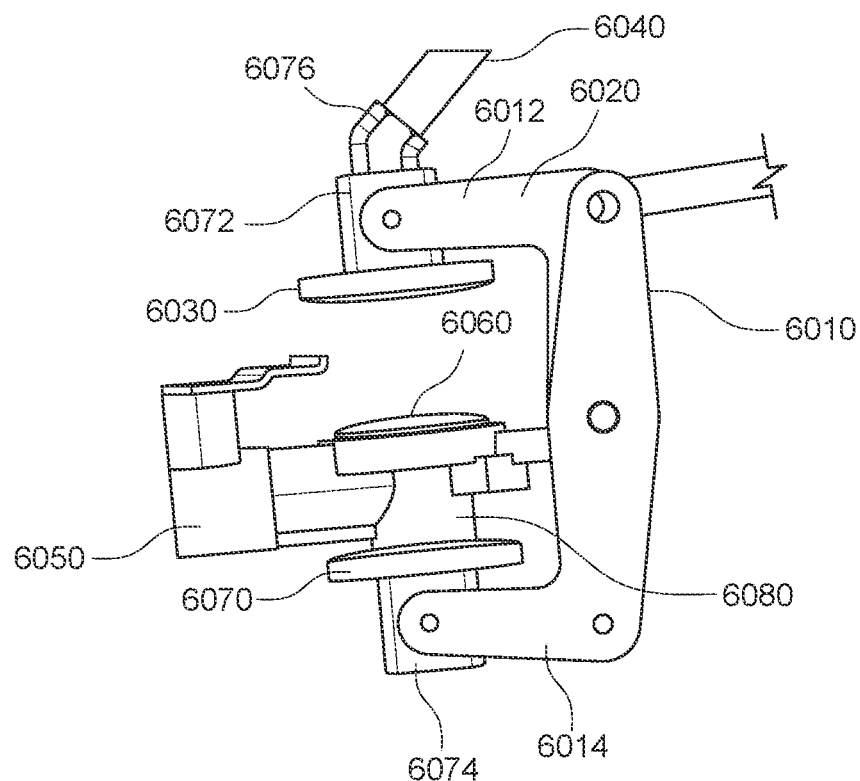
FIG. 60 is a fragmentary side view of a truck-based glad hand connection employing a clamping action in response to an associated actuator, shown in an open orientation with respect to a trailer glad hand.
Figure 60A:
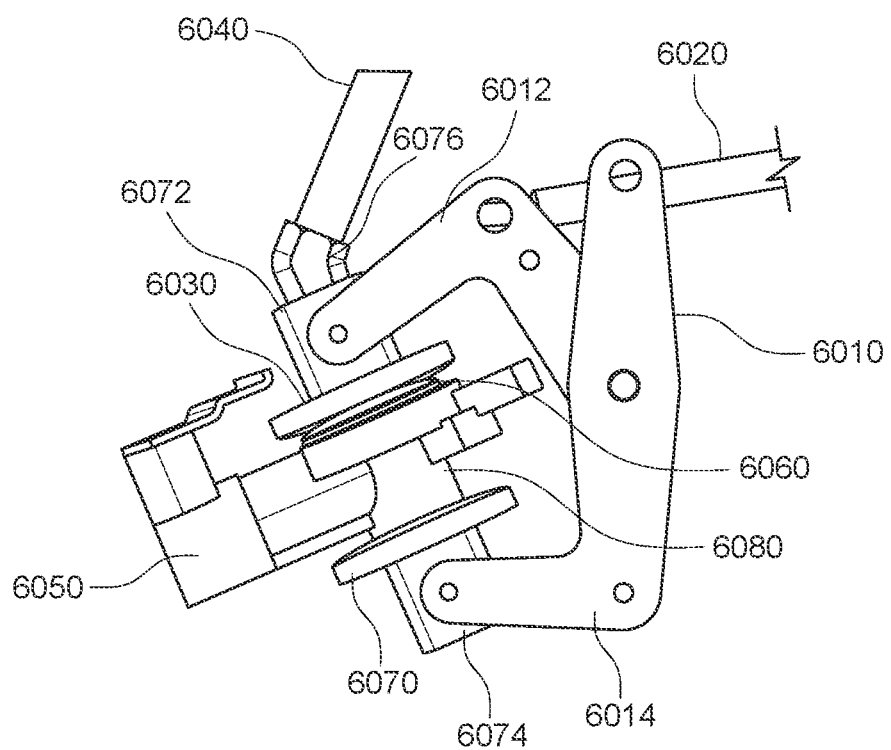
FIG. 60A is a fragmentary side view of the truck-based glad hand connection of FIG. 60, shown in a closed/engaged orientation with respect to the trailer glad hand.

An alternate technique, shown generally in FIGS. 60 and 60A, employs a clamp 6010 with an actuator 6020 that provides consistent force and seals the glad hand face. A rotary actuator or linear actuator can provide linear force to close the clamp from an opened, disengaged position (FIG. 60) to a closed, sealed position (FIG. 60A), in which top clamp pad 6030 is annular and is connected to a truck pneumatic line 6040. The pad confronts, and seals against, the trailer glad hand 6050 and associated seal 6060. More generally, the bottom clamp pad 6070 bears against the central barrel 6080 of the trailer glad hand 6050. The body of the clamp 6010 is composed of two pivotally jointed L-shaped sections 6012, 6014, each carrying a respective clamp pad 6030, 6070. The clamp pads 6030, 6070 are, likewise, carried on respective pivoting bases 6072, 6074. The upper base 6072 receives a threaded connector 6076. Clamping action by the actuator is used to pressurably engage and disengage the trailer glad hand 6050. In an alternate embodiment, a rotary actuator can be employed instead of the depicted linear actuator, which serves to drive a led screw that clamps and unclamps the arrangement.

Figure 61:
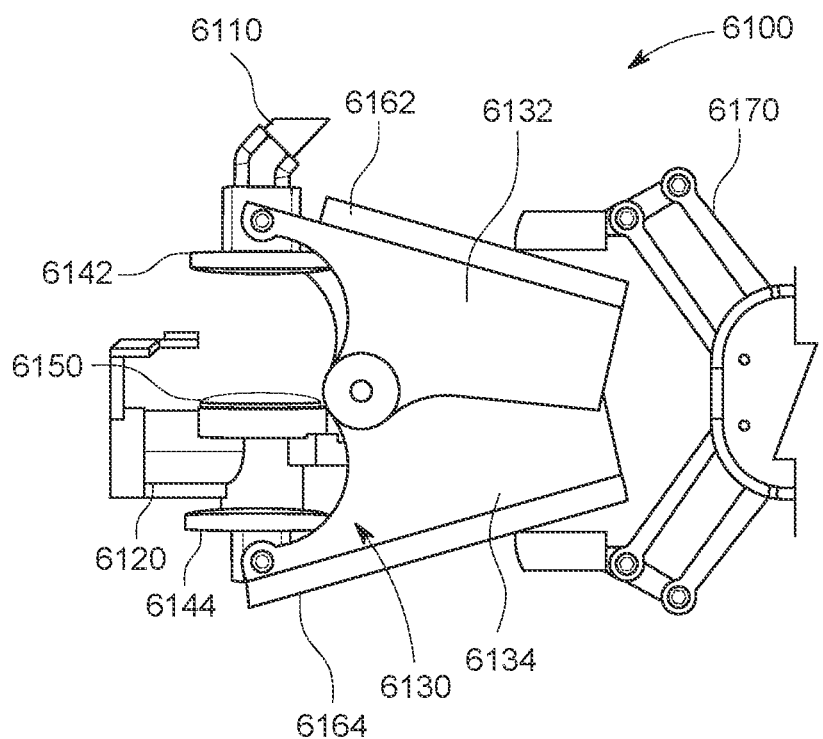
FIG. 61 is a fragmentary side view of a truck-based glad hand connection employing a spring-loaded, clip-like action in response to the motion of the manipulator end effector, shown in an open orientation with respect to a trailer glad hand.
Figure 61A:
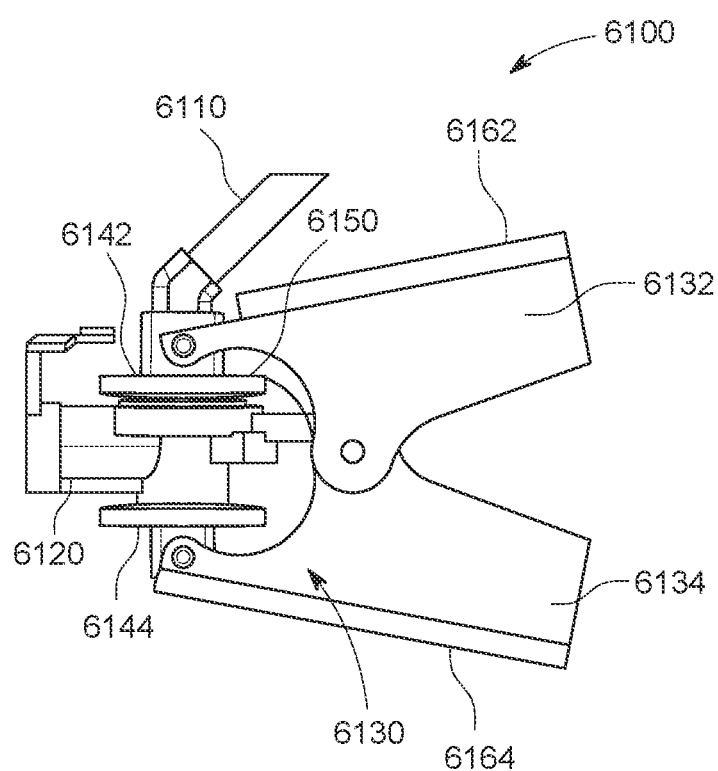
FIG. 61A is a fragmentary side view of the truck-based glad hand connection of FIG. 61, shown in a closed/engaged orientation with respect to the trailer glad hand.

FIGS. 61 and 61A provide another clamping mechanism 6100 for selectively engaging and disengaging the truck pneumatic source/line 6110 from a conventional trailer glad hand 6120. This embodiment employs a spring-loaded clamp body 6130 with a pair of pivoting clamp members 6132, 6134. The clamp members 6132, 6134 are spring-loaded to remain in a normally closed orientation under a predetermined clamping pressure. When normally closed (FIG. 61A), the opposing clamp pads 6142, 6144 on each member 6132, 6134 compress against opposing sides of the trailer glad hand 6120. In this orientation, the upper clamp pad 6132 includes an annular passage that seals against and allows air passage into the trailer glad hand seal 6050 in a manner similar to the clamp 6000 of FIGS. 60 and 60A, described above. The fine manipulator end effector can be used to deliver the clamping mechanism into alignment with the trailer glad hand using servoing techniques and sensor feedback as described above.

As shown in FIG. 61, the clamp members 6132 and 6134 each include a respective outer interface surface 6162, 6164, which can include a textured finish and/or friction-generating material. The end effector 6170 of the fine manipulator can grasp the interface surfaces and force the clamp open as shown in FIG. 61. The clamp can be moved into and out of alignment with the trailer glad hand 6120 in this orientation. The end effector releases pressure on the clamp members 6132, 6134 causing the internal spring (e.g. a conventional torsion wrap spring) to pivot the clamp members closed into sealed engagement with the trailer glad hand 6120. The spring-loaded clamp is opened using the fine manipulator system and positioned facing the center hole in the glad hand. This spring-loaded clamp 6100 automatically engages with the trailer glad hand when released in proper alignment therebetween.

Figure 62:
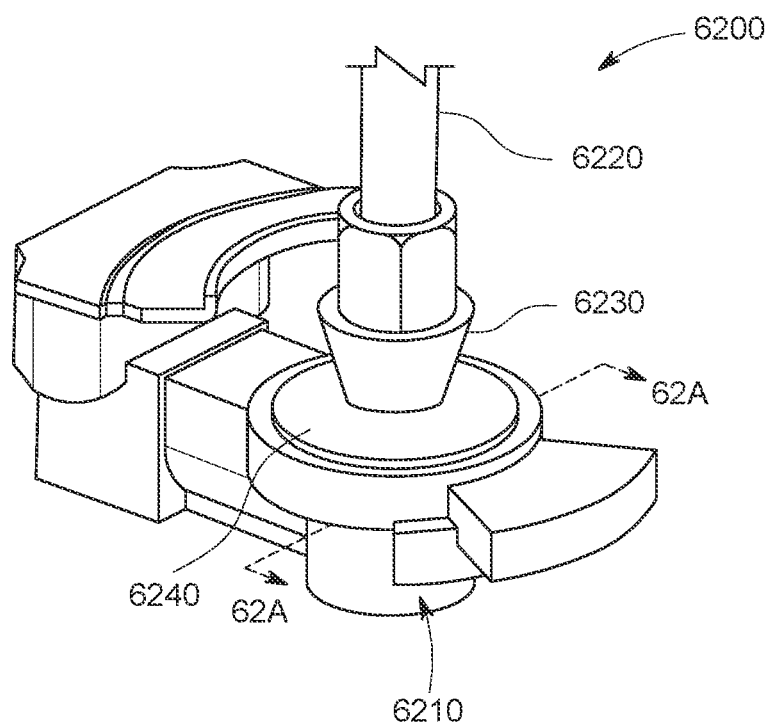
FIG. 62 is a fragmentary perspective view of a truck-based glad hand connection employing a press-fit connection action, shown in an engaged/connected orientation with respect to a trailer glad hand.
Figure 62A:
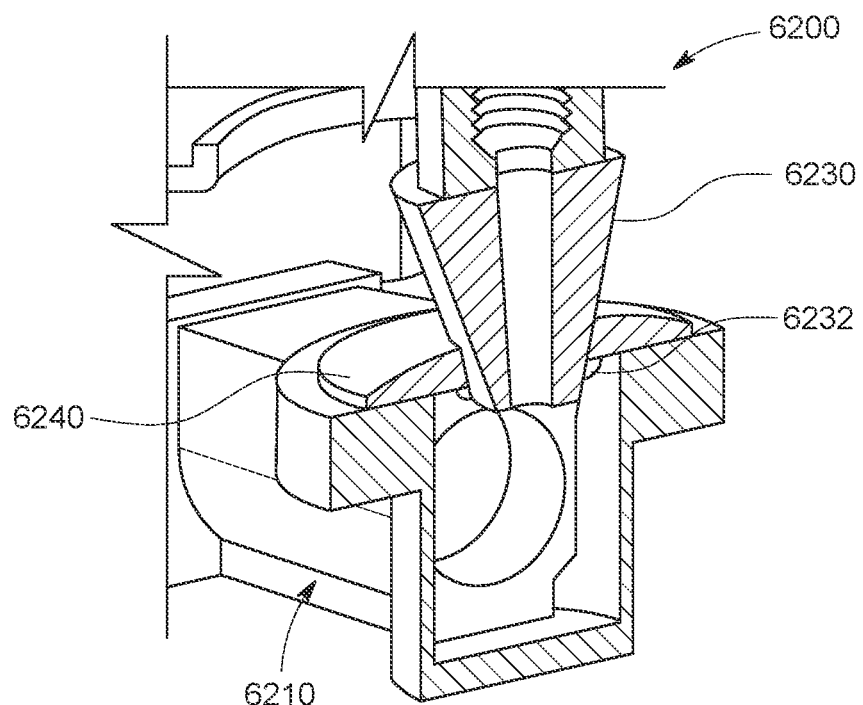
FIG. 62A is a cross section taken along line 62A-62A of FIG. 62.

FIGS. 62 and 62A show another embodiment of an arrangement 6200 for sealing the truck pneumatic source/line 6220 with respect to a conventional trailer glad hand 6210. This embodiment employs a cone shaped plug 6230 that is pressed into the annular seal 6240 of the trailer glad hand 6210 to provide a proper seal. The plug can define an optional step 6232 that passes through and acts as a holding barb with respect to the glad hand seal hole, so as to provide extra holding strength. As another option (not shown) an external clamp can be used to grip the back of the trailer glad hand and provide positive pressure to seal. The plug is aligned and pressed into place by an appropriately shaped end effector on the fine manipulator. The plug can include a bracket interface (not shown) that allows the end effector to apply and remove the cone.

Figure 63:
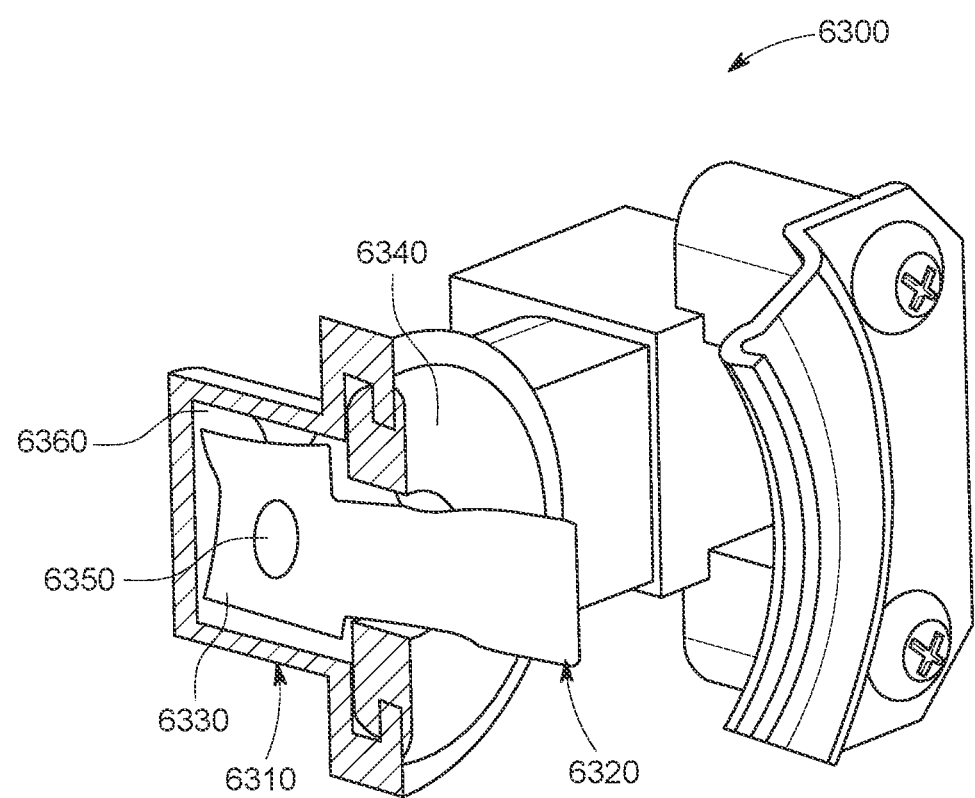
FIG. 63 is a cross-sectional perspective view of a truck-based glad hand connection employing a an inflatable, plug-like connection, shown in an engaged/connected orientation with respect to a trailer glad hand, whereby the manipulator accesses the interconnector via an appropriate truck based connection and end effector.

FIG. 63 shows yet another embodiment of an arrangement 6300 for a connection between a conventional trailer glad hand 6310 and a truck pneumatic source/line 6320, the pneumatic line includes an inflatable probe/plug 6330 that passes into the hole of the glad hand annular seal 6340. The plug is sealed around an internal line that exits in an outlet 6350. The uninflated plug geometry allows it to pass freely into and out of the glad hand seal hole. However, when inflated in response to an engagement command (after inserted) the interior of the plug expands, as shown, to seal against the edges of the annular seal 6340. Upon proper inflation of the plug into the glad hand pocket 6360, positive pressure can be supplied to the system via the port 6350. The plug can be constructed from a durable elastomeric material (e.g. natural or synthetic rubber) that expands upon application of inflation pressure. Appropriate adapters and/or brackets can be employed to allow the end effector of the fine manipulation system to carry, insert and extract the plug with respect to the glad hand annular seal.

Figure 64:
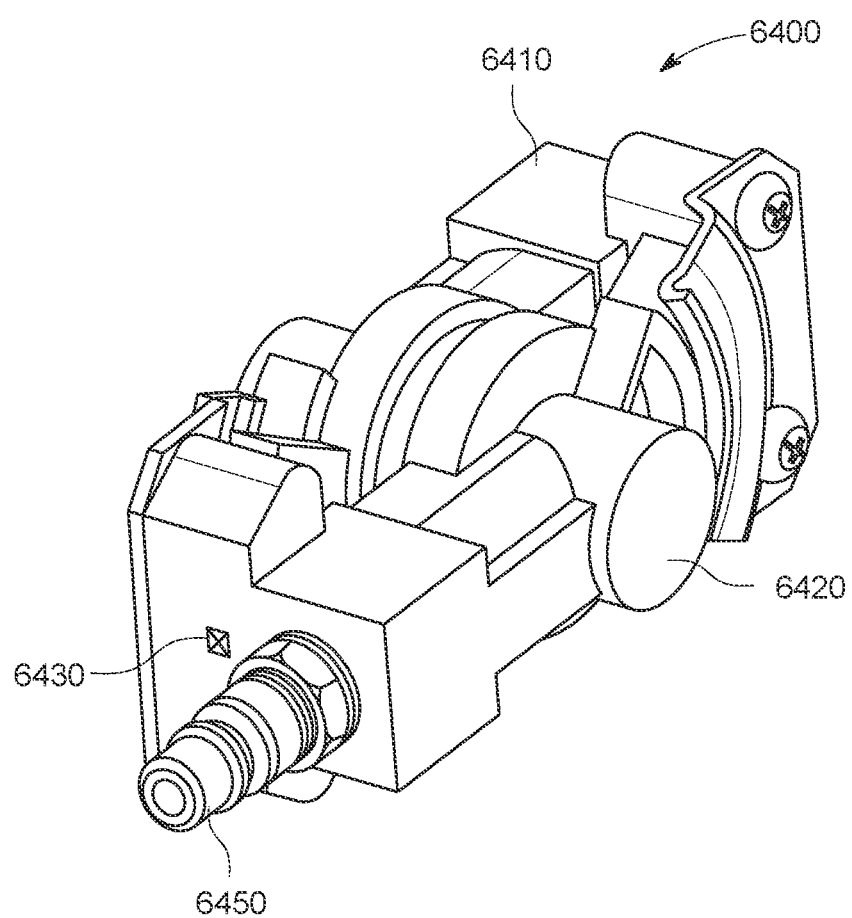
FIG. 64 is a perspective view of a truck-based glad hand connection employing an industrial interchange connector thereon for semi-permanent attachment of the truck-based glad hand (using conventional, rotational attachment techniques) to a trailer glad hand.

FIG. 64 shows another connection arrangement 6400 in which the trailer glad hand 6410 is provided with a semi-permanently attached truck glad hand 6420 according to a conventional rotary clamping motion. The truck glad hand connector 6420 now includes industrial interchange pneumatic connector (a quick-disconnect) 6450. The truck glad hand adaptor 6420 can include one or more fiducial(s) 6430 (e.g. ID codes with embedded information) for easier recognition by the gross and/or fine manipulation sensing system/camera(s). The interchange connection adaptor 6450 can be arranged to thread into the truck glad hand 6420, and thereby allows for the connection of a corresponding industrial interchange connector mounted on the end of the truck pneumatic line (not shown), and which is carried into engagement by the fine manipulator end effector. The fiducial can also be carried on a bracket in a manner similar to that described above with reference to FIG. 52. The fiducial can, more particularly, define ArUco marker images that provide pose estimation using a camera. The fiducial can also be part of an arrangement of reflective points: defining a reflective or high contrast coating to allow vision by a sensor camera.

Figure 65:
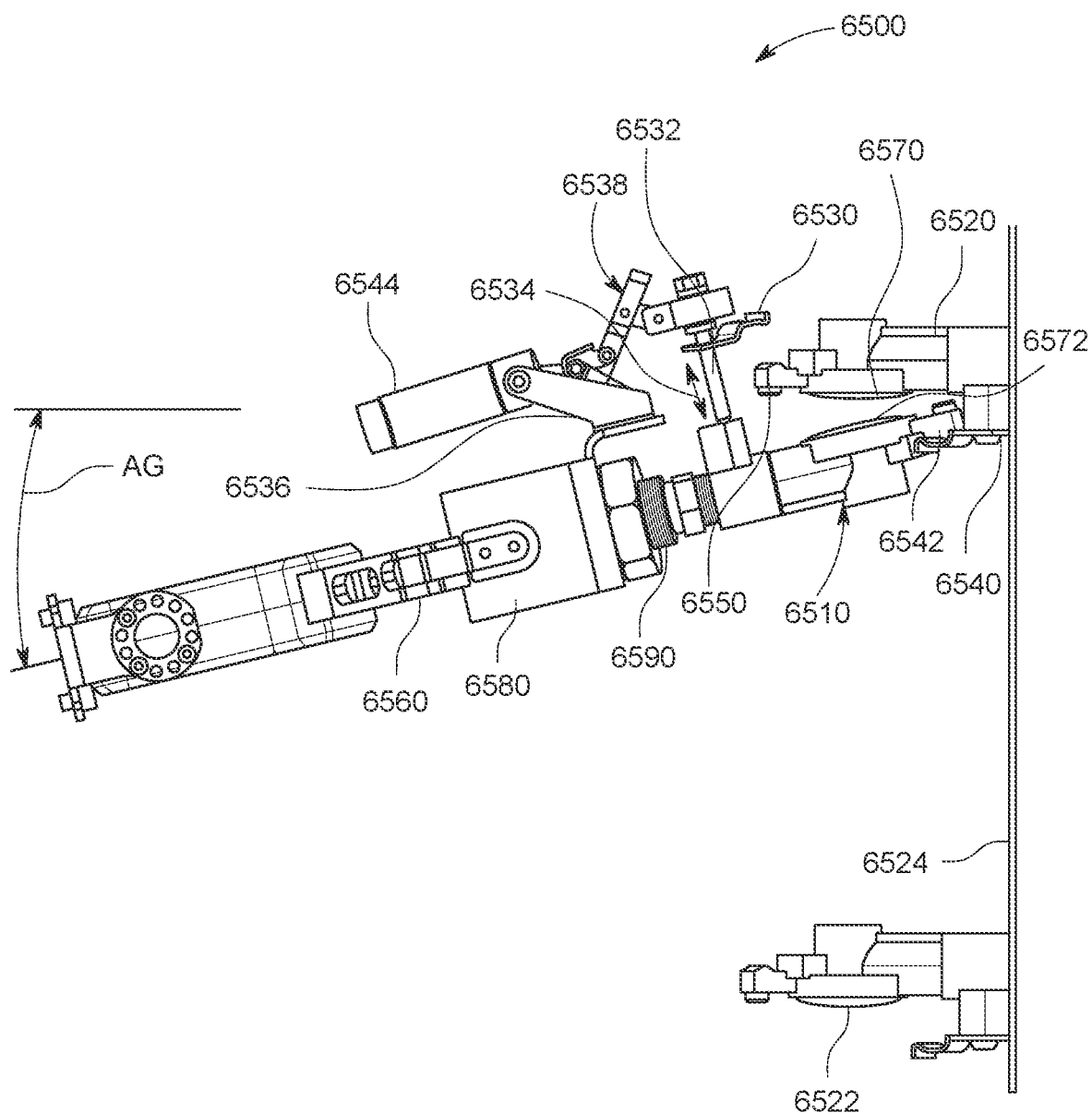
FIG. 65 is a fragmentary side view of a truck-based glad hand connection employing a clamping action with a linear actuator integrated with the truck connector, shown in an open orientation with respect to a trailer glad hand.
Figure 66:
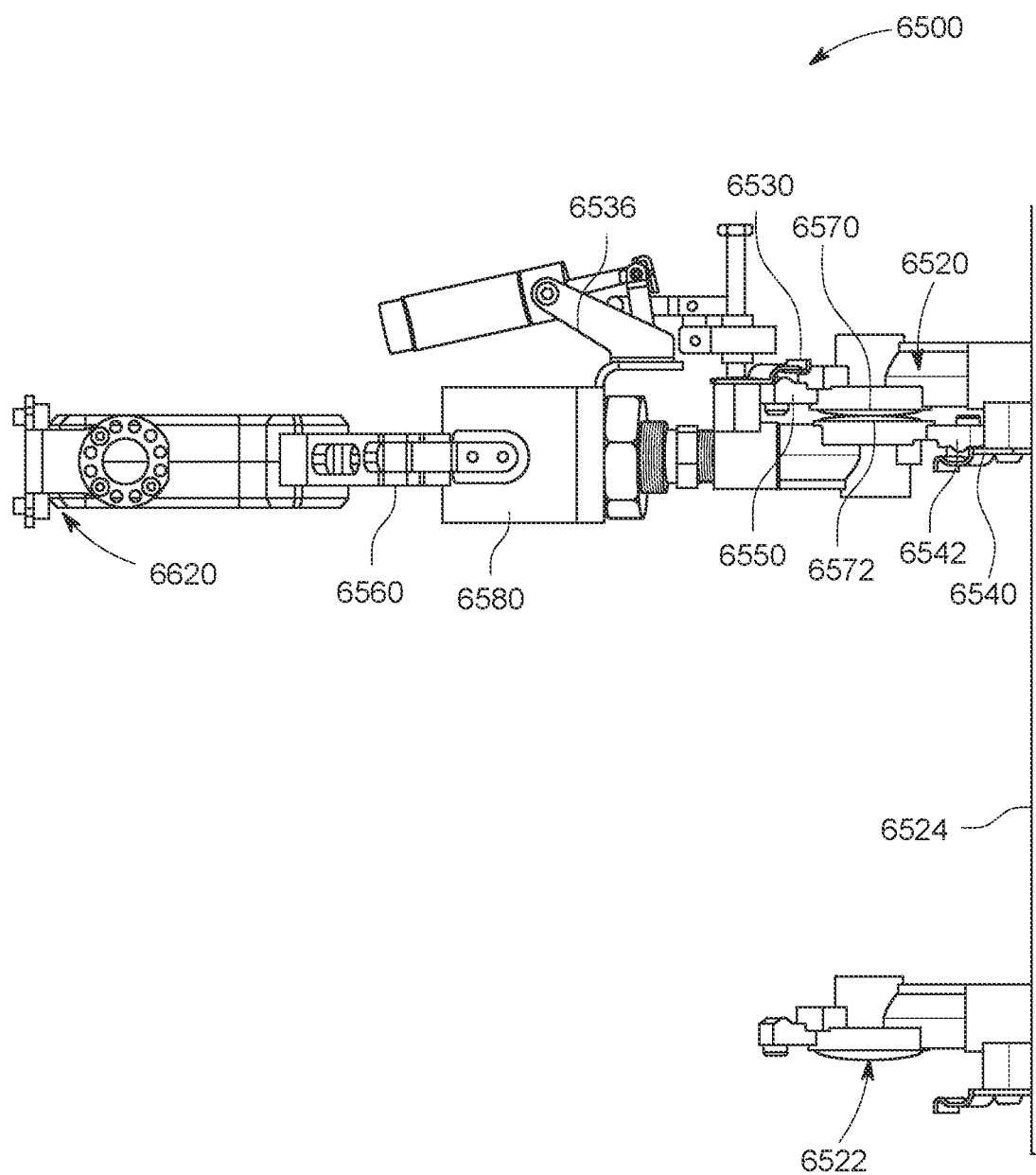
FIG. 66 is a fragmentary side view of the truck-based glad hand connection of FIG. 65, shown in a closed/engaged orientation with respect to the trailer glad hand

FIGS. 65 and 66 show another arrangement 6500 for attaching a truck-based glad hand connector 6510 to a trailer glad hand 6520, shown mounted in tandem with a second glad hand 6522 on the trailer front face 6524. The glad hand connector 6510 is a modification of a conventional glad hand unit. The glad hand 6510 includes a sliding sheet metal retainer 6530, that rides (double arrow 6534) on a rail 6532, under the driving force of an actuator assembly 6536. The actuator assembly can be operated by the sensor system when the glad hand 6510 is aligned with the trailer glad hand as shown in FIG. 65. In this orientation, the trailer glad hand's sheet metal retainer 6540 engages the truck glad hand's flange 6542. The actuator 6536 selectively engages and disengages the sheet metal retainer 6530 of the modified truck glad hand 6510 with the retainer 6550 of the aligned trailer glad hand 6520. In engaging the retainer 6530, the end effector 6560 rotates (curved arrow 6620) the glad hand 6510 into a parallel relationship with the trailer glad hand 6520, so that their respective seals 6570 and 6572 are engaged and mated (See FIG. 66). Hence, in operation, the end effector 6560 approaches the trailer glad hand 6520 at a non-parallel angle AG that allows the flange 6542 to slip under the fixed trailer glad hand retainer 6540 while the seals 6570 and 6572 are remote from each other (as shown in FIG. 65). The end effector then rotates the glad hand 6510 into a parallel relationship with the trailer glad hand 6520. During this step, the actuator 6536 slides the retainer 6530 into contact with the trailer glad hand flange 6550 to compressibly join the two seals 6570, 6572 together (as shown in FIG. 66). The end effector 6560 can release the attached glad hand 6510 at its grasping base 6580 and return to a neutral position on the truck chassis thereafter. Disconnection and removal of the glad hand 6510 from the trailer glad hand 6520 is the reverse of attachment—that is, the end effector 6560 is servoed to, and engages the glad hand grasping base 6580; the actuator 6536 releases the retainer 6530 and the end effector 6560 rotates the glad hand 6510 to generate the angle AG with respect to the trailer glad hand 6520; and then the glad hand 6510 is moved away from the trailer glad hand 6520 to a neutral location, awaiting the next connection cycle. This arrangement 6500 allows for relatively straightforward attachment and removal of the glad hand using a robot manipulator. It avoids (is free of) the complicated motions required in conventional glad hand interengagement—which requires rotation about the seal centroidal axis. Note that the glad hand grasping base can also act as an adaptor so as to allow pressurized air to pass through. The actuator assembly 6536 can include the depicted pivoting joints 6538 and linear actuator 6544. The actuator can employ electrical, hydraulic or pneumatic motive force. An appropriate line connection (not shown) to the actuator, so as to provide power, can be provided and can run in parallel to the truck pneumatic line (also not shown, but attached generally to the grasping base 6580 to deliver pressurized air to the glad hand pressure connection 6590).

Figure 67:
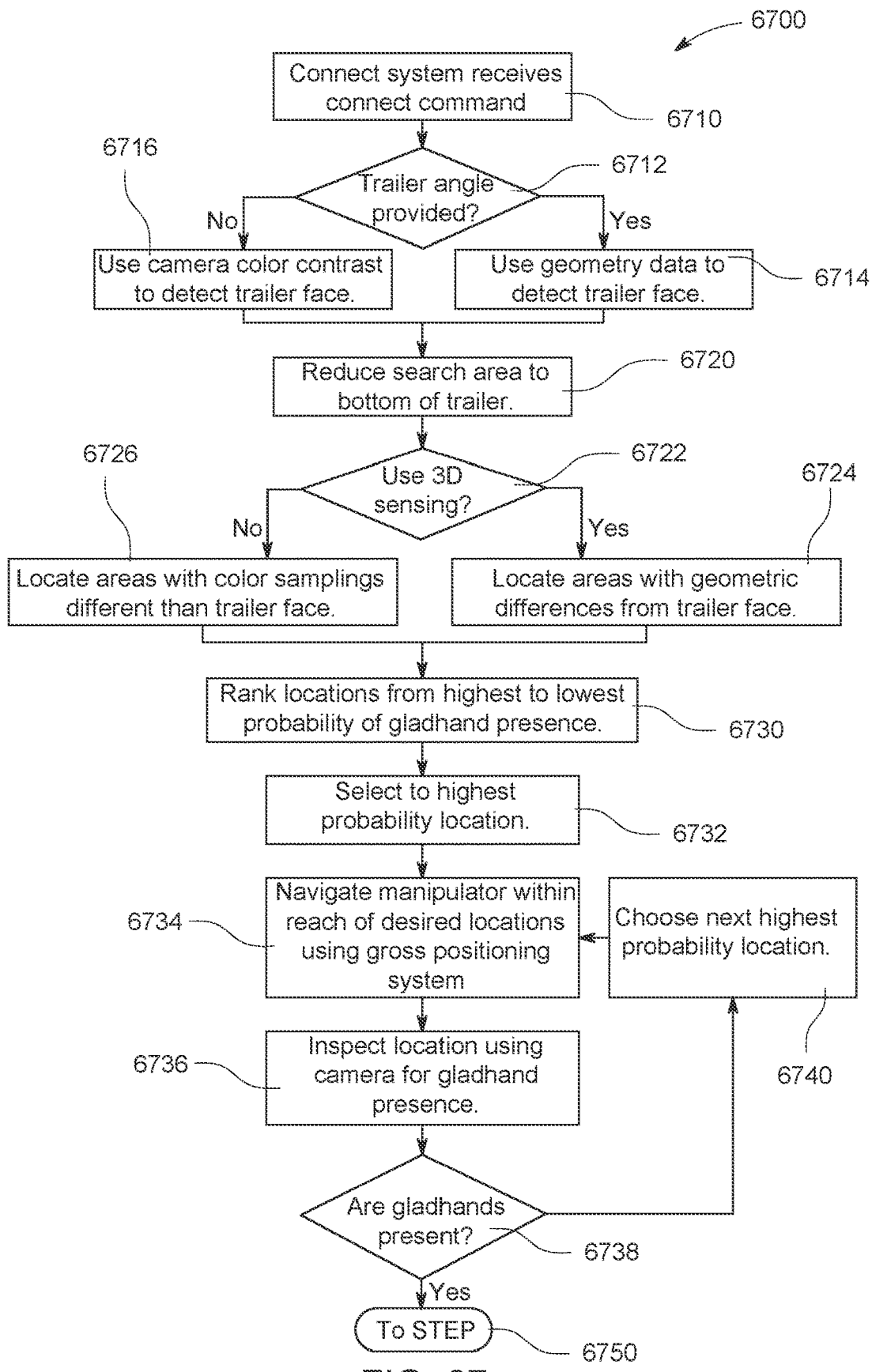
FIGS. 67 and 67A show a flow diagram of a procedure for performing a glad hand (or similar) connection between an autonomous truck and a trailer using a gross and fine sensing and manipulation system according to the various embodiments herein.
Figure 67A:
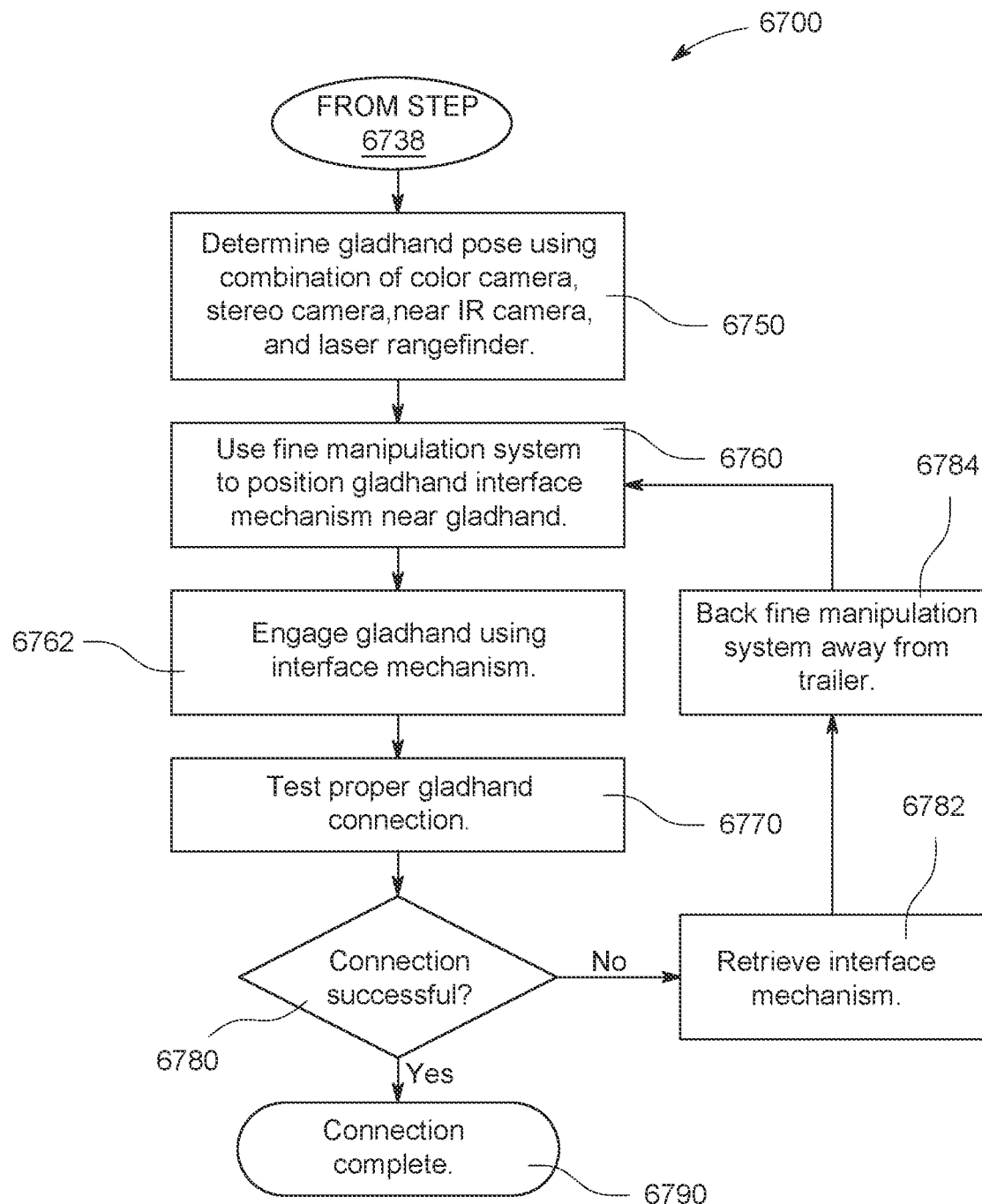

FIGS. 67 and 67A show the general procedure 6700 for operation of the gross and fine localization and manipulation for attaching truck pneumatic (or electrical) connection to the trailer glad hand using one of the connection implementations described above. The procedure 6700 begins by finding the trailer face after the system receives a connect command (step 6710). The procedure 6700 determines whether the trailer pivot/hitch angle, with respect to the truck chassis is available (decision step 6712). If the angle is available, the geometry data is provided to detect the trailer face in acquired images from the gross detection sensor (step 6714). Conversely, if the angle data is not available, then the gross sensor assembly can use (e.g.) color contrast in acquired images of the trailer front face to detect its location and dimensions (step 6716). Once determining the trailer location and dimensions, the procedure 6700 reduces the search area to the bottom region of the trailer where glad hands/glad hand panel are likely located (step 6720).

Next, the procedure 6700 attempts to locate the glad hand panel in the reduced search region, which may or may not entail 3D sensing (decision step 6722). If 3D sensing is used by the gross sensing system, then the system locates areas with geometric differences from the trailer face, and stores image features therefrom, in step 6724. If 3D sensing is not employed, the procedure 6700 can attempt to locate the glad hand panel by identifying and storing color features on the trailer face image(s) that differ from surroundings (step 6726). Based on feature information identified via step 6724 or step 6726, or (optionally) both, the procedure 6700 then ranks locations on the trailer face from highest to lowest probability of glad hand/panel presence (step 6730). This ranking can be based on a variety of factors including the prevalence of glad hand/panel candidate features, a strong pattern match of specific colors or shapes, or other metrics. Trained pattern recognition software can be employed according to skill in the art. In step 6732, the location with the highest rank is selected as the target for gross position movement of the manipulator and the end effector carrying the truck connection.

This location data is then used to guide the manipulator and end effector using the gross positioning system in step 6734. The end effector is brought into proximity with/adjacent to the candidate location whereby a fine sensor (e.g. camera, 3D scanner, etc.) assembly carried on the end effector and/or the manipulator can inspect the location for glad hand features (step 6736). If the fine sensing system verifies that glad hand features are present at the location, then the procedure uses that location for the fine manipulation process (decision step 6738). Conversely, if no identifiable glad hand features or patterns are recognized by the vision system associated with the fine sensing, then the next highest rank feature set is chosen, and (if needed) the manipulator is moved again in step 6734 to inspect the next location (step 6736). This process repeats until the glad hand is located or no glad hand is found (at which point the procedure reports an error or takes other action). Once a glad hand location is confirmed, then (via decision step 6738) the procedure 6700 estimates the glad hand pose from images acquired with the fine sensing system. This can include image data derived from any combination of color, stereo near IR or laser range finding, among other modalities (step 6750). The fine manipulator is moved toward the identified coordinates of the trailer glad hand and in an orientation that matches its 3D pose. Note that the carried truck-based connector has a known pose that is correlated with the determined pose of the trailer glad hand so that they can be engaged. Visual/sensor-based feedback can be used to servo the manipulator as it approaches the trailer glad hand (step 6760). The trailer glad hand is eventually engaged in the appropriate orientation by the end effector and carried connector in step 6762. Once engaged, the connection can be secured using appropriate motions and/or actuations of the truck-based connector in accordance to any of the embodiments described above or other appropriate connection mechanisms—including, where the manipulator has been adapted, via the conventional rotational connection of a conventional truck glad hand. The connection is tested for security and success (decision step 6780). Such tests can include visual tests and/or whether the pneumatic system holds its pressure. If successful, the procedure 6700 signals success and the manipulator can disengage the truck-based connector and return to a neutral position (step 6790). If the connection test is unsuccessful (decision step 6780), then the procedure can instruct the manipulator to engage and/or retrieve the truck-based connector (step 6782). The fine manipulator is then backed away from the trailer front face (step 6784) to a sufficient location and fine manipulation steps 6760, 6762, 6770 and 6780 are repeated until the connection tests successfully. If the test is unsuccessful after a given number of attempts, then the procedure stops and sends an alert to personnel, and/or takes other appropriate action.

O. Reverse Assist Systems and Methods for Autonomous Truck/Trailer Operation

One unique challenge that an AV yard truck faces, while connected to a trailer, is safety while reversing. This primarily is due to the blind spot that is created directly behind the trailer. Vision and sensor systems mounted on the tractor are rendered less effective as they can be occluded by the (often as tall or taller, and elongated trailer). It is often undesirable to refit a trailer fleet with individual sensor systems to assist in the reversing process, and a variety of fleets can be encountered in a yard making it impractical to retrofit all vehicles that may encounter the yard or its autonomous vehicles. In addition, fitting trailers with specialized sensors adds costs and such are prone to damage and breakage in over-the road operations. Some exemplary types of reversing sensors can include cameras, LIDAR, radar, and/or sonar.

Figure 68:
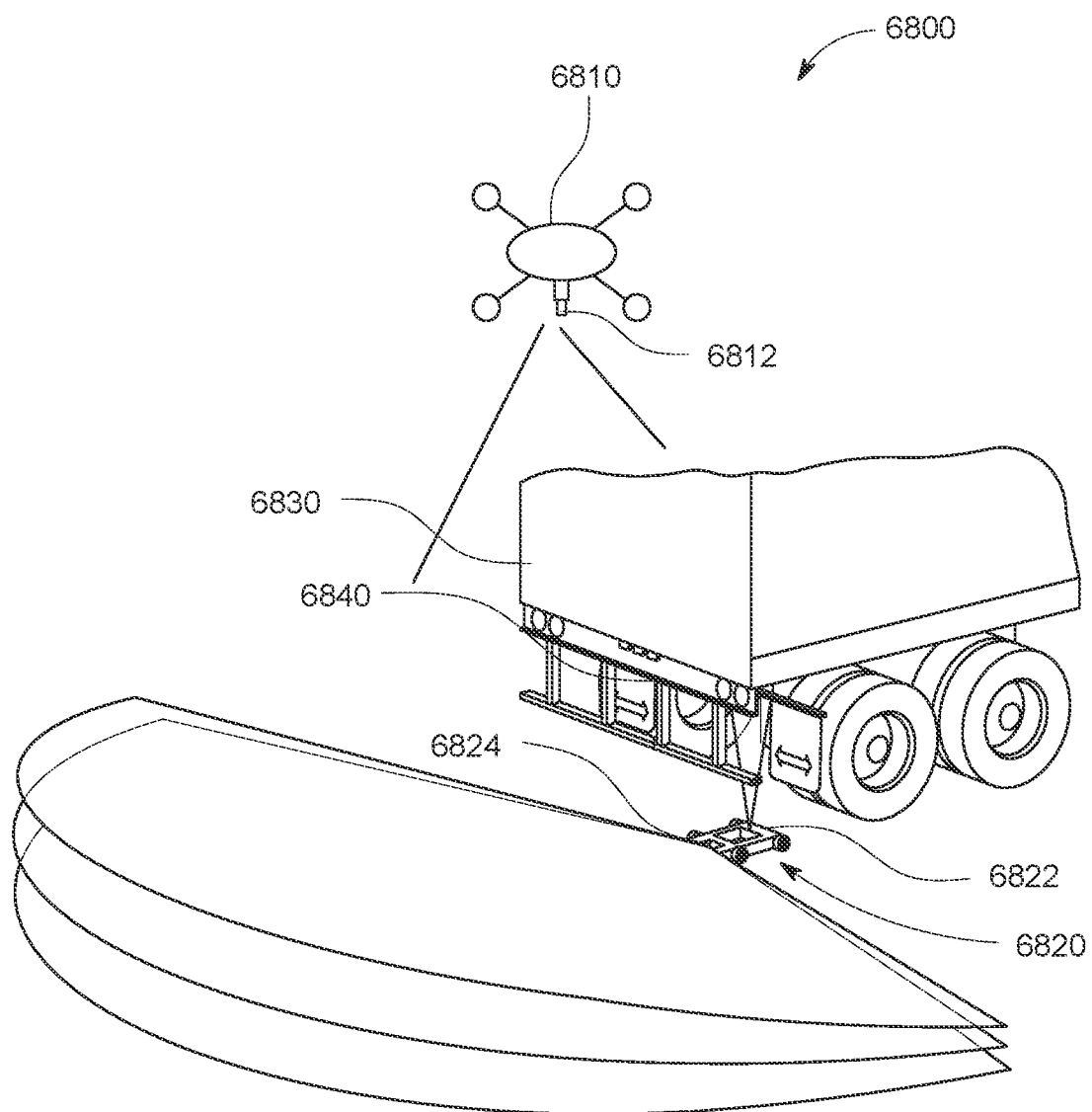
FIG. 68 is a fragmentary perspective view of the rear of a trailer showing an unmanned aerial vehicle (UAV) and unmanned ground vehicle (UGV) under control of an autonomous truck and/or facility system server, scanning and imaging a rear area of the vehicle for use (e.g.) in reversing operations, according to an embodiment.

FIG. 68 shows an arrangement 6800 for enhancing reversing safety in an autonomous truck environment using an autonomous robot. In an embodiment of a detection and safety system an autonomous unmanned aerial vehicle (UAV) 6810 or unmanned ground vehicle (UGV)/Rover 6820 can be employed. This vehicle 6810, 6820, equipped with one, or any combination of the above-mentioned sensor equipment (e.g. camera/sensor 6812, cameras/sensors 6822, 6824), as well as being data linked to the yard truck's system and/or yard truck controller, can be deployed from the yard truck and either assist with vision from the air or ground. As described further below, such systems can also be deployed on the top of trailer to relay sensor data back to the yard truck's autonomous navigation system.

In the illustrative ground vehicle embodiment (FIG. 68), using on-board sensors, the UGV would position itself off of a predetermined marker (for example along the outside edge of driver's side trailer frame 6830), and by communicating with the yard truck system server, the UGV can autonomously maneuver with trailer movements and augment the AV yard truck's vision/sensor system with the use of its own vision/sensor system during reversing and trailer positioning. As shown, sensors 6822 can look up at the truck's frame to determine and guide based upon its extents. It can move rearward as the truck backs up by tracking the rear edge 6840 of the trailer. UGV sensors 6824 can look rearwardly and determine the presence of obstructions or other hazards, such as vehicles/persons moving into and out of the trailer's path. This can operate in a manner similar to the backup systems found on most modern automobiles.

Figure 69:
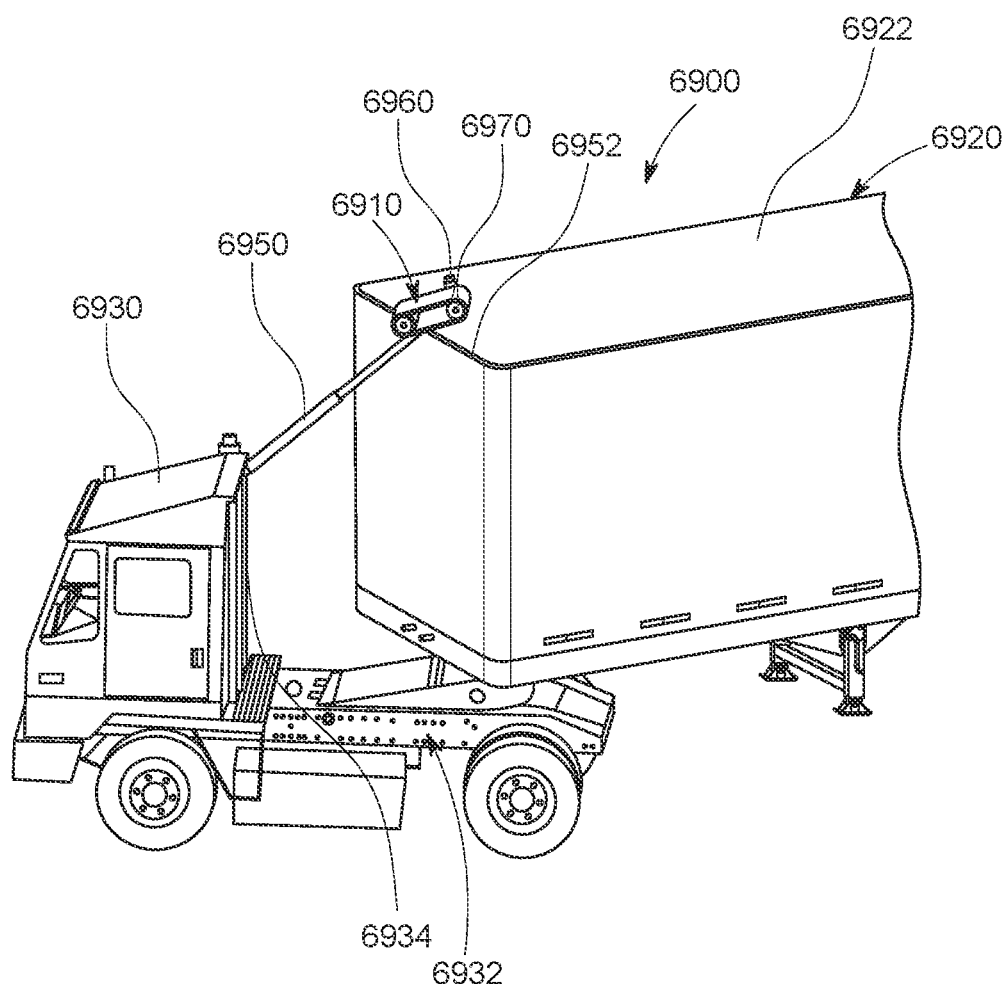
FIG. 69 is a fragmentary perspective view of an autonomous truck and trailer hitched thereto showing a deployment mechanism and associated UGV engaging the front end of the trailer roof, according to an embodiment.
Figure 70:
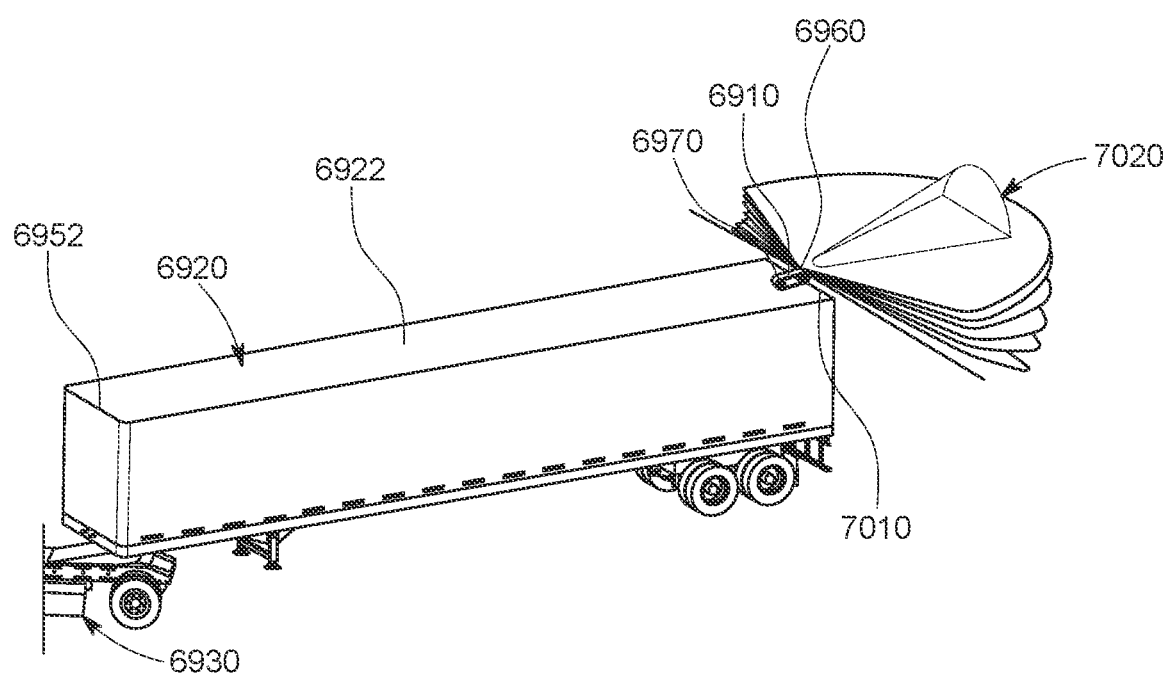
FIG. 70 is a fragmentary perspective view of the trailer and UGV of FIG. 69 showing the UGV acquiring sensor data from the rear of the trailer roof.

FIGS. 69 and 70 show an arrangement 6900 in which a UGV 6910 is deployed onto the roof 6922 of a trailer/container 6920 from the yard truck 6930 (where it is stowed as a non-interfering location on the chassis 6932 and/or cab 6934 when not in use) via a mechanical lifting system 6950 (ex. boom, arm, etc.). The lifting system can be extended and retracted as appropriate during the truck's movement. Using its sensors, the UGV determines the edges of the trailer/container roof 6922 and drives down the (e.g.) centerline from the front 6952 to the back 7010 (FIG. 70) of the trailer 6920. Upon sensing the rear edge of the roof 6922, the UGV 6910 locks its tires/tracks 6970, and provides rear vision/sensing and/or lighting in appropriate wavelength(s) 7020, using appropriate sensors 6960. The tires or tracks should provide sufficient holding friction to prevent slippage of the UGV during trailer motion. In various embodiments, the UGV can include a tether that extends from the truck cab for safety and/or to transmit data/power between the cab and the UGV.

Once the trailer has been successfully parked, a signal is sent to the server/truck controller, instructing the UGV 6910 to retrace its path along the roof from the rear 7010 to the front 6952 of the trailer 6920. The server/truck controller instructs the lifting mechanism 6950 to engage and retrieve the UGV 6910 and stow it back on the yard truck 6930.

Another embodiment of the deployment of a sensor system to the rear of an attached trailer is through the use of either a telescoping or scissoring boom (not shown), affixed to the yard truck, which would be capable of delivering a self-contained vision/sensor device, with an integrated lighting system for safety, to the rear of the trailer.

Another embodiment (not shown) includes a control routine that directs the yard truck to rear of the trailer, prior to connection, and uses an onboard delivery mechanism to temporary fasten a sensor system mounted on a deployment mechanism on the truck to the rear of the trailer using appropriate clamps, magnetic fixing units, etc.

Another embodiment (not shown) employs a robotic arm mounted on the truck, which is outfitted with a sensor package to peer around the trailer edge during backup. The robotic arm can communicate any sensor data back to the yard truck.

Figure 30:
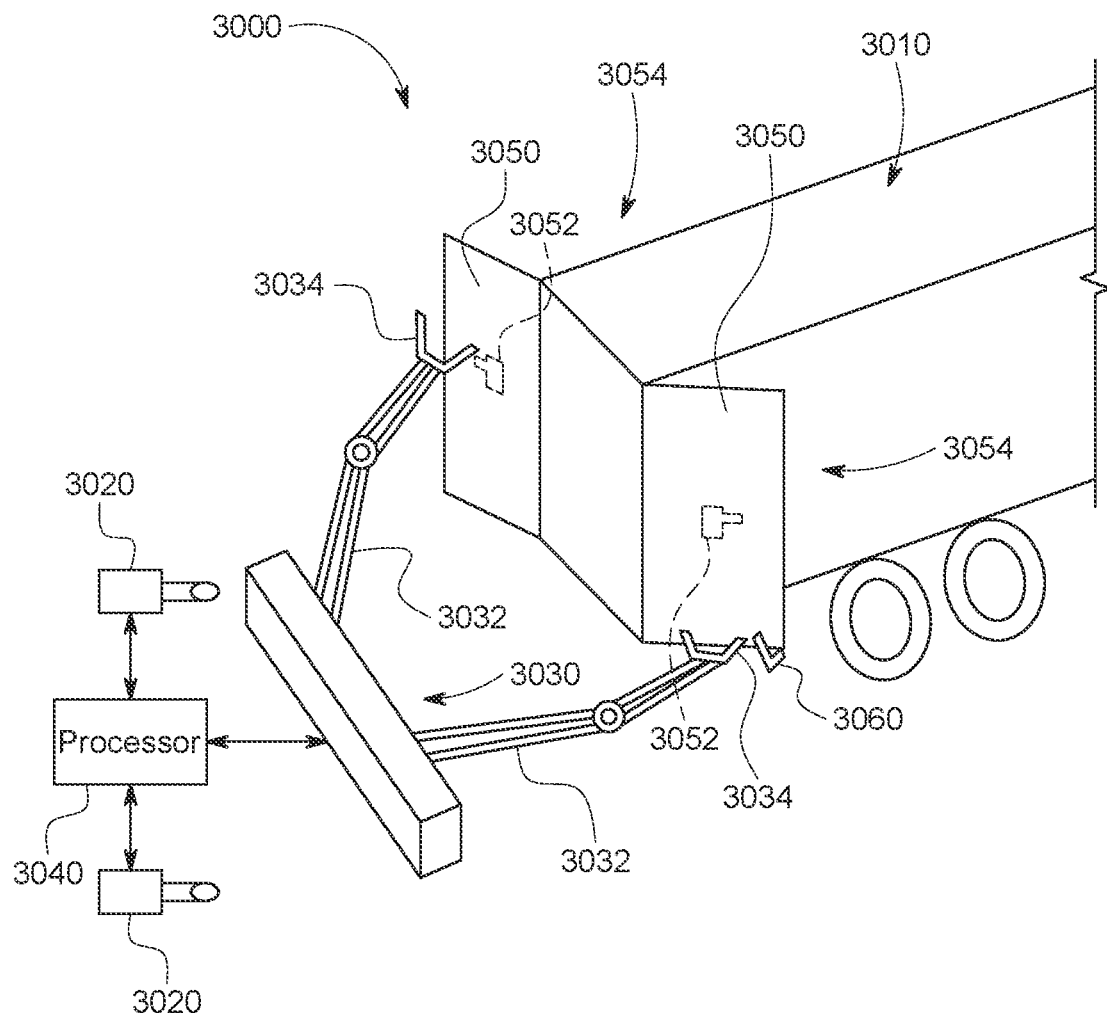
FIG. 30 is a diagram of door station for use in opening/closing trailer doors for use in the loading/unloading process within the yard environment.
Figure 30A:
FIG. 30A is a detailed view of the clamping mechanism of FIG. 30, according to an illustrative embodiment.

Yet another embodiment (not shown) integrates a deployable sensor system to the back of a trailer while the trailer is positioned at a door opening station (as described generally in Section IV and FIG. 30 above).

1. Dolly Arrangements

Figure 71:
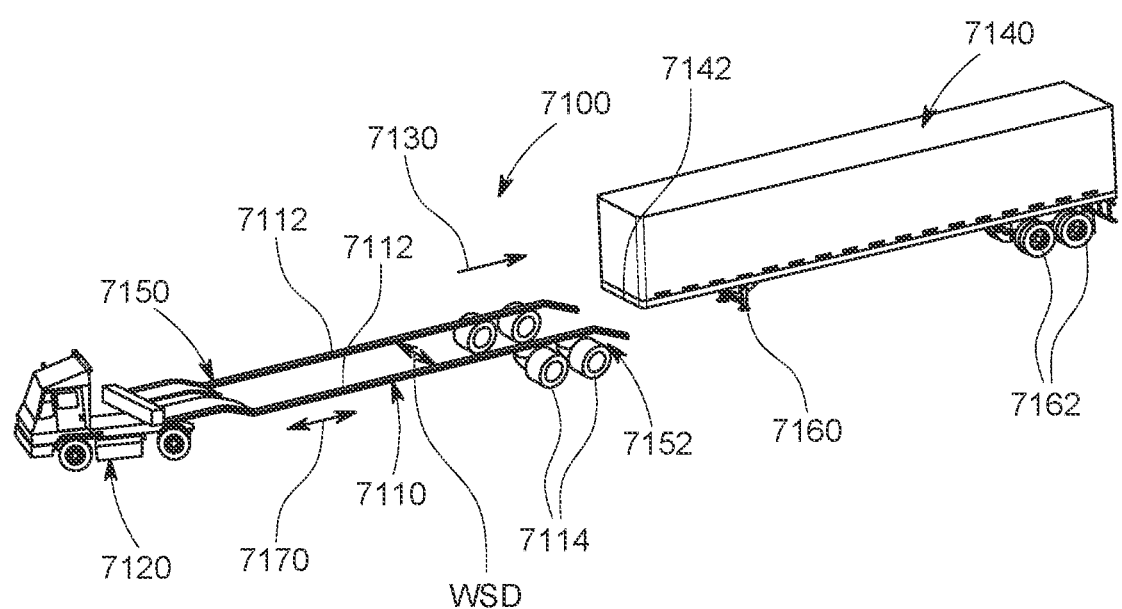
FIG. 71 is a perspective view of a split dolly trailer hitched to an autonomous truck for use in receiving and transporting an OTR trailer in a manner that can be free of electrical or pneumatic connections between the OTR trailer and the truck, as such functions are provided by the split dolly trailer, in addition to reverse sensing, according to an embodiment.
Figure 72:
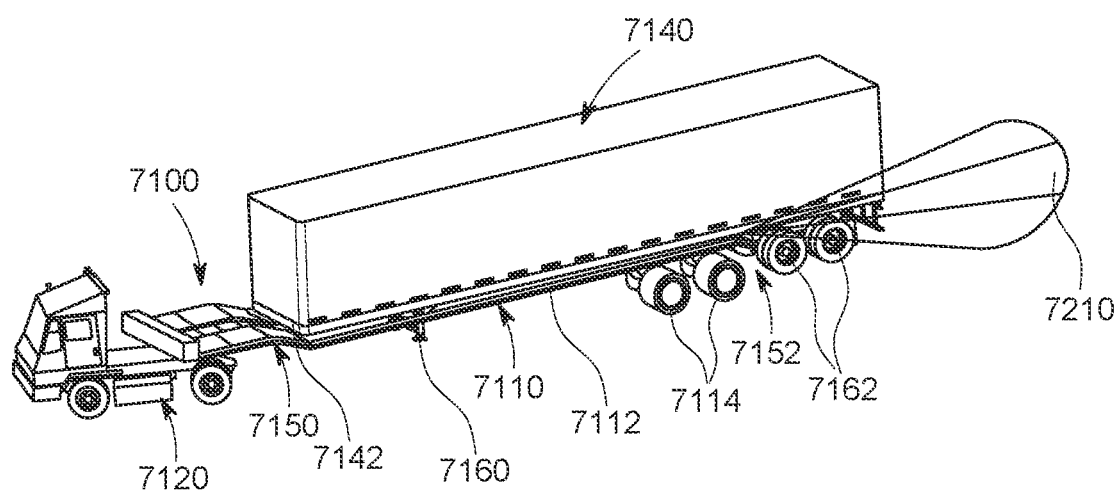
FIG. 72 is a perspective view of the split dolly trailer and OTR trailer of FIG. 71, shown in an engaged orientation for transport by the autonomous truck.

FIGS. 71 and 72 show another arrangement 7100, a split dolly trailer 7110 is provided to assist with vision/sensing while reversing a trailer. The trailer 7110 consists of a pair of rails 7112 joined at a front end that includes a fifth wheel hitch. The rails are sufficiently rigid to maintain their shape along a length that is nearly as long as a conventional trailer. It includes a plurality of wheels 7114 arranged in bogies that are similar to those of a truck except that they are free of transverse axles, thereby allowing the inside width WSD between rails 7112 to be open behind the front end 7150. The dolly trailer 7110 connects to a yard truck's 7120 fifth wheel. When backed down, the dolly simultaneously travels (arrow 7130) down both sides of a parked over-the-road (OTR) trailer 7140 until the leading edge 7142 of OTR trailer 7140 is positioned appropriately at the front 7150 of the split dolly trailer (See FIG. 72). Note that the depicted rails 7112 clear the undercarriage of the trailer forward of its wheels 7162. The rear end of the rails can be downwardly ramped, as depicted, to assist in guiding the trailer bottom thereonto.

On the rear 7152 of the split dolly trailer rail(s) 7112 can be a mounted an appropriate vision/sensor system and lighting 7210). The system 7210 transmits information to the system server and/or the yard truck controller to be used during backup operations as described above. Once alignment has occurred (FIG. 72), pivoting or telescoping arms (not shown) along the length of the dolly can be deployed by a command of the server or truck controller to evenly distribute the OTR trailer's weight and potentially secure it against side to side motion. An onboard pneumatic (airbags) or hydraulic system (pistons) can lift the frame of the dolly 7110 until it raises the OTR trailer's landing gear 7160 and tires 7162 fully off of the ground. At this point in time, the dolly's wheels 7114 support the trailer 7140. An additional feature on the split dolly trailer 7110 is a geared telescoping device that allows the frame to stretch or shrink to accommodate multiple lengths of trailers and axle positions (denoted by double-arrow 7170). The adjustment of split dolly trailer length can be accomplished by the system server upon identification of the extents of the trailer in a manner described above. The extents are used to direct motors (e.g. a rack and pinion or lead screw system) on the trailer dolly 7110 to extend or retract the rails. A variety of telescoping or sliding mechanisms, which should be clear to those of skill, can be used to facilitate rail length adjustment. In general, the length should be set so that the trailer wheels 7162 reside at a clearance of a few inches or feet behind the split dolly wheels 7114 when the trailer 7140 is fully engaged by the split dolly 7110 (as shown in FIG. 72). After mounting the trailer, the autonomous truck can direct the trailer to another location in the yard based upon a programmed path as described above for loading, unloading, etc. Advantageously, this embodiment is free of a requirement to connect electrics or pneumatic lines to the trailer, and, thus, automated connection mechanisms can be omitted from the yard truck. Taillights can be mounted adjacent to the rear of the split dolly on each rail and wheel brakes can be fitted to the dolly wheels in a manner clear to those of skill. More generally, the split dolly can remain hitched to the autonomous truck after delivering a trailer and can be carried about the yard as a semi-permanent attachment. Its brakes and electrics can be connected using conventional glad hands by yard personnel.

Figure 73:
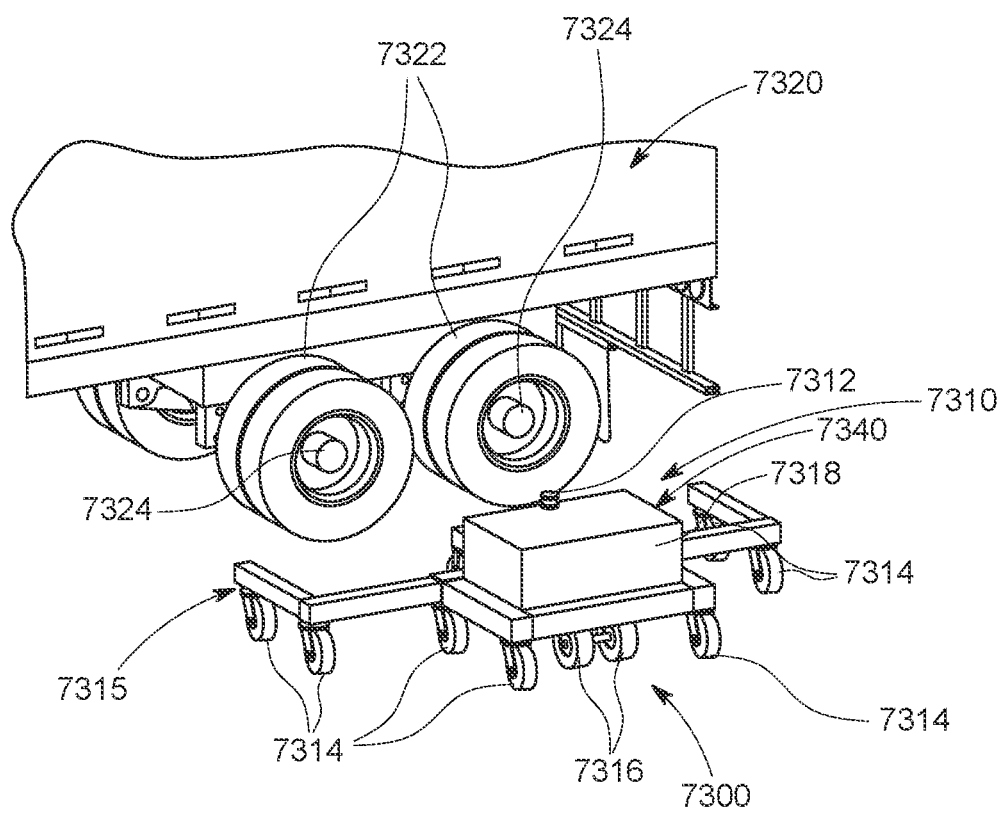
FIG. 73 is a fragmentary perspective view of an autonomous dolly, which is one of a pair, for use in engaging the wheel sets on each side of an OTR trailer to allow it to be transported free of contact with the ground by an autonomous truck, the dollies providing braking, lighting and rear sensing, preparing to engage and lift the wheel set according to an embodiment.
Figure 74:
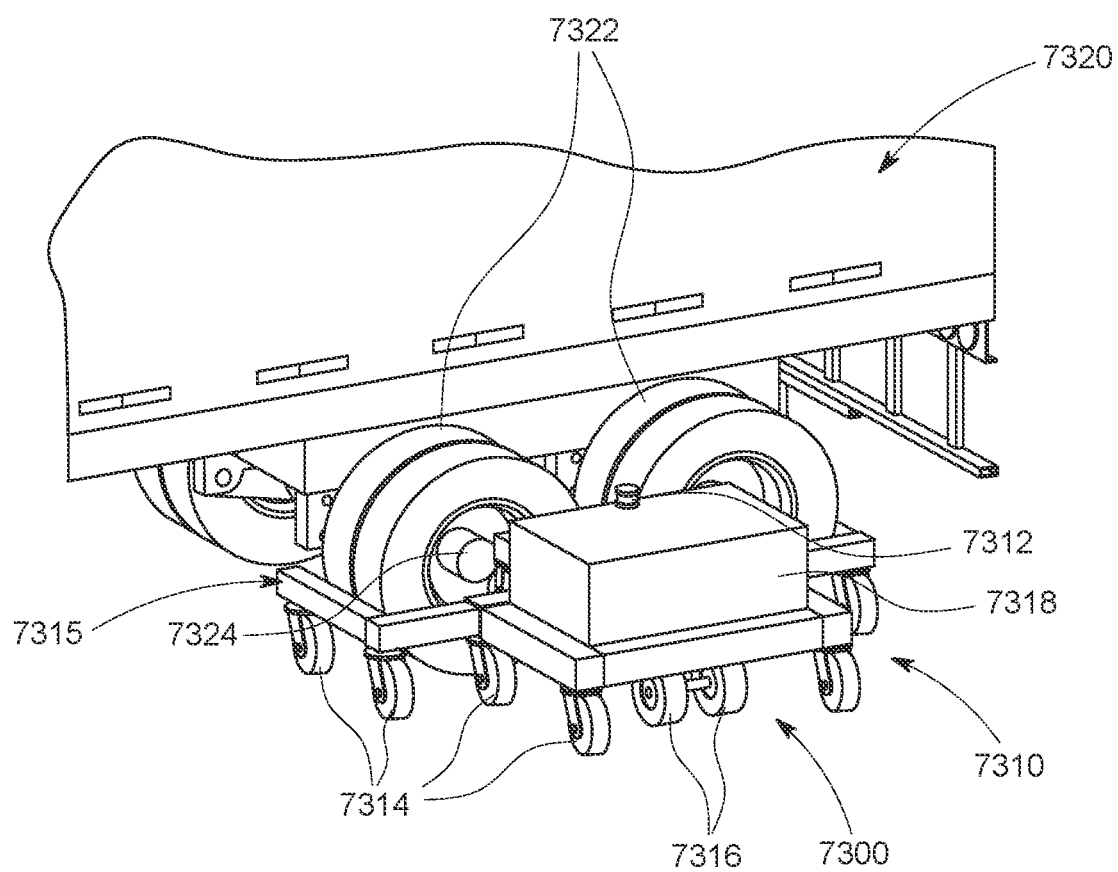
FIG. 74 is a fragmentary perspective view of the autonomous dolly and OTR trailer of FIG. 73, shown in an engaged orientation with the wheel set raised.

FIGS. 73 and 74 show a dolly arrangement 7300, which combines a UGV with a trailer wheel dolly. More particularly, two autonomous dollies (driver side dolly 7310 shown), communicating with the system server and/or yard trucks autonomous control system, are deployed and align with the trailer 7320 adjacent to each opposing side thereof. They each align with the wheels 7322 and associated rear axles 7324 on each respective side of the trailer 7320. Each dolly 7310 is guided by a vision and other associated sensor assembly 7312, which can operate to drive the dolly 7310 semi-autonomously, avoiding obstructions and guiding to the trailer wheels. Alternatively, the dolly can transmit all sensor and control data to a vision system instantiated on the truck or server and receive control commands remotely. The dolly 7310 includes a plurality of heavy duty caster wheels 7314 mounted to a robust, U-shaped frame 7315. Driven wheels 7316 are powered by motors (via gears, belts, etc.) in a central housing 7318 mounted to the frame 7315. The driven wheels 7316 steer and move the dolly 7310 as appropriate. The housing 7318 can provide a lifting mechanism that hydraulically or pneumatically cradles and elevate the trailer's tires once engaged (FIG. 74). In this manner, the wheels 7322 of the trailer 7320 are lifted out of engagement with the ground and the dollies instead engage the ground. Lights (not shown) can be mounted on the dolly housing 7318—for example along the rear-facing face 7340. More generally, the dolly's lighting, reversing vision/sensors, and braking are all are controlled via the yard truck control system so that the trailer need not connect directly to the yard truck—or can be connected for braking only, as electrics and reversing sensors are provided by the dolly. Such depends, in part, upon the robustness of the dolly's braking system—i.e. if the dolly brakes are sufficiently robust, then braking can be accomplished by the dolly, and if not, then braking pneumatic connections between the truck and trailer are made via the above-described automated connection systems.

By way of further background, it is recognized that a significant challenge in providing an automated trailer conveyance system to a yard environment is overcoming the locked emergency spring brakes on a parked trailer. All road-worthy OTR trailers include emergency brake systems that are spring-engaged until air pressure is provided to glad hand airlines, which thereby actuates and releases the emergency brakes. To automate moving of yard trucks, a technique for unlocking the wheels and allowing the back of the trailer to move freely in an automated manner is highly desirable.

Figure 74A:
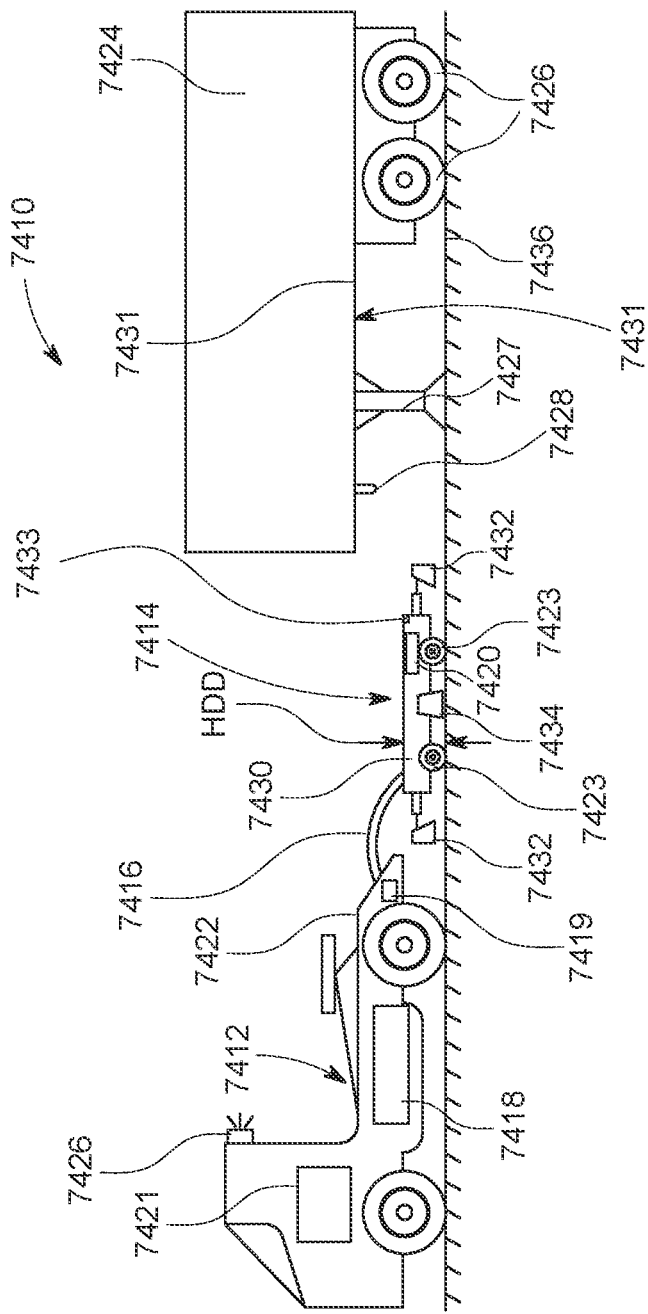
FIG. 74A is a side view of a single tethered, robotic dolly for raising the rear wheel sets of an exemplary trailer in conjunction with an autonomous yard truck, so as to avoid the requirement to connect brake pneumatic lines and/or electrical connections from the yard truck, shown preparing to engage the trailer, according to an embodiment.

With reference to FIG. 74A, an automated dolly arrangement 7410 is shown in a pre-engaged orientation in which the autonomous yard truck 7412 employs a deployable, robotic dolly 7414 with a tether and/or umbilical 7416 that interconnects with a power supply and dolly controller 7418. The tether 7416 can also interconnect with the vehicle pressurized air supply 7419 via an appropriate air hose that is bundled with the power and/or data (control) lines. Alternatively, the tether 7416 can be a simple cable or line with no power, data and/or air and the dolly can be powered by on-board batteries/power units and receive control signals wirelessly via the truck 7412 and/or system server. In such an arrangement, the tether can be omitted in other exemplary embodiments (as described generally above).

The truck-based dolly controller 7418 (FIG. 74A), in the exemplary embodiment, can be integrated with, or interconnected to, the vehicle's main controller and communications transceiver 7421. The deployable dolly 7414 can include a CPU with associated controller 7420 that coordinates local dolly operations with signals provided by the autonomous truck and/or system server, as described below. The dolly 7414 can be attached to the chassis 7422 of the truck 7412, or can follow the truck at an appropriate standoff distance when not deployed. Appropriate hooks, arms, cranes, ramps, etc. can be used to allow the dolly 7414 to engage the chassis of the truck 7412. The dolly 7414 includes a plurality of driven wheels (four wheels 7423 in this embodiment), which can be independently or collectively driven in various arrangements via (e.g. one or more electric motors and appropriate gearboxes). The wheels can be steerable via a steering mechanism that turns the wheels and/or applying differential power to each of the wheels in a manner clear to those of skill.

Figure 74B:
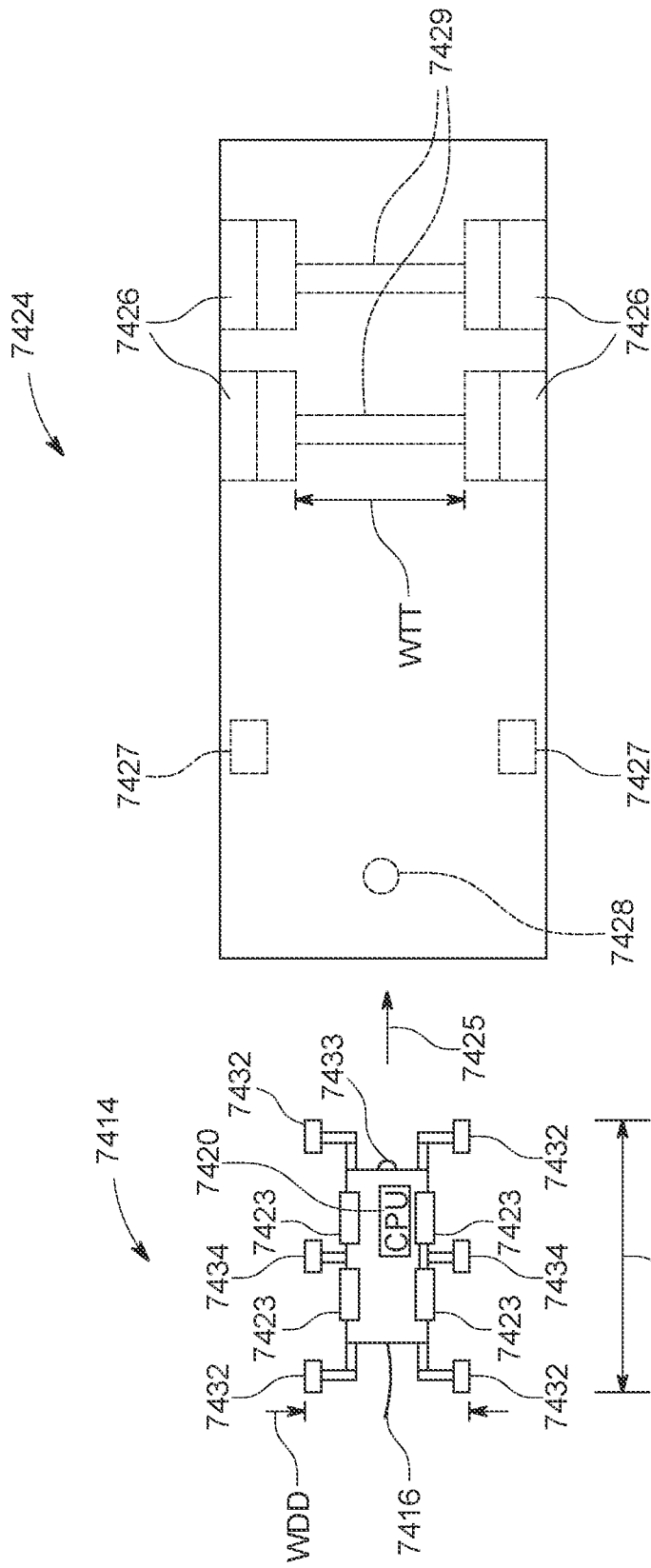
FIG. 74B is a top view of the dolly and an exposed top view of the adjacent trailer of FIG. 74A, showing locations wheels and axles thereof.

The deployable dolly 7414, which is sized (overall height HDD, overall width WDD and overall length LDD) to the scale of the depicted trailer 7424, is further shown in top view in FIG. 74B moving rearwardly (arrow 7425) away from the truck and toward the trailer 7424, as the tether 7416 is paid out from the truck 7412 using a spring-loaded or powered reel, or other appropriate coiling/wrapping system that should be clear to those of skill. The truck 7412 can include visual and/or other types of spatial sensors 7433 to assist in guiding the dolly 7414 toward, and in alignment with a centerline of, the trailer 7424. Additionally, or alternatively, the dolly can include such visual and/or spatial sensors 7433 (and associated perception system) to assist in finding and aligning with the trailer 7424. More particularly, the overall width WDD is sized less than the width WTT between trailer tires 7426. Likewise, the height HDD is less than the axles 7429 between tires 7426 (i.e. bogey assemblies), and this dolly geometry allows it to enter beneath the underside 7431 of the trailer 7424, and pass between, and under, the landing gear assembly 7427 and trailer hitch 7428. Using its sensor(s) 7433, the dolly can be guided to, and aligned with (e.g. using machine vision and pattern recognition that identifies the shapes of the parallel axles 7429) respect to a location relative to the rear axles 7429 so as to engage the tires 7426 as described below.

Figure 74C:
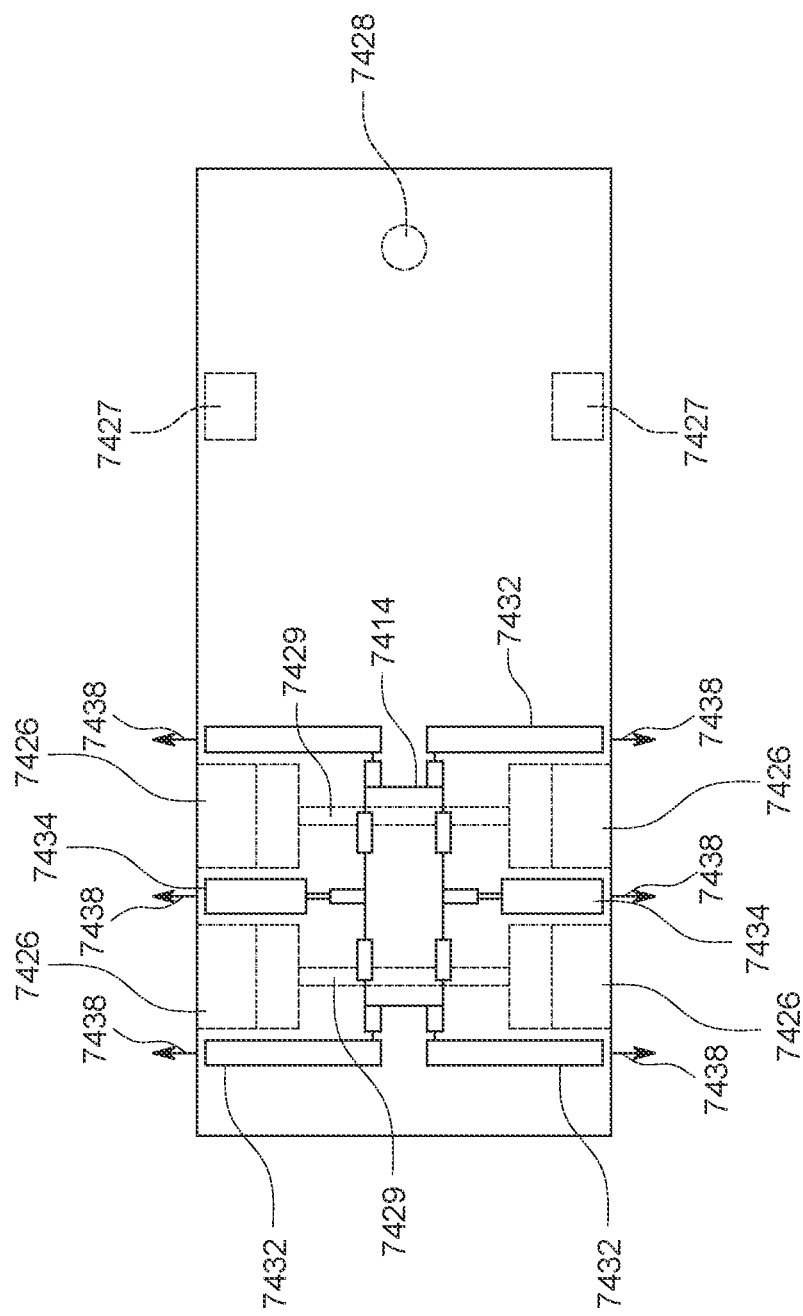
FIG. 74C is an exposed top view of the trailer of FIGS. 74A and 74B, showing the dolly engaged with the wheels of the trailer so as to lift them off the ground.

The deployable dolly 7414 consists of a central body/housing 7430 that contains the CPU 7420 and other electro-mechanical systems. A plurality of movable pinching mechanisms 7432 and 7434 extend outwardly from the body 7430 and, respectively engage the outer edges and inner facing edges of the trailer tires 7426. When engaged, pneumatic, hydraulic or electrical actuators cause the pinching mechanisms 7432 and 7434 to lift the tires upwardly out of engagement with the ground 7436. The engagement operation can include extending the pinching mechanisms 7432, 7434 outwardly (arrows 7438) from a non-interfering position between the tires 7426 to the interfering position depicted in FIG. 74C. In this manner the overall width of the dolly becomes greater that the inter-tire width WTT.

When engaged and lifted, the trailer rear is under control of the dolly 7414 and its wheels 7423. These dolly wheels 7423 can be independently braked via the truck controller so as to provide appropriate emergency and running braking operations as required. The dolly 7414 can also include various brake and running taillights (e.g. marker and reversing lights—not shown) as required. The trailer 7424 is hitched to the yard truck 7412 using automated or manually assisted techniques, as described generally herein. The hitching can occur either before or after the dolly 7414 lifts the wheels 7426 off the ground 7436. The dolly can then operate in cooperation with motion of the truck via appropriate control commands/signals. The dolly wheels can either freewheel (except when applying desired braking) and rely upon the driving power of the truck exclusively, or can provide supplemental driving power and/or steering assist to the hitched truck and trailer assembly.

Figure 74D:
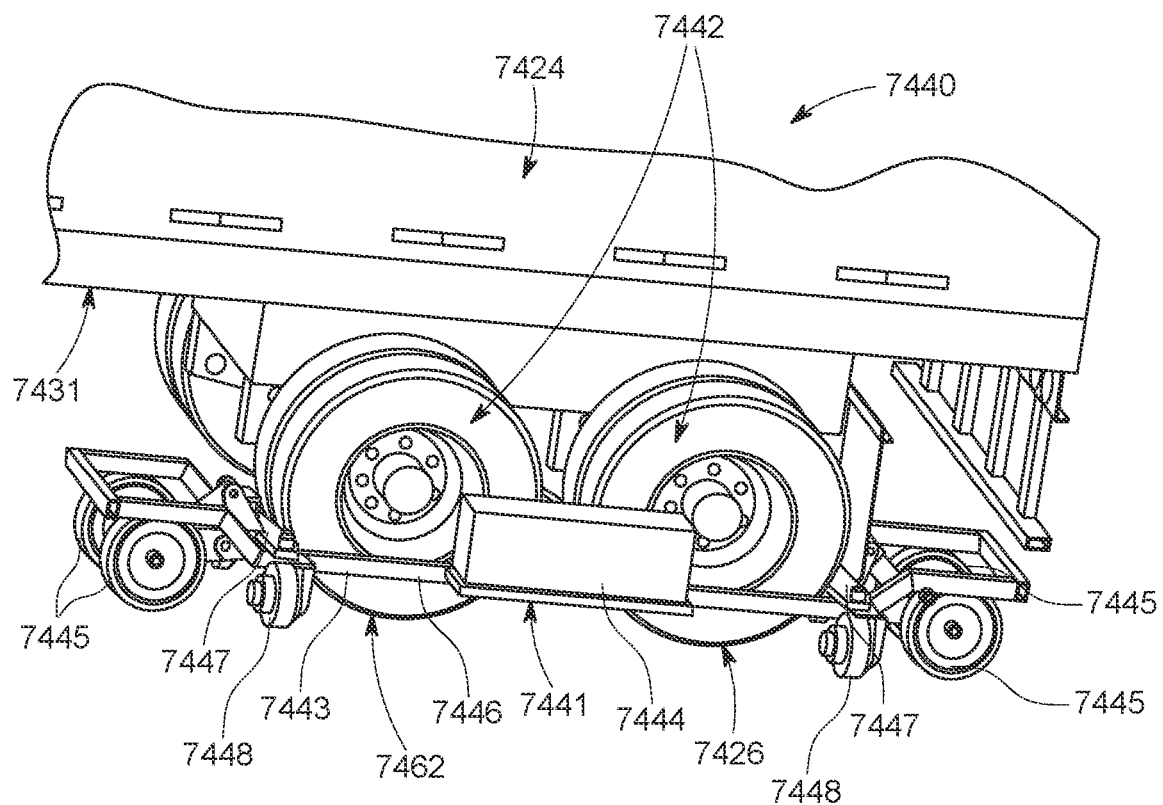
FIG. 74D is a perspective view of one dolly of a pair of dollies, shown engaging a wheel set on a respective side of the exemplary trailer, according to an embodiment.

With reference to FIG. 74D, another arrangement 7440, similar to that described above in FIGS. 73 and 74, is shown. In this embodiment, a pair of robotic dollies 7441 (only left side is depicted for clarity) that are adapted to engage the left and right sets of trailer tires 7426 from the outside of the sidewalls 7442. The dolly, thus, is arranged as an open framework 7443 with a power and control housing 7444 mounted to an outside elongated support beam 7446 that ties the opposing drive wheels 7445 together. The dolly 7441 can be tethered or untethered as described variously above. The front and rear faces of the tires 7426 are cradled by somewhat wedge shaped members 7447. After moving into engagement using drive wheels 7445, each side of the trailer is lifted off the ground via the respective sets of tires 7426, with the use of hydraulic/pneumatic pistons or electrically geared motors (actuators) 7448 that operate in cooperation, allowing for maintained balance and control. Upon completion of the trailer lifting and movement task, the dollies 7441 either return to the yard truck, and an associated docking station to charge (assuming they are untethered in an exemplary embodiment, whereby charging is accomplished using direct charging connections, inductive charging, etc.), or the dollies 7441 can travel to, and dock at, at a convenient charging station in proximity to the docking bays or parking areas, until the next yard truck requests assistance in lifting and transporting a trailer.

Figure 74E:
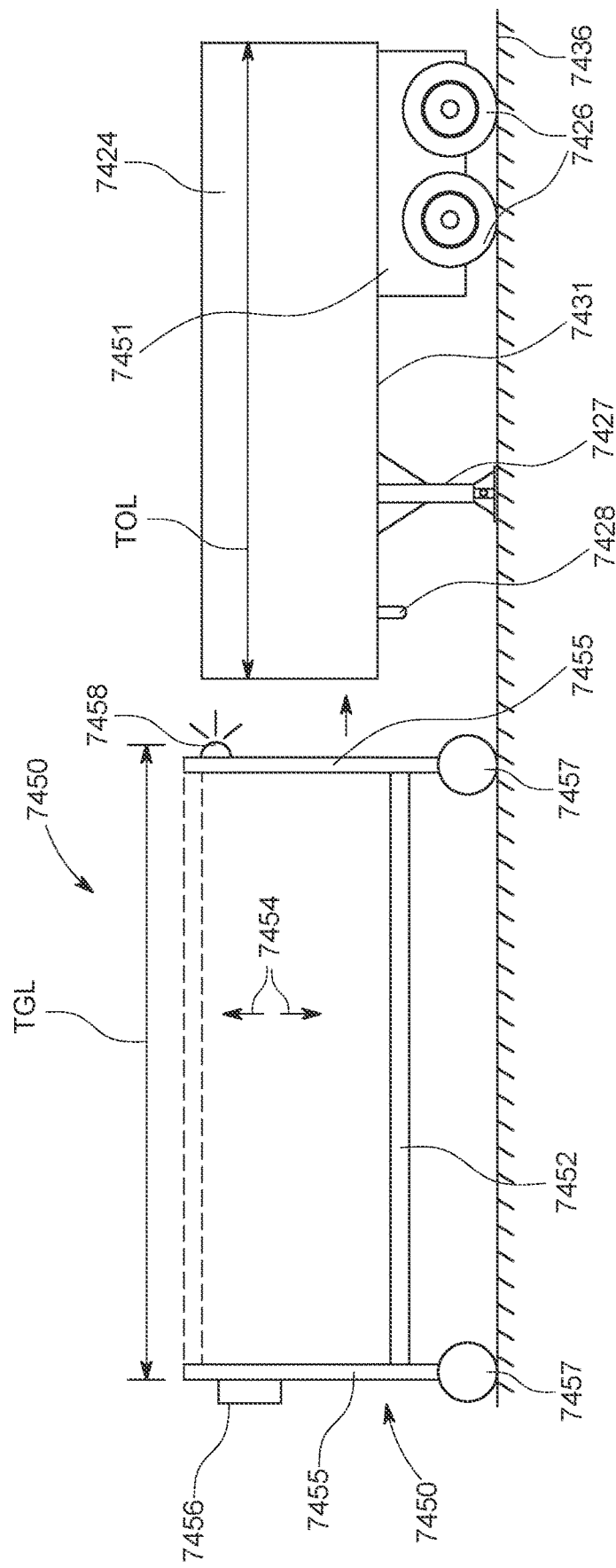
FIG. 74E is a side view of a robotic gantry system for raising the entirety of the underside of an exemplary trailer in conjunction with an autonomous yard truck (not shown), or as an independent autonomous transport unit, so as to avoid the requirement to connect brake pneumatic lines and/or electrical connections from the yard truck, shown preparing to engage the trailer, according to an embodiment.
Figure 74F:
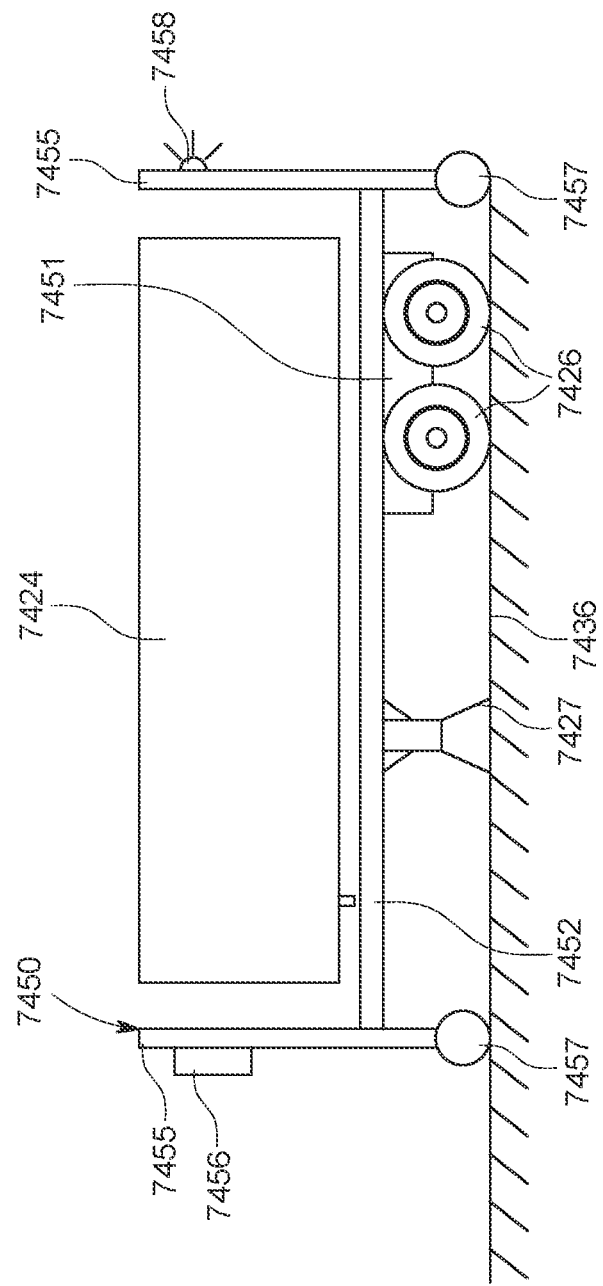
FIG. 74F is a side view of the robotic gantry system and exemplary trailer of FIG. 74E, shown engaged and prior to lifting.
Figure 74G:
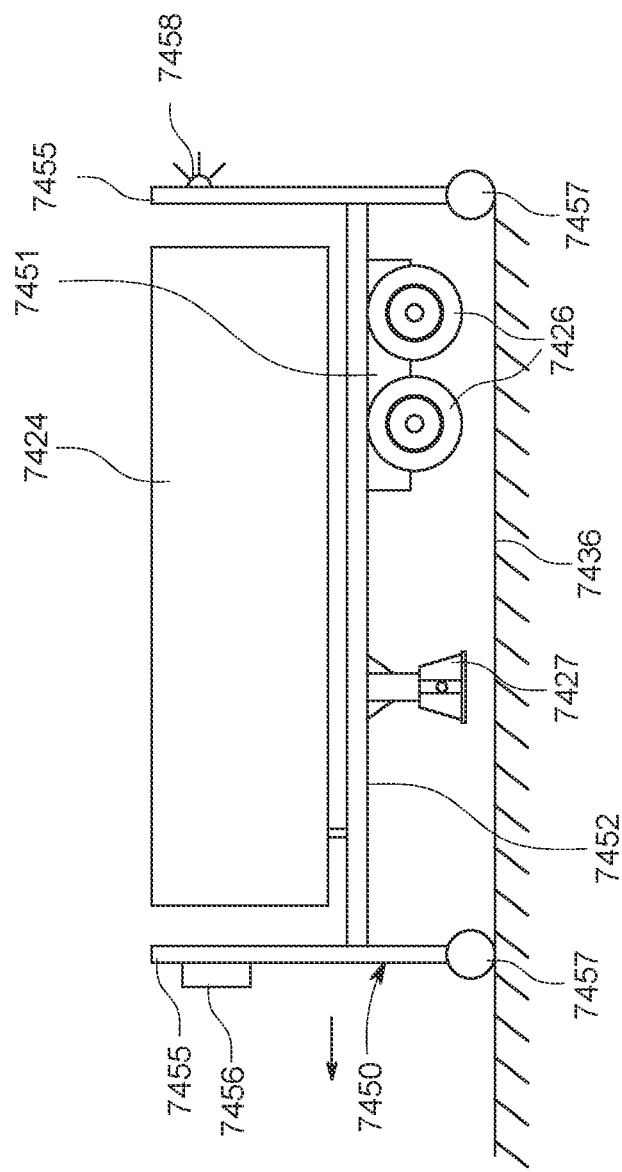
FIG. 74G is a side view of the robotic gantry system and exemplary trailer of FIG. 74E, shown engaged and lifting the trailer off the ground for transport.

With reference to a further embodiment shown in FIGS. 74E-74G an automated gantry frame and wheel system 7450 is used to straddle the rear end 7451 of a trailer 7424 and either affix to the trailer wheels 7426 or the underside 7431 of the trailer frame, in order to lift the rear end of the trailer 7424 off of the ground 7436. As shown, the system 7450 defines a vertically (double-arrows 7454) moving support frame 7452 attached to opposing uprights 7455 at the front and rear of the system 7450. In an embodiment, the gantry system 7450 can define an overall length TGL that is typically (but not necessarily) greater than the overall length of the trailer 7424 so that the uprights reside in front of and behind the front and rear sides of the trailer, respectively. In alternate embodiments, the gantry can be less than this "full length" design. The support is adapted to engage the underside 7431 of the trailer 7424. In this embodiments, the uprights include wheels 7457 that are driven and/or steerable using an on-board (e.g. rechargeable) power supply. Motion of the system is controlled via a control unit and transceiver 7456, which can communicate with the yard truck to provide motion and sensory information. A rear sensing and illumination pod (or a plurality of pods/units) 7458 can be used to provide running and brake lights as well as perception system information for use in guiding the system 7450 onto a trailer and navigating therefrom. As shown in FIG. 74F, the system 7450 can move into alignment with the trailer 7424, with the support 7457 residing below the underside 7431 of the trailer. Then, in FIG. 74G, the support is raised to locate the trailer wheels 7426 and landing gear 7427 out of engagement with the ground 7436. The gantry system 7450 can then move toward the yard truck (not shown in this example) or the yard truck can move toward the system. The front of the gantry system 7450 is arranged to allow the truck to hitch to the trailer through the front uprights 7455 (or hitch directly to the system 7450, itself), and thereby tow the engaged trailer to a desired location within the yard. During towing, the system is in communication with the yard truck and is capable of independent braking (on some or all of wheels 7457), rear sensing assistance, as well as rear marker and signal lighting. In another embodiment, the system 7450 can be tethered to the yard truck in a manner described generally above, and can be towed or follow the yard truck as it moves around the yard. Alternatively, a gantry system 7450 can be independently automated, incorporating self-propulsion, sensing, and autonomy, and hence replacing the need for an independent yard truck. In any embodiment, additional sensors, operationally and/or functionally similar to those of the above-described yard truck(s), can be used to facilitate independent operation—for example, sensors located facing forward.

Figure 74H:
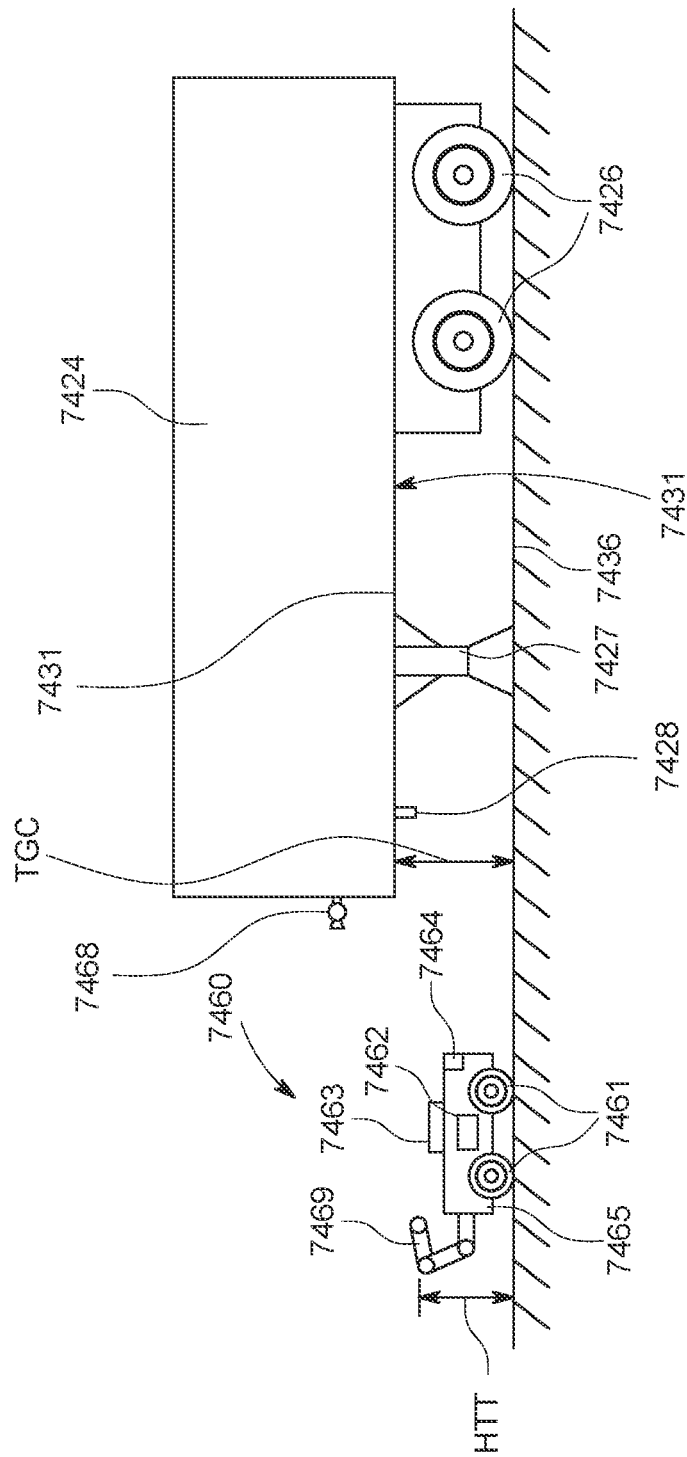
FIG. 74H is a side view of a robotic tug vehicle for raising the front kingpin of an exemplary trailer, and a robotic arm on the tug vehicle that provides connections between the tug vehicle and trailer brake pneumatic lines and/or electrical connections, shown preparing to engage the trailer, according to an embodiment.
Figure 74:
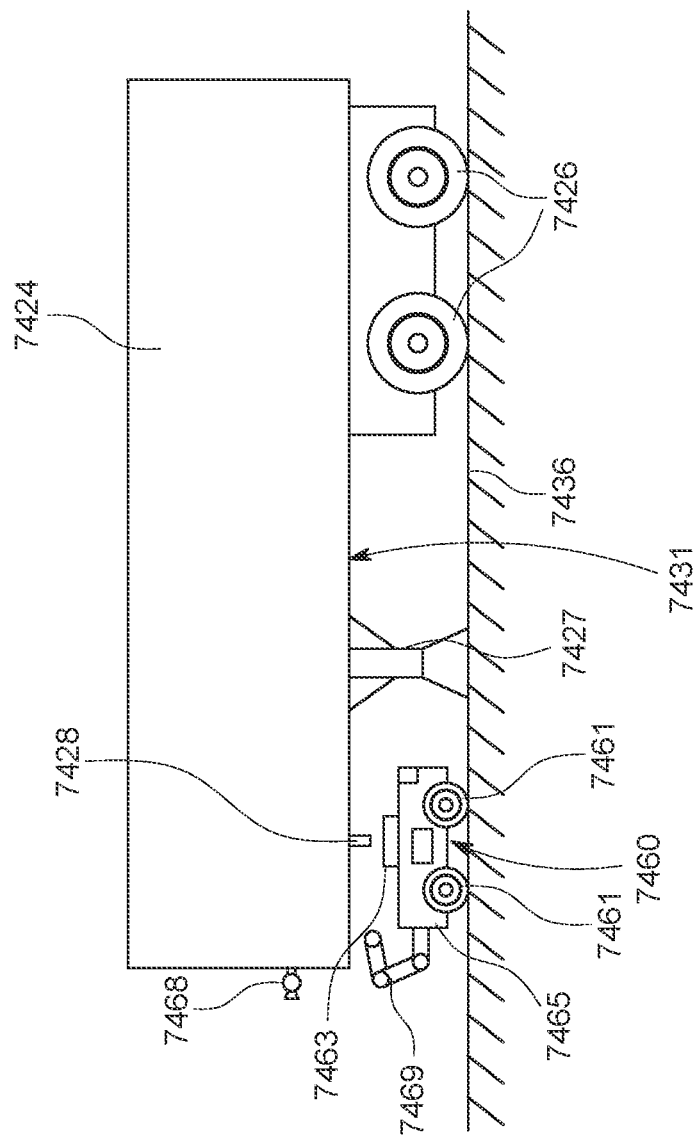

As described above, alternate systems and methods of trailer movement, which may partially or fully omit a yard truck, can be employed in a facility setting. In an embodiment, shown in FIGS. 74H-74J, a full size yard truck, as described above, is replaced with a self-powered (electric, internal combustion, etc.) mini-tug vehicle 7460 equipped with sensors 7464 (for a perception system) and a smart platform 7463 that allows for automated connection to a kingpin 7428 of a trailer 7424, and navigation in a yard setting under the power of its wheels 7461 and control of a CPU and transceiver 7462 that communicates (e.g. directly) with the system server via a wireless data link (as described generally above with reference to yard trucks). The vehicle 7460 can include a heavily reinforced chassis 7465, this is suitably squat bodied to maneuver under the trailer 7424 (i.e. the maximum height HTT is less that the ground clearance TGC between the front underside of the trailer 7424 and the ground 7436). The configuration should also reside in front of the landing gear 7427, so as to avoid interference therewith. Depending upon the condition of the yard and/or other factors, the wheels 7461 can be substituted with crawler tracks. As shown in FIG. 74H, the automated mini-tug vehicle 7460 can approach the trailer front using sensors 7464 that provide a perception system with data in a manner described above. It can, thus, be dispatched by the system server to find a specific trailer in the yard from a remote location—for example a charging and/or waiting area. The vehicle 7460 is aligned with the trailer centerline using the perception system and passes underneath the front.

Figure 74J:
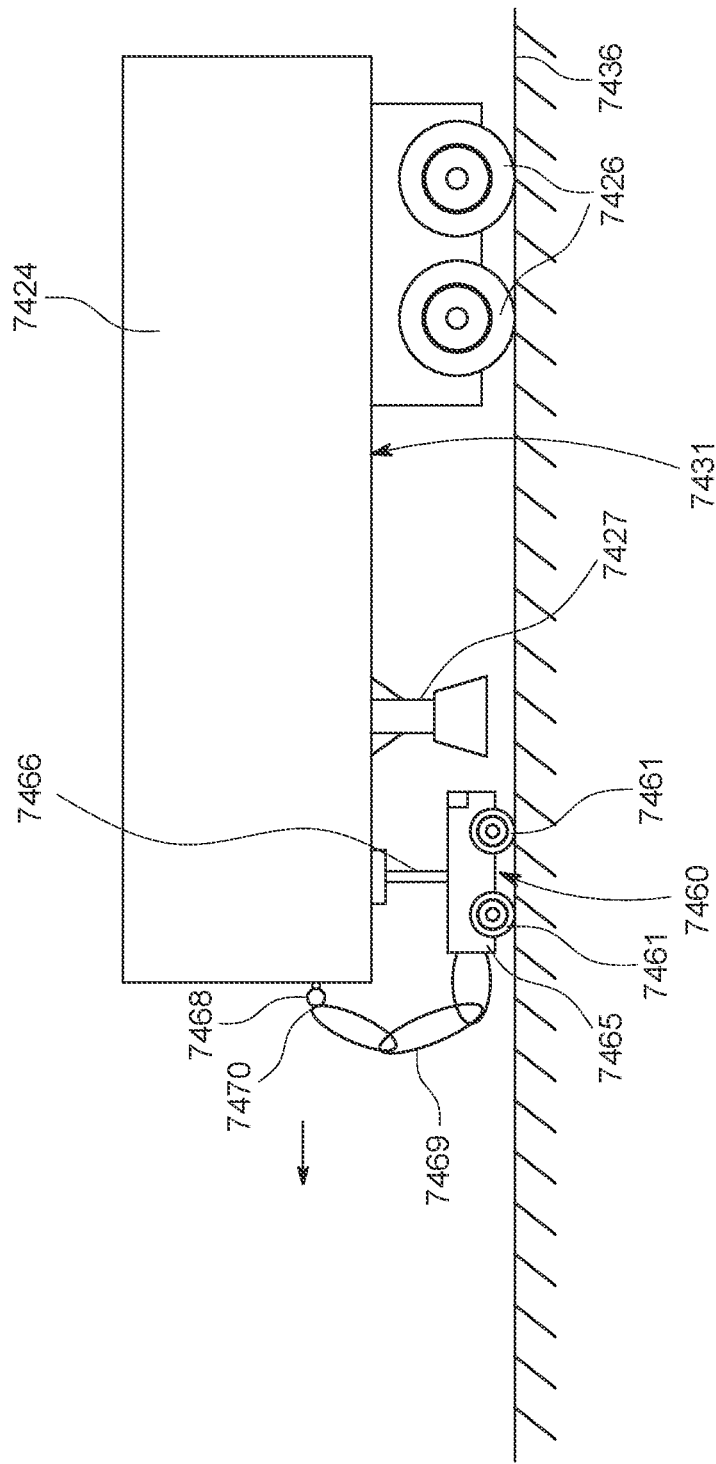
FIG. 74J is a side view of the tug vehicle and the trailer of FIGS. 74H and 74I, in which a vertical post has engaged and raised the kingpin, and the robotic arm has engaged a glad hand connection on the trailer to provide brake pneumatic power and/or electricity.

As shown in FIG. 74I, the tug vehicle 7460 then aligns with the trailer kingpin 7428. Then, as shown in FIG. 74J, the platform 7463 and vertically extends a post 7466 with a fifth wheel device capable of interlocking with a trailer kingpin 7428, and lifting the front of the trailer 7424 so that the landing gear clears the ground in the manner of a conventional truck engagement with the kingpin. The chassis can include an air tank and/or compressor and associated valve assembly that is adapted to pressurize the truck braking system via one or more glad hand connections 7468. A robotic arm 7469 is attached to the chassis. It can include on-board sensors that allow its end effector 7470 to engage the glad hand 7468 and complete a pressure connection. The operation of the arm and/or sensors can be similar to those described herein for yard truck embodiments. Other connection mechanisms, including a self-guiding, quick disconnect connection (as described above) can be used on the chassis 7465 in alternate embodiments. As shown in FIGS. 74H and 74I, the arm 7469 can be retracted during travel and alignment, and then extended to connect with the truck during or after the kingpin is engaged. The arm can also be used to connect trailer electrics so that the vehicle 7460 can operate running and brake lights as appropriate. A significant advantage of the illustrative tug configuration is that it would be capable of rotating 360 degrees about the kingpin, and hence have superior trailer maneuvering capabilities.

Figure 74K:
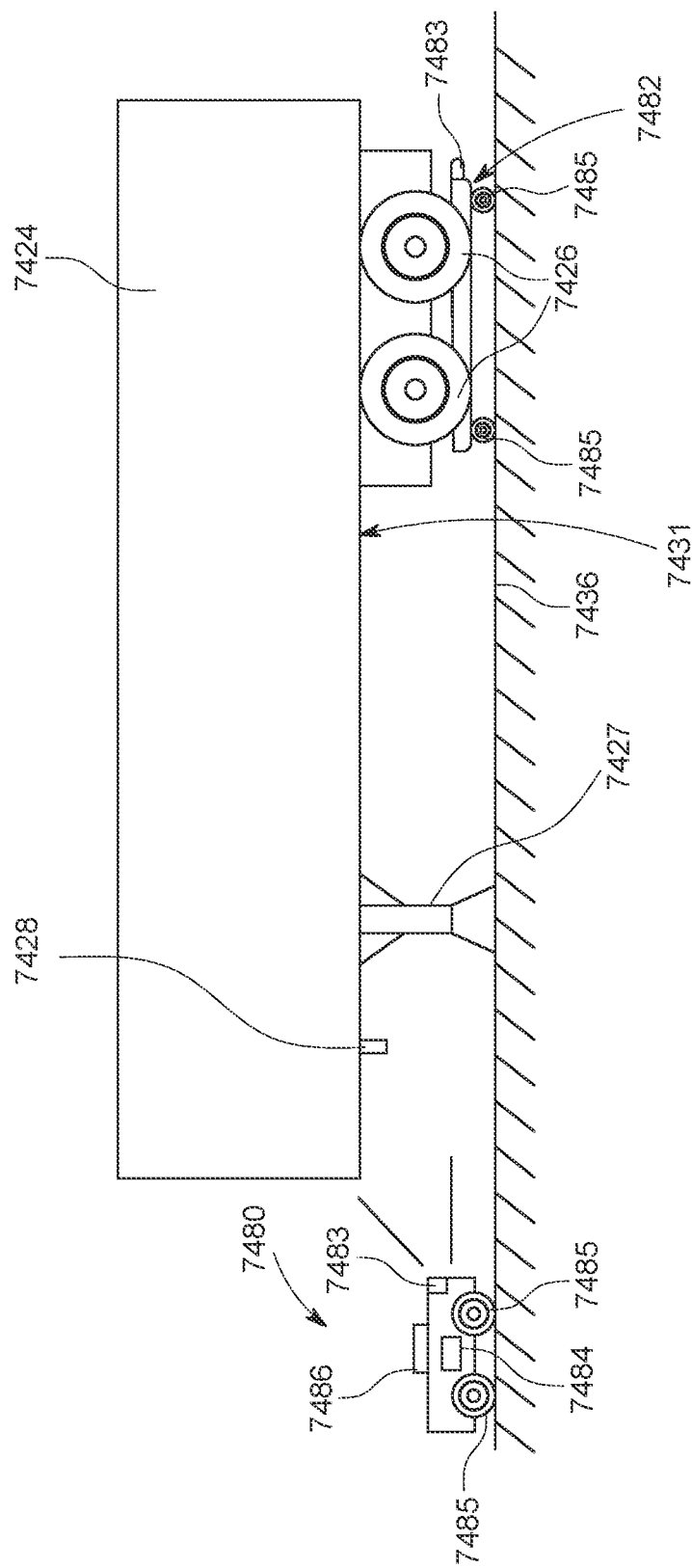
FIG. 74K is a side view of a robotic tug vehicle for raising the front kingpin of an exemplary trailer, and a separate dolly assembly that raises the rear wheels to avoid a requirement for connections between the tug vehicle and trailer brake pneumatic lines and/or electrical connections, shown preparing to engage the trailer, according to an embodiment.
Figure 74L:
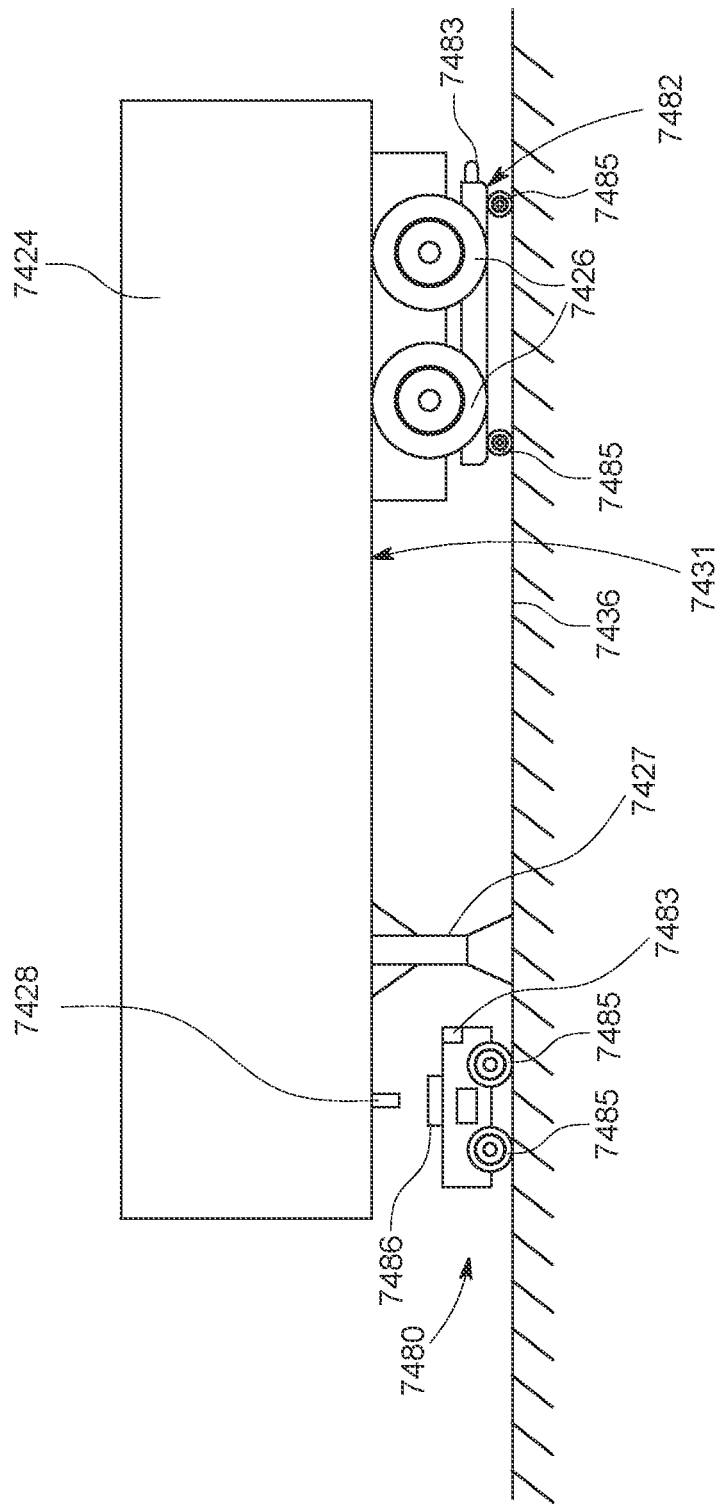
FIG. 74L is a side view of the tug vehicle and trailer of FIG. 74K in alignment, preparing to engage and lift the kingpin.
Figure 74M:
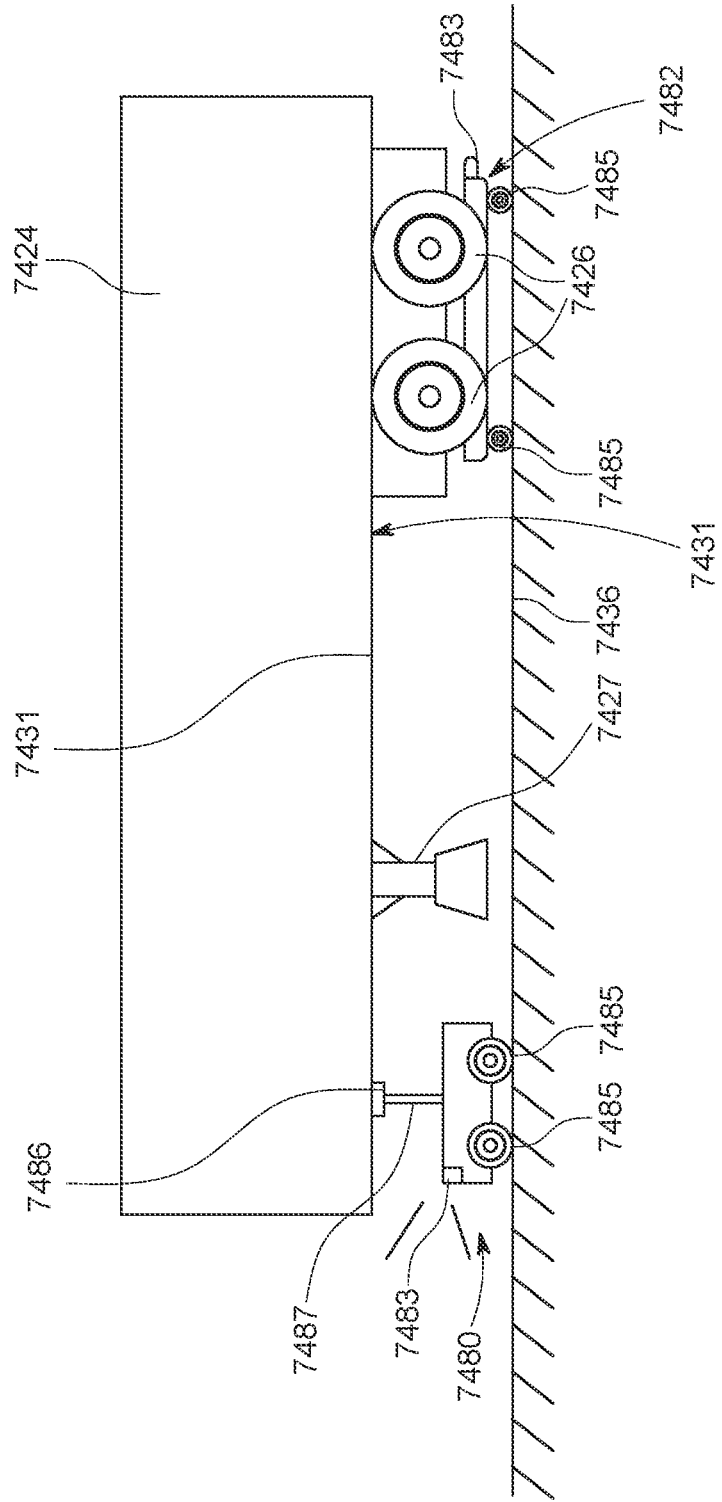
FIG. 74M is a side view of the tug vehicle and the trailer of FIGS. 74K and 74L, in which a vertical post has engaged and raised the kingpin, and the dolly assembly allows for free movement of the trailer rear with associated braking and illumination provided by the dolly assembly.

In an alternate embodiment, shown in FIGS. 74K-74M, a tug vehicle 7480 omits a separate pneumatic connection (robotic) arm, and interoperates with other trailer wheel lifting systems, such as one of the above-described dolly assemblies 7482. The dollies can include drive wheels 7485 as described above and appropriate rear illumination and sensing assemblies (exemplary pods 7483). As shown in FIG. 74K, the tug arrives at a trailer 7424 with a rear end already lifted from the ground 7436 via a dolly arrangement 7482. The front end still rests on the landing gear 7427. The vehicle 7480 aligns with the kingpin 7428 using sensors (and associated perception system) that communicates with the system server via the CPU and transceiver 7484. The tug wheels 7485 (or tracks) are instructed to drive and steer via data handled through the CPU 7484. Once the tug platform 7486 aligns with the kingpin 7428 (FIG. 74L), the vertical post 7487 extends to engage the kingpin 7428 and lift the trailer so that the landing gear 7427 clears the ground 7436. The tug can rotate (e.g.) 180 degrees so that the sensors 7483 face forwardly and the tug vehicle 7480 can drive the trailer to a destination in conjunction with the dolly arrangement 7482. The dolly(ies) can be controlled via the tug vehicle 7480 (similar to a yard truck embodiment), or can be under direct (e.g. wireless) control of the system server. In embodiments, the dolly(ies) can be tethered to the tug vehicle or separate, and can either trail the vehicle or arrive from a remote location (e.g. a charging and/or waiting area).

Figure 74N:
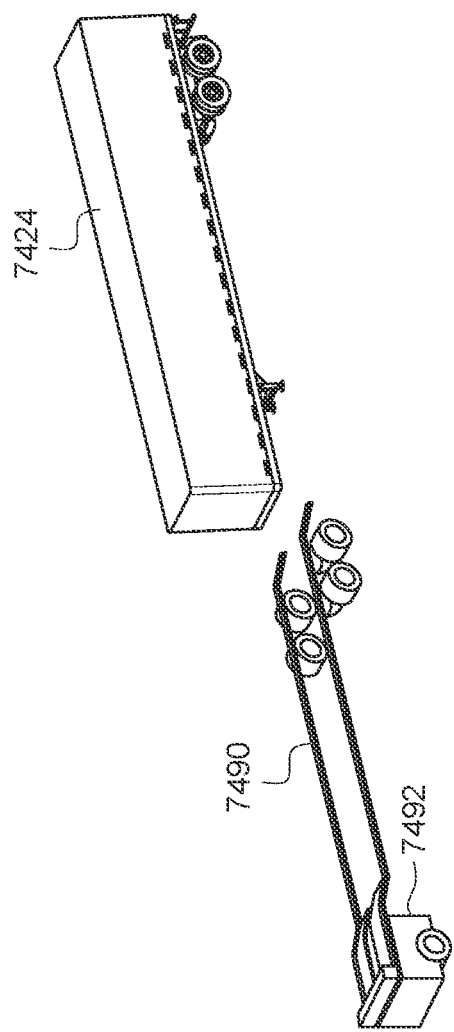
FIG. 74N is a perspective view of a split dolly trailer with an integrated tug.

Many of the above features can be combined in various ways. By way of non-limiting example, FIG. 74N is a perspective view of a split dolly trailer with an integrated tug. The split dolly trailer 7490 and integrated tug 7492 can be used in receiving and transporting an OTR trailer in a manner that can be free of electrical or pneumatic connections between the OTR trailer and the truck, because the various braking and signaling functions are provided by the split dolly trailer 7490 and integrated tug.

It is contemplated that any of the above dolly, gantry or tug vehicle embodiments can incorporate electrical, pneumatic and/or hydraulic steering and power train components that can be arranged according to skill in the art. Likewise, various custom-designed components can be employed in accordance with skill in the art to accommodate particular performance and/or load-handling requirements for the system.

2. Facility Arrangements

In another embodiment, the yard or facility site is instrumented with sensing devices, including a vision system camera and other sensing modalities (e.g. radar, LIDAR, laser range finds, etc.) instead (or in addition to) the trailer. Cameras and sensors can be mounted in a static configuration with coverage for each potential location that requires reversing of the trailer as part of the operation. As with the trailer-mounted systems, these sensors require communication to relay sensor data to the yard truck's autonomous navigation system.

Figure 75:
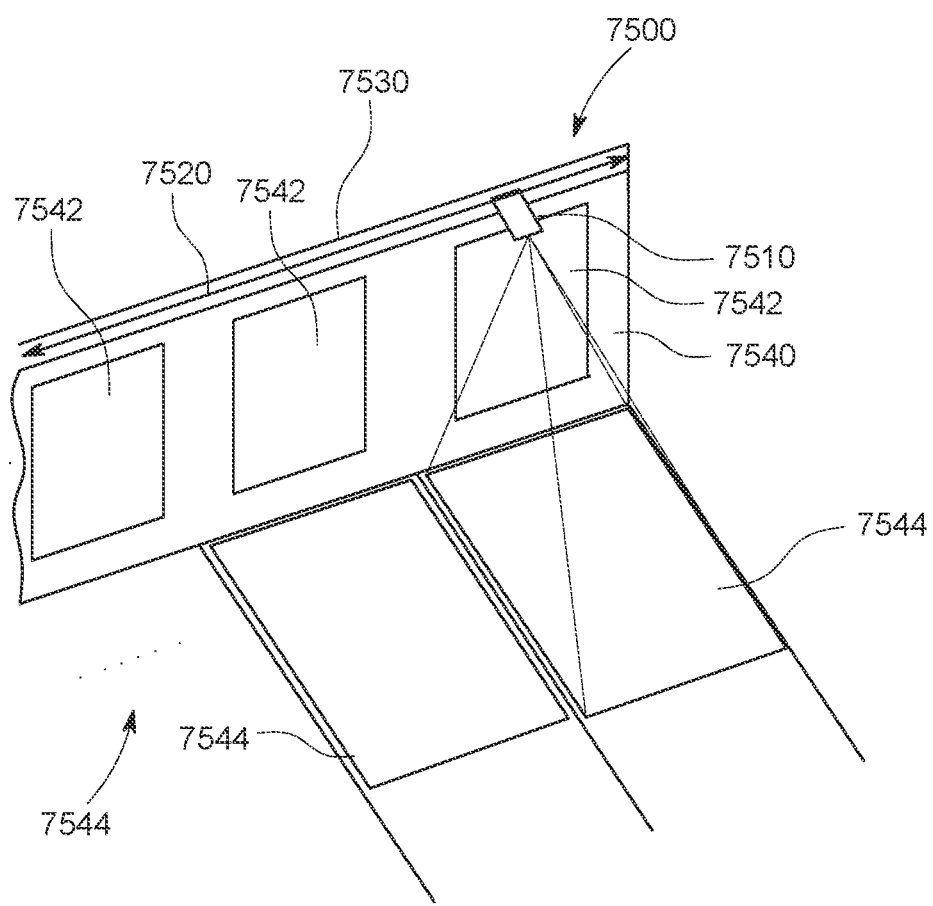
FIG. 75 is a fragmentary perspective view of a facility-mounted moving sensing system for providing images of the rear of a trailer, typically towed by an autonomous truck, according to an embodiment.

By way of non-limiting example, reference is made to FIG. 75, which shows a facility 7500 that includes site-mounted sensing, including sensors 7510 capable of side-to-side motion (arrow 7520) between potential reversing locations, for example by movement along a wire or rail 7530 attached to the side of a building 7540 (e.g. a loading dock with a series of bay doors 7542) to cover the "blind-spot" regions 7544. The exemplary sensor assembly 7510 is interfaced with a (e.g. wireless) communication system that relays sensor data to the yard truck's autonomous navigation system or system server. The sensor can be adapted to respond to an arriving or departing truck and move into its region to cover its operations. If a plurality of trucks are expected to move in relatively close time intervals to each other, then a plurality of sensors can be provided on one or more rails, wires, etc. In an embodiment, these moving sensor assemblies' sensors can be adapted to move independently from the site infrastructure, resulting in the UAV or UGV implementation described above.

Note that additional site-mounted sensing operations can be provided in embodiments, which can include ground-mounted radar or LIDAR sensors and/or cameras that can be adapted to detect non-truck movement in the yard, and report such to the system server. This can be used for safety and security, tracking potential hazards and obstructions, as well as persons moving around the yard who may be at risk for injury from moving vehicles.

In embodiments, the operation of an auxiliary trailer jackstand can be automated and augmented based upon data and instructions from the yard tuck and/or system server. Currently, separate jackstands are sometimes employed at distribution centers and production facilities, to prevent a collapse of a trailer due to trailer landing gear failure. This current method requires a driver or ground personnel to locate and properly position (and then later retract and stow) a jackstand under the front of the trailer each time it is unhitched from the truck.

P. Automated Jackstands

Figure 76:
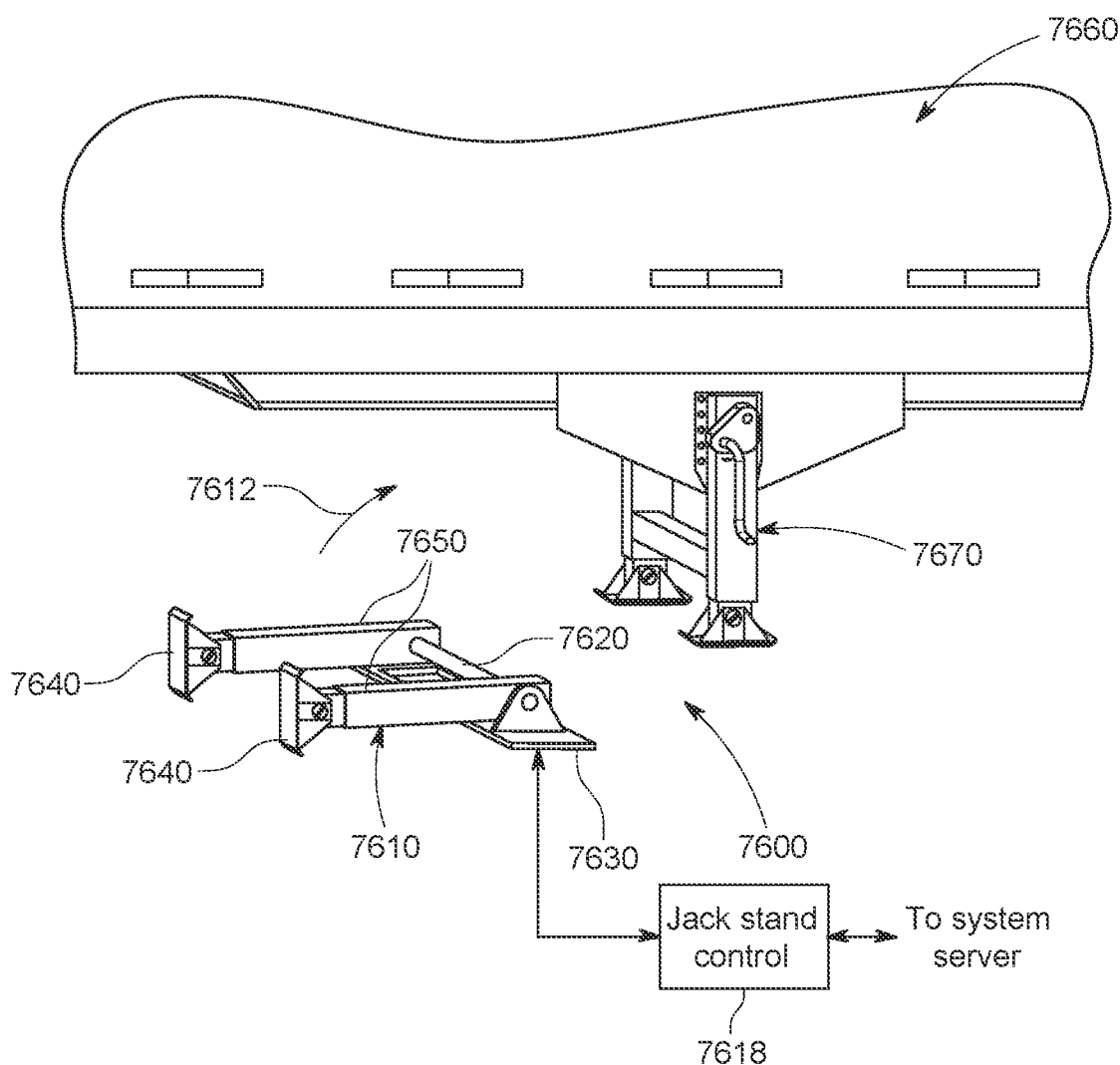
FIG. 76 is a fragmentary perspective view of a trailer and associated landing gear located adjacent to an automatically deploying jack stand, shown in a retracted position, flush to the ground, according to an embodiment.
Figure 77:
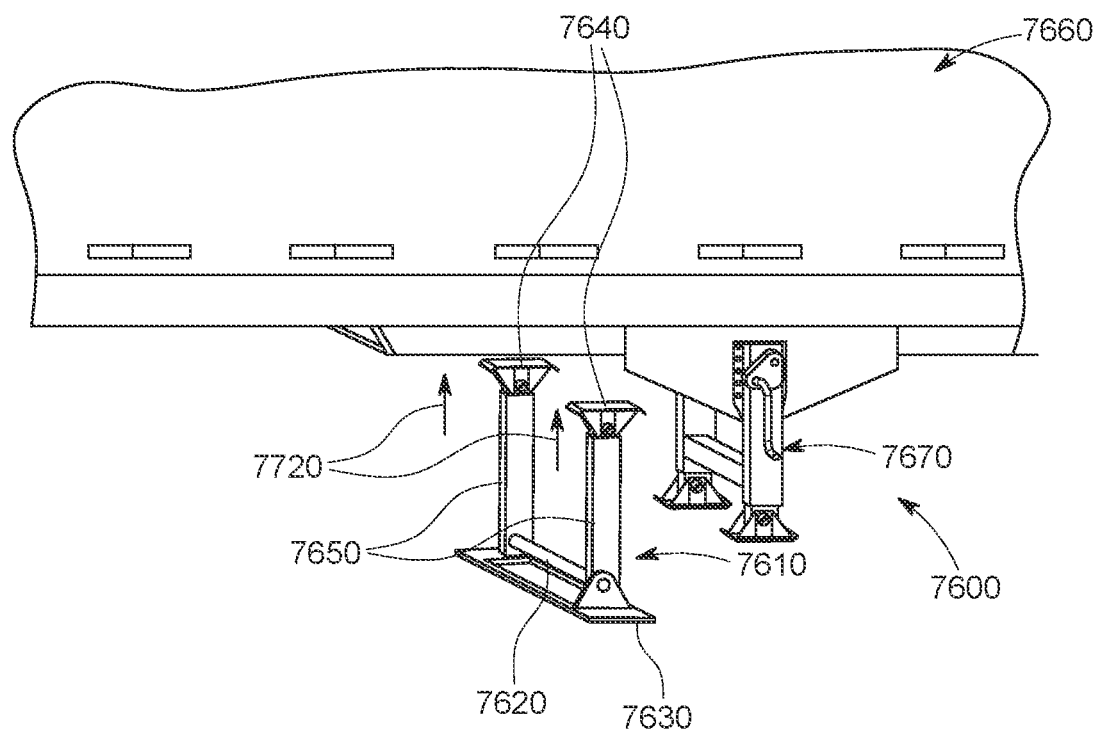
Figure 78:
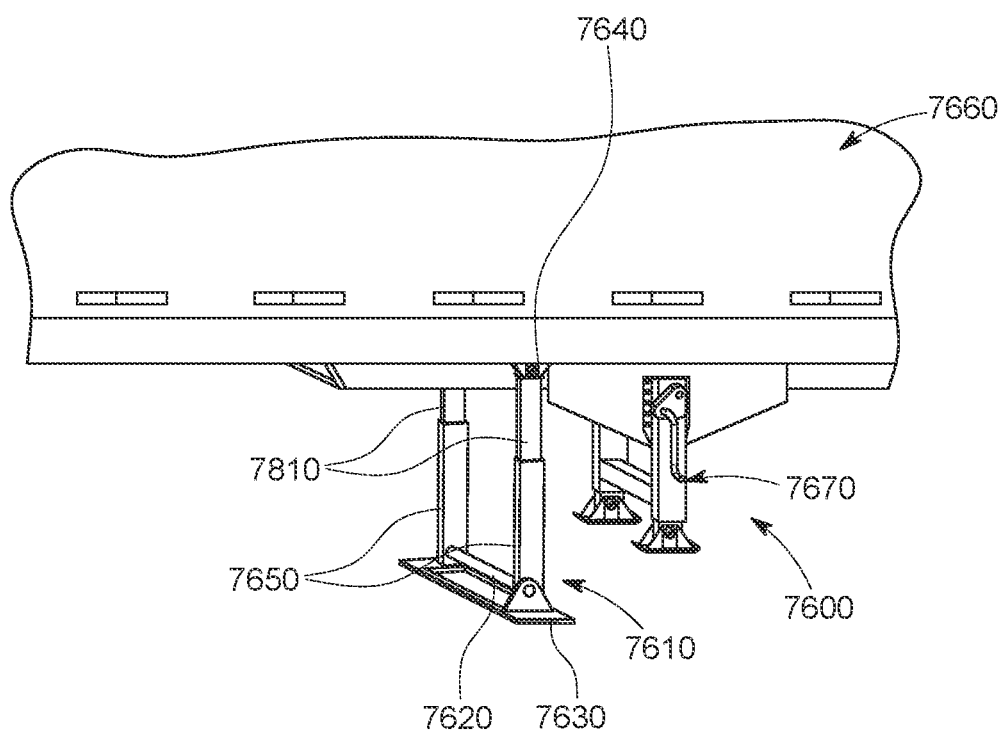

FIGS. 76-78 show an automated jackstand arrangement 7600 in which the trailer jackstand is pivotally movable between a flush position against the ground (FIG. 76) and an auto-deployed position, in which it pivots (curved arrow 7612, about pivot axle 7620) on its base 7630. In this upright, deployed position (FIG. 77), the jack pads 7640 on spaced apart jack legs 7650 confront the bottom of the trailer 7660. The pads 7640 are then moved upwardly (arrows 7720) on telescoping members 7810 of the legs 7650 until they pressurably engage the bottom of the trailer 7660.

Hydraulic or pneumatic pistons can be used to drive the telescoping members 7810. Likewise, a hydraulic, pneumatic or electromechanical system, with appropriate locking device(s), can be used to pivot the jackstand from a grounded orientation (FIG. 76) to a deployed orientation (FIGS. 77 and 78). The engagement of the jackstand pads 7640 with the bottom of the trailer 7660, provides further support for the landing gear 7670, as well as the added benefit of securing the trailer against skidding away from the loading bay in the manner of wheel chocks. The automated jackstand can either be permanently anchored to the ground for specific length trailers, or alternately, or can be mounted on a sliding track that rides beneath the trailer, thereby allowing flexibility of variable trailer lengths, communicated via yard management system or automated yard truck system to a jackstand controller 7618, which also controls pivoting deployment.

Q. Automated Chocking

From a safety standpoint many operations choose to place wheel chocks in front of a trailer's tires when the trailer is being loaded or unloaded at a facility dock/loading bay. This is due to the historical precedence of the trailer separating away from a dock, typically when it is being loaded or unloaded with the assistance of a vehicle, such as a forklift. The gap left between the trailer and dock can lead to serious injury or death from impingement should the trailer suddenly lurch forward or backward.

Figure 79:
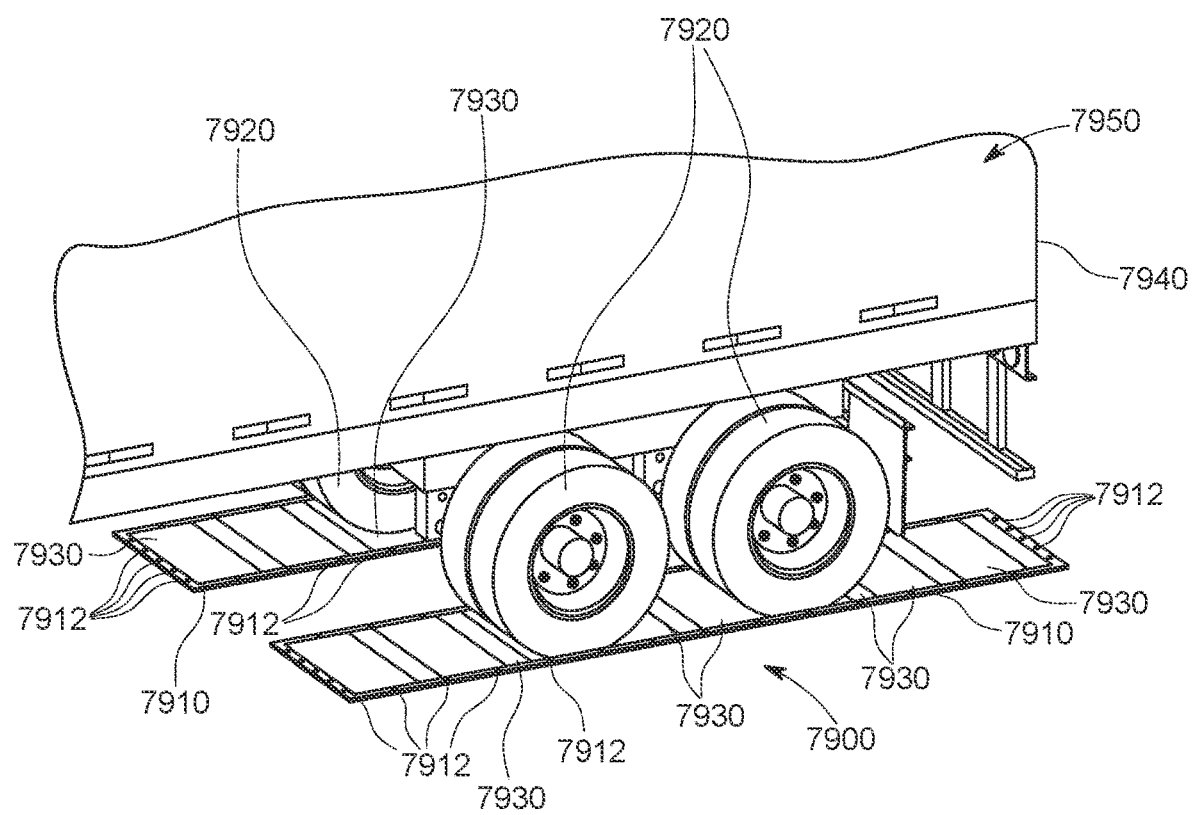
Figure 80:
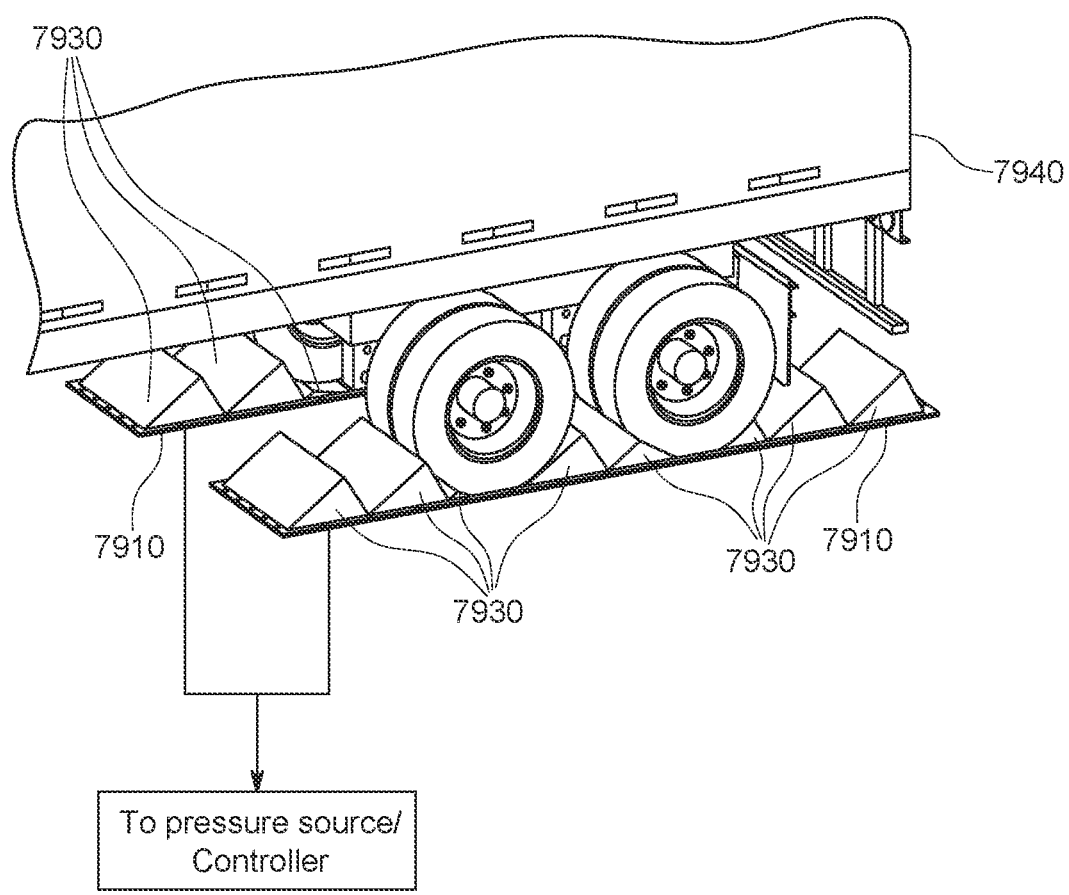

An automated chocking system 7900, according to an embodiment is shown in FIGS. 79 and 80. The system comprises a baseplate tray 7910, located under each trailer wheel set 7920, which can be bolted 7912 (or otherwise secured firmly) to the ground. The tray 7910 retains a plurality (e.g. eight) in-line air bladders 7930 made from high-density rubber, or a similarly behaving compound (e.g. a reinforced fabric), that are wear and tear resistant to the effects of trailer wheels when deflated (FIG. 79). Once the trailer tires pull onto the tray 7910 and are properly positioned (e.g. rear 7940 of trailer 7950 positioned against bay door for loading/unloading), a switch can be manually thrown, or automatically triggered, that will open an air valve (pressure source) for a specific loading bay, for example, originating from a centrally located air compressor that services multiple docks. The opening of the air valve will start the inflation of the air bladders that are not compressed by the weight of the trailer tires (see FIG. 80). The air bladders assume a sawtooth side cross section (each tooth defining an individual triangular side cross section. Hence the surrounding teeth serve to capture the wheels and prevent forward or rearward rolling motion. Once the loading or unloading of the trailer has been completed, an operator in the facility can either throw a switch that will automatically deflate the bladders (returning them to the flattened configuration of FIG. 79), or provide a signal to the autonomous vehicle system, that can remotely activate the deflation mechanism. The dimensions of each triangular tooth are highly variable. In general, they should be sized and arranged to provide a cradling ramp on each side of a wheel set with no more than one tooth compressed therebetween.

Figure 81:
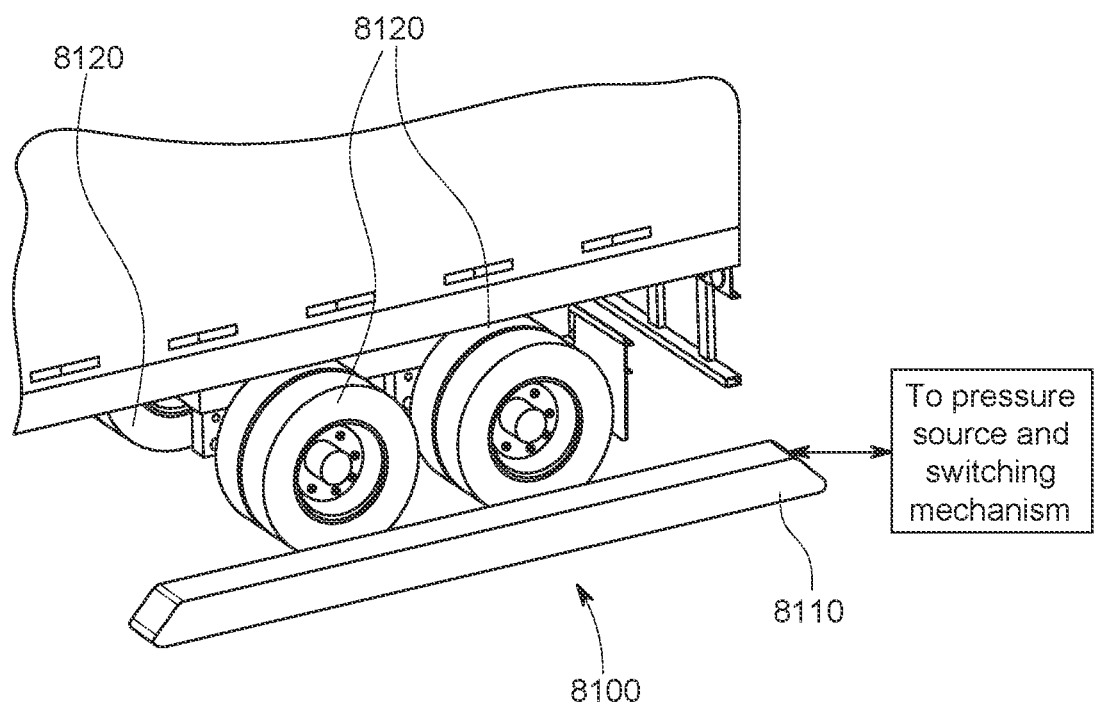
Figure 82:
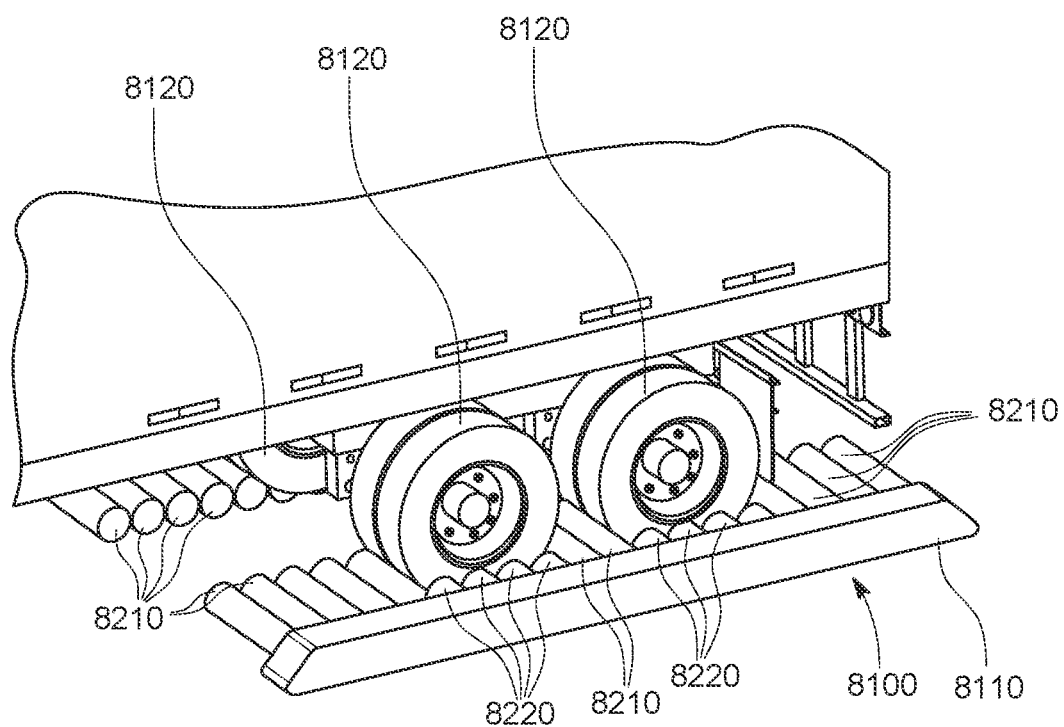

FIGS. 81 and 82 show an inflatable automated chocking system 8100 according to an embodiment. It consists of a pair of rigid framed and hard mounted air manifolds 8110, each located adjacent to the outside of the trailer tires 8120. Along the length of the manifold 8110 there is a row of independent tubes that can be inflated once the trailer is in position against the loading bay, as shown. Once triggered to inflate, all tubes 8210 that are not obstructed (by tires 8120) rigidly fill with air and surround the tires, preventing them from rolling as shown in FIG. 82. Tubes 8220 that are partly or fully obstructed by the tires 8120 do not fill completely (as shown in FIG. 82). These tubes can resist complete inflation based upon a safety valve in each tube pneumatic circuit that senses resistance to pressurization or based upon the degree of pressure applied to the tube being insufficient to overcome the resistance posed by the sidewall of the trailer tire. Upon deflation, pressurized air is extracted from the tubes 8210, and the tubes retract out of the path of the departing trailer. A suction source can be employed to ensure full retraction into the manifold 8110. Alternatively, the tubes can include an elastic material or an internal expansion spring (metal or polymer) that forces retraction when air pressure is released. The degree of pressure used to inflate the tubes, as well as the material thickness and durability is chosen to ensure that the trailer remains stationary when inflated. The cylindrical diameter of the tubes can be approximately several inches to a foot and the length can be approximately the same as or greater than the width of at least one (and generally both) tires in a wheel set 8120.

Figure 83:
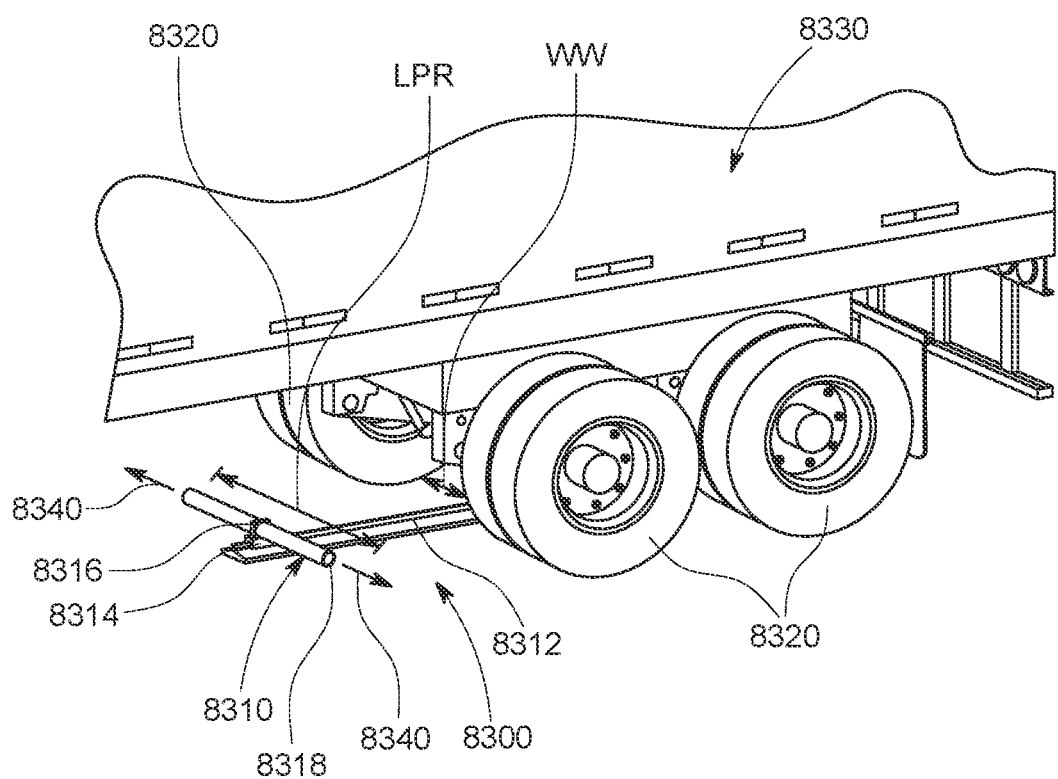
Figure 84:
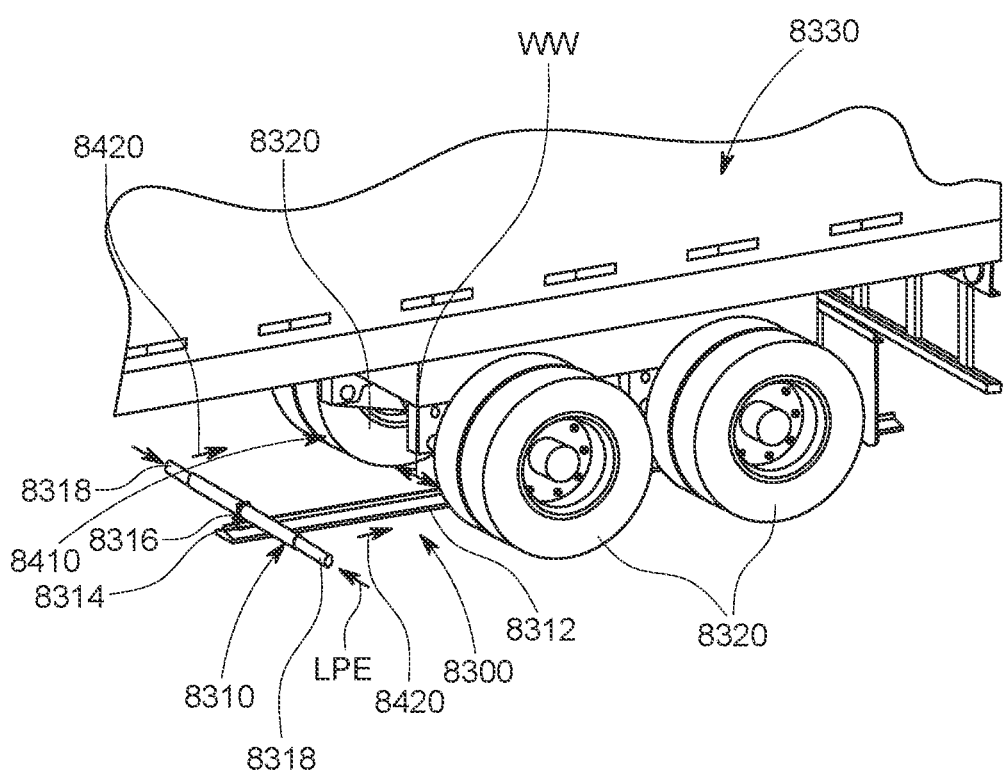
Figure 85:
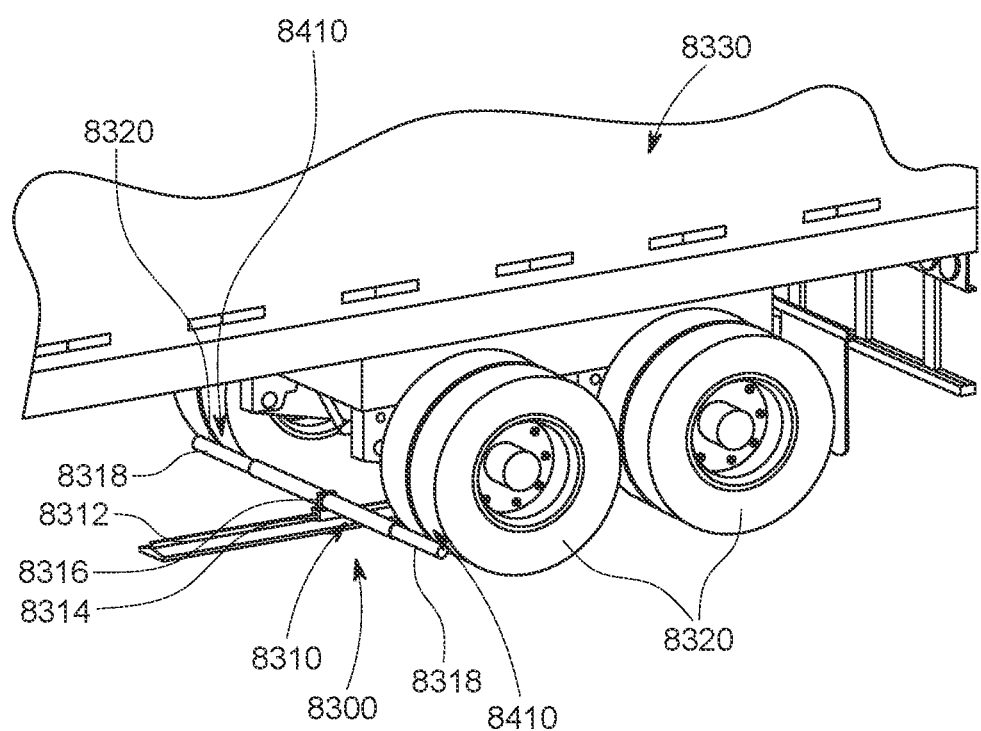

Another automated chocking arrangement 8300 is shown in FIGS. 83-85, according to an embodiment. The arrangement 8300 consists of a high-strength (e.g. a strong metal/metal alloy) telescoping pipe 8310 that is center-mounted on a track 8312. The track 8312 is secured to the parking pad between the wheel sets 8320 of the trailer 8330 using bolts or other fastening mechanisms. Pipe 8310 is mounted on a slider 8314 with a base 8316. The slider 8314 moves along the track 8312 under operation of a robust actuator—for example hydraulic motor/piston and/or geared electric motors (e.g. a rack and pinion for linear motion).

As shown, in operation, the trailer 8330 is moved into position with respect to the dock or other parking area. The length LPR is less than the width WW between wheels so that the wheels can pass over the pipe 8310 free of interference. As shown in FIG. 84, once parked, a sensing system senses the presence of the truck and/or an operator presses a switch that causes the inner telescoping ends 8318 of the pipe to extend outwardly (arrows 8340) in opposite directions so that the overall pipe 8310 defines a length LPE greater than inner wheel width WW. The telescoping sections extend using a linear actuator, such as a hydraulic piston that can be implemented according to known skill. The piston can be embedded in the center pipe section. The ends 8318 can be retracted by a reversing hydraulic pressure or a resistive spring force that operates when the extension pressure is removed. When either a sensor or the operator determines the parked location of the wheel fronts 8420, the slider 8314 is moved (arrows 8420) to slide along a track 8312 for some length along the trailer until the ends 8318 engage the wheel fronts 8410, as shown in FIG. 85. The ability to slide along the track to differing positions allows the pipe 8310 to compensate for a wide range of possible trailer axle positions). The slider motion mechanism can include a sensor that detects when resistance is encountered as the sliding pipe engages the stationary trailer tires 8320. Additionally, the slider motion mechanism can include locking components (not shown) that further secure the slider to its desired location along the track. The holding force of the slider motor can also suffice as a sufficient resistance mechanism depending upon its design.

When the trailer 8330 is again ready for motion, the operator or the system server directs the pipe ends 8318 to retract and the slider 8314 to move back to a forward waiting position. The trailer wheels 8320 are then free to pass over the arrangement 8300.

A similar automated chocking arrangement 8600 to the arrangement 8300 described above in reference to FIGS. 83 to 85 is shown in FIGS. 86 to 88. Thus, similarly functioning elements can be assumed to operate similarly. In this embodiment, a fixed pipe 8610 is provided on a slider 8614 that moves along a fixed track 8612 as described above. In this embodiment, the pipe 8610 is a fixed unit with an overall length LPF that is greater than the inner width WW of the wheels. The slider includes a powered pivot 8618 that allows the pipe 8610 to rotate about a vertical axis APF. Thus, as shown, pipe can normally stow itself lengthwise (parallel) to the trailer 8630, allowing the wheels to back through it to the parking space. The slider 8614 is sufficiently far forward of the wheel fronts 8650 in this orientation to then allow the pivot 8618 to rotate (curved arrow 8640) the pipe 8610 by 90 degrees into its deployed position, as shown in FIG. 87. In this position, the pipe 8610 extends in opposing directions sufficiently to engage the wheel fronts 8650. The system is then directed by a sensor and/or the operator to move the slider 8614 and associated pipe 8610 rearwardly (arrows 8720) into engagement with the wheel fronts 8650, as shown in FIG. 88. The trailer 8630 is now safely chocked for loading or unloading.

When the trailer 8630 is again ready for motion, the operator or the system server directs the slider 8614 to move to a forward waiting position and rotate the pipe pivot 8618 to place the pipe 8610 parallel to the track 8612. The trailer wheels 8620 are then free to pass over the arrangement 8600.

The power of the pivot motor and its locking ability may be reduced as the wheels tend to bear evenly on both sides of the pipe. In general, in the arrangements 8300 and 8600, the cross section of the pipe can be any acceptable regular or irregular shape—for example, circular as depicted, polygonal or a combination of polygonal and curvilinear shapes. In an embodiment, the front, wheel-engaging surface of the pipe can be shaped with an angled flat face similar to a conventional wheel chock so as to enhance its retaining ability.

R. Automated Trailer Angle Detection

When hauling a trailer, it is desirable to determine the orientation (relative angle) of the trailer with respect the tractor. Traditionally, the orientation and perspective of the front face of trailer is observed by a human driver to derive the approximate angle measurement. However, due to the variability in the front face's surface (due to the presence of refrigeration units, fairings, etc.), this approach is less effective using automated sensors, such as visual cameras, conventional LIDAR, etc. However, the commercial availability of so-called high-resolution LIDAR affords more capability in automating the relative trailer angle determination process. Such a high-resolution solution is commercially available from Velodyne LiDAR, Inc. of San Jose, CA in the form of the VLS128™ system, which is presently considered one of the world's highest-resolution LiDAR for use in (e.g.) autonomous vehicles and similar applications. This system uses 128 discrete structured light (laser) beams to derive a 3D surface contour/shape at a significant working distance. These beams can be arranged in projected concentric rings. Other competing high-resolution LIDAR devices and also be employed herein, as well as alternate 3D sensing systems, which can include stereoscopic cameras, etc.

FIGS. 89 and 90 show an arrangement 8900 of an autonomous (e.g. yard) truck 8910 and unhitched trailer 8920 to detect the relative trailer angle ATA, shown herein between the plane of a rear chassis (e.g. bumper 8930) of the truck 8910 and the centerline CLT of the trailer 8920.

Illustratively, this arrangement 8900 includes a LIDAR device 8922 mounted on the truck rear chassis/bumper 8930, facing rearwardly toward the trailer. In operation, the LIDAR device 8922 communicates with a processor 8924, which can be part of the vehicle CPU, and includes an angle determination process(or) 8926. The process(or) 8926 detects the position and orientation of the (e.g.) two landing-gear legs 9010 and 9012 on the trailer 8920 in order to estimate the trailer's angle ATA relative to the rear 8930 of the truck 8910. The LIDAR device 8922 defines a working angle range 9020 that is sufficient to capture the legs 9010 and 9012 within the range of expected trailer angles ATA to be encountered during operation. As shown, the LIDAR beam(s) can also acquire the fronts of at least one of the wheel set(s) 9030, 9032, 9034 and 9036. The height HLT (FIG. 89) between the LIDAR device 9022 and the ground 8950 is chosen to allow its beams 8942 to travel sufficiently beneath the trailer underside 8940 to reach the landing gear legs 9010 and 9012, and potentially, the tire set(s) 9030, 9032, 9034 and 9036. Because the legs 9010 and 9012 and (optionally) the tires are positioned at known parallel orientation across the width/beam on either side of the trailer 9020, and these structures have distinctive surface shapes, they can be used as a reference to determine the relative angle ATA with respect to the truck and associated LIDAR unit (and the truck coordinate system established by the process(or) 8926).

In operation, and with further reference to FIG. 91, the process(or) 8926 analyzes at least one of the rings in the transmitted LIDAR data from the trailer scan to search for groups of points 9110, 9112 where the overall group is roughly the width WLL of a respective landing gear leg. The process(or) 8926, then compares all groups to look for pairs of groups which are roughly equidistant from the trailer kingpin point 8960, and where the separation distance WLG between the two groups 9110, 9112 is roughly the width of a trailer. For pairs that match the criteria, the process(or) 8926 estimates the trailer angle ATA (taken with respect to a line 9140 parallel to the truck bumper) as the angle that bisects the two vectors (outside angles) 9120, 9122 from the truck/trailer hitch point to the opposing outer edges of the two point groups 9110 and 9112.

At extreme relative angles between the truck and trailer, one of the landing gear legs 9010, 9012 can be occluded from the LIDAR sensor's view (e.g. the occluded leg may be in front of the rear bumper due to the extreme angle). This condition is shown by way of example in FIG. 92, in which the landing gear leg 9012 of the trailer 8920 is visible within the maximum sensing fan (cone) 9220 of the LIDAR device 8922, but the opposing leg 9010 is outside the cone (positioned in front of the bumper 9030), and occluded. If no point pairs representative of landing gear legs are found, and if a single group of points is detected (e.g. points corresponding to leg 9012) in the area where the other leg would be expected to be occluded (as that leg is now at an extreme left or right position), then the process(or) 8926 uses a predefined trailer width WTP to estimate the location of the occluded leg 9010. The process(or) 8926 then uses the sensed location of the found leg 9012 and an estimated location for the occluded leg 9010 as an approximated pair for the purposed of the above-described procedure. It then uses this pair to estimate the trailer angle as the angle that bisects the two vectors from the kingpin to the outer edges of the two legs in the approximated pair.

Note that in certain situations, an additional step of providing a linear quadratic estimate (e.g. Kalman filtering)

can be employed in order to smooth the output and improve robustness of the trailer angle determination procedure described above.

With reference again to FIG. 89, in a further embodiment, it can be useful to confirm trailer angle ATA, or improve trailer angle accuracy. The procedure can employ the use of the lower outer edges 8970 of the leading edge of the trailer 8920. This procedure can be accomplished by processing the received, upper LIDAR rings to detect the outer edges of the trailer and can be useful in confirming results from the landing gear detection, or in eliminating false positives if the landing-gear detection procedure returns more than one solution.

In another embodiment, and with reference again to FIG. 91, the LIDAR device can be used to detect the trailer wheels 9030 and 9034 by locating corresponding points 9130 and 9134. This data can be used to confirm, and/or refine the accuracy of, the angle determined using detection of the landing gear, or if the landing gear detection is not conclusive, the location of the wheels can be used to independently establish the trailer angle. The (stored) typical width WTW between (e.g.) the inside edges can be compared to sensed width to establish that the groups of points are wheels and angles can be computed in a manner similar to that described above for landing gear.

S. Automated Kingpin Detection

Reference is made to FIGS. 93 and 94 that depicts a system and method to further assist in the retrieval of a trailer by an autonomous truck. In performing this operation, the system and method employs the approximate location of the trailer, which can be obtained by visual sensing and/or other techniques as described herein. The system and method of this embodiment generally allows the truck to be able to back down and connect to the trailer successfully. This embodiment can employ the above-described LIDAR device 8922 (in FIGS. 89-92). Other like reference numbers are also employed in the depiction of FIGS. 93 and 94 where they apply to similar or identical structures/components.

The system and method, more particularly, allows for proper connection of the truck fifth wheel 9310 to the trailer kingpin 8960 in a backing operation. It employs a kingpin location detection and determination process(or) 9320, which can be part of the overall vehicle processor/CPU 8910, and is interconnected to the LIDAR device and any resident processes/ors instantiated thereon (or associated therewith). Using the system-provided trailer location, the truck 8910 is positioned adjacent to the trailer 8920, and the reversing procedure is then initiated to connect the truck and trailer. During this process it is highly desirable to accurately determine the relative position of the trailer kingpin 8960. While the kingpin 8960 is a relatively small structure on the overall trailer underside 8940, using a LIDAR device 8922 mounted on a truck's back bumper 8930, it is uniquely identifiable as an image feature set produced by the beams 9330 of the LIDAR device 8922.

According to an embodiment, and with further reference to FIG. 95 and the flow diagram of FIG. 96, a procedure 9600 for accurately determining the location of the trailer kingpin 8960 is shown. The procedure 9600 processes (e.g. using the process(or) 9320) each of the LIDAR rings independently and segregates the found points into groups (step 9610). The procedure 9600 then searches for three discrete groups of points 9510, 9512 and 9520 that are separate, but relatively adjacent (within a predetermined threshold), and where the middle group 9520 is closer to the sensor 8922 than the other two (flanking) groups 9510 and 9512 (step 9620).

Step 9620 of the procedure 9600 then further eliminates trios of groups where the flanking groups 9510 and 9512 are not relatively flat and at roughly the same height, and/or where the middle group is significantly wider or taller than the expected width/height of a kingpin. If a trio of groups matches all criteria (decision step 9630), then the procedure 9600 estimates the x, y (or another coordinate system) position of the kingpin as the average of all the point hits in the middle group 9520 (step 9640). The procedure 9600 also reports the kingpin plate height (minimum height of the flanking groups 9510, 9512) HK (FIG. 93) so that the system will have a metric as to how high to raise the fifth wheel 9310 (step 9650). The procedure 9600 then transforms the x, y position from the sensor coordinate space to the navigation/vehicle coordinate space (step 9660). The procedure 9600 then compares the x, y position with the coordinates of any previous detections (step 9670). If there is no match (decision step 9680), then the new x, y position is appended to the list of previous detections (step 9682), and the procedure 9600 continues to search (via steps 9610-9670). However, if there is a match (decision step 9680), then the confidence in the matched detection is incremented to increase its value (step 9684). Based upon incrementing of the confidence value in step 9684, the procedure 9600 prioritizes the list of previous detections using the accumulated confidence, as well as proximity to the vehicle (step 9690). After prioritizing in step 9690, the procedure 9600 outputs detection that has the highest priority for use to guide the backing operation of the truck onto the trailer via the navigation coordinate space.

In an alternate, related embodiment, the system and method employs the above-described trailer angle determination procedure (FIGS. 89-92) which detects the location of the trailer landing gear legs 9010 and 9012. Once both of the landing gear legs have been identified and located, the location of the kingpin 8960 can be estimated based on known/standard trailer geometry, typically expressed in terms of an x, y coordinate relationship between (e.g. centroids). This estimated location is translated into the vehicle/navigation coordinate space. As shown in FIG. 95, the outer edges 9550, 9552, 9560 and 9562 are identified in related point groups that span the width of the trailer underside/sides, and can also be the basis of a trailer angle determination.

VII. Conclusion

It should be clear that the above-described system and method of handling and managing trailers within a shipping yard and the associated devices and operational techniques for autonomous AV yard trucks provides an effective way to reduce human intervention, thereby lowering costs, potentially increasing safety and reducing downtime. The systems and methods herein are practically applicable to a wide range of both electric and fuel-powered trucks and any commercially available trailer arrangement. More particularly, the systems and methods herein effectively enable automation of critical yard operations, such as connection of one or more pneumatic and electrical lines between truck and trailer, unlatching and opening of trailer doors, safe hitching, navigation and docking of trailers with loading bays and docks, maintaining security at the dock and within the vehicle against unauthorized operations and/or users, and other aspects of autonomous vehicle operation. Such systems also enhance operations in container yards, and in other busy yard environments where reverse direction may be a concern and ensuring safety of parked vehicles is a consideration. These novel systems, methods and operations, while adapted to use on AV yard trucks can also benefit other types of automated transport vehicles, and it is contemplated that, using skill in the art, such can be extended to a wide range of non-yard-based and/or OTR vehicles.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow fort a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. A method for operating an autonomous vehicle (AV) yard truck in a yard environment comprising the steps of:
   facilitating, with a processor, autonomous movement of the AV yard truck, substantially free of human user control inputs to onboard controls of the truck, and connection to and disconnection from trailers in the yard;
   sensing, with a plurality of sensors that provide information to the processor, terrain and objects in the yard and assisting in automatically connecting to and disconnecting from the trailers;
   tracking, with a remote server, interconnected with the processor, movement of the AV yard truck around the yard and determines locations for connecting to and disconnecting from the trailers; and
   lowering, in response to the processor, a fifth wheel of the AV yard truck when hitching to or unhitching from one of the trailers and raising the fifth wheel when hitched to one of the trailers.

2. The method as set forth in claim 1, further comprising, acquiring information with a sensor assembly that is directed rearward that senses a feature on a visible portion of the one of the trailers when adjacent to, or hitched to, the AV yard truck, the sensor assembly computing at least one of:
   (a) at least one of (1) a height of the one of the trailers and (2) if landing gear of the one of the trailers is engaged or disengaged from the ground, and
   (b) a relative angle of the one of the trailers.

3. The method as set forth in claim 2, wherein the feature comprises at least one of a fiducial on the trailer front face and an edge on a body of the trailer.

4. The method as set forth in claim 3, wherein the fiducial comprises an ID code with information encoded thereinto.

5. The method as set forth in claim 2, further comprising measuring, a location and orientation of the one of the trailers, with the sensor assembly comprising at least one of radar, LiDAR, and a camera.

6. The method as set forth in claim 2, further comprising, determining with the sensor assembly, if a kingpin of the one of the trailers is engaged with the fifth wheel.

7. A method for operating an autonomous vehicle (AV) yard truck in a yard environment comprising the steps of:
   facilitating, with a processor, autonomous movement of the AV yard truck, substantially free of human user control inputs to onboard controls of the truck, and connection to and disconnection from trailers in the yard;
   sensing, with a plurality of sensors providing information to the processor, features in the yard and assisting in automatically connecting to and disconnecting from the trailers;
   tracking, with a remote server that receives information from the processor, movement of the AV yard truck around the yard and determining locations for connecting to and disconnecting from the trailers; and
   calculating, by the remote server, a route for the AV yard truck to traverse when moving the trailers in the yard environment.

8. The method as set forth in claim 7, wherein the step of calculating includes routing the AV yard truck to a location corresponding to one of the trailers in the yard environment identified by the remote server for hitching to the AV yard truck.

9. The method as set forth in claim 7, wherein the step of routing includes determining, based upon the information from the plurality of sensors, a location of the AV yard truck in the yard environment and a location corresponding to the one of the trailers for hitching to the AV yard truck.

10. The method as set forth in claim 9, wherein the sensors include at least one of GPS, a camera, radar and LiDAR located on the AV yard truck.

11. The method as set forth in claim 7, further comprising, operating a graphical user interface that receives information from the remote server, and that at least one of (a) monitors movement of the AV yard truck, (b) displays inputs and controls for an operator to instruct movement of trailers by the AV yard truck and monitor performance of the movement, and (c) observes locations of trailers based upon identifying data thereof, stored within a trailer inventory database.

12. The method as set forth in claim 11, further comprising, determining, in response to information provided by at least one of the processor and the remote server, an identity of one of the trailers and confirming that the AV yard truck is tasked to be hitched to the identified one of the trailers.

13. The method as set forth in claim 12 wherein the graphical user interface provides inventory information on the trailers in the yard environment from a data store, including the identity of each of the trailers and a location thereof with respect to a map of the yard environment.

14. The method as set forth in claim 12 wherein the trailer identification system includes at least one camera that generates image data from identification information on the one of the trailers.

15. The method as set forth in claim 12, further comprising, scanning an OCR and an ARTag on the one of the trailers by at least one camera and operating ID decoding process to determine the identity of the one of the trailers.

16. The method as set forth in claim 15, further comprising, accessing, by at least one of the remote server and the processor, data related to locations of the trailers in the yard environment, and confirming presence of the identified one of the trailers at a respective of the locations.

17. A method for operating an autonomous vehicle (AV) yard truck in a yard environment comprising the steps of:
facilitating, with a processor, autonomous movement of the AV yard truck, substantially free of human user control inputs to onboard controls of the AV yard truck, and connection to and disconnection from trailers in the yard environment;
sensing, with a plurality of sensors providing information to the processor, features in the yard environment and assisting automatically connecting to and disconnecting from the trailers;
tracking, by a remote server that communicates with the processor, movement of the AV yard truck around the yard environment and determining locations for connecting to and disconnecting from the trailers; and
operating a graphical user interface communicating with the remote server, that at least one of (a) monitors movement of the AV yard truck, (b) displays inputs and controls for an operator to instruct movement of trailers by the AV yard truck and monitor performance of the movement, and (c) observes locations of trailers based upon identifying data thereof, stored within a trailer inventory database.

18. The method as set forth in claim 17, further comprising, sensing, in response to at least one of the processor and the remote server, identity of one of the trailers and confirming that the AV yard truck is tasked to be hitched to the identified one of the trailers.

19. The method as set forth in claim 18, further comprising, providing by the graphical user interface, inventory information on the trailers in the yard environment from a data store, including an identity, respectively, of each of the trailers and a location thereof with respect to a map of the yard environment.

20. The method as set forth in claim 18, wherein the step of sensing includes generating, by at least one camera, image data from identification information on the one of the trailers.

21. The method as set forth in claim 20, wherein the identification information is one of text scanned by OCR and an ARTag scanned using an ID decoding process.

22. The method as set forth in claim 19, further comprising, accessing, by at least one of the processor and the remote server, data related to locations of the trailers in the yard environment and confirming presence of the identified one of the trailers at a respective of the locations.

* * * * *